United States Patent
Guo

(10) Patent No.: US 11,791,975 B2
(45) Date of Patent: Oct. 17, 2023

(54) MULTICELL LINK DIRECTION ALIGNMENT

(71) Applicant: Nokia Technologies Oy, Espoo (FI)

(72) Inventor: Haiyou Guo, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 543 days.

(21) Appl. No.: 17/253,784

(22) PCT Filed: Jul. 17, 2018

(86) PCT No.: PCT/CN2018/095971
§ 371 (c)(1),
(2) Date: Dec. 18, 2020

(87) PCT Pub. No.: WO2020/014867
PCT Pub. Date: Jan. 23, 2020

(65) Prior Publication Data
US 2023/0142492 A1    May 11, 2023

(51) Int. Cl.
*H04W 72/0446* (2023.01)
*H04L 5/14* (2006.01)
*H04W 16/10* (2009.01)

(52) U.S. Cl.
CPC .......... *H04L 5/1469* (2013.01); *H04W 16/10* (2013.01); *H04W 72/0446* (2013.01)

(58) Field of Classification Search
CPC .......................... H04W 16/10; H04W 72/0446
See application file for complete search history.

(56) References Cited

U.S. PATENT DOCUMENTS

| | | | | |
|---|---|---|---|---|
| 2013/0194982 A1* | 8/2013 | Fwu | ...................... | H04B 7/0617 370/280 |
| 2014/0056186 A1* | 2/2014 | Gao | ...................... | H04B 7/2656 370/280 |
| 2014/0153528 A1* | 6/2014 | Chen | ...................... | H04L 1/1861 370/329 |

(Continued)

FOREIGN PATENT DOCUMENTS

| | | |
|---|---|---|
| CN | 102196580 A | 9/2011 |
| CN | 102271414 A | 12/2011 |

(Continued)

OTHER PUBLICATIONS

Extended European Search Report received for corresponding European Patent Application No. 18927019.2, dated Feb. 7, 2022, 7 pages.

(Continued)

*Primary Examiner* — Fahmida S Chowdhury
(74) *Attorney, Agent, or Firm* — Nokia Technologies Oy

(57) ABSTRACT

To minimize a number of uplink/downlink conflicts when at least some of the subframes within a transmission frame may be flexible allocated either to uplink or to downlink, a network node, which is configured to provide wireless access to user devices in a cell, is configured to determine in the cell and its neighboring cells uplink/downlink ratios of at least the flexible subframes, and based on the uplink/downlink ratios, determine, from a look-up-table, optimal link direction assignments at least for the flexible subframes, and to cause transmissions using the optimal link direction assignments.

12 Claims, 3 Drawing Sheets

(56) References Cited

U.S. PATENT DOCUMENTS

| | | | | |
|---|---|---|---|---|
| 2014/0161001 A1* | 6/2014 | Gao | .......................... | H04J 3/02 |
| | | | | 370/280 |
| 2015/0373550 A1* | 12/2015 | Hong | ...................... | H04L 5/001 |
| | | | | 370/254 |
| 2015/0381422 A1* | 12/2015 | Eriksson | ............... | H04W 24/10 |
| | | | | 370/277 |
| 2016/0044672 A1* | 2/2016 | Quan | .................... | H04W 72/21 |
| | | | | 370/280 |
| 2016/0301514 A1* | 10/2016 | Samdanis | ............. | H04W 52/14 |
| 2016/0381587 A1* | 12/2016 | Alexey | ................. | H04L 5/0048 |
| | | | | 370/329 |
| 2017/0311320 A1* | 10/2017 | Lunttila | ................ | H04W 48/00 |
| 2018/0263049 A1* | 9/2018 | Seo | ........................ | H04W 72/20 |
| 2021/0226821 A1* | 7/2021 | Liu | ................... | H04W 72/0446 |

FOREIGN PATENT DOCUMENTS

| | | |
|---|---|---|
| CN | 103384179 A | 11/2013 |
| EP | 2966893 A1 | 1/2016 |
| WO | 2009/120701 A2 | 10/2009 |
| WO | 2015/020589 A1 | 2/2015 |
| WO | 2018/127854 A1 | 7/2018 |

OTHER PUBLICATIONS

International Search Report and Written Opinion received for corresponding Patent Cooperation Treaty Application No. PCT/CN2018/095971, dated Apr. 17, 2019, 9 pages.

* cited by examiner

MULTICELL LINK DIRECTION ALIGNMENT

RELATED APPLICATION

This application was originally filed as PCT Application No. PCT/CN2018/095971, filed on Jul. 17, 2018, of which is incorporated herein by reference in its entirety.

TECHNICAL FIELD

Various example embodiments relates to wireless communications.

BACKGROUND

Wireless communication systems are under constant development. The need for faster communication and huge increase of the data amount create challenges for the wireless communications systems. One way to tackle the challenges is to use dynamically air interface resources either for uplink or downlink, depending on a traffic situation. A side effect of this dynamic allocation is that it may result in a misalignment in a link direction among neighboring cells. The misalignment increases the happening probability of cross-link interference, which in turn may cause transmission failures.

BRIEF DESCRIPTION

According to an aspect, there is provided the subject matter of the independent claims. Some embodiments are defined in the dependent claims.

An aspect provides a network node configured to provide wireless access via a cell, the network node comprising: at least one processor; and at least one memory including computer program code; the at least one memory and computer program code configured to, with the at least one processor, cause the network node at least to perform: determining in the cell and in its neighboring cells uplink/downlink ratios of at least flexible subframes within a transmission frame, a flexible subframe being a subframe that is flexibly assignable for uplink or for downlink; determining, based on the uplink/downlink ratios, using a lookup-table comprising mappings between at least some uplink/downlink ratios and their optimal link direction assignments, optimal link direction assignments at least for the flexible subframes in the cell and its neighboring cells; and causing using the optimal link direction assignments in one or more transmissions.

Another aspect provides a network node configured to provide wireless access to user devices, the network node comprising: means for determining in the cell and its neighboring cells uplink/downlink ratios of at least flexible subframes within a transmission frame, a flexible subframe being a subframe that is flexibly assignable for uplink or for downlink; means for determining, based on the uplink/downlink ratios, using a look-up-table comprising mappings between at least some uplink/downlink ratios and their optimal link direction assignments, optimal link direction assignments at least for the flexible subframes in the cell and its neighboring cells; and means for causing using the optimal link direction assignments in one or more transmissions.

Still another aspect provides a non-transitory computer readable medium comprising program instructions for causing a network node configured to provide wireless access via a cell to perform at least the following: determining in the cell and in its neighboring cells uplink/downlink ratios of at least flexible subframes within a transmission frame, a flexible subframe being a subframe that is flexibly assignable for uplink or for downlink; determining, based on the uplink/downlink ratios, using a look-up-table comprising mappings between at least some uplink/downlink ratios and their optimal link direction assignments, optimal link direction assignments at least for the flexible subframes in the cell and its neighboring cells; and causing using the optimal link direction assignments in one or more transmissions.

A further aspect provides a computer program comprising instructions for causing a network node configured to provide wireless access via a cell to perform at least the following: determining in the cell and in its neighboring cells uplink/downlink ratios of at least flexible subframes within a transmission frame, a flexible subframe being a subframe that is flexibly assignable for uplink or for downlink; determining, based on the uplink/downlink ratios, using a lookup-table comprising mappings between at least some uplink/downlink ratios and their optimal link direction assignments, optimal link direction assignments at least for the flexible subframes in the cell and its neighboring cells; and causing using the optimal link direction assignments in one or more transmissions.

One or more examples of implementations are set forth in more detail in the accompanying drawings and the description below. Other features will be apparent from the description and drawings, and from the claims.

BRIEF DESCRIPTION OF DRAWINGS

In the following, example embodiments will be described in greater detail with reference to the attached drawings, in which.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

Embodiments and examples described herein may be implemented in any communications system comprising wireless connection(s). In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
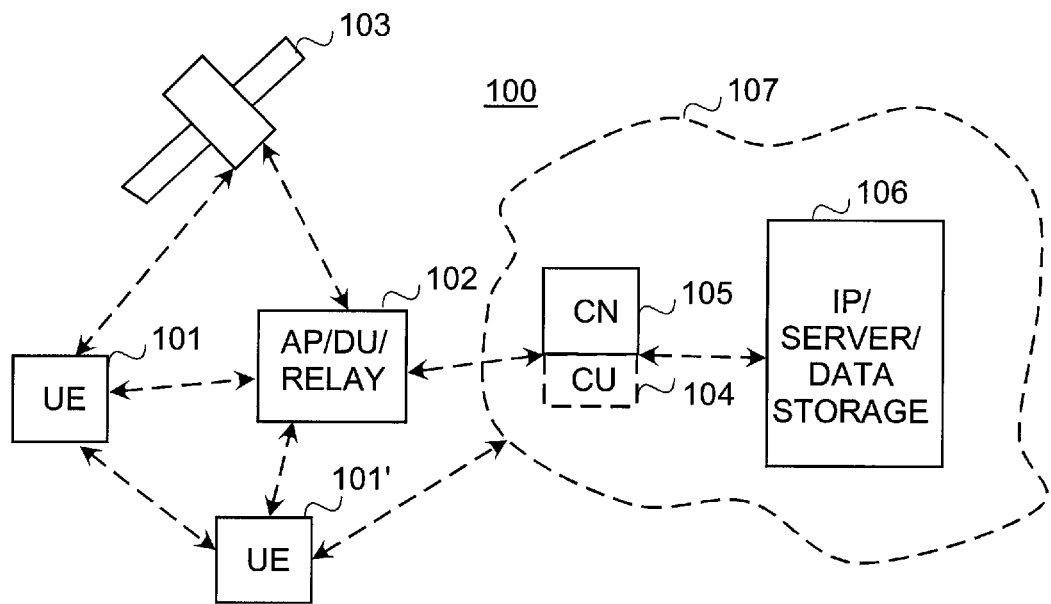
FIGS. 1 and 2 illustrate exemplified wireless communication systems.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes or corresponding network devices than the LTE (a so-called small cell concept), including macro sites operating in cooperation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network.

The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As mentioned, existence of wireless networks on unlicensed frequency bands is constantly increasing. Base stations, called below access points, may support one or more radio access technologies configured to operate on the unlicensed bands, and user devices may be configured to support multiple radio access technologies, on the unlicensed, licensed, and/or on shared frequency bands. Examples of radio access technologies using the unlicensed band include IEEE 802.11 (Wi-Fi), IEEE 802.15, IEEE 802.16, Long-Term Evolution Unlicensed (LTEU), Licensed Assisted Access (LAA), LTE-Wi-Fi Aggregation (LWA), New Radio Licensed Assisted Access (NR-LAA), other unlicensed variants standardized as a part of 5G technology, MulteFire. Many of the user devices can send and receive data on multiple radio access technologies, such as cellular, Long Term Evolution (LTE), IEEE 802.11 (Wi-Fi), IEEE 802.15.1 (Bluetooth®), and other radio access technologies. Some radio access technologies operate also on licensed frequency bands. Further, some radio access technologies may operate on several unlicensed frequency band. For example, IEEE 802.11 operates on 2.4 GHz, 5 GHz, and 60 GHz unlicensed frequency bands. An example of a shared frequency band (shared wireless access) is Citizens Broadband Radio Service (CBRS) that operates on 3.5 GHz band, using the same radio interface as LTE in the licensed spectrum or in the unlicensed 5 GHz band.

In 5G, a dynamic time division duplex, called enhanced interference mitigation and traffic adaption (eIMTA), allows uplink/downlink configuration to vary on a frame-by-frame basis. The frame structure used for enhanced interference mitigation and traffic adaption contains subframes that are dedicated to be either for uplink or for downlink, and four flexible (non-dedicated) subframes, subframes number 3, 4, 8 and 9. Each flexible subframe is assignable (configurable)

for downlink and uplink, naturally for one direction per subframe in one frame. In other words, the frame structure contains downlink only subframes (slots), uplink only subframes (slots), and bi-directional subframes (slots), and the configuration of the bi-directional slots may change in each frame. Below different examples are described using the frame structure of the enhanced interference mitigation and traffic adaption, and a hexagonal cell structure with seven cells as illustrating examples, without restricting the examples to such solutions. It is a straightforward solution to implement the principles to other kind of cell structures and/or frame structures.

Figure 2:
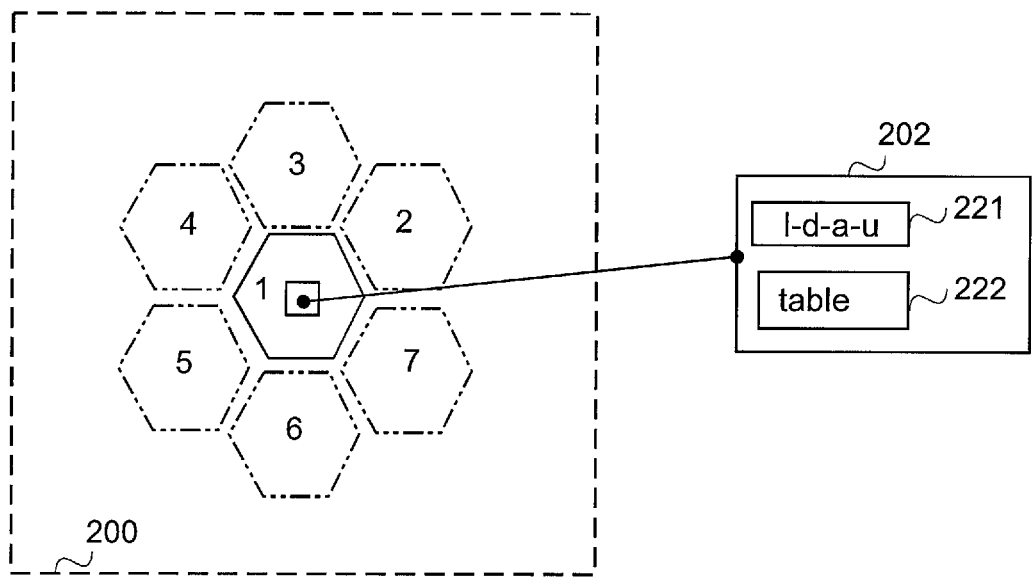

FIG. 2 illustrates a simplified example of a wireless system 200 having the hexagonal cell structure, in which a cell has six neighbouring cells. The hexagonal cell structure is illustrated in FIG. 2 in the perspective of the cell 1. The cell 1 in FIG. 2 comprises a network node 202 for providing the cell, and via the cell, wireless access to user apparatuses. Naturally, although not illustrated in FIG. 2, each cell 2, 3, 4, 5, 6, 7 comprise a corresponding network node providing wireless access (a corresponding cell). The network node 202 providing wireless access may be a base station, eNodeB, or gNB, etc. Below the network node is called simply an access node.

An access node may be configured to support optimal multilink link direction assignment. For that purpose, the access node 202 comprises a link direction assignment unit (l-d-a-u) 221 and one or more memories 222 storing at least a look-up-table. In another embodiment, the look-up-table is not stored in the one or more memories 222, but implemented by one or more digital combinational circuits for the look-up-table, i.e. as a hardware. Regardless of the implementation of the look-up-table, the input and the output are the same.

The look-up-table is created using the fact that the neighboring relation of the cells is fixed in advance; different combinations of UL/DL ratio in cell 1, and in its neighboring cells 2, 3, 4, 5, 6, 7 are known in advance, and the optimal assignment for link direction alignment can be formulated as a zero-one integer problem of the below formula 1:

$$N_{CLI}^*(\{N_{slot,n}^{UL}\}) = \min_{x_{n,t}^{cell}} \sum_{t=1}^{N_{slot}} \sum_{m \in S_{cell}} \sum_{n \in S_{cell}} a_{m,n}(x_{m,t}^{cell} - x_{n,t}^{cell})^2 \text{ s.t.} \sum_{t=1}^{N_{slot}} x_{n,t}^{cell} = N_{slot,n}^{UL}, \ n \in S_{cell}$$

$$x_{n,t}^{cell} \in \{0, 1\}, \ n \in S_{cell}, t = 1, 2, \cdots, N_{slot}.$$

wherein $N^*_{CLI}$ is the minimum total number of link direction conflicts over the neighbouring cells for given combination of UL/DL ratio, $N_{slot,n}^{UL}$ is the number of flexible subframes that are assigned as uplink subframes to cell n, $x_{n,t}^{cell}$ is a zero-one indication variable for link direction, 1 means that the subframe t is assigned as an uplink subframe for cell n, 0 means that subframe t is assigned as an downlink subframe for cell n, $N_{slot}$ is the number of flexible subframes, $S_{cell}$ is the cluster of neighboring cells (i.e. the set of the indices of the neighbouring cells), $a_{m,n}$ is a constant representing neighboring relation between cells m and n as follows (formula 2):

$$a_{n,m} = \begin{cases} 1 & \text{if } n \neq m \text{ and cells } m \text{ and } n \text{ are } neighbouring \\ 0 & \text{if } n = m \text{ or cell } m \text{ and } n \text{ are not } neighbouring \end{cases}$$

Real-time calculation (computing) for the optimal solution to the above zero-one integer problem, even when there are no more than altogether 7 cells (cell 1+6 neighboring cells) and 4 flexible subframes, takes too much time. However, it is possible to calculate (compute) in advance optimal link direction assignments for all possible uplink/downlink ratio combinations. Since each cell has 5 possible uplink/downlink ratios, i.e. 0:4, 1:3, 2:2, 3:1, 4:0, this means calculating (computing) in advance optimal link direction assignments for all possible $5^7$, i.e. 78125, uplink/downlink ratio combinations.

The in advance calculated (pre-calculated) optimal link direction assignments may be stored to the look-up-table 222 with some information indicating a mapping relation between a specific set of uplink/downlink ratios and an optimal link direction assignment for the specific set.

The mapping relation may be based on a configuration number, and the look-up-table 222 may comprise rows, in which one row denotes one mapping. For example, a look-up-table 222 for the hexagonal structure may have an array structure with 8 columns, starting with a configuration number and then, for each cell, a link direction assignment at least for the flexible subframes. The link direction assignment may be given by value "0" indicating downlink and value "1" indicating uplink, and the values may be listed according to the flexible subframe number order in such a way that, for example, a string "1010" means that the subframe number 3 is uplink, the subframe number 4 is downlink, the subframe number 8 is uplink and the subframe number 9 is downlink. Naturally any other way may be used. For example, value "0" could indicate uplink, and value "1" downlink.

Values for the look-up-table 222 may be defined using following principles, for example:

Combinations of uplink/downlink ratios may be defined as follows (formula 3):

$$\{N_{slot,1}^{UL}:(4-N_{slot,1}^{UL}), N_{slot,2}^{UL}:(4-N_{slot,2}^{UL}), \ldots, N_{slot,7}^{UL}:(4-N_{slot,7}^{UL})\}$$

wherein $N_{slot,n}^{UL}$ is the number of flexible subframes that are assigned as uplink subframes to cell n, and $N_{slot,n}^{UL}:(4-N_{slot,n}^{UL})$ is the uplink/downlink ratio cell n It should be appreciated that in the above and below, term "slot" is used in formulas instead of subframe simply because "slot" as a shorter term.

When the ratios are known, for each ratio, a corresponding configuration number, #Congfig, can be calculated (computed) using the following formula 4:

$$\#Congfig(\{N_{slot,n}^{UL}:(4-N_{slot,n}^{UL})\}_{n=1,2,\ldots,7}) = 1 + c^T a$$

with $$c = [5^6 \ 5^5 \ 5^4 \ 5^3 \ 5^2 \ 5^1]^T$$

$$a = [N_{slot,1}^{UL} \ N_{slot,2}^{UL} \ N_{slot,3}^{UL} \ N_{slot,4}^{UL} \ N_{slot,5}^{UL} \ N_{slot,6}^{UL} \ N_{slot,7}^{UL}]^T$$

For the illustrated hexagonal cell structure, the configuration number may be any number between 1-78125, which range covers all possible uplink/downlink ratio combinations. With the configuration number, a corresponding optimal link direction assignment for the cells may be retrieved from the lookup-table with a rather simple calculation.

However, the size of the table is rather big, and it will require quite a lot of storage capacity.

In another implementation, a reduced size look-up-table 222 is used with the configuration numbers. The reduced size look-up-table can be seen as a subset of the table containing all configuration numbers. The reduced size table can be created by exploiting geometric and directional symmetry of the hexagonal structure. Thanks to the above approach, it is possible to reduce the size of the look-up-table for the illustrated hexagonal cell structure from a table having all 78125 optimal link direction assignments to a table having only 3787 optimal link direction assignments to cover all the same possibilities. In the example table only the assignment of flexible subframes for each cell are shown, using the above described principles: 1010 meaning that the subframe number 3 is uplink, the subframe number 4 is downlink, the subframe number 8 is uplink and the subframe number 9 is downlink. Table 1 contains the 3787 optimal link direction assignments.

TABLE 1

(reduced size look-up-table)

| #Config | Cell 1 | Cell 2 | Cell 3 | Cell 4 | Cell 5 | Cell 6 | Cell 7 |
|---|---|---|---|---|---|---|---|
| 1 | 0000 | 0000 | 0000 | 0000 | 0000 | 0000 | 0000 |
| 2 | 0000 | 0000 | 0000 | 0000 | 0000 | 0000 | 0001 |
| 3 | 0000 | 0000 | 0000 | 0000 | 0000 | 0000 | 0011 |
| 4 | 0000 | 0000 | 0000 | 0000 | 0000 | 0000 | 0111 |
| 5 | 0000 | 0000 | 0000 | 0000 | 0000 | 0000 | 1111 |
| 7 | 0000 | 0000 | 0000 | 0000 | 0000 | 1000 | 1000 |
| 8 | 0000 | 0000 | 0000 | 0000 | 0000 | 0100 | 1100 |
| 9 | 0000 | 0000 | 0000 | 0000 | 0000 | 0100 | 1101 |
| 10 | 0000 | 0000 | 0000 | 0000 | 0000 | 0001 | 1111 |
| 13 | 0000 | 0000 | 0000 | 0000 | 0000 | 1100 | 1100 |
| 14 | 0000 | 0000 | 0000 | 0000 | 0000 | 1100 | 1101 |
| 15 | 0000 | 0000 | 0000 | 0000 | 0000 | 0011 | 1111 |
| 19 | 0000 | 0000 | 0000 | 0000 | 0000 | 1110 | 1110 |
| 20 | 0000 | 0000 | 0000 | 0000 | 0000 | 0111 | 1111 |
| 25 | 0000 | 0000 | 0000 | 0000 | 0000 | 1111 | 1111 |
| 27 | 0000 | 0000 | 0000 | 0000 | 0001 | 0000 | 0001 |
| 28 | 0000 | 0000 | 0000 | 0000 | 0001 | 0000 | 0011 |
| 29 | 0000 | 0000 | 0000 | 0000 | 0001 | 0000 | 0111 |
| 30 | 0000 | 0000 | 0000 | 0000 | 0001 | 0000 | 1111 |
| 32 | 0000 | 0000 | 0000 | 0000 | 1000 | 1000 | 1000 |
| 33 | 0000 | 0000 | 0000 | 0000 | 1000 | 1000 | 1001 |
| 34 | 0000 | 0000 | 0000 | 0000 | 1000 | 1000 | 1011 |
| 35 | 0000 | 0000 | 0000 | 0000 | 1000 | 1000 | 1111 |
| 37 | 0000 | 0000 | 0000 | 0000 | 1000 | 1001 | 0001 |
| 38 | 0000 | 0000 | 0000 | 0000 | 1000 | 1001 | 1001 |
| 39 | 0000 | 0000 | 0000 | 0000 | 1000 | 1001 | 1011 |
| 40 | 0000 | 0000 | 0000 | 0000 | 1000 | 1001 | 1111 |
| 42 | 0000 | 0000 | 0000 | 0000 | 1000 | 1011 | 0001 |
| 43 | 0000 | 0000 | 0000 | 0000 | 1000 | 1011 | 0011 |
| 44 | 0000 | 0000 | 0000 | 0000 | 1000 | 1011 | 1011 |
| 45 | 0000 | 0000 | 0000 | 0000 | 1000 | 1011 | 1111 |
| 47 | 0000 | 0000 | 0000 | 0000 | 0001 | 1111 | 0001 |
| 48 | 0000 | 0000 | 0000 | 0000 | 0001 | 1111 | 0011 |
| 49 | 0000 | 0000 | 0000 | 0000 | 0001 | 1111 | 0111 |
| 50 | 0000 | 0000 | 0000 | 0000 | 0001 | 1111 | 1111 |
| 53 | 0000 | 0000 | 0000 | 0000 | 0011 | 0000 | 0011 |
| 54 | 0000 | 0000 | 0000 | 0000 | 0011 | 0000 | 0111 |
| 55 | 0000 | 0000 | 0000 | 0000 | 0011 | 0000 | 1111 |
| 58 | 0000 | 0000 | 0000 | 0000 | 1100 | 1000 | 1001 |
| 59 | 0000 | 0000 | 0000 | 0000 | 1100 | 1000 | 1011 |
| 60 | 0000 | 0000 | 0000 | 0000 | 1100 | 1000 | 1111 |
| 63 | 0000 | 0000 | 0000 | 0000 | 1001 | 1001 | 1001 |
| 64 | 0000 | 0000 | 0000 | 0000 | 1001 | 1001 | 1011 |
| 65 | 0000 | 0000 | 0000 | 0000 | 1100 | 1100 | 1111 |
| 68 | 0000 | 0000 | 0000 | 0000 | 1010 | 1011 | 0011 |
| 69 | 0000 | 0000 | 0000 | 0000 | 1010 | 1011 | 1011 |
| 70 | 0000 | 0000 | 0000 | 0000 | 1100 | 1101 | 1111 |
| 73 | 0000 | 0000 | 0000 | 0000 | 0011 | 1111 | 0011 |
| 74 | 0000 | 0000 | 0000 | 0000 | 0011 | 1111 | 0111 |
| 75 | 0000 | 0000 | 0000 | 0000 | 0011 | 1111 | 1111 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 79 | 0000 | 0000 | 0000 | 0000 | 0111 | 0000 | 0111 |
| 80 | 0000 | 0000 | 0000 | 0000 | 0111 | 0000 | 1111 |
| 84 | 0000 | 0000 | 0000 | 0000 | 1110 | 1000 | 1011 |
| 85 | 0000 | 0000 | 0000 | 0000 | 1110 | 1000 | 1111 |
| 89 | 0000 | 0000 | 0000 | 0000 | 1101 | 1001 | 1011 |
| 90 | 0000 | 0000 | 0000 | 0000 | 1101 | 1001 | 1111 |
| 94 | 0000 | 0000 | 0000 | 0000 | 1011 | 1011 | 1011 |
| 95 | 0000 | 0000 | 0000 | 0000 | 1101 | 1101 | 1111 |
| 99 | 0000 | 0000 | 0000 | 0000 | 0111 | 1111 | 0111 |
| 100 | 0000 | 0000 | 0000 | 0000 | 0111 | 1111 | 1111 |
| 105 | 0000 | 0000 | 0000 | 0000 | 1111 | 0000 | 1111 |
| 110 | 0000 | 0000 | 0000 | 0000 | 1111 | 0001 | 1111 |
| 115 | 0000 | 0000 | 0000 | 0000 | 1111 | 0011 | 1111 |
| 120 | 0000 | 0000 | 0000 | 0000 | 1111 | 0111 | 1111 |
| 125 | 0000 | 0000 | 0000 | 0000 | 1111 | 1111 | 1111 |
| 127 | 0000 | 0000 | 0000 | 0001 | 0000 | 0000 | 0001 |
| 128 | 0000 | 0000 | 0000 | 0001 | 0000 | 0000 | 0011 |
| 129 | 0000 | 0000 | 0000 | 0001 | 0000 | 0000 | 0111 |
| 130 | 0000 | 0000 | 0000 | 0001 | 0000 | 0000 | 1111 |
| 132 | 0000 | 0000 | 0000 | 0001 | 0000 | 0001 | 0001 |
| 133 | 0000 | 0000 | 0000 | 0001 | 0000 | 0001 | 0011 |
| 134 | 0000 | 0000 | 0000 | 0001 | 0000 | 0001 | 0111 |
| 135 | 0000 | 0000 | 0000 | 0001 | 0000 | 0001 | 1111 |
| 137 | 0000 | 0000 | 0000 | 0001 | 0000 | 1001 | 0001 |
| 138 | 0000 | 0000 | 0000 | 0001 | 0000 | 1001 | 1001 |
| 139 | 0000 | 0000 | 0000 | 0001 | 0000 | 1001 | 1011 |
| 140 | 0000 | 0000 | 0000 | 0001 | 0000 | 0011 | 1111 |
| 142 | 0000 | 0000 | 0000 | 0001 | 0000 | 1011 | 0010 |
| 143 | 0000 | 0000 | 0000 | 0001 | 0000 | 1101 | 0101 |
| 144 | 0000 | 0000 | 0000 | 0001 | 0000 | 1101 | 1101 |
| 145 | 0000 | 0000 | 0000 | 0001 | 0000 | 0111 | 1111 |
| 147 | 0000 | 0000 | 0000 | 0001 | 0000 | 1111 | 0001 |
| 148 | 0000 | 0000 | 0000 | 0001 | 0000 | 1111 | 0011 |
| 149 | 0000 | 0000 | 0000 | 0001 | 0000 | 1111 | 0111 |
| 150 | 0000 | 0000 | 0000 | 0001 | 0000 | 1111 | 1111 |
| 153 | 0000 | 0000 | 0000 | 1000 | 1000 | 0000 | 0011 |
| 154 | 0000 | 0000 | 0000 | 1000 | 1000 | 0000 | 0111 |
| 155 | 0000 | 0000 | 0000 | 1000 | 1000 | 0000 | 1111 |
| 157 | 0000 | 0000 | 0000 | 1000 | 1000 | 1000 | 1000 |
| 158 | 0000 | 0000 | 0000 | 1000 | 1000 | 1000 | 1010 |
| 159 | 0000 | 0000 | 0000 | 1000 | 1000 | 1000 | 1110 |
| 160 | 0000 | 0000 | 0000 | 1000 | 1000 | 1000 | 1111 |
| 162 | 0000 | 0000 | 0000 | 1000 | 1000 | 1001 | 1000 |
| 163 | 0000 | 0000 | 0000 | 1000 | 1000 | 1001 | 1001 |
| 164 | 0000 | 0000 | 0000 | 0010 | 0010 | 0110 | 1110 |
| 165 | 0000 | 0000 | 0000 | 1000 | 1000 | 1001 | 1111 |
| 167 | 0000 | 0000 | 0000 | 1000 | 1000 | 1011 | 0010 |
| 168 | 0000 | 0000 | 0000 | 1000 | 1000 | 1011 | 1010 |
| 169 | 0000 | 0000 | 0000 | 1000 | 1000 | 1011 | 1011 |
| 170 | 0000 | 0000 | 0000 | 1000 | 1000 | 1011 | 1111 |
| 172 | 0000 | 0000 | 0000 | 1000 | 1000 | 1111 | 0001 |
| 173 | 0000 | 0000 | 0000 | 1000 | 1000 | 1111 | 0011 |
| 174 | 0000 | 0000 | 0000 | 1000 | 1000 | 1111 | 0111 |
| 175 | 0000 | 0000 | 0000 | 1000 | 1000 | 1111 | 1111 |
| 178 | 0000 | 0000 | 0000 | 0100 | 1100 | 0000 | 0011 |
| 179 | 0000 | 0000 | 0000 | 0100 | 1100 | 0000 | 0111 |
| 180 | 0000 | 0000 | 0000 | 0100 | 1100 | 0000 | 1111 |
| 183 | 0000 | 0000 | 0000 | 1000 | 1001 | 0001 | 0011 |
| 184 | 0000 | 0000 | 0000 | 1000 | 1001 | 0001 | 0111 |
| 185 | 0000 | 0000 | 0000 | 1000 | 1001 | 0001 | 1111 |
| 187 | 0000 | 0000 | 0000 | 1000 | 1001 | 1001 | 1000 |
| 188 | 0000 | 0000 | 0000 | 1000 | 1001 | 1001 | 1001 |
| 189 | 0000 | 0000 | 0000 | 1000 | 1001 | 1001 | 1011 |
| 190 | 0000 | 0000 | 0000 | 1000 | 1001 | 1001 | 1111 |
| 192 | 0000 | 0000 | 0000 | 0001 | 0101 | 1101 | 0100 |
| 193 | 0000 | 0000 | 0000 | 0001 | 0101 | 1101 | 1100 |
| 194 | 0000 | 0000 | 0000 | 0010 | 0110 | 1110 | 1110 |
| 195 | 0000 | 0000 | 0000 | 1000 | 1001 | 1011 | 1111 |
| 197 | 0000 | 0000 | 0000 | 1000 | 1001 | 1111 | 0001 |
| 198 | 0000 | 0000 | 0000 | 1000 | 1001 | 1111 | 0011 |
| 199 | 0000 | 0000 | 0000 | 1000 | 1001 | 1111 | 0111 |
| 200 | 0000 | 0000 | 0000 | 1000 | 1001 | 1111 | 1111 |
| 203 | 0000 | 0000 | 0000 | 0100 | 1101 | 0000 | 0011 |
| 204 | 0000 | 0000 | 0000 | 0100 | 1101 | 0000 | 0111 |
| 205 | 0000 | 0000 | 0000 | 0100 | 1101 | 0000 | 1111 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 208 | 0000 | 0000 | 0000 | 1000 | 1011 | 0001 | 0011 |
| 209 | 0000 | 0000 | 0000 | 1000 | 1011 | 0001 | 0111 |
| 210 | 0000 | 0000 | 0000 | 1000 | 1011 | 0001 | 1111 |
| 213 | 0000 | 0000 | 0000 | 1000 | 1011 | 0011 | 0011 |
| 214 | 0000 | 0000 | 0000 | 1000 | 1011 | 0011 | 0111 |
| 215 | 0000 | 0000 | 0000 | 1000 | 1011 | 0011 | 1111 |
| 217 | 0000 | 0000 | 0000 | 1000 | 1011 | 1011 | 0010 |
| 218 | 0000 | 0000 | 0000 | 1000 | 1011 | 1011 | 1010 |
| 219 | 0000 | 0000 | 0000 | 1000 | 1011 | 1011 | 1011 |
| 220 | 0000 | 0000 | 0000 | 1000 | 1011 | 1011 | 1111 |
| 222 | 0000 | 0000 | 0000 | 1000 | 1011 | 1111 | 0001 |
| 223 | 0000 | 0000 | 0000 | 1000 | 1011 | 1111 | 0011 |
| 224 | 0000 | 0000 | 0000 | 1000 | 1011 | 1111 | 0111 |
| 225 | 0000 | 0000 | 0000 | 1000 | 1011 | 1111 | 1111 |
| 228 | 0000 | 0000 | 0000 | 0001 | 1111 | 0000 | 0011 |
| 229 | 0000 | 0000 | 0000 | 0001 | 1111 | 0000 | 0111 |
| 230 | 0000 | 0000 | 0000 | 0001 | 1111 | 0000 | 1111 |
| 233 | 0000 | 0000 | 0000 | 0001 | 1111 | 0001 | 0011 |
| 234 | 0000 | 0000 | 0000 | 0001 | 1111 | 0001 | 0111 |
| 235 | 0000 | 0000 | 0000 | 0001 | 1111 | 0001 | 1111 |
| 238 | 0000 | 0000 | 0000 | 0001 | 1111 | 1001 | 1001 |
| 239 | 0000 | 0000 | 0000 | 0001 | 1111 | 1001 | 1011 |
| 240 | 0000 | 0000 | 0000 | 0001 | 1111 | 0011 | 1111 |
| 243 | 0000 | 0000 | 0000 | 0001 | 1111 | 1101 | 0101 |
| 244 | 0000 | 0000 | 0000 | 0001 | 1111 | 1101 | 1101 |
| 245 | 0000 | 0000 | 0000 | 0001 | 1111 | 0111 | 1111 |
| 247 | 0000 | 0000 | 0000 | 0001 | 1111 | 1111 | 0001 |
| 248 | 0000 | 0000 | 0000 | 0001 | 1111 | 1111 | 0011 |
| 249 | 0000 | 0000 | 0000 | 0001 | 1111 | 1111 | 0111 |
| 250 | 0000 | 0000 | 0000 | 0001 | 1111 | 1111 | 1111 |
| 253 | 0000 | 0000 | 0000 | 0011 | 0000 | 0000 | 0011 |
| 254 | 0000 | 0000 | 0000 | 0011 | 0000 | 0000 | 0111 |
| 255 | 0000 | 0000 | 0000 | 0011 | 0000 | 0000 | 1111 |
| 258 | 0000 | 0000 | 0000 | 0011 | 0000 | 0001 | 0011 |
| 259 | 0000 | 0000 | 0000 | 0011 | 0000 | 0001 | 0111 |
| 260 | 0000 | 0000 | 0000 | 0011 | 0000 | 0001 | 1111 |
| 263 | 0000 | 0000 | 0000 | 0011 | 0000 | 1001 | 1001 |
| 264 | 0000 | 0000 | 0000 | 0011 | 0000 | 1001 | 1011 |
| 265 | 0000 | 0000 | 0000 | 0011 | 0000 | 0011 | 1111 |
| 268 | 0000 | 0000 | 0000 | 0011 | 0000 | 1101 | 0101 |
| 269 | 0000 | 0000 | 0000 | 0011 | 0000 | 1101 | 1101 |
| 270 | 0000 | 0000 | 0000 | 0011 | 0000 | 0111 | 1111 |
| 273 | 0000 | 0000 | 0000 | 0011 | 0000 | 1111 | 0011 |
| 274 | 0000 | 0000 | 0000 | 0011 | 0000 | 1111 | 0111 |
| 275 | 0000 | 0000 | 0000 | 0011 | 0000 | 1111 | 1111 |
| 279 | 0000 | 0000 | 0000 | 1100 | 1000 | 0000 | 0111 |
| 280 | 0000 | 0000 | 0000 | 1100 | 1000 | 0000 | 1111 |
| 283 | 0000 | 0000 | 0000 | 1100 | 1000 | 1000 | 1010 |
| 284 | 0000 | 0000 | 0000 | 1100 | 1000 | 1000 | 1110 |
| 285 | 0000 | 0000 | 0000 | 1100 | 1000 | 1000 | 1111 |
| 288 | 0000 | 0000 | 0000 | 1100 | 1000 | 1001 | 1001 |
| 289 | 0000 | 0000 | 0000 | 0110 | 0010 | 0110 | 1110 |
| 290 | 0000 | 0000 | 0000 | 1100 | 1000 | 1001 | 1111 |
| 293 | 0000 | 0000 | 0000 | 1100 | 1000 | 1011 | 1010 |
| 294 | 0000 | 0000 | 0000 | 1100 | 1000 | 1011 | 1011 |
| 295 | 0000 | 0000 | 0000 | 1100 | 1000 | 1011 | 1111 |
| 298 | 0000 | 0000 | 0000 | 1100 | 1000 | 1111 | 0011 |
| 299 | 0000 | 0000 | 0000 | 1100 | 1000 | 1111 | 0111 |
| 300 | 0000 | 0000 | 0000 | 1100 | 1000 | 1111 | 1111 |
| 304 | 0000 | 0000 | 0000 | 1100 | 1100 | 0000 | 0111 |
| 305 | 0000 | 0000 | 0000 | 1100 | 1100 | 0000 | 1111 |
| 309 | 0000 | 0000 | 0000 | 1001 | 1001 | 0001 | 0111 |
| 310 | 0000 | 0000 | 0000 | 1001 | 1001 | 0001 | 1111 |
| 313 | 0000 | 0000 | 0000 | 1001 | 1001 | 1001 | 1001 |
| 314 | 0000 | 0000 | 0000 | 1001 | 1001 | 1001 | 1011 |
| 315 | 0000 | 0000 | 0000 | 1001 | 1001 | 1001 | 1111 |
| 318 | 0000 | 0000 | 0000 | 1001 | 1001 | 1011 | 1010 |
| 319 | 0000 | 0000 | 0000 | 1001 | 1001 | 1011 | 1011 |
| 320 | 0000 | 0000 | 0000 | 1001 | 1001 | 1011 | 1111 |
| 323 | 0000 | 0000 | 0000 | 1100 | 1100 | 1111 | 0011 |
| 324 | 0000 | 0000 | 0000 | 1100 | 1100 | 1111 | 0111 |
| 325 | 0000 | 0000 | 0000 | 1100 | 1100 | 1111 | 1111 |
| 329 | 0000 | 0000 | 0000 | 1100 | 1101 | 0000 | 0111 |
| 330 | 0000 | 0000 | 0000 | 1100 | 1101 | 0000 | 1111 |
| 334 | 0000 | 0000 | 0000 | 1010 | 1011 | 0001 | 0111 |
| 335 | 0000 | 0000 | 0000 | 1010 | 1011 | 0001 | 1111 |
| 339 | 0000 | 0000 | 0000 | 1010 | 1011 | 0011 | 0111 |
| 340 | 0000 | 0000 | 0000 | 1010 | 1011 | 0011 | 1111 |
| 343 | 0000 | 0000 | 0000 | 1010 | 1011 | 1011 | 1010 |
| 344 | 0000 | 0000 | 0000 | 1010 | 1011 | 1011 | 1011 |
| 345 | 0000 | 0000 | 0000 | 1010 | 1011 | 1011 | 1111 |
| 348 | 0000 | 0000 | 0000 | 1100 | 1101 | 1111 | 0011 |
| 349 | 0000 | 0000 | 0000 | 1100 | 1101 | 1111 | 0111 |
| 350 | 0000 | 0000 | 0000 | 1100 | 1101 | 1111 | 1111 |
| 354 | 0000 | 0000 | 0000 | 0011 | 1111 | 0000 | 0111 |
| 355 | 0000 | 0000 | 0000 | 0011 | 1111 | 0000 | 1111 |
| 359 | 0000 | 0000 | 0000 | 0011 | 1111 | 0001 | 0111 |
| 360 | 0000 | 0000 | 0000 | 0011 | 1111 | 0001 | 1111 |
| 364 | 0000 | 0000 | 0000 | 0011 | 1111 | 1001 | 1011 |
| 365 | 0000 | 0000 | 0000 | 0011 | 1111 | 0011 | 1111 |
| 369 | 0000 | 0000 | 0000 | 0011 | 1111 | 1101 | 1101 |
| 370 | 0000 | 0000 | 0000 | 0011 | 1111 | 0111 | 1111 |
| 373 | 0000 | 0000 | 0000 | 0011 | 1111 | 1111 | 0011 |
| 374 | 0000 | 0000 | 0000 | 0011 | 1111 | 1111 | 0111 |
| 375 | 0000 | 0000 | 0000 | 0011 | 1111 | 1111 | 1111 |
| 379 | 0000 | 0000 | 0000 | 0111 | 0000 | 0000 | 0111 |
| 380 | 0000 | 0000 | 0000 | 0111 | 0000 | 0000 | 1111 |
| 384 | 0000 | 0000 | 0000 | 0111 | 0000 | 0001 | 0111 |
| 385 | 0000 | 0000 | 0000 | 0111 | 0000 | 0001 | 1111 |
| 389 | 0000 | 0000 | 0000 | 0111 | 0000 | 1001 | 1011 |
| 390 | 0000 | 0000 | 0000 | 0111 | 0000 | 0011 | 1111 |
| 394 | 0000 | 0000 | 0000 | 0111 | 0000 | 1101 | 1101 |
| 395 | 0000 | 0000 | 0000 | 0111 | 0000 | 0111 | 1111 |
| 399 | 0000 | 0000 | 0000 | 0111 | 0000 | 1111 | 0111 |
| 400 | 0000 | 0000 | 0000 | 0111 | 0000 | 1111 | 1111 |
| 405 | 0000 | 0000 | 0000 | 1110 | 1000 | 0000 | 1111 |
| 409 | 0000 | 0000 | 0000 | 1110 | 1000 | 1000 | 1110 |
| 410 | 0000 | 0000 | 0000 | 1110 | 1000 | 1000 | 1111 |
| 414 | 0000 | 0000 | 0000 | 1110 | 0010 | 0110 | 1110 |
| 415 | 0000 | 0000 | 0000 | 1110 | 1000 | 1001 | 1111 |
| 419 | 0000 | 0000 | 0000 | 1110 | 1000 | 1011 | 1011 |
| 420 | 0000 | 0000 | 0000 | 1110 | 1000 | 1011 | 1111 |
| 424 | 0000 | 0000 | 0000 | 1110 | 1000 | 1111 | 0111 |
| 425 | 0000 | 0000 | 0000 | 1110 | 1000 | 1111 | 1111 |
| 430 | 0000 | 0000 | 0000 | 1110 | 1010 | 0000 | 1111 |
| 435 | 0000 | 0000 | 0000 | 1011 | 1010 | 1000 | 1111 |
| 439 | 0000 | 0000 | 0000 | 1101 | 1001 | 1001 | 1011 |
| 440 | 0000 | 0000 | 0000 | 1101 | 1001 | 1001 | 1111 |
| 444 | 0000 | 0000 | 0000 | 1101 | 1001 | 1011 | 1011 |
| 445 | 0000 | 0000 | 0000 | 1101 | 1001 | 1011 | 1111 |
| 449 | 0000 | 0000 | 0000 | 1101 | 1001 | 1111 | 0111 |
| 450 | 0000 | 0000 | 0000 | 1101 | 1001 | 1111 | 1111 |
| 455 | 0000 | 0000 | 0000 | 1110 | 1110 | 0000 | 1111 |
| 460 | 0000 | 0000 | 0000 | 1011 | 1011 | 0001 | 1111 |
| 465 | 0000 | 0000 | 0000 | 1011 | 1011 | 0011 | 1111 |
| 469 | 0000 | 0000 | 0000 | 1011 | 1011 | 1011 | 1011 |
| 470 | 0000 | 0000 | 0000 | 1011 | 1011 | 1011 | 1111 |
| 474 | 0000 | 0000 | 0000 | 1101 | 1101 | 1111 | 0111 |
| 475 | 0000 | 0000 | 0000 | 1101 | 1101 | 1111 | 1111 |
| 480 | 0000 | 0000 | 0000 | 0111 | 1111 | 0000 | 1111 |
| 485 | 0000 | 0000 | 0000 | 0111 | 1111 | 0001 | 1111 |
| 490 | 0000 | 0000 | 0000 | 0111 | 1111 | 0011 | 1111 |
| 495 | 0000 | 0000 | 0000 | 0111 | 1111 | 0111 | 1111 |
| 499 | 0000 | 0000 | 0000 | 0111 | 1111 | 1111 | 0111 |
| 500 | 0000 | 0000 | 0000 | 0111 | 1111 | 1111 | 1111 |
| 505 | 0000 | 0000 | 0000 | 1111 | 0000 | 0000 | 1111 |
| 510 | 0000 | 0000 | 0000 | 1111 | 0000 | 0001 | 1111 |
| 515 | 0000 | 0000 | 0000 | 1111 | 0000 | 0011 | 1111 |
| 520 | 0000 | 0000 | 0000 | 1111 | 0000 | 0111 | 1111 |
| 525 | 0000 | 0000 | 0000 | 1111 | 0000 | 1111 | 1111 |
| 535 | 0000 | 0000 | 0000 | 1111 | 1000 | 1000 | 1111 |
| 540 | 0000 | 0000 | 0000 | 1111 | 0100 | 1100 | 1111 |
| 545 | 0000 | 0000 | 0000 | 1111 | 0100 | 1101 | 1111 |
| 550 | 0000 | 0000 | 0000 | 1111 | 0001 | 1111 | 1111 |
| 565 | 0000 | 0000 | 0000 | 1111 | 1100 | 1100 | 1111 |
| 570 | 0000 | 0000 | 0000 | 1111 | 1100 | 1101 | 1111 |
| 575 | 0000 | 0000 | 0000 | 1111 | 0011 | 1111 | 1111 |
| 595 | 0000 | 0000 | 0000 | 1111 | 1110 | 1110 | 1111 |
| 600 | 0000 | 0000 | 0000 | 1111 | 0111 | 1111 | 1111 |
| 625 | 0000 | 0000 | 0000 | 1111 | 1111 | 1111 | 1111 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 652 | 0000 | 0000 | 0001 | 0000 | 0001 | 0000 | 0001 |
| 653 | 0000 | 0000 | 0001 | 0000 | 0001 | 0000 | 0011 |
| 654 | 0000 | 0000 | 0001 | 0000 | 0001 | 0000 | 0111 |
| 655 | 0000 | 0000 | 0001 | 0000 | 0001 | 0000 | 1111 |
| 657 | 0000 | 0000 | 0001 | 0000 | 0010 | 0010 | 0010 |
| 658 | 0000 | 0000 | 0001 | 0000 | 0001 | 0001 | 0011 |
| 659 | 0000 | 0000 | 0001 | 0000 | 0001 | 0001 | 0111 |
| 660 | 0000 | 0000 | 0001 | 0000 | 0001 | 0001 | 1111 |
| 662 | 0000 | 0000 | 0001 | 0000 | 0001 | 0011 | 0010 |
| 663 | 0000 | 0000 | 0001 | 0000 | 0001 | 0011 | 0011 |
| 664 | 0000 | 0000 | 0001 | 0000 | 0010 | 1010 | 1011 |
| 665 | 0000 | 0000 | 0001 | 0000 | 0001 | 0011 | 1111 |
| 667 | 0000 | 0000 | 0001 | 0000 | 0001 | 0111 | 0010 |
| 668 | 0000 | 0000 | 0001 | 0000 | 0001 | 0111 | 0110 |
| 669 | 0000 | 0000 | 0001 | 0000 | 0001 | 0111 | 0111 |
| 670 | 0000 | 0000 | 0001 | 0000 | 0001 | 0111 | 1111 |
| 672 | 0000 | 0000 | 0001 | 0000 | 0001 | 1111 | 0001 |
| 673 | 0000 | 0000 | 0001 | 0000 | 0001 | 1111 | 0011 |
| 674 | 0000 | 0000 | 0001 | 0000 | 0001 | 1111 | 0111 |
| 675 | 0000 | 0000 | 0001 | 0000 | 0001 | 1111 | 1111 |
| 678 | 0000 | 0000 | 0001 | 0000 | 0011 | 0000 | 0011 |
| 679 | 0000 | 0000 | 0001 | 0000 | 0011 | 0000 | 0111 |
| 680 | 0000 | 0000 | 0001 | 0000 | 0011 | 0000 | 1111 |
| 683 | 0000 | 0000 | 0001 | 0000 | 0010 | 0110 | 0110 |
| 684 | 0000 | 0000 | 0001 | 0000 | 1001 | 0001 | 0111 |
| 685 | 0000 | 0000 | 0001 | 0000 | 1001 | 0001 | 1111 |
| 688 | 0000 | 0000 | 0001 | 0000 | 0011 | 0011 | 0011 |
| 689 | 0000 | 0000 | 0001 | 0000 | 0011 | 0011 | 0111 |
| 690 | 0000 | 0000 | 0001 | 0000 | 1001 | 1001 | 1111 |
| 693 | 0000 | 0000 | 0001 | 0000 | 0101 | 0111 | 0110 |
| 694 | 0000 | 0000 | 0001 | 0000 | 0101 | 0111 | 0111 |
| 695 | 0000 | 0000 | 0001 | 0000 | 1001 | 1011 | 1111 |
| 698 | 0000 | 0000 | 0001 | 0000 | 0011 | 1111 | 0011 |
| 699 | 0000 | 0000 | 0001 | 0000 | 0011 | 1111 | 0111 |
| 700 | 0000 | 0000 | 0001 | 0000 | 0011 | 1111 | 1111 |
| 704 | 0000 | 0000 | 0001 | 0000 | 0111 | 0000 | 0111 |
| 705 | 0000 | 0000 | 0001 | 0000 | 0111 | 0000 | 1111 |
| 709 | 0000 | 0000 | 0001 | 0000 | 1011 | 0010 | 0111 |
| 710 | 0000 | 0000 | 0001 | 0000 | 1011 | 0010 | 1111 |
| 714 | 0000 | 0000 | 0001 | 0000 | 1011 | 0011 | 0111 |
| 715 | 0000 | 0000 | 0001 | 0000 | 1011 | 0011 | 1111 |
| 719 | 0000 | 0000 | 0001 | 0000 | 0111 | 0111 | 0111 |
| 720 | 0000 | 0000 | 0001 | 0000 | 1011 | 1011 | 1111 |
| 724 | 0000 | 0000 | 0001 | 0000 | 0111 | 1111 | 0111 |
| 725 | 0000 | 0000 | 0001 | 0000 | 0111 | 1111 | 1111 |
| 730 | 0000 | 0000 | 0001 | 0000 | 1111 | 0000 | 1111 |
| 735 | 0000 | 0000 | 0001 | 0000 | 1111 | 0001 | 1111 |
| 740 | 0000 | 0000 | 0001 | 0000 | 1111 | 0011 | 1111 |
| 745 | 0000 | 0000 | 0001 | 0000 | 1111 | 0111 | 1111 |
| 750 | 0000 | 0000 | 0001 | 0000 | 1111 | 1111 | 1111 |
| 757 | 0000 | 0000 | 1000 | 1000 | 0000 | 0010 | 0010 |
| 758 | 0000 | 0000 | 1000 | 1000 | 0000 | 0001 | 0011 |
| 759 | 0000 | 0000 | 1000 | 1000 | 0000 | 0001 | 0111 |
| 760 | 0000 | 0000 | 1000 | 1000 | 0000 | 0001 | 1111 |
| 763 | 0000 | 0000 | 1000 | 1000 | 0000 | 0011 | 0011 |
| 764 | 0000 | 0000 | 1000 | 1000 | 0000 | 0011 | 0111 |
| 765 | 0000 | 0000 | 1000 | 1000 | 0000 | 0011 | 1111 |
| 769 | 0000 | 0000 | 1000 | 1000 | 0000 | 1011 | 1011 |
| 770 | 0000 | 0000 | 1000 | 1000 | 0000 | 0111 | 1111 |
| 775 | 0000 | 0000 | 1000 | 1000 | 0000 | 1111 | 1111 |
| 778 | 0000 | 0000 | 1000 | 1000 | 1000 | 0000 | 0011 |
| 779 | 0000 | 0000 | 1000 | 1000 | 1000 | 0000 | 0111 |
| 780 | 0000 | 0000 | 1000 | 1000 | 1000 | 0000 | 1111 |
| 782 | 0000 | 0000 | 0010 | 0010 | 0010 | 0010 | 0010 |
| 783 | 0000 | 0000 | 0010 | 0010 | 0010 | 0010 | 0011 |
| 784 | 0000 | 0000 | 0010 | 0010 | 0010 | 0010 | 0111 |
| 785 | 0000 | 0000 | 1000 | 1000 | 1000 | 1000 | 1111 |
| 787 | 0000 | 0000 | 1000 | 1000 | 1000 | 1010 | 0010 |
| 788 | 0000 | 0000 | 1000 | 1000 | 1000 | 1010 | 1010 |
| 789 | 0000 | 0000 | 1000 | 1000 | 1000 | 0110 | 1110 |
| 790 | 0000 | 0000 | 1000 | 1000 | 1000 | 1010 | 1111 |
| 792 | 0000 | 0000 | 1000 | 1000 | 1000 | 1110 | 0010 |
| 793 | 0000 | 0000 | 1000 | 1000 | 1000 | 1110 | 0110 |
| 794 | 0000 | 0000 | 0001 | 0001 | 0001 | 0111 | 0111 |
| 795 | 0000 | 0000 | 1000 | 1000 | 1000 | 1110 | 1111 |
| 797 | 0000 | 0000 | 1000 | 1000 | 1000 | 1111 | 0001 |
| 798 | 0000 | 0000 | 1000 | 1000 | 1000 | 1111 | 0011 |
| 799 | 0000 | 0000 | 1000 | 1000 | 1000 | 1111 | 0111 |
| 800 | 0000 | 0000 | 1000 | 1000 | 1000 | 1111 | 1111 |
| 803 | 0000 | 0000 | 1000 | 1000 | 1001 | 0000 | 0011 |
| 804 | 0000 | 0000 | 1000 | 1000 | 1001 | 0000 | 0111 |
| 805 | 0000 | 0000 | 1000 | 1000 | 1001 | 0000 | 1111 |
| 807 | 0000 | 0000 | 1000 | 1000 | 1010 | 0010 | 0010 |
| 808 | 0000 | 0000 | 1000 | 1000 | 1010 | 0010 | 0011 |
| 809 | 0000 | 0000 | 1000 | 1000 | 1010 | 0010 | 0111 |
| 810 | 0000 | 0000 | 1000 | 1000 | 1010 | 0010 | 1111 |
| 812 | 0000 | 0000 | 1000 | 1000 | 1010 | 1010 | 0010 |
| 813 | 0000 | 0000 | 0001 | 0001 | 0011 | 0011 | 0011 |
| 814 | 0000 | 0000 | 1000 | 1000 | 1010 | 1010 | 1011 |
| 815 | 0000 | 0000 | 1000 | 1000 | 1010 | 1010 | 1111 |
| 817 | 0000 | 0000 | 0010 | 0010 | 1010 | 1110 | 0010 |
| 818 | 0000 | 0000 | 0010 | 0010 | 1010 | 1110 | 0110 |
| 819 | 0000 | 0000 | 0010 | 0010 | 1010 | 1110 | 1110 |
| 820 | 0000 | 0000 | 0010 | 0010 | 0110 | 1110 | 1111 |
| 822 | 0000 | 0000 | 1000 | 1000 | 1001 | 1111 | 0001 |
| 823 | 0000 | 0000 | 1000 | 1000 | 1001 | 1111 | 0011 |
| 824 | 0000 | 0000 | 1000 | 1000 | 1001 | 1111 | 0111 |
| 825 | 0000 | 0000 | 1000 | 1000 | 1001 | 1111 | 1111 |
| 828 | 0000 | 0000 | 1000 | 1000 | 1011 | 0000 | 0011 |
| 829 | 0000 | 0000 | 1000 | 1000 | 1011 | 0000 | 0111 |
| 830 | 0000 | 0000 | 1000 | 1000 | 1011 | 0000 | 1111 |
| 832 | 0000 | 0000 | 1000 | 1000 | 1011 | 0010 | 0010 |
| 833 | 0000 | 0000 | 1000 | 1000 | 1011 | 0010 | 0011 |
| 834 | 0000 | 0000 | 1000 | 1000 | 1011 | 0010 | 0111 |
| 835 | 0000 | 0000 | 1000 | 1000 | 1011 | 0010 | 1111 |
| 837 | 0000 | 0000 | 0001 | 0001 | 0111 | 0011 | 0001 |
| 838 | 0000 | 0000 | 1000 | 1000 | 1011 | 0011 | 0011 |
| 839 | 0000 | 0000 | 1000 | 1000 | 1011 | 1010 | 1011 |
| 840 | 0000 | 0000 | 1000 | 1000 | 1011 | 1010 | 1111 |
| 842 | 0000 | 0000 | 1000 | 1000 | 1011 | 1011 | 0001 |
| 843 | 0000 | 0000 | 1000 | 1000 | 1011 | 1011 | 0011 |
| 844 | 0000 | 0000 | 1000 | 1000 | 1011 | 1011 | 1011 |
| 845 | 0000 | 0000 | 1000 | 1000 | 1011 | 1011 | 1111 |
| 847 | 0000 | 0000 | 1000 | 1000 | 1011 | 1111 | 0001 |
| 848 | 0000 | 0000 | 1000 | 1000 | 1011 | 1111 | 0011 |
| 849 | 0000 | 0000 | 1000 | 1000 | 1011 | 1111 | 0111 |
| 850 | 0000 | 0000 | 1000 | 1000 | 1011 | 1111 | 1111 |
| 853 | 0000 | 0000 | 1000 | 1000 | 1111 | 0000 | 0011 |
| 854 | 0000 | 0000 | 1000 | 1000 | 1111 | 0000 | 0111 |
| 855 | 0000 | 0000 | 1000 | 1000 | 1111 | 0000 | 1111 |
| 857 | 0000 | 0000 | 1000 | 1000 | 1111 | 0010 | 0010 |
| 858 | 0000 | 0000 | 1000 | 1000 | 1111 | 0001 | 0011 |
| 859 | 0000 | 0000 | 1000 | 1000 | 1111 | 0001 | 0111 |
| 860 | 0000 | 0000 | 1000 | 1000 | 1111 | 0001 | 1111 |
| 862 | 0000 | 0000 | 1000 | 1000 | 1111 | 0011 | 0010 |
| 863 | 0000 | 0000 | 1000 | 1000 | 1111 | 0011 | 0011 |
| 864 | 0000 | 0000 | 1000 | 1000 | 1111 | 0011 | 0111 |
| 865 | 0000 | 0000 | 1000 | 1000 | 1111 | 0011 | 1111 |
| 867 | 0000 | 0000 | 1000 | 1000 | 1111 | 1011 | 0010 |
| 868 | 0000 | 0000 | 1000 | 1000 | 1111 | 1011 | 1010 |
| 869 | 0000 | 0000 | 1000 | 1000 | 1111 | 1011 | 1011 |
| 870 | 0000 | 0000 | 1000 | 1000 | 1111 | 0111 | 1111 |
| 872 | 0000 | 0000 | 1000 | 1000 | 1111 | 1111 | 0001 |
| 873 | 0000 | 0000 | 1000 | 1000 | 1111 | 1111 | 0011 |
| 874 | 0000 | 0000 | 1000 | 1000 | 1111 | 1111 | 0111 |
| 875 | 0000 | 0000 | 1000 | 1000 | 1111 | 1111 | 1111 |
| 883 | 0000 | 0000 | 0100 | 1100 | 0000 | 0001 | 0011 |
| 884 | 0000 | 0000 | 0100 | 1100 | 0000 | 0001 | 0111 |
| 885 | 0000 | 0000 | 0100 | 1100 | 0000 | 0001 | 1111 |
| 887 | 0000 | 0000 | 0100 | 1100 | 0000 | 0011 | 0010 |
| 888 | 0000 | 0000 | 0100 | 1100 | 0000 | 0011 | 0011 |
| 889 | 0000 | 0000 | 0100 | 1100 | 0000 | 0011 | 0111 |
| 890 | 0000 | 0000 | 0100 | 1100 | 0000 | 0011 | 1111 |
| 892 | 0000 | 0000 | 0100 | 1100 | 0000 | 1011 | 0010 |
| 893 | 0000 | 0000 | 0100 | 1100 | 0000 | 1011 | 1010 |
| 894 | 0000 | 0000 | 0100 | 1100 | 0000 | 1011 | 1011 |
| 895 | 0000 | 0000 | 0100 | 1100 | 0000 | 0111 | 1111 |
| 897 | 0000 | 0000 | 0100 | 1100 | 0000 | 1111 | 0001 |
| 898 | 0000 | 0000 | 0100 | 1100 | 0000 | 1111 | 0011 |
| 899 | 0000 | 0000 | 0100 | 1100 | 0000 | 1111 | 0111 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 900 | 0000 | 0000 | 0100 | 1100 | 0000 | 1111 | 1111 |
| 903 | 0000 | 0000 | 1000 | 1001 | 0001 | 0000 | 0011 |
| 904 | 0000 | 0000 | 1000 | 1001 | 0001 | 0000 | 0111 |
| 905 | 0000 | 0000 | 1000 | 1001 | 0001 | 0000 | 1111 |
| 908 | 0000 | 0000 | 0010 | 1010 | 0010 | 0010 | 0011 |
| 909 | 0000 | 0000 | 0010 | 1010 | 0010 | 0010 | 0111 |
| 910 | 0000 | 0000 | 1000 | 1010 | 0010 | 0010 | 1111 |
| 912 | 0000 | 0000 | 1000 | 1001 | 0001 | 0011 | 0001 |
| 913 | 0000 | 0000 | 1000 | 1001 | 0001 | 0011 | 0011 |
| 914 | 0000 | 0000 | 1000 | 1001 | 0001 | 0011 | 1011 |
| 915 | 0000 | 0000 | 1000 | 1001 | 0001 | 0011 | 1111 |
| 917 | 0000 | 0000 | 1000 | 1001 | 0001 | 0111 | 0001 |
| 918 | 0000 | 0000 | 1000 | 1001 | 0001 | 0111 | 0011 |
| 919 | 0000 | 0000 | 1000 | 1001 | 0001 | 0111 | 0111 |
| 920 | 0000 | 0000 | 1000 | 1001 | 0001 | 0111 | 1111 |
| 922 | 0000 | 0000 | 1000 | 1001 | 0001 | 1111 | 0001 |
| 923 | 0000 | 0000 | 1000 | 1001 | 0001 | 1111 | 0011 |
| 924 | 0000 | 0000 | 1000 | 1001 | 0001 | 1111 | 0111 |
| 925 | 0000 | 0000 | 1000 | 1001 | 0001 | 1111 | 1111 |
| 928 | 0000 | 0000 | 1000 | 1001 | 1001 | 0000 | 0011 |
| 929 | 0000 | 0000 | 1000 | 1001 | 1001 | 0000 | 0111 |
| 930 | 0000 | 0000 | 1000 | 1001 | 1001 | 0000 | 1111 |
| 933 | 0000 | 0000 | 1000 | 1010 | 1010 | 0010 | 0011 |
| 934 | 0000 | 0000 | 1000 | 1010 | 1010 | 0010 | 0111 |
| 935 | 0000 | 0000 | 1000 | 1010 | 1010 | 0010 | 1111 |
| 937 | 0000 | 0000 | 1000 | 1010 | 1010 | 1010 | 0010 |
| 938 | 0000 | 0000 | 0010 | 0011 | 0011 | 0011 | 0011 |
| 939 | 0000 | 0000 | 0010 | 1010 | 1010 | 1010 | 1011 |
| 940 | 0000 | 0000 | 1000 | 1010 | 1010 | 1010 | 1111 |
| 942 | 0000 | 0000 | 1000 | 1001 | 1001 | 1011 | 0001 |
| 943 | 0000 | 0000 | 1000 | 1001 | 1001 | 1011 | 0011 |
| 944 | 0000 | 0000 | 1000 | 1001 | 1001 | 1011 | 1011 |
| 945 | 0000 | 0000 | 1000 | 1001 | 1001 | 1011 | 1111 |
| 947 | 0000 | 0000 | 1000 | 1001 | 1001 | 1111 | 0001 |
| 948 | 0000 | 0000 | 1000 | 1001 | 1001 | 1111 | 0011 |
| 949 | 0000 | 0000 | 1000 | 1001 | 1001 | 1111 | 0111 |
| 950 | 0000 | 0000 | 1000 | 1001 | 1001 | 1111 | 1111 |
| 953 | 0000 | 0000 | 1000 | 1001 | 1011 | 0000 | 0011 |
| 954 | 0000 | 0000 | 1000 | 1001 | 1011 | 0000 | 0111 |
| 955 | 0000 | 0000 | 1000 | 1001 | 1011 | 0000 | 1111 |
| 958 | 0000 | 0000 | 0010 | 1010 | 1110 | 0010 | 0011 |
| 959 | 0000 | 0000 | 1000 | 1001 | 1011 | 0010 | 0111 |
| 960 | 0000 | 0000 | 0010 | 0110 | 1110 | 0010 | 1111 |
| 962 | 0000 | 0000 | 0010 | 1010 | 1110 | 1100 | 1000 |
| 963 | 0000 | 0000 | 0010 | 1010 | 1110 | 0110 | 0110 |
| 964 | 0000 | 0000 | 1000 | 1001 | 1011 | 0011 | 0111 |
| 965 | 0000 | 0000 | 0010 | 0110 | 1110 | 0110 | 1111 |
| 967 | 0000 | 0000 | 0010 | 1010 | 1110 | 1110 | 0010 |
| 968 | 0000 | 0000 | 1000 | 1001 | 1011 | 1011 | 0011 |
| 969 | 0000 | 0000 | 0010 | 0110 | 1110 | 1110 | 1110 |
| 970 | 0000 | 0000 | 0010 | 0110 | 1110 | 1110 | 1111 |
| 972 | 0000 | 0000 | 1000 | 1001 | 1011 | 1111 | 0001 |
| 973 | 0000 | 0000 | 1000 | 1001 | 1011 | 1111 | 0011 |
| 974 | 0000 | 0000 | 1000 | 1001 | 1011 | 1111 | 0111 |
| 975 | 0000 | 0000 | 1000 | 1001 | 1011 | 1111 | 1111 |
| 978 | 0000 | 0000 | 1000 | 1001 | 1111 | 0000 | 0011 |
| 979 | 0000 | 0000 | 1000 | 1001 | 1111 | 0000 | 0111 |
| 980 | 0000 | 0000 | 1000 | 1001 | 1111 | 0000 | 1111 |
| 983 | 0000 | 0000 | 1000 | 1001 | 1111 | 0001 | 0011 |
| 984 | 0000 | 0000 | 1000 | 1001 | 1111 | 0001 | 0111 |
| 985 | 0000 | 0000 | 1000 | 1001 | 1111 | 0001 | 1111 |
| 987 | 0000 | 0000 | 1000 | 1001 | 1111 | 0011 | 0010 |
| 988 | 0000 | 0000 | 1000 | 1001 | 1111 | 0011 | 0011 |
| 989 | 0000 | 0000 | 1000 | 1001 | 1111 | 0011 | 0111 |
| 990 | 0000 | 0000 | 1000 | 1001 | 1111 | 0011 | 1111 |
| 992 | 0000 | 0000 | 1000 | 1001 | 1111 | 1011 | 0010 |
| 993 | 0000 | 0000 | 1000 | 1001 | 1111 | 1011 | 1010 |
| 994 | 0000 | 0000 | 1000 | 1001 | 1111 | 1011 | 1011 |
| 995 | 0000 | 0000 | 1000 | 1001 | 1111 | 0111 | 1111 |
| 997 | 0000 | 0000 | 1000 | 1001 | 1111 | 1111 | 0001 |
| 998 | 0000 | 0000 | 1000 | 1001 | 1111 | 1111 | 0011 |
| 999 | 0000 | 0000 | 1000 | 1001 | 1111 | 1111 | 0111 |
| 1000 | 0000 | 0000 | 1000 | 1001 | 1111 | 1111 | 1111 |
| 1009 | 0000 | 0000 | 0100 | 1101 | 0000 | 0001 | 0111 |
| 1010 | 0000 | 0000 | 0100 | 1101 | 0000 | 0001 | 1111 |
| 1013 | 0000 | 0000 | 0100 | 1101 | 0000 | 0011 | 0011 |
| 1014 | 0000 | 0000 | 0100 | 1101 | 0000 | 0011 | 0111 |
| 1015 | 0000 | 0000 | 0100 | 1101 | 0000 | 0011 | 1111 |
| 1017 | 0000 | 0000 | 0100 | 1101 | 0000 | 1011 | 0010 |
| 1018 | 0000 | 0000 | 0100 | 1101 | 0000 | 1011 | 1010 |
| 1019 | 0000 | 0000 | 0100 | 1101 | 0000 | 1011 | 1011 |
| 1020 | 0000 | 0000 | 0100 | 1101 | 0000 | 0111 | 1111 |
| 1022 | 0000 | 0000 | 0100 | 1101 | 0000 | 1111 | 0001 |
| 1023 | 0000 | 0000 | 0100 | 1101 | 0000 | 1111 | 0011 |
| 1024 | 0000 | 0000 | 0100 | 1101 | 0000 | 1111 | 0111 |
| 1025 | 0000 | 0000 | 0100 | 1101 | 0000 | 1111 | 1111 |
| 1028 | 0000 | 0000 | 1000 | 1011 | 0001 | 0000 | 0011 |
| 1029 | 0000 | 0000 | 1000 | 1011 | 0001 | 0000 | 0111 |
| 1030 | 0000 | 0000 | 1000 | 1011 | 0001 | 0000 | 1111 |
| 1033 | 0000 | 0000 | 1000 | 1011 | 0010 | 0010 | 0011 |
| 1034 | 0000 | 0000 | 1000 | 1011 | 0010 | 0010 | 0111 |
| 1035 | 0000 | 0000 | 1000 | 1011 | 0010 | 0010 | 1111 |
| 1038 | 0000 | 0000 | 1000 | 1011 | 0001 | 0011 | 0011 |
| 1039 | 0000 | 0000 | 1000 | 1011 | 0001 | 0011 | 0111 |
| 1040 | 0000 | 0000 | 1000 | 1011 | 0001 | 0011 | 1111 |
| 1042 | 0000 | 0000 | 1000 | 1011 | 0001 | 0111 | 0001 |
| 1043 | 0000 | 0000 | 1000 | 1011 | 0001 | 0111 | 0011 |
| 1044 | 0000 | 0000 | 1000 | 1011 | 0001 | 0111 | 0111 |
| 1045 | 0000 | 0000 | 1000 | 1011 | 0001 | 0111 | 1111 |
| 1047 | 0000 | 0000 | 1000 | 1011 | 0001 | 1111 | 0001 |
| 1048 | 0000 | 0000 | 1000 | 1011 | 0001 | 1111 | 0011 |
| 1049 | 0000 | 0000 | 1000 | 1011 | 0001 | 1111 | 0111 |
| 1050 | 0000 | 0000 | 1000 | 1011 | 0001 | 1111 | 1111 |
| 1053 | 0000 | 0000 | 1000 | 1011 | 0011 | 0000 | 0011 |
| 1054 | 0000 | 0000 | 1000 | 1011 | 0011 | 0000 | 0111 |
| 1055 | 0000 | 0000 | 1000 | 1011 | 0011 | 0000 | 1111 |
| 1058 | 0000 | 0000 | 0100 | 0111 | 0101 | 0001 | 0011 |
| 1059 | 0000 | 0000 | 1000 | 1011 | 0011 | 0010 | 0111 |
| 1060 | 0000 | 0000 | 1000 | 1011 | 1010 | 1000 | 1111 |
| 1063 | 0000 | 0000 | 1000 | 1011 | 0011 | 0011 | 0011 |
| 1064 | 0000 | 0000 | 1000 | 1011 | 0011 | 0011 | 0111 |
| 1065 | 0000 | 0000 | 1000 | 1011 | 0011 | 0011 | 1111 |
| 1067 | 0000 | 0000 | 1000 | 1011 | 0011 | 0111 | 0001 |
| 1068 | 0000 | 0000 | 1000 | 1011 | 0011 | 0111 | 0011 |
| 1069 | 0000 | 0000 | 1000 | 1011 | 0011 | 0111 | 0111 |
| 1070 | 0000 | 0000 | 1000 | 1011 | 0011 | 0111 | 1111 |
| 1072 | 0000 | 0000 | 1000 | 1011 | 0011 | 1111 | 0001 |
| 1073 | 0000 | 0000 | 1000 | 1011 | 0011 | 1111 | 0011 |
| 1074 | 0000 | 0000 | 1000 | 1011 | 0011 | 1111 | 0111 |
| 1075 | 0000 | 0000 | 1000 | 1011 | 0011 | 1111 | 1111 |
| 1078 | 0000 | 0000 | 1000 | 1011 | 1011 | 0000 | 0011 |
| 1079 | 0000 | 0000 | 1000 | 1011 | 1011 | 0000 | 0111 |
| 1080 | 0000 | 0000 | 1000 | 1011 | 1011 | 0000 | 1111 |
| 1083 | 0000 | 0000 | 1000 | 1011 | 1011 | 0010 | 0011 |
| 1084 | 0000 | 0000 | 1000 | 1011 | 1011 | 0010 | 0111 |
| 1085 | 0000 | 0000 | 1000 | 1011 | 1011 | 0010 | 1111 |
| 1088 | 0000 | 0000 | 1000 | 1011 | 1011 | 0011 | 0011 |
| 1089 | 0000 | 0000 | 1000 | 1011 | 1011 | 1010 | 1011 |
| 1090 | 0000 | 0000 | 1000 | 1011 | 1011 | 1010 | 1111 |
| 1092 | 0000 | 0000 | 1000 | 1011 | 1011 | 1011 | 0001 |
| 1093 | 0000 | 0000 | 1000 | 1011 | 1011 | 1011 | 0011 |
| 1094 | 0000 | 0000 | 1000 | 1011 | 1011 | 1011 | 1011 |
| 1095 | 0000 | 0000 | 1000 | 1011 | 1011 | 1011 | 1111 |
| 1097 | 0000 | 0000 | 1000 | 1011 | 1011 | 1111 | 0001 |
| 1098 | 0000 | 0000 | 1000 | 1011 | 1011 | 1111 | 0011 |
| 1099 | 0000 | 0000 | 1000 | 1011 | 1011 | 1111 | 0111 |
| 1100 | 0000 | 0000 | 1000 | 1011 | 1011 | 1111 | 1111 |
| 1103 | 0000 | 0000 | 1000 | 1011 | 1111 | 0000 | 0011 |
| 1104 | 0000 | 0000 | 1000 | 1011 | 1111 | 0000 | 0111 |
| 1105 | 0000 | 0000 | 1000 | 1011 | 1111 | 0000 | 1111 |
| 1108 | 0000 | 0000 | 1000 | 1011 | 1111 | 0001 | 0011 |
| 1109 | 0000 | 0000 | 1000 | 1011 | 1111 | 0001 | 0111 |
| 1110 | 0000 | 0000 | 1000 | 1011 | 1111 | 0001 | 1111 |
| 1113 | 0000 | 0000 | 1000 | 1011 | 1111 | 0011 | 0011 |
| 1114 | 0000 | 0000 | 1000 | 1011 | 1111 | 0011 | 0111 |
| 1115 | 0000 | 0000 | 1000 | 1011 | 1111 | 0011 | 1111 |
| 1117 | 0000 | 0000 | 1000 | 1011 | 1111 | 1011 | 0010 |
| 1118 | 0000 | 0000 | 1000 | 1011 | 1111 | 1011 | 1010 |
| 1119 | 0000 | 0000 | 1000 | 1011 | 1111 | 1011 | 1011 |
| 1120 | 0000 | 0000 | 1000 | 1011 | 1111 | 0111 | 1111 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 1122 | 0000 | 0000 | 1000 | 1011 | 1111 | 1111 | 0001 |
| 1123 | 0000 | 0000 | 1000 | 1011 | 1111 | 1111 | 0011 |
| 1124 | 0000 | 0000 | 1000 | 1011 | 1111 | 1111 | 0111 |
| 1125 | 0000 | 0000 | 1000 | 1011 | 1111 | 1111 | 1111 |
| 1135 | 0000 | 0000 | 0001 | 1111 | 0000 | 0001 | 1111 |
| 1138 | 0000 | 0000 | 0001 | 1111 | 0000 | 1001 | 1001 |
| 1139 | 0000 | 0000 | 0001 | 1111 | 0000 | 1001 | 1011 |
| 1140 | 0000 | 0000 | 0001 | 1111 | 0000 | 0011 | 1111 |
| 1143 | 0000 | 0000 | 0001 | 1111 | 0000 | 1101 | 0101 |
| 1144 | 0000 | 0000 | 0001 | 1111 | 0000 | 1101 | 1101 |
| 1145 | 0000 | 0000 | 0001 | 1111 | 0000 | 0111 | 1111 |
| 1147 | 0000 | 0000 | 0001 | 1111 | 0000 | 1111 | 0001 |
| 1148 | 0000 | 0000 | 0001 | 1111 | 0000 | 1111 | 0011 |
| 1149 | 0000 | 0000 | 0001 | 1111 | 0000 | 1111 | 0111 |
| 1150 | 0000 | 0000 | 0001 | 1111 | 0000 | 1111 | 1111 |
| 1153 | 0000 | 0000 | 0001 | 1111 | 0001 | 0000 | 0011 |
| 1154 | 0000 | 0000 | 0001 | 1111 | 0001 | 0000 | 0111 |
| 1155 | 0000 | 0000 | 0001 | 1111 | 0001 | 0000 | 1111 |
| 1158 | 0000 | 0000 | 0001 | 1111 | 0001 | 0001 | 0011 |
| 1159 | 0000 | 0000 | 0001 | 1111 | 0001 | 0001 | 0111 |
| 1160 | 0000 | 0000 | 0001 | 1111 | 0001 | 0001 | 1111 |
| 1163 | 0000 | 0000 | 0001 | 1111 | 0001 | 0011 | 0011 |
| 1164 | 0000 | 0000 | 0001 | 1111 | 0010 | 1010 | 1011 |
| 1165 | 0000 | 0000 | 0001 | 1111 | 0001 | 0011 | 1111 |
| 1168 | 0000 | 0000 | 0001 | 1111 | 0001 | 0111 | 0110 |
| 1169 | 0000 | 0000 | 0001 | 1111 | 0001 | 0111 | 0111 |
| 1170 | 0000 | 0000 | 0001 | 1111 | 0001 | 0111 | 1111 |
| 1172 | 0000 | 0000 | 0001 | 1111 | 0001 | 1111 | 0001 |
| 1173 | 0000 | 0000 | 0001 | 1111 | 0001 | 1111 | 0011 |
| 1174 | 0000 | 0000 | 0001 | 1111 | 0001 | 1111 | 0111 |
| 1175 | 0000 | 0000 | 0001 | 1111 | 0001 | 1111 | 1111 |
| 1178 | 0000 | 0000 | 0001 | 1111 | 0011 | 0000 | 0011 |
| 1179 | 0000 | 0000 | 0001 | 1111 | 0011 | 0000 | 0111 |
| 1180 | 0000 | 0000 | 0001 | 1111 | 0011 | 0000 | 1111 |
| 1183 | 0000 | 0000 | 0001 | 1111 | 1001 | 0001 | 0011 |
| 1184 | 0000 | 0000 | 0001 | 1111 | 1001 | 0001 | 0111 |
| 1185 | 0000 | 0000 | 0001 | 1111 | 1001 | 0001 | 1111 |
| 1188 | 0000 | 0000 | 0001 | 1111 | 0011 | 0011 | 0011 |
| 1189 | 0000 | 0000 | 0001 | 1111 | 0011 | 0011 | 0111 |
| 1190 | 0000 | 0000 | 0001 | 1111 | 1001 | 1001 | 1111 |
| 1193 | 0000 | 0000 | 0001 | 1111 | 1011 | 1011 | 0011 |
| 1194 | 0000 | 0000 | 0001 | 1111 | 0101 | 0111 | 0111 |
| 1195 | 0000 | 0000 | 0001 | 1111 | 1001 | 1011 | 1111 |
| 1197 | 0000 | 0000 | 0001 | 1111 | 0011 | 1111 | 0001 |
| 1198 | 0000 | 0000 | 0001 | 1111 | 0011 | 1111 | 0011 |
| 1199 | 0000 | 0000 | 0001 | 1111 | 0011 | 1111 | 0111 |
| 1200 | 0000 | 0000 | 0001 | 1111 | 0011 | 1111 | 1111 |
| 1203 | 0000 | 0000 | 0001 | 1111 | 0111 | 0000 | 0011 |
| 1204 | 0000 | 0000 | 0001 | 1111 | 0111 | 0000 | 0111 |
| 1205 | 0000 | 0000 | 0001 | 1111 | 0111 | 0000 | 1111 |
| 1208 | 0000 | 0000 | 0001 | 1111 | 1011 | 0010 | 0110 |
| 1209 | 0000 | 0000 | 0001 | 1111 | 1011 | 0010 | 0111 |
| 1210 | 0000 | 0000 | 0001 | 1111 | 1011 | 0010 | 1111 |
| 1213 | 0000 | 0000 | 0001 | 1111 | 1011 | 0011 | 0011 |
| 1214 | 0000 | 0000 | 0001 | 1111 | 1011 | 0011 | 0111 |
| 1215 | 0000 | 0000 | 0001 | 1111 | 1101 | 0101 | 1111 |
| 1218 | 0000 | 0000 | 0001 | 1111 | 1011 | 1011 | 0011 |
| 1219 | 0000 | 0000 | 0001 | 1111 | 0111 | 0111 | 0111 |
| 1220 | 0000 | 0000 | 0001 | 1111 | 1011 | 1011 | 1111 |
| 1222 | 0000 | 0000 | 0001 | 1111 | 0111 | 1111 | 0001 |
| 1223 | 0000 | 0000 | 0001 | 1111 | 0111 | 1111 | 0011 |
| 1224 | 0000 | 0000 | 0001 | 1111 | 0111 | 1111 | 0111 |
| 1225 | 0000 | 0000 | 0001 | 1111 | 0111 | 1111 | 1111 |
| 1228 | 0000 | 0000 | 0001 | 1111 | 1111 | 0000 | 0011 |
| 1229 | 0000 | 0000 | 0001 | 1111 | 1111 | 0000 | 0111 |
| 1230 | 0000 | 0000 | 0001 | 1111 | 1111 | 0000 | 1111 |
| 1233 | 0000 | 0000 | 0001 | 1111 | 1111 | 0001 | 0011 |
| 1234 | 0000 | 0000 | 0001 | 1111 | 1111 | 0001 | 0111 |
| 1235 | 0000 | 0000 | 0001 | 1111 | 1111 | 0001 | 1111 |
| 1238 | 0000 | 0000 | 0001 | 1111 | 1111 | 1001 | 1001 |
| 1239 | 0000 | 0000 | 0001 | 1111 | 1111 | 1001 | 1011 |
| 1240 | 0000 | 0000 | 0001 | 1111 | 1111 | 0011 | 1111 |
| 1243 | 0000 | 0000 | 0001 | 1111 | 1111 | 1101 | 0101 |
| 1244 | 0000 | 0000 | 0001 | 1111 | 1111 | 1101 | 1101 |
| 1245 | 0000 | 0000 | 0001 | 1111 | 1111 | 0111 | 1111 |
| 1247 | 0000 | 0000 | 0001 | 1111 | 1111 | 1111 | 0001 |
| 1248 | 0000 | 0000 | 0001 | 1111 | 1111 | 1111 | 0011 |
| 1249 | 0000 | 0000 | 0001 | 1111 | 1111 | 1111 | 0111 |
| 1250 | 0000 | 0000 | 0001 | 1111 | 1111 | 1111 | 1111 |
| 1303 | 0000 | 0000 | 0011 | 0000 | 0011 | 0000 | 0011 |
| 1304 | 0000 | 0000 | 0011 | 0000 | 0011 | 0000 | 0111 |
| 1305 | 0000 | 0000 | 0011 | 0000 | 0011 | 0000 | 1111 |
| 1308 | 0000 | 0000 | 0011 | 0000 | 0011 | 0010 | 0110 |
| 1309 | 0000 | 0000 | 0011 | 0000 | 1001 | 0001 | 0111 |
| 1310 | 0000 | 0000 | 0011 | 0000 | 1001 | 0001 | 1111 |
| 1313 | 0000 | 0000 | 0011 | 0000 | 0011 | 0011 | 0011 |
| 1314 | 0000 | 0000 | 0011 | 0000 | 0011 | 0011 | 0111 |
| 1315 | 0000 | 0000 | 0011 | 0000 | 1001 | 1001 | 1111 |
| 1318 | 0000 | 0000 | 0011 | 0000 | 0101 | 0111 | 0110 |
| 1319 | 0000 | 0000 | 0011 | 0000 | 0101 | 0111 | 0111 |
| 1320 | 0000 | 0000 | 0011 | 0000 | 1001 | 1011 | 1111 |
| 1323 | 0000 | 0000 | 0011 | 0000 | 0011 | 1111 | 0011 |
| 1324 | 0000 | 0000 | 0011 | 0000 | 0011 | 1111 | 0111 |
| 1325 | 0000 | 0000 | 0011 | 0000 | 0011 | 1111 | 1111 |
| 1329 | 0000 | 0000 | 0011 | 0000 | 0111 | 0000 | 0111 |
| 1330 | 0000 | 0000 | 0011 | 0000 | 0111 | 0000 | 1111 |
| 1334 | 0000 | 0000 | 0011 | 0000 | 1011 | 0010 | 0111 |
| 1335 | 0000 | 0000 | 0011 | 0000 | 1011 | 0010 | 1111 |
| 1339 | 0000 | 0000 | 0011 | 0000 | 1011 | 0011 | 0111 |
| 1340 | 0000 | 0000 | 0011 | 0000 | 1011 | 0011 | 1111 |
| 1344 | 0000 | 0000 | 0011 | 0000 | 0111 | 0111 | 0111 |
| 1345 | 0000 | 0000 | 0011 | 0000 | 1011 | 1011 | 1111 |
| 1349 | 0000 | 0000 | 0011 | 0000 | 0111 | 1111 | 0111 |
| 1350 | 0000 | 0000 | 0011 | 0000 | 0111 | 1111 | 1111 |
| 1355 | 0000 | 0000 | 0011 | 0000 | 1111 | 0000 | 1111 |
| 1360 | 0000 | 0000 | 0011 | 0000 | 1111 | 0001 | 1111 |
| 1365 | 0000 | 0000 | 0011 | 0000 | 1111 | 0011 | 1111 |
| 1370 | 0000 | 0000 | 0011 | 0000 | 1111 | 0111 | 1111 |
| 1375 | 0000 | 0000 | 0011 | 0000 | 1111 | 1111 | 1111 |
| 1408 | 0000 | 0000 | 0110 | 0010 | 0010 | 0010 | 0011 |
| 1409 | 0000 | 0000 | 0110 | 0010 | 0010 | 0010 | 0111 |
| 1410 | 0000 | 0000 | 1100 | 1000 | 1000 | 1000 | 1111 |
| 1413 | 0000 | 0000 | 0101 | 0001 | 0001 | 0011 | 0011 |
| 1414 | 0000 | 0000 | 0110 | 0010 | 0010 | 1010 | 1011 |
| 1415 | 0000 | 0000 | 1100 | 1000 | 1000 | 1010 | 1111 |
| 1418 | 0000 | 0000 | 1100 | 1000 | 1000 | 1011 | 0011 |
| 1419 | 0000 | 0000 | 1100 | 1000 | 1000 | 1011 | 1011 |
| 1420 | 0000 | 0000 | 1100 | 1000 | 1000 | 1110 | 1111 |
| 1423 | 0000 | 0000 | 1100 | 1000 | 1000 | 1111 | 0011 |
| 1424 | 0000 | 0000 | 1100 | 1000 | 1000 | 1111 | 0111 |
| 1425 | 0000 | 0000 | 1100 | 1000 | 1000 | 1111 | 1111 |
| 1429 | 0000 | 0000 | 1100 | 1000 | 1001 | 0000 | 0111 |
| 1430 | 0000 | 0000 | 1100 | 1000 | 1001 | 0000 | 1111 |
| 1433 | 0000 | 0000 | 1100 | 1000 | 1010 | 0010 | 0011 |
| 1434 | 0000 | 0000 | 1100 | 1000 | 1010 | 0010 | 0111 |
| 1435 | 0000 | 0000 | 1100 | 1000 | 1010 | 0010 | 1111 |
| 1438 | 0000 | 0000 | 1100 | 1000 | 1010 | 1010 | 1010 |
| 1439 | 0000 | 0000 | 1100 | 0100 | 0110 | 0110 | 0111 |
| 1440 | 0000 | 0000 | 1100 | 1000 | 1010 | 1010 | 1111 |
| 1443 | 0000 | 0000 | 0110 | 0010 | 1010 | 1110 | 0110 |
| 1444 | 0000 | 0000 | 0110 | 0010 | 0110 | 1110 | 1110 |
| 1445 | 0000 | 0000 | 0110 | 0010 | 0110 | 1110 | 1111 |
| 1448 | 0000 | 0000 | 1100 | 1000 | 1001 | 1111 | 0011 |
| 1449 | 0000 | 0000 | 1100 | 1000 | 1001 | 1111 | 0111 |
| 1450 | 0000 | 0000 | 1100 | 1000 | 1001 | 1111 | 1111 |
| 1454 | 0000 | 0000 | 1100 | 1000 | 1011 | 0000 | 0111 |
| 1455 | 0000 | 0000 | 1100 | 1000 | 1011 | 0000 | 1111 |
| 1458 | 0000 | 0000 | 1100 | 1000 | 1011 | 0010 | 0011 |
| 1459 | 0000 | 0000 | 1100 | 1000 | 1011 | 0010 | 0111 |
| 1460 | 0000 | 0000 | 1100 | 1000 | 1011 | 0010 | 1111 |
| 1463 | 0000 | 0000 | 1100 | 1000 | 1011 | 0011 | 0011 |
| 1464 | 0000 | 0000 | 1100 | 1000 | 1011 | 1010 | 1011 |
| 1465 | 0000 | 0000 | 1100 | 1000 | 1011 | 1010 | 1111 |
| 1468 | 0000 | 0000 | 1100 | 1000 | 1011 | 1011 | 0011 |
| 1469 | 0000 | 0000 | 1100 | 1000 | 1011 | 1011 | 1011 |
| 1470 | 0000 | 0000 | 1100 | 1000 | 1011 | 1011 | 1111 |
| 1473 | 0000 | 0000 | 1100 | 1000 | 1011 | 1111 | 0011 |
| 1474 | 0000 | 0000 | 1100 | 1000 | 1011 | 1111 | 0111 |
| 1475 | 0000 | 0000 | 1100 | 1000 | 1011 | 1111 | 1111 |
| 1479 | 0000 | 0000 | 1100 | 1000 | 1111 | 0000 | 0111 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 1480 | 0000 | 0000 | 1100 | 1000 | 1111 | 0000 | 1111 |
| 1483 | 0000 | 0000 | 1100 | 1000 | 1111 | 0001 | 0011 |
| 1484 | 0000 | 0000 | 1100 | 1000 | 1111 | 0001 | 0111 |
| 1485 | 0000 | 0000 | 1100 | 1000 | 1111 | 0001 | 1111 |
| 1488 | 0000 | 0000 | 1100 | 1000 | 1111 | 0011 | 0011 |
| 1489 | 0000 | 0000 | 1100 | 1000 | 1111 | 0011 | 0111 |
| 1490 | 0000 | 0000 | 1100 | 1000 | 1111 | 0011 | 1111 |
| 1493 | 0000 | 0000 | 1100 | 1000 | 1111 | 1011 | 1010 |
| 1494 | 0000 | 0000 | 1100 | 1000 | 1111 | 1011 | 1011 |
| 1495 | 0000 | 0000 | 1100 | 1000 | 1111 | 0111 | 1111 |
| 1498 | 0000 | 0000 | 1100 | 1000 | 1111 | 1111 | 0011 |
| 1499 | 0000 | 0000 | 1100 | 1000 | 1111 | 1111 | 0111 |
| 1500 | 0000 | 0000 | 1100 | 1000 | 1111 | 1111 | 1111 |
| 1513 | 0000 | 0000 | 1100 | 1100 | 0000 | 0011 | 0011 |
| 1514 | 0000 | 0000 | 1100 | 1100 | 0000 | 0011 | 0111 |
| 1515 | 0000 | 0000 | 1100 | 1100 | 0000 | 0011 | 1111 |
| 1519 | 0000 | 0000 | 1100 | 1100 | 0000 | 1011 | 1011 |
| 1520 | 0000 | 0000 | 1100 | 1100 | 0000 | 0111 | 1111 |
| 1525 | 0000 | 0000 | 1100 | 1100 | 0000 | 1111 | 1111 |
| 1534 | 0000 | 0000 | 1010 | 1010 | 0010 | 0010 | 0111 |
| 1535 | 0000 | 0000 | 1010 | 1010 | 0010 | 0010 | 1111 |
| 1538 | 0000 | 0000 | 1001 | 1001 | 0001 | 0011 | 0011 |
| 1539 | 0000 | 0000 | 1001 | 1001 | 0001 | 0011 | 1011 |
| 1540 | 0000 | 0000 | 1001 | 1001 | 0001 | 0011 | 1111 |
| 1543 | 0000 | 0000 | 1001 | 1001 | 0001 | 0111 | 0011 |
| 1544 | 0000 | 0000 | 1001 | 1001 | 0001 | 0111 | 0111 |
| 1545 | 0000 | 0000 | 1001 | 1001 | 0001 | 0111 | 1111 |
| 1548 | 0000 | 0000 | 1001 | 1001 | 0001 | 1111 | 0011 |
| 1549 | 0000 | 0000 | 1001 | 1001 | 0001 | 1111 | 0111 |
| 1550 | 0000 | 0000 | 1001 | 1001 | 0001 | 1111 | 1111 |
| 1554 | 0000 | 0000 | 1001 | 1001 | 1001 | 0000 | 0111 |
| 1555 | 0000 | 0000 | 1001 | 1001 | 1001 | 0000 | 1111 |
| 1559 | 0000 | 0000 | 1010 | 1010 | 1010 | 0010 | 0111 |
| 1560 | 0000 | 0000 | 1010 | 1010 | 1010 | 0010 | 1111 |
| 1563 | 0000 | 0000 | 0011 | 0011 | 0011 | 0011 | 0011 |
| 1564 | 0000 | 0000 | 1010 | 1010 | 1010 | 1010 | 1011 |
| 1565 | 0000 | 0000 | 1010 | 1010 | 1010 | 1010 | 1111 |
| 1568 | 0000 | 0000 | 1001 | 1001 | 1001 | 1011 | 0011 |
| 1569 | 0000 | 0000 | 1001 | 1001 | 1001 | 1011 | 1011 |
| 1570 | 0000 | 0000 | 1001 | 1001 | 1001 | 1011 | 1111 |
| 1573 | 0000 | 0000 | 1001 | 1001 | 1001 | 1111 | 0011 |
| 1574 | 0000 | 0000 | 1001 | 1001 | 1001 | 1111 | 0111 |
| 1575 | 0000 | 0000 | 1001 | 1001 | 1001 | 1111 | 1111 |
| 1579 | 0000 | 0000 | 1001 | 1001 | 1011 | 0000 | 0111 |
| 1580 | 0000 | 0000 | 1001 | 1001 | 1011 | 0000 | 1111 |
| 1584 | 0000 | 0000 | 1001 | 1001 | 1011 | 0010 | 0111 |
| 1585 | 0000 | 0000 | 1001 | 1001 | 1011 | 0010 | 1111 |
| 1588 | 0000 | 0000 | 1001 | 1001 | 1011 | 0011 | 0011 |
| 1589 | 0000 | 0000 | 1001 | 1001 | 1011 | 1010 | 1011 |
| 1590 | 0000 | 0000 | 1001 | 1001 | 1011 | 1010 | 1111 |
| 1593 | 0000 | 0000 | 1001 | 1001 | 1011 | 1011 | 0011 |
| 1594 | 0000 | 0000 | 1001 | 1001 | 1011 | 1011 | 1011 |
| 1595 | 0000 | 0000 | 1001 | 1001 | 1011 | 1011 | 1111 |
| 1598 | 0000 | 0000 | 1001 | 1001 | 1011 | 1111 | 0011 |
| 1599 | 0000 | 0000 | 1001 | 1001 | 1011 | 1111 | 0111 |
| 1600 | 0000 | 0000 | 1001 | 1001 | 1011 | 1111 | 1111 |
| 1604 | 0000 | 0000 | 1100 | 1100 | 1111 | 0000 | 0111 |
| 1605 | 0000 | 0000 | 1100 | 1100 | 1111 | 0000 | 1111 |
| 1609 | 0000 | 0000 | 1100 | 1100 | 1111 | 0001 | 0111 |
| 1610 | 0000 | 0000 | 1100 | 1100 | 1111 | 0001 | 1111 |
| 1613 | 0000 | 0000 | 1100 | 1100 | 1111 | 0011 | 0011 |
| 1614 | 0000 | 0000 | 1100 | 1100 | 1111 | 0011 | 0111 |
| 1615 | 0000 | 0000 | 1100 | 1100 | 1111 | 0011 | 1111 |
| 1618 | 0000 | 0000 | 1100 | 1100 | 1111 | 1011 | 1010 |
| 1619 | 0000 | 0000 | 1100 | 1100 | 1111 | 1011 | 1011 |
| 1620 | 0000 | 0000 | 1100 | 1100 | 1111 | 0111 | 1111 |
| 1623 | 0000 | 0000 | 1100 | 1100 | 1111 | 1111 | 0011 |
| 1624 | 0000 | 0000 | 1100 | 1100 | 1111 | 1111 | 0111 |
| 1625 | 0000 | 0000 | 1100 | 1100 | 1111 | 1111 | 1111 |
| 1639 | 0000 | 0000 | 1100 | 1101 | 0000 | 0011 | 1111 |
| 1640 | 0000 | 0000 | 1100 | 1101 | 0000 | 0011 | 1111 |
| 1643 | 0000 | 0000 | 1100 | 1101 | 0000 | 1011 | 1010 |
| 1644 | 0000 | 0000 | 1100 | 1101 | 0000 | 1011 | 1011 |
| 1645 | 0000 | 0000 | 1100 | 1101 | 0000 | 0111 | 1111 |
| 1648 | 0000 | 0000 | 1100 | 1101 | 0000 | 1111 | 0011 |
| 1649 | 0000 | 0000 | 1100 | 1101 | 0000 | 1111 | 0111 |
| 1650 | 0000 | 0000 | 1100 | 1101 | 0000 | 1111 | 1111 |
| 1659 | 0000 | 0000 | 1010 | 1011 | 0010 | 0010 | 0111 |
| 1660 | 0000 | 0000 | 1010 | 1011 | 0010 | 0010 | 1111 |
| 1664 | 0000 | 0000 | 1100 | 1101 | 0001 | 0011 | 0111 |
| 1665 | 0000 | 0000 | 1010 | 1011 | 0001 | 0011 | 1111 |
| 1668 | 0000 | 0000 | 1010 | 1011 | 0001 | 0111 | 0011 |
| 1669 | 0000 | 0000 | 1010 | 1011 | 0001 | 0111 | 0111 |
| 1670 | 0000 | 0000 | 1010 | 1011 | 0001 | 0111 | 1111 |
| 1673 | 0000 | 0000 | 1010 | 1011 | 0001 | 1111 | 0011 |
| 1674 | 0000 | 0000 | 1010 | 1011 | 0001 | 1111 | 0111 |
| 1675 | 0000 | 0000 | 1010 | 1011 | 0001 | 1111 | 1111 |
| 1679 | 0000 | 0000 | 1010 | 1011 | 0011 | 0000 | 0111 |
| 1680 | 0000 | 0000 | 1010 | 1011 | 0011 | 0000 | 1111 |
| 1684 | 0000 | 0000 | 1100 | 1110 | 1100 | 1000 | 1011 |
| 1685 | 0000 | 0000 | 1010 | 1011 | 1010 | 1000 | 1111 |
| 1689 | 0000 | 0000 | 1010 | 1011 | 0011 | 0011 | 0111 |
| 1690 | 0000 | 0000 | 1010 | 1011 | 0011 | 0011 | 1111 |
| 1693 | 0000 | 0000 | 1010 | 1011 | 0011 | 0111 | 0011 |
| 1694 | 0000 | 0000 | 1010 | 1011 | 0011 | 0111 | 0111 |
| 1695 | 0000 | 0000 | 1010 | 1011 | 0011 | 0111 | 1111 |
| 1698 | 0000 | 0000 | 1010 | 1011 | 0011 | 1111 | 0011 |
| 1699 | 0000 | 0000 | 1010 | 1011 | 0011 | 1111 | 0111 |
| 1700 | 0000 | 0000 | 1010 | 1011 | 0011 | 1111 | 1111 |
| 1704 | 0000 | 0000 | 1010 | 1011 | 1011 | 0000 | 0111 |
| 1705 | 0000 | 0000 | 1010 | 1011 | 1011 | 0000 | 1111 |
| 1709 | 0000 | 0000 | 1010 | 1011 | 1011 | 0010 | 0111 |
| 1710 | 0000 | 0000 | 1010 | 1011 | 1011 | 0010 | 1111 |
| 1714 | 0000 | 0000 | 1010 | 1011 | 1011 | 1010 | 1011 |
| 1715 | 0000 | 0000 | 1010 | 1011 | 1011 | 1010 | 1111 |
| 1718 | 0000 | 0000 | 1010 | 1011 | 1011 | 1011 | 0011 |
| 1719 | 0000 | 0000 | 1010 | 1011 | 1011 | 1011 | 1011 |
| 1720 | 0000 | 0000 | 1010 | 1011 | 1011 | 1011 | 1111 |
| 1723 | 0000 | 0000 | 1010 | 1011 | 1011 | 1111 | 0011 |
| 1724 | 0000 | 0000 | 1010 | 1011 | 1011 | 1111 | 0111 |
| 1725 | 0000 | 0000 | 1010 | 1011 | 1011 | 1111 | 1111 |
| 1729 | 0000 | 0000 | 1100 | 1101 | 1111 | 0000 | 0111 |
| 1730 | 0000 | 0000 | 1100 | 1101 | 1111 | 0000 | 1111 |
| 1734 | 0000 | 0000 | 1100 | 1101 | 1111 | 0001 | 0111 |
| 1735 | 0000 | 0000 | 1100 | 1101 | 1111 | 0001 | 1111 |
| 1739 | 0000 | 0000 | 1100 | 1101 | 1111 | 0011 | 0111 |
| 1740 | 0000 | 0000 | 1100 | 1101 | 1111 | 0011 | 1111 |
| 1743 | 0000 | 0000 | 1100 | 1101 | 1111 | 1011 | 1010 |
| 1744 | 0000 | 0000 | 1100 | 1101 | 1111 | 1011 | 1011 |
| 1745 | 0000 | 0000 | 1100 | 1101 | 1111 | 0111 | 1111 |
| 1748 | 0000 | 0000 | 1100 | 1101 | 1111 | 1111 | 0011 |
| 1749 | 0000 | 0000 | 1100 | 1101 | 1111 | 1111 | 0111 |
| 1750 | 0000 | 0000 | 1100 | 1101 | 1111 | 1111 | 1111 |
| 1765 | 0000 | 0000 | 0011 | 1111 | 0000 | 0011 | 1111 |
| 1769 | 0000 | 0000 | 0011 | 1111 | 0000 | 1101 | 1101 |
| 1770 | 0000 | 0000 | 0011 | 1111 | 0000 | 0111 | 1111 |
| 1773 | 0000 | 0000 | 0011 | 1111 | 0000 | 1111 | 0011 |
| 1774 | 0000 | 0000 | 0011 | 1111 | 0000 | 1111 | 0111 |
| 1775 | 0000 | 0000 | 0011 | 1111 | 0000 | 1111 | 1111 |
| 1784 | 0000 | 0000 | 0011 | 1111 | 0001 | 0001 | 0111 |
| 1785 | 0000 | 0000 | 0011 | 1111 | 0001 | 0001 | 1111 |
| 1789 | 0000 | 0000 | 0011 | 1111 | 0010 | 1010 | 1011 |
| 1790 | 0000 | 0000 | 0011 | 1111 | 0001 | 0011 | 1111 |
| 1794 | 0000 | 0000 | 0011 | 1111 | 0001 | 0111 | 0111 |
| 1795 | 0000 | 0000 | 0011 | 1111 | 0001 | 0111 | 1111 |
| 1798 | 0000 | 0000 | 0011 | 1111 | 0001 | 1111 | 0011 |
| 1799 | 0000 | 0000 | 0011 | 1111 | 0001 | 1111 | 0111 |
| 1800 | 0000 | 0000 | 0011 | 1111 | 0001 | 1111 | 1111 |
| 1804 | 0000 | 0000 | 0011 | 1111 | 0011 | 0000 | 0111 |
| 1805 | 0000 | 0000 | 0011 | 1111 | 0011 | 0000 | 1111 |
| 1809 | 0000 | 0000 | 0011 | 1111 | 1001 | 0001 | 0111 |
| 1810 | 0000 | 0000 | 0011 | 1111 | 1001 | 0001 | 1111 |
| 1814 | 0000 | 0000 | 0011 | 1111 | 0011 | 0011 | 0111 |
| 1815 | 0000 | 0000 | 0011 | 1111 | 1001 | 1001 | 1111 |
| 1819 | 0000 | 0000 | 0011 | 1111 | 0101 | 0111 | 0111 |
| 1820 | 0000 | 0000 | 0011 | 1111 | 1001 | 1011 | 1111 |
| 1823 | 0000 | 0000 | 0011 | 1111 | 0011 | 1111 | 0011 |
| 1824 | 0000 | 0000 | 0011 | 1111 | 0011 | 1111 | 0111 |
| 1825 | 0000 | 0000 | 0011 | 1111 | 0011 | 1111 | 1111 |
| 1829 | 0000 | 0000 | 0011 | 1111 | 0111 | 0000 | 0111 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 1830 | 0000 | 0000 | 0011 | 1111 | 0111 | 0000 | 1111 |
| 1834 | 0000 | 0000 | 0011 | 1111 | 1011 | 0010 | 0111 |
| 1835 | 0000 | 0000 | 0011 | 1111 | 1011 | 0010 | 1111 |
| 1839 | 0000 | 0000 | 0011 | 1111 | 1011 | 0011 | 0111 |
| 1840 | 0000 | 0000 | 0011 | 1111 | 1101 | 0101 | 1111 |
| 1844 | 0000 | 0000 | 0011 | 1111 | 0111 | 0111 | 0111 |
| 1845 | 0000 | 0000 | 0011 | 1111 | 1011 | 1011 | 1111 |
| 1848 | 0000 | 0000 | 0011 | 1111 | 0111 | 1111 | 0011 |
| 1849 | 0000 | 0000 | 0011 | 1111 | 0111 | 1111 | 0111 |
| 1850 | 0000 | 0000 | 0011 | 1111 | 0111 | 1111 | 1111 |
| 1854 | 0000 | 0000 | 0011 | 1111 | 1111 | 0000 | 0111 |
| 1855 | 0000 | 0000 | 0011 | 1111 | 1111 | 0000 | 1111 |
| 1859 | 0000 | 0000 | 0011 | 1111 | 1111 | 0001 | 0111 |
| 1860 | 0000 | 0000 | 0011 | 1111 | 1111 | 0001 | 1111 |
| 1864 | 0000 | 0000 | 0011 | 1111 | 1111 | 1001 | 1011 |
| 1865 | 0000 | 0000 | 0011 | 1111 | 1111 | 0011 | 1111 |
| 1869 | 0000 | 0000 | 0011 | 1111 | 1111 | 1101 | 1101 |
| 1870 | 0000 | 0000 | 0011 | 1111 | 1111 | 0111 | 1111 |
| 1873 | 0000 | 0000 | 0011 | 1111 | 1111 | 1111 | 0011 |
| 1874 | 0000 | 0000 | 0011 | 1111 | 1111 | 1111 | 0111 |
| 1875 | 0000 | 0000 | 0011 | 1111 | 1111 | 1111 | 1111 |
| 1954 | 0000 | 0000 | 0111 | 0000 | 0111 | 0000 | 0111 |
| 1955 | 0000 | 0000 | 0111 | 0000 | 0111 | 0000 | 1111 |
| 1959 | 0000 | 0000 | 0111 | 0000 | 1011 | 0010 | 0111 |
| 1960 | 0000 | 0000 | 0111 | 0000 | 1011 | 0010 | 1111 |
| 1964 | 0000 | 0000 | 0111 | 0000 | 1011 | 0011 | 0111 |
| 1965 | 0000 | 0000 | 0111 | 0000 | 1011 | 0011 | 1111 |
| 1969 | 0000 | 0000 | 0111 | 0000 | 0111 | 0111 | 0111 |
| 1970 | 0000 | 0000 | 0111 | 0000 | 1011 | 1011 | 1111 |
| 1974 | 0000 | 0000 | 0111 | 0000 | 0111 | 1111 | 0111 |
| 1975 | 0000 | 0000 | 0111 | 0000 | 0111 | 1111 | 1111 |
| 1980 | 0000 | 0000 | 0111 | 0000 | 1111 | 0000 | 1111 |
| 1985 | 0000 | 0000 | 0111 | 0000 | 1111 | 0001 | 1111 |
| 1990 | 0000 | 0000 | 0111 | 0000 | 1111 | 0011 | 1111 |
| 1995 | 0000 | 0000 | 0111 | 0000 | 1111 | 0111 | 1111 |
| 2000 | 0000 | 0000 | 0111 | 0000 | 1111 | 1111 | 1111 |
| 2034 | 0000 | 0000 | 1110 | 0010 | 0010 | 0010 | 0111 |
| 2035 | 0000 | 0000 | 1110 | 1000 | 1000 | 1000 | 1111 |
| 2039 | 0000 | 0000 | 1110 | 0010 | 0010 | 1010 | 1011 |
| 2040 | 0000 | 0000 | 1110 | 1000 | 1000 | 1010 | 1111 |
| 2044 | 0000 | 0000 | 1101 | 0001 | 0001 | 0111 | 1111 |
| 2045 | 0000 | 0000 | 1110 | 1000 | 1000 | 1110 | 1111 |
| 2049 | 0000 | 0000 | 1110 | 1000 | 1000 | 1111 | 0111 |
| 2050 | 0000 | 0000 | 1110 | 1000 | 1000 | 1111 | 1111 |
| 2059 | 0000 | 0000 | 1110 | 1000 | 1010 | 0010 | 0111 |
| 2060 | 0000 | 0000 | 1110 | 1000 | 1010 | 0010 | 1111 |
| 2064 | 0000 | 0000 | 1110 | 0100 | 0110 | 0110 | 0111 |
| 2065 | 0000 | 0000 | 1110 | 1000 | 1010 | 1010 | 1111 |
| 2069 | 0000 | 0000 | 1110 | 0010 | 0110 | 1110 | 1110 |
| 2070 | 0000 | 0000 | 1110 | 0010 | 0110 | 1110 | 1111 |
| 2074 | 0000 | 0000 | 1110 | 1000 | 1001 | 1111 | 0111 |
| 2075 | 0000 | 0000 | 1110 | 1000 | 1001 | 1111 | 1111 |
| 2080 | 0000 | 0000 | 1110 | 1000 | 1011 | 0000 | 1111 |
| 2084 | 0000 | 0000 | 1110 | 1000 | 1011 | 0010 | 0111 |
| 2085 | 0000 | 0000 | 1110 | 1000 | 1011 | 0010 | 1111 |
| 2089 | 0000 | 0000 | 1110 | 1000 | 1011 | 1010 | 1011 |
| 2090 | 0000 | 0000 | 1110 | 1000 | 1011 | 1010 | 1111 |
| 2094 | 0000 | 0000 | 1110 | 1000 | 1011 | 1011 | 1011 |
| 2095 | 0000 | 0000 | 1110 | 1000 | 1011 | 1011 | 1111 |
| 2099 | 0000 | 0000 | 1110 | 1000 | 1011 | 1111 | 0111 |
| 2100 | 0000 | 0000 | 1110 | 1000 | 1011 | 1111 | 1111 |
| 2105 | 0000 | 0000 | 1110 | 1000 | 1111 | 0000 | 1111 |
| 2109 | 0000 | 0000 | 1110 | 1000 | 1111 | 0001 | 0111 |
| 2110 | 0000 | 0000 | 1110 | 1000 | 1111 | 0001 | 1111 |
| 2114 | 0000 | 0000 | 1110 | 1000 | 1111 | 0011 | 0111 |
| 2115 | 0000 | 0000 | 1110 | 1000 | 1111 | 0011 | 1111 |
| 2119 | 0000 | 0000 | 1110 | 1000 | 1111 | 1011 | 1011 |
| 2120 | 0000 | 0000 | 1110 | 1000 | 1111 | 0111 | 1111 |
| 2124 | 0000 | 0000 | 1110 | 1000 | 1111 | 1111 | 0111 |
| 2125 | 0000 | 0000 | 1110 | 1000 | 1111 | 1111 | 1111 |
| 2160 | 0000 | 0000 | 1011 | 1010 | 1000 | 1000 | 1111 |
| 2164 | 0000 | 0000 | 0111 | 0110 | 0100 | 1100 | 1110 |
| 2165 | 0000 | 0000 | 1011 | 1010 | 1000 | 1010 | 1111 |
| 2169 | 0000 | 0000 | 1011 | 1010 | 1000 | 1011 | 1011 |
| 2170 | 0000 | 0000 | 1011 | 1010 | 1000 | 1110 | 1111 |
| 2174 | 0000 | 0000 | 1011 | 1010 | 1000 | 1111 | 0111 |
| 2175 | 0000 | 0000 | 1011 | 1010 | 1000 | 1111 | 1111 |
| 2185 | 0000 | 0000 | 1110 | 1010 | 1010 | 0010 | 1111 |
| 2189 | 0000 | 0000 | 1110 | 1010 | 1010 | 1010 | 1011 |
| 2190 | 0000 | 0000 | 1110 | 1010 | 1010 | 1010 | 1111 |
| 2194 | 0000 | 0000 | 1101 | 1001 | 1001 | 1011 | 1011 |
| 2195 | 0000 | 0000 | 1101 | 1001 | 1001 | 1011 | 1111 |
| 2199 | 0000 | 0000 | 1101 | 1001 | 1001 | 1111 | 0111 |
| 2200 | 0000 | 0000 | 1101 | 1001 | 1001 | 1111 | 1111 |
| 2205 | 0000 | 0000 | 1101 | 1001 | 1011 | 0000 | 1111 |
| 2210 | 0000 | 0000 | 1101 | 1001 | 1011 | 0010 | 1111 |
| 2214 | 0000 | 0000 | 1101 | 1001 | 1011 | 1010 | 1011 |
| 2215 | 0000 | 0000 | 1101 | 1001 | 1011 | 1010 | 1111 |
| 2219 | 0000 | 0000 | 1101 | 1001 | 1011 | 1011 | 1011 |
| 2220 | 0000 | 0000 | 1101 | 1001 | 1011 | 1011 | 1111 |
| 2224 | 0000 | 0000 | 1101 | 1001 | 1011 | 1111 | 0111 |
| 2225 | 0000 | 0000 | 1101 | 1001 | 1011 | 1111 | 1111 |
| 2230 | 0000 | 0000 | 1101 | 1001 | 1111 | 0000 | 1111 |
| 2235 | 0000 | 0000 | 1101 | 1001 | 1111 | 0001 | 1111 |
| 2239 | 0000 | 0000 | 1101 | 1001 | 1111 | 0011 | 0111 |
| 2240 | 0000 | 0000 | 1101 | 1001 | 1111 | 0011 | 1111 |
| 2244 | 0000 | 0000 | 1101 | 1001 | 1111 | 1011 | 1011 |
| 2245 | 0000 | 0000 | 1101 | 1001 | 1111 | 0111 | 1111 |
| 2249 | 0000 | 0000 | 1101 | 1001 | 1111 | 1111 | 0111 |
| 2250 | 0000 | 0000 | 1101 | 1001 | 1111 | 1111 | 1111 |
| 2269 | 0000 | 0000 | 1110 | 1110 | 0000 | 1011 | 1011 |
| 2270 | 0000 | 0000 | 1110 | 1110 | 0000 | 0111 | 1111 |
| 2275 | 0000 | 0000 | 1110 | 1110 | 0000 | 1111 | 1111 |
| 2285 | 0000 | 0000 | 1011 | 1011 | 0010 | 0010 | 1111 |
| 2290 | 0000 | 0000 | 1011 | 1011 | 0001 | 0011 | 1111 |
| 2294 | 0000 | 0000 | 1011 | 1011 | 0001 | 0111 | 0111 |
| 2295 | 0000 | 0000 | 1011 | 1011 | 0001 | 0111 | 1111 |
| 2299 | 0000 | 0000 | 1011 | 1011 | 0001 | 1111 | 0111 |
| 2300 | 0000 | 0000 | 1011 | 1011 | 0001 | 1111 | 1111 |
| 2310 | 0000 | 0000 | 1110 | 1110 | 1010 | 1000 | 1111 |
| 2315 | 0000 | 0000 | 1011 | 1011 | 0011 | 0011 | 1111 |
| 2319 | 0000 | 0000 | 1011 | 1011 | 0011 | 0111 | 0111 |
| 2320 | 0000 | 0000 | 1011 | 1011 | 0011 | 0111 | 1111 |
| 2324 | 0000 | 0000 | 1011 | 1011 | 0011 | 1111 | 0111 |
| 2325 | 0000 | 0000 | 1011 | 1011 | 0011 | 1111 | 1111 |
| 2330 | 0000 | 0000 | 1011 | 1011 | 1011 | 0000 | 1111 |
| 2335 | 0000 | 0000 | 1011 | 1011 | 1011 | 0010 | 1111 |
| 2340 | 0000 | 0000 | 1011 | 1011 | 1011 | 1010 | 1111 |
| 2344 | 0000 | 0000 | 1011 | 1011 | 1011 | 1011 | 1011 |
| 2345 | 0000 | 0000 | 1011 | 1011 | 1011 | 1011 | 1111 |
| 2349 | 0000 | 0000 | 1011 | 1011 | 1011 | 1111 | 0111 |
| 2350 | 0000 | 0000 | 1011 | 1011 | 1011 | 1111 | 1111 |
| 2355 | 0000 | 0000 | 1101 | 1101 | 1111 | 0000 | 1111 |
| 2360 | 0000 | 0000 | 1101 | 1101 | 1111 | 0001 | 1111 |
| 2365 | 0000 | 0000 | 1101 | 1101 | 1111 | 0011 | 1111 |
| 2369 | 0000 | 0000 | 1101 | 1101 | 1111 | 1011 | 1011 |
| 2370 | 0000 | 0000 | 1101 | 1101 | 1111 | 0111 | 1111 |
| 2374 | 0000 | 0000 | 1101 | 1101 | 1111 | 1111 | 0111 |
| 2375 | 0000 | 0000 | 1101 | 1101 | 1111 | 1111 | 1111 |
| 2395 | 0000 | 0000 | 0111 | 1111 | 0000 | 0111 | 1111 |
| 2399 | 0000 | 0000 | 0111 | 1111 | 0000 | 1111 | 0111 |
| 2400 | 0000 | 0000 | 0111 | 1111 | 0000 | 1111 | 1111 |
| 2410 | 0000 | 0000 | 0111 | 1111 | 0001 | 0001 | 1111 |
| 2415 | 0000 | 0000 | 0111 | 1111 | 0001 | 0011 | 1111 |
| 2420 | 0000 | 0000 | 0111 | 1111 | 0001 | 0111 | 1111 |
| 2424 | 0000 | 0000 | 0111 | 1111 | 0001 | 1111 | 0111 |
| 2425 | 0000 | 0000 | 0111 | 1111 | 0001 | 1111 | 1111 |
| 2435 | 0000 | 0000 | 0111 | 1111 | 1001 | 0001 | 1111 |
| 2440 | 0000 | 0000 | 0111 | 1111 | 1001 | 1001 | 1111 |
| 2445 | 0000 | 0000 | 0111 | 1111 | 1001 | 1011 | 1111 |
| 2449 | 0000 | 0000 | 0111 | 1111 | 0011 | 1111 | 0111 |
| 2450 | 0000 | 0000 | 0111 | 1111 | 0011 | 1111 | 1111 |
| 2455 | 0000 | 0000 | 0111 | 1111 | 0111 | 0000 | 1111 |
| 2460 | 0000 | 0000 | 0111 | 1111 | 1011 | 0010 | 1111 |
| 2465 | 0000 | 0000 | 0111 | 1111 | 1101 | 0101 | 1111 |
| 2470 | 0000 | 0000 | 0111 | 1111 | 1011 | 1011 | 1111 |
| 2474 | 0000 | 0000 | 0111 | 1111 | 0111 | 1111 | 0111 |
| 2475 | 0000 | 0000 | 0111 | 1111 | 0111 | 1111 | 1111 |
| 2480 | 0000 | 0000 | 0111 | 1111 | 1111 | 0000 | 1111 |
| 2485 | 0000 | 0000 | 0111 | 1111 | 1111 | 0001 | 1111 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 2490 | 0000 | 0000 | 0111 | 1111 | 1111 | 0011 | 1111 |
| 2495 | 0000 | 0000 | 0111 | 1111 | 1111 | 0111 | 1111 |
| 2499 | 0000 | 0000 | 0111 | 1111 | 1111 | 1111 | 0111 |
| 2500 | 0000 | 0000 | 0111 | 1111 | 1111 | 1111 | 1111 |
| 2605 | 0000 | 0000 | 1111 | 0000 | 1111 | 0000 | 1111 |
| 2610 | 0000 | 0000 | 1111 | 0000 | 1111 | 0001 | 1111 |
| 2615 | 0000 | 0000 | 1111 | 0000 | 1111 | 0011 | 1111 |
| 2620 | 0000 | 0000 | 1111 | 0000 | 1111 | 0111 | 1111 |
| 2625 | 0000 | 0000 | 1111 | 0000 | 1111 | 1111 | 1111 |
| 2660 | 0000 | 0000 | 1111 | 1000 | 1000 | 1000 | 1111 |
| 2665 | 0000 | 0000 | 1111 | 1000 | 1000 | 1001 | 1111 |
| 2670 | 0000 | 0000 | 1111 | 1000 | 1000 | 1011 | 1111 |
| 2675 | 0000 | 0000 | 1111 | 1000 | 1000 | 1111 | 1111 |
| 2685 | 0000 | 0000 | 1111 | 1000 | 1001 | 0001 | 1111 |
| 2690 | 0000 | 0000 | 1111 | 1000 | 1001 | 1001 | 1111 |
| 2695 | 0000 | 0000 | 1111 | 1000 | 1011 | 1111 | 1111 |
| 2700 | 0000 | 0000 | 1111 | 0100 | 1100 | 1111 | 1111 |
| 2710 | 0000 | 0000 | 1111 | 1000 | 1011 | 0001 | 1111 |
| 2715 | 0000 | 0000 | 1111 | 1000 | 1011 | 0011 | 1111 |
| 2720 | 0000 | 0000 | 1111 | 1000 | 1011 | 1111 | 1111 |
| 2725 | 0000 | 0000 | 1111 | 0100 | 1101 | 1111 | 1111 |
| 2735 | 0000 | 0000 | 1111 | 0001 | 1111 | 0001 | 1111 |
| 2740 | 0000 | 0000 | 1111 | 0001 | 1111 | 0011 | 1111 |
| 2745 | 0000 | 0000 | 1111 | 0001 | 1111 | 0111 | 1111 |
| 2750 | 0000 | 0000 | 1111 | 0001 | 1111 | 1111 | 1111 |
| 2790 | 0000 | 0000 | 1111 | 1100 | 1000 | 1001 | 1111 |
| 2795 | 0000 | 0000 | 1111 | 1100 | 1000 | 1011 | 1111 |
| 2800 | 0000 | 0000 | 1111 | 1100 | 1000 | 1111 | 1111 |
| 2815 | 0000 | 0000 | 1111 | 1001 | 1001 | 1001 | 1111 |
| 2820 | 0000 | 0000 | 1111 | 1001 | 1001 | 1011 | 1111 |
| 2825 | 0000 | 0000 | 1111 | 1100 | 1100 | 1111 | 1111 |
| 2840 | 0000 | 0000 | 1111 | 1100 | 1101 | 1001 | 1111 |
| 2845 | 0000 | 0000 | 1111 | 1010 | 1011 | 1011 | 1111 |
| 2850 | 0000 | 0000 | 1111 | 1100 | 1101 | 1111 | 1111 |
| 2865 | 0000 | 0000 | 1111 | 0011 | 1111 | 0011 | 1111 |
| 2870 | 0000 | 0000 | 1111 | 0011 | 1111 | 0111 | 1111 |
| 2875 | 0000 | 0000 | 1111 | 0011 | 1111 | 1111 | 1111 |
| 2920 | 0000 | 0000 | 1111 | 1110 | 1000 | 1011 | 1111 |
| 2925 | 0000 | 0000 | 1111 | 1110 | 1000 | 1111 | 1111 |
| 2945 | 0000 | 0000 | 1111 | 1101 | 1001 | 1011 | 1111 |
| 2950 | 0000 | 0000 | 1111 | 1101 | 1001 | 1111 | 1111 |
| 2970 | 0000 | 0000 | 1111 | 1011 | 1011 | 1011 | 1111 |
| 2975 | 0000 | 0000 | 1111 | 1110 | 1110 | 1111 | 1111 |
| 2995 | 0000 | 0000 | 1111 | 0111 | 1111 | 0111 | 1111 |
| 3000 | 0000 | 0000 | 1111 | 0111 | 1111 | 1111 | 1111 |
| 3025 | 0000 | 0000 | 1111 | 1111 | 0000 | 1111 | 1111 |
| 3050 | 0000 | 0000 | 1111 | 1111 | 0001 | 1111 | 1111 |
| 3075 | 0000 | 0000 | 1111 | 1111 | 0011 | 1111 | 1111 |
| 3100 | 0000 | 0000 | 1111 | 1111 | 0111 | 1111 | 1111 |
| 3125 | 0000 | 0000 | 1111 | 1111 | 1111 | 1111 | 1111 |
| 3907 | 0000 | 0010 | 0010 | 0010 | 0010 | 0010 | 0010 |
| 3908 | 0000 | 0010 | 0010 | 0010 | 0010 | 0010 | 0011 |
| 3909 | 0000 | 1000 | 1000 | 1000 | 1000 | 1000 | 1110 |
| 3910 | 0000 | 0010 | 0010 | 0010 | 0010 | 0010 | 1111 |
| 3913 | 0000 | 0010 | 0010 | 0010 | 0010 | 0110 | 0110 |
| 3914 | 0000 | 0010 | 0010 | 0010 | 0010 | 0011 | 1011 |
| 3915 | 0000 | 0010 | 0010 | 0010 | 0010 | 0011 | 1111 |
| 3919 | 0000 | 0010 | 0010 | 0010 | 0010 | 0111 | 0111 |
| 3920 | 0000 | 0010 | 0010 | 0010 | 0010 | 0111 | 1111 |
| 3925 | 0000 | 1000 | 1000 | 1000 | 1000 | 1111 | 1111 |
| 3933 | 0000 | 0010 | 0010 | 0010 | 0110 | 0010 | 0110 |
| 3934 | 0000 | 0010 | 0010 | 0010 | 0011 | 0010 | 1110 |
| 3935 | 0000 | 1000 | 1000 | 1000 | 1010 | 0010 | 1111 |
| 3938 | 0000 | 1000 | 1000 | 1000 | 1010 | 1010 | 1010 |
| 3939 | 0000 | 1000 | 1000 | 1000 | 1010 | 1010 | 1110 |
| 3940 | 0000 | 0001 | 0001 | 0001 | 0011 | 0011 | 1111 |
| 3943 | 0000 | 1000 | 1000 | 1000 | 1010 | 1011 | 1010 |
| 3944 | 0000 | 0010 | 0010 | 0010 | 0110 | 0111 | 0111 |
| 3945 | 0000 | 0001 | 0001 | 0001 | 0011 | 1011 | 1111 |
| 3948 | 0000 | 0001 | 0001 | 0001 | 0011 | 1111 | 0011 |
| 3949 | 0000 | 1000 | 1000 | 1000 | 1010 | 1111 | 1011 |
| 3950 | 0000 | 1000 | 1000 | 1000 | 1010 | 1111 | 1111 |
| 3959 | 0000 | 1000 | 1000 | 1000 | 1110 | 0010 | 1110 |
| 3960 | 0000 | 1000 | 1000 | 1000 | 1110 | 0010 | 1111 |
| 3964 | 0000 | 1000 | 1000 | 1000 | 1110 | 0110 | 1110 |
| 3965 | 0000 | 1000 | 1000 | 1000 | 1011 | 0011 | 1111 |
| 3969 | 0000 | 1000 | 1000 | 1000 | 1110 | 1110 | 1110 |
| 3970 | 0000 | 1000 | 1000 | 1000 | 1011 | 1011 | 1111 |
| 3974 | 0000 | 1000 | 1000 | 1000 | 1110 | 1111 | 1011 |
| 3975 | 0000 | 1000 | 1000 | 1000 | 1110 | 1111 | 1111 |
| 3985 | 0000 | 1000 | 1000 | 1000 | 1111 | 0001 | 1111 |
| 3990 | 0000 | 1000 | 1000 | 1000 | 1111 | 0011 | 1111 |
| 3995 | 0000 | 1000 | 1000 | 1000 | 1111 | 0111 | 1111 |
| 4000 | 0000 | 1000 | 1000 | 1000 | 1111 | 1111 | 1111 |
| 4033 | 0000 | 1000 | 1000 | 1010 | 0010 | 0010 | 1010 |
| 4034 | 0000 | 1000 | 1000 | 1010 | 0010 | 0010 | 1110 |
| 4035 | 0000 | 1000 | 1000 | 1010 | 0010 | 0010 | 1111 |
| 4038 | 0000 | 1000 | 1000 | 1010 | 0010 | 1010 | 1010 |
| 4039 | 0000 | 1000 | 1000 | 1001 | 1000 | 1010 | 1011 |
| 4040 | 0000 | 1000 | 1000 | 1010 | 0010 | 0011 | 1111 |
| 4043 | 0000 | 0010 | 0010 | 0011 | 0010 | 0111 | 0110 |
| 4044 | 0000 | 0010 | 0010 | 0011 | 0010 | 0111 | 0111 |
| 4045 | 0000 | 1000 | 1000 | 1010 | 0010 | 0111 | 1111 |
| 4048 | 0000 | 0010 | 0010 | 0011 | 0010 | 1111 | 0011 |
| 4049 | 0000 | 1000 | 1000 | 1010 | 0010 | 1111 | 1011 |
| 4050 | 0000 | 1000 | 1000 | 1010 | 0010 | 1111 | 1111 |
| 4059 | 0000 | 1000 | 1000 | 1010 | 1010 | 0010 | 1110 |
| 4060 | 0000 | 1000 | 1000 | 1010 | 1010 | 0010 | 1111 |
| 4063 | 0000 | 1000 | 1000 | 1010 | 1010 | 1010 | 1010 |
| 4064 | 0000 | 1000 | 1000 | 1010 | 1010 | 1010 | 1110 |
| 4065 | 0000 | 0001 | 0001 | 0011 | 0011 | 0011 | 1111 |
| 4068 | 0000 | 1000 | 1000 | 1010 | 1010 | 1110 | 1010 |
| 4069 | 0000 | 1000 | 1000 | 1010 | 1010 | 1011 | 1011 |
| 4070 | 0000 | 1000 | 1000 | 1010 | 1010 | 1011 | 1111 |
| 4073 | 0000 | 0010 | 0010 | 0011 | 0011 | 1111 | 0011 |
| 4074 | 0000 | 1000 | 1000 | 1010 | 1010 | 1111 | 1011 |
| 4075 | 0000 | 1000 | 1000 | 1010 | 1010 | 1111 | 1111 |
| 4084 | 0000 | 0010 | 0010 | 0010 | 1011 | 0010 | 1110 |
| 4085 | 0000 | 0010 | 0010 | 0010 | 1110 | 0010 | 1111 |
| 4089 | 0000 | 0010 | 0010 | 0110 | 1110 | 0110 | 1110 |
| 4090 | 0000 | 0010 | 0010 | 0010 | 1110 | 0110 | 1111 |
| 4093 | 0000 | 1000 | 1000 | 1001 | 1011 | 1011 | 1010 |
| 4094 | 0000 | 0010 | 0010 | 0110 | 1110 | 1110 | 1110 |
| 4095 | 0000 | 0010 | 0010 | 0010 | 1110 | 1110 | 1111 |
| 4098 | 0000 | 0010 | 0010 | 0010 | 1011 | 1111 | 0011 |
| 4099 | 0000 | 0010 | 0010 | 0110 | 0111 | 1111 | 0111 |
| 4100 | 0000 | 0010 | 0010 | 0110 | 1110 | 1111 | 1111 |
| 4109 | 0000 | 1000 | 1000 | 1001 | 1111 | 0010 | 1011 |
| 4110 | 0000 | 1000 | 1000 | 1001 | 1111 | 0001 | 1111 |
| 4114 | 0000 | 0100 | 0100 | 0101 | 1111 | 0110 | 0111 |
| 4115 | 0000 | 1000 | 1000 | 1001 | 1111 | 0011 | 1111 |
| 4119 | 0000 | 1000 | 1000 | 1001 | 1111 | 1011 | 1011 |
| 4120 | 0000 | 1000 | 1000 | 1001 | 1111 | 0111 | 1111 |
| 4123 | 0000 | 1000 | 1000 | 1001 | 1111 | 1111 | 1010 |
| 4124 | 0000 | 1000 | 1000 | 1001 | 1111 | 1111 | 1110 |
| 4125 | 0000 | 1000 | 1000 | 1001 | 1111 | 1111 | 1111 |
| 4159 | 0000 | 1000 | 1000 | 1011 | 0010 | 0010 | 1110 |
| 4160 | 0000 | 1000 | 1000 | 1011 | 0010 | 0010 | 1111 |
| 4164 | 0000 | 1000 | 1000 | 1011 | 0010 | 0110 | 1110 |
| 4165 | 0000 | 1000 | 1000 | 1011 | 0010 | 0011 | 1111 |
| 4169 | 0000 | 1000 | 1000 | 1011 | 0010 | 1110 | 1110 |
| 4170 | 0000 | 1000 | 1000 | 1011 | 0010 | 0111 | 1111 |
| 4174 | 0000 | 1000 | 1000 | 1011 | 0010 | 1111 | 1011 |
| 4175 | 0000 | 1000 | 1000 | 1011 | 0010 | 1111 | 1111 |
| 4185 | 0000 | 0100 | 0100 | 0111 | 0011 | 0001 | 1111 |
| 4189 | 0000 | 1000 | 1000 | 1011 | 0011 | 0011 | 1011 |
| 4190 | 0000 | 1000 | 1000 | 1011 | 0011 | 0011 | 1111 |
| 4194 | 0000 | 1000 | 1000 | 1011 | 1010 | 1110 | 1110 |
| 4195 | 0000 | 1000 | 1000 | 1011 | 0011 | 0111 | 1111 |
| 4199 | 0000 | 1000 | 1000 | 1011 | 1010 | 1111 | 1011 |
| 4200 | 0000 | 1000 | 1000 | 1011 | 1010 | 1111 | 1111 |
| 4210 | 0000 | 1000 | 1000 | 1011 | 1011 | 0001 | 1111 |
| 4215 | 0000 | 1000 | 1000 | 1011 | 1011 | 0011 | 1111 |
| 4219 | 0000 | 1000 | 1000 | 1011 | 1011 | 1011 | 1011 |
| 4220 | 0000 | 1000 | 1000 | 1011 | 1011 | 1011 | 1111 |
| 4224 | 0000 | 1000 | 1000 | 1011 | 1011 | 1111 | 1011 |
| 4225 | 0000 | 1000 | 1000 | 1011 | 1011 | 1111 | 1111 |
| 4235 | 0000 | 1000 | 1000 | 1011 | 1111 | 0001 | 1111 |
| 4240 | 0000 | 1000 | 1000 | 1011 | 1111 | 0011 | 1111 |
| 4245 | 0000 | 1000 | 1000 | 1011 | 1111 | 0111 | 1111 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 4249 | 0000 | 1000 | 1000 | 1011 | 1111 | 1111 | 1110 |
| 4250 | 0000 | 1000 | 1000 | 1011 | 1111 | 1111 | 1111 |
| 4285 | 0000 | 1000 | 1000 | 1111 | 0010 | 0010 | 1111 |
| 4290 | 0000 | 1000 | 1000 | 1111 | 0001 | 0011 | 1111 |
| 4295 | 0000 | 1000 | 1000 | 1111 | 0001 | 0111 | 1111 |
| 4300 | 0000 | 1000 | 1000 | 1111 | 0001 | 1111 | 1111 |
| 4315 | 0000 | 1000 | 1000 | 1111 | 0011 | 0011 | 1111 |
| 4320 | 0000 | 1000 | 1000 | 1111 | 0011 | 0111 | 1111 |
| 4325 | 0000 | 1000 | 1000 | 1111 | 0011 | 1111 | 1111 |
| 4345 | 0000 | 1000 | 1000 | 1111 | 1011 | 1011 | 1111 |
| 4350 | 0000 | 1000 | 1000 | 1111 | 0111 | 1111 | 1111 |
| 4375 | 0000 | 1000 | 1000 | 1111 | 1111 | 1111 | 1111 |
| 4558 | 0000 | 1000 | 1001 | 0001 | 0011 | 0010 | 1010 |
| 4559 | 0000 | 1000 | 1001 | 0001 | 0011 | 0010 | 1110 |
| 4560 | 0000 | 1000 | 1001 | 0001 | 0011 | 0001 | 1111 |
| 4563 | 0000 | 0100 | 0110 | 0010 | 0110 | 0110 | 0110 |
| 4564 | 0000 | 1000 | 1010 | 0010 | 0110 | 0110 | 1110 |
| 4565 | 0000 | 1000 | 1001 | 0001 | 0011 | 0011 | 1111 |
| 4568 | 0000 | 0010 | 0110 | 0100 | 1100 | 1110 | 0110 |
| 4569 | 0000 | 0010 | 1010 | 0010 | 0110 | 0111 | 0111 |
| 4570 | 0000 | 1000 | 1001 | 0001 | 0011 | 1011 | 1111 |
| 4573 | 0000 | 0001 | 1001 | 0001 | 0011 | 1111 | 0011 |
| 4574 | 0000 | 1000 | 1001 | 0001 | 0011 | 1111 | 1011 |
| 4575 | 0000 | 1000 | 1001 | 0001 | 0011 | 1111 | 1111 |
| 4584 | 0000 | 1000 | 1001 | 0001 | 0111 | 0010 | 1110 |
| 4585 | 0000 | 1000 | 1001 | 0001 | 0111 | 0001 | 1111 |
| 4589 | 0000 | 1000 | 1001 | 0001 | 0111 | 0110 | 1110 |
| 4590 | 0000 | 1000 | 1001 | 0001 | 0111 | 0011 | 1111 |
| 4594 | 0000 | 0100 | 0101 | 0001 | 0111 | 0111 | 0111 |
| 4595 | 0000 | 1000 | 1001 | 0001 | 0111 | 0111 | 1111 |
| 4599 | 0000 | 1000 | 1001 | 0001 | 0111 | 1111 | 1011 |
| 4600 | 0000 | 1000 | 1001 | 0001 | 0111 | 1111 | 1111 |
| 4610 | 0000 | 1000 | 1001 | 0001 | 1111 | 0001 | 1111 |
| 4615 | 0000 | 1000 | 1001 | 0001 | 1111 | 0011 | 1111 |
| 4620 | 0000 | 1000 | 1001 | 0001 | 1111 | 0111 | 1111 |
| 4625 | 0000 | 1000 | 1001 | 0001 | 1111 | 1111 | 1111 |
| 4663 | 0000 | 0010 | 1010 | 1010 | 0010 | 1010 | 1010 |
| 4664 | 0000 | 1000 | 1001 | 1001 | 1000 | 1010 | 1011 |
| 4665 | 0000 | 1000 | 1010 | 1010 | 0010 | 0011 | 1111 |
| 4669 | 0000 | 1000 | 1010 | 1010 | 0010 | 1110 | 1110 |
| 4670 | 0000 | 1000 | 1010 | 1010 | 0010 | 0111 | 1111 |
| 4675 | 0000 | 1000 | 1010 | 1010 | 0010 | 1111 | 1111 |
| 4684 | 0000 | 1000 | 1010 | 1010 | 1010 | 0010 | 1110 |
| 4685 | 0000 | 1000 | 1010 | 1010 | 1010 | 0010 | 1111 |
| 4688 | 0000 | 1000 | 1010 | 1010 | 1010 | 1010 | 1010 |
| 4689 | 0000 | 0001 | 0011 | 0011 | 0011 | 0011 | 0111 |
| 4690 | 0000 | 0010 | 0011 | 0011 | 0011 | 0011 | 1111 |
| 4693 | 0000 | 1000 | 1010 | 1010 | 1010 | 1011 | 1010 |
| 4694 | 0000 | 1000 | 1100 | 1100 | 1100 | 1110 | 1110 |
| 4695 | 0000 | 0010 | 0011 | 0011 | 0011 | 0111 | 1111 |
| 4698 | 0000 | 0010 | 1010 | 1010 | 1010 | 1111 | 0011 |
| 4699 | 0000 | 1000 | 1010 | 1010 | 1010 | 1111 | 1011 |
| 4700 | 0000 | 1000 | 1010 | 1010 | 1010 | 1111 | 1111 |
| 4709 | 0000 | 1000 | 1001 | 1001 | 1011 | 0010 | 1110 |
| 4710 | 0000 | 1000 | 1001 | 1001 | 1011 | 0001 | 1111 |
| 4713 | 0000 | 0001 | 0011 | 0011 | 1011 | 0011 | 0011 |
| 4714 | 0000 | 1000 | 1001 | 1001 | 1011 | 0011 | 1011 |
| 4715 | 0000 | 1000 | 1001 | 1001 | 1011 | 0011 | 1111 |
| 4718 | 0000 | 1000 | 1001 | 1001 | 1011 | 1011 | 1010 |
| 4719 | 0000 | 1000 | 1001 | 1001 | 1011 | 1011 | 1011 |
| 4720 | 0000 | 1000 | 1001 | 1001 | 1011 | 1011 | 1111 |
| 4723 | 0000 | 0001 | 1001 | 1001 | 1011 | 1111 | 0011 |
| 4724 | 0000 | 1000 | 1001 | 1001 | 1011 | 1111 | 1011 |
| 4725 | 0000 | 1000 | 1001 | 1001 | 1011 | 1111 | 1111 |
| 4734 | 0000 | 1000 | 1001 | 1001 | 1111 | 0010 | 1011 |
| 4735 | 0000 | 1000 | 1001 | 1001 | 1111 | 0001 | 1111 |
| 4738 | 0000 | 0001 | 1001 | 1001 | 1111 | 0011 | 0011 |
| 4739 | 0000 | 1000 | 1001 | 1001 | 1111 | 1010 | 1011 |
| 4740 | 0000 | 1000 | 1001 | 1001 | 1111 | 0011 | 1111 |
| 4743 | 0000 | 0010 | 1010 | 1010 | 1111 | 1011 | 1010 |
| 4744 | 0000 | 1000 | 1001 | 1001 | 1111 | 1011 | 1011 |
| 4745 | 0000 | 1000 | 1001 | 1001 | 1111 | 0111 | 1111 |
| 4748 | 0000 | 1000 | 1001 | 1001 | 1111 | 1111 | 1010 |
| 4749 | 0000 | 1000 | 1001 | 1001 | 1111 | 1111 | 1110 |
| 4750 | 0000 | 1000 | 1001 | 1001 | 1111 | 1111 | 1111 |
| 4789 | 0000 | 1000 | 1001 | 1011 | 0010 | 0110 | 1110 |
| 4790 | 0000 | 0010 | 1010 | 1110 | 0010 | 0011 | 1111 |
| 4793 | 0000 | 0010 | 1010 | 1011 | 0010 | 0111 | 0110 |
| 4794 | 0000 | 0010 | 0110 | 1110 | 0010 | 0111 | 0111 |
| 4795 | 0000 | 1000 | 1001 | 1011 | 0010 | 0111 | 1111 |
| 4798 | 0000 | 0010 | 1010 | 1011 | 0010 | 1111 | 0011 |
| 4799 | 0000 | 1000 | 1001 | 1011 | 0010 | 1111 | 1011 |
| 4800 | 0000 | 0010 | 0110 | 1110 | 0010 | 1111 | 1111 |
| 4809 | 0000 | 0010 | 0110 | 1110 | 1100 | 1000 | 1110 |
| 4810 | 0000 | 0010 | 0110 | 1110 | 1100 | 1000 | 1111 |
| 4814 | 0000 | 1000 | 1001 | 1011 | 0011 | 0011 | 1011 |
| 4815 | 0000 | 1000 | 1010 | 1110 | 0110 | 0111 | 1111 |
| 4818 | 0000 | 1000 | 1001 | 1011 | 1010 | 1011 | 1010 |
| 4819 | 0000 | 0010 | 1010 | 1110 | 0110 | 0111 | 0111 |
| 4820 | 0000 | 0010 | 1010 | 1110 | 0110 | 0111 | 1111 |
| 4823 | 0000 | 0010 | 1010 | 1110 | 0110 | 1111 | 0011 |
| 4824 | 0000 | 0010 | 1010 | 1110 | 0110 | 1111 | 0111 |
| 4825 | 0000 | 0010 | 1010 | 1110 | 0110 | 1111 | 1111 |
| 4834 | 0000 | 1000 | 1010 | 1011 | 1011 | 0010 | 1110 |
| 4835 | 0000 | 0010 | 1010 | 1110 | 1110 | 0010 | 1111 |
| 4839 | 0000 | 1000 | 1001 | 1011 | 1011 | 0011 | 1011 |
| 4840 | 0000 | 0010 | 1010 | 1110 | 1110 | 0110 | 1111 |
| 4843 | 0000 | 0010 | 0110 | 1110 | 1110 | 1110 | 1010 |
| 4844 | 0000 | 0010 | 0110 | 1110 | 1110 | 1110 | 1110 |
| 4845 | 0000 | 0010 | 1010 | 1110 | 1110 | 1110 | 1111 |
| 4848 | 0000 | 0010 | 1010 | 1110 | 1110 | 1111 | 0011 |
| 4849 | 0000 | 0010 | 1010 | 1110 | 1110 | 1111 | 0111 |
| 4850 | 0000 | 0010 | 0110 | 1110 | 1110 | 1111 | 1111 |
| 4859 | 0000 | 0001 | 1001 | 1101 | 1111 | 0010 | 0111 |
| 4860 | 0000 | 1000 | 1001 | 1011 | 1111 | 0001 | 1111 |
| 4864 | 0000 | 0001 | 1001 | 1101 | 1111 | 0110 | 0111 |
| 4865 | 0000 | 1000 | 1001 | 1011 | 1111 | 0011 | 1111 |
| 4868 | 0000 | 0010 | 0110 | 1110 | 1111 | 1110 | 0110 |
| 4869 | 0000 | 0001 | 1001 | 1101 | 1111 | 0111 | 0111 |
| 4870 | 0000 | 1000 | 1001 | 1011 | 1111 | 0111 | 1111 |
| 4873 | 0000 | 0001 | 0101 | 1101 | 1111 | 1111 | 0011 |
| 4874 | 0000 | 0001 | 0101 | 1101 | 1111 | 1111 | 0111 |
| 4875 | 0000 | 1000 | 1001 | 1011 | 1111 | 1111 | 1111 |
| 4915 | 0000 | 0100 | 1100 | 1111 | 0001 | 0011 | 1111 |
| 4919 | 0000 | 0100 | 1100 | 1111 | 0001 | 0111 | 0111 |
| 4920 | 0000 | 0100 | 1100 | 1111 | 0001 | 0111 | 1111 |
| 4923 | 0000 | 0100 | 1100 | 1111 | 0001 | 1111 | 1100 |
| 4924 | 0000 | 0010 | 1010 | 1111 | 0001 | 1111 | 0111 |
| 4925 | 0000 | 0100 | 1100 | 1111 | 0001 | 1111 | 1111 |
| 4934 | 0000 | 0100 | 1100 | 1111 | 0011 | 0010 | 0111 |
| 4935 | 0000 | 0100 | 1100 | 1111 | 0011 | 0010 | 1111 |
| 4939 | 0000 | 0100 | 1100 | 1111 | 0011 | 0011 | 0111 |
| 4940 | 0000 | 0100 | 1100 | 1111 | 0011 | 0011 | 1111 |
| 4944 | 0000 | 0100 | 1100 | 1111 | 0011 | 0111 | 0111 |
| 4945 | 0000 | 0100 | 1100 | 1111 | 0011 | 0111 | 1111 |
| 4948 | 0000 | 0001 | 0011 | 1111 | 0011 | 1111 | 1001 |
| 4949 | 0000 | 1000 | 1010 | 1111 | 0011 | 1111 | 1110 |
| 4950 | 0000 | 0100 | 1100 | 1111 | 0011 | 1111 | 1111 |
| 4959 | 0000 | 0100 | 1100 | 1111 | 1011 | 0010 | 0111 |
| 4960 | 0000 | 0100 | 1100 | 1111 | 1011 | 0010 | 1111 |
| 4964 | 0000 | 0100 | 1100 | 1111 | 1011 | 0011 | 0111 |
| 4965 | 0000 | 0100 | 1100 | 1111 | 1011 | 1010 | 1111 |
| 4969 | 0000 | 0100 | 1100 | 1111 | 0111 | 0111 | 0111 |
| 4970 | 0000 | 0100 | 1100 | 1111 | 1011 | 1011 | 1111 |
| 4973 | 0000 | 0001 | 0011 | 1111 | 0111 | 1111 | 1001 |
| 4974 | 0000 | 1000 | 1001 | 1111 | 0111 | 1111 | 1110 |
| 4975 | 0000 | 0100 | 1100 | 1111 | 0111 | 1111 | 1111 |
| 4984 | 0000 | 0100 | 1100 | 1111 | 1111 | 0001 | 0111 |
| 4985 | 0000 | 0100 | 1100 | 1111 | 1111 | 0001 | 1111 |
| 4989 | 0000 | 0100 | 1100 | 1111 | 1111 | 0011 | 0111 |
| 4990 | 0000 | 0100 | 1100 | 1111 | 1111 | 0011 | 1111 |
| 4994 | 0000 | 0100 | 1100 | 1111 | 1111 | 0111 | 0111 |
| 4995 | 0000 | 0100 | 1100 | 1111 | 1111 | 0111 | 1111 |
| 4998 | 0000 | 1000 | 1001 | 1111 | 1111 | 1111 | 1001 |
| 4999 | 0000 | 1000 | 1001 | 1111 | 1111 | 1111 | 1011 |
| 5000 | 0000 | 0100 | 1100 | 1111 | 1111 | 1111 | 1111 |
| 5209 | 0000 | 0100 | 1101 | 0001 | 0111 | 0010 | 1110 |
| 5210 | 0000 | 1000 | 1011 | 0001 | 0111 | 0001 | 1111 |
| 5214 | 0000 | 0100 | 1101 | 0001 | 0111 | 0011 | 0111 |
| 5215 | 0000 | 1000 | 1011 | 0001 | 0111 | 0011 | 1111 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 5219 | 0000 | 0100 | 1101 | 0001 | 0111 | 0111 | 0111 |
| 5220 | 0000 | 1000 | 1011 | 0001 | 0111 | 0111 | 1111 |
| 5224 | 0000 | 0100 | 1101 | 0001 | 0111 | 1111 | 0111 |
| 5225 | 0000 | 1000 | 1011 | 0001 | 0111 | 1111 | 1111 |
| 5235 | 0000 | 1000 | 1011 | 0001 | 1111 | 0001 | 1111 |
| 5240 | 0000 | 1000 | 1011 | 0001 | 1111 | 0011 | 1111 |
| 5245 | 0000 | 1000 | 1011 | 0001 | 1111 | 0111 | 1111 |
| 5250 | 0000 | 1000 | 1011 | 0001 | 1111 | 1111 | 1111 |
| 5314 | 0000 | 1000 | 1011 | 0011 | 0011 | 0011 | 1011 |
| 5315 | 0000 | 1000 | 1011 | 0011 | 0011 | 0011 | 1111 |
| 5319 | 0000 | 0100 | 1110 | 0110 | 0110 | 0111 | 0111 |
| 5320 | 0000 | 1000 | 1011 | 0011 | 0011 | 0111 | 1111 |
| 5324 | 0000 | 1000 | 1011 | 0011 | 0011 | 1111 | 1011 |
| 5325 | 0000 | 1000 | 1011 | 0011 | 0011 | 1111 | 1111 |
| 5335 | 0000 | 1000 | 1011 | 0011 | 0111 | 0001 | 1111 |
| 5339 | 0000 | 1000 | 1011 | 0011 | 0111 | 0110 | 1110 |
| 5340 | 0000 | 1000 | 1011 | 0011 | 0111 | 0011 | 1111 |
| 5344 | 0000 | 0100 | 1110 | 0110 | 0111 | 0111 | 0111 |
| 5345 | 0000 | 1000 | 1011 | 0011 | 0111 | 0111 | 1111 |
| 5349 | 0000 | 0100 | 1101 | 1001 | 1011 | 1111 | 0111 |
| 5350 | 0000 | 1000 | 1011 | 0011 | 0111 | 1111 | 1111 |
| 5360 | 0000 | 1000 | 1011 | 0011 | 1111 | 0001 | 1111 |
| 5364 | 0000 | 0100 | 1101 | 1001 | 1111 | 0110 | 0111 |
| 5365 | 0000 | 1000 | 1011 | 0011 | 1111 | 0011 | 1111 |
| 5369 | 0000 | 0100 | 1101 | 1001 | 1111 | 0111 | 0111 |
| 5370 | 0000 | 1000 | 1011 | 0011 | 1111 | 0111 | 1111 |
| 5374 | 0000 | 1000 | 1011 | 0011 | 1111 | 1111 | 1110 |
| 5375 | 0000 | 1000 | 1011 | 0011 | 1111 | 1111 | 1111 |
| 5419 | 0000 | 0100 | 1110 | 1110 | 0010 | 0111 | 0111 |
| 5420 | 0000 | 1000 | 1011 | 1011 | 0010 | 0111 | 1111 |
| 5425 | 0000 | 1000 | 1011 | 1011 | 0010 | 1111 | 1111 |
| 5440 | 0000 | 1000 | 1011 | 1011 | 0011 | 0011 | 1111 |
| 5444 | 0000 | 0100 | 1110 | 1110 | 0110 | 0111 | 0111 |
| 5445 | 0000 | 1000 | 1011 | 1011 | 0011 | 0111 | 1111 |
| 5449 | 0000 | 0100 | 1110 | 1110 | 0110 | 1111 | 0111 |
| 5450 | 0000 | 1000 | 1011 | 1011 | 1010 | 1111 | 1111 |
| 5460 | 0000 | 1000 | 1011 | 1011 | 1011 | 0001 | 1111 |
| 5465 | 0000 | 1000 | 1011 | 1011 | 1011 | 0011 | 1111 |
| 5469 | 0000 | 1000 | 1011 | 1011 | 1011 | 1011 | 1011 |
| 5470 | 0000 | 1000 | 1011 | 1011 | 1011 | 1011 | 1111 |
| 5474 | 0000 | 1000 | 1011 | 1011 | 1011 | 1111 | 1011 |
| 5475 | 0000 | 1000 | 1011 | 1011 | 1011 | 1111 | 1111 |
| 5485 | 0000 | 1000 | 1011 | 1011 | 1111 | 0001 | 1111 |
| 5490 | 0000 | 1000 | 1011 | 1011 | 1111 | 0011 | 1111 |
| 5494 | 0000 | 0100 | 1101 | 1101 | 1111 | 0111 | 0111 |
| 5495 | 0000 | 1000 | 1011 | 1011 | 1111 | 0111 | 1111 |
| 5499 | 0000 | 1000 | 1011 | 1011 | 1111 | 1111 | 1110 |
| 5500 | 0000 | 1000 | 1011 | 1011 | 1111 | 1111 | 1111 |
| 5545 | 0000 | 0100 | 1101 | 1111 | 0001 | 0111 | 1111 |
| 5549 | 0000 | 1000 | 1110 | 1111 | 0001 | 1111 | 1110 |
| 5550 | 0000 | 0100 | 1101 | 1111 | 0001 | 1111 | 1111 |
| 5565 | 0000 | 0100 | 1101 | 1111 | 0011 | 0011 | 1111 |
| 5570 | 0000 | 0100 | 1101 | 1111 | 0011 | 0111 | 1111 |
| 5574 | 0000 | 1000 | 1110 | 1111 | 0011 | 1111 | 1110 |
| 5575 | 0000 | 0100 | 1101 | 1111 | 0011 | 1111 | 1111 |
| 5585 | 0000 | 0100 | 1101 | 1111 | 1011 | 0010 | 1111 |
| 5590 | 0000 | 0100 | 1101 | 1111 | 1011 | 1010 | 1111 |
| 5595 | 0000 | 0100 | 1101 | 1111 | 1011 | 1111 | 1111 |
| 5599 | 0000 | 1000 | 1110 | 1111 | 0111 | 1111 | 1110 |
| 5600 | 0000 | 0100 | 1101 | 1111 | 0111 | 1111 | 1111 |
| 5610 | 0000 | 0100 | 1101 | 1111 | 1111 | 0001 | 1111 |
| 5615 | 0000 | 0100 | 1101 | 1111 | 1111 | 0011 | 1111 |
| 5620 | 0000 | 0100 | 1101 | 1111 | 1111 | 0111 | 1111 |
| 5624 | 0000 | 1000 | 1011 | 1111 | 1111 | 1111 | 1011 |
| 5625 | 0000 | 0100 | 1101 | 1111 | 1111 | 1111 | 1111 |
| 5860 | 0000 | 0001 | 1111 | 0001 | 1111 | 0001 | 1111 |
| 5865 | 0000 | 0001 | 1111 | 0001 | 1111 | 0011 | 1111 |
| 5870 | 0000 | 0001 | 1111 | 0001 | 1111 | 0111 | 1111 |
| 5875 | 0000 | 0001 | 1111 | 0001 | 1111 | 1111 | 1111 |
| 5940 | 0000 | 0001 | 1111 | 0011 | 0011 | 0011 | 1111 |
| 5945 | 0000 | 0001 | 1111 | 0011 | 0011 | 1111 | 1111 |
| 5950 | 0000 | 0001 | 1111 | 1001 | 1001 | 1111 | 1111 |
| 5965 | 0000 | 0001 | 1111 | 1001 | 1011 | 0011 | 1111 |
| 5970 | 0000 | 0001 | 1111 | 0101 | 0111 | 0111 | 1111 |
| 5975 | 0000 | 0001 | 1111 | 1001 | 1011 | 1111 | 1111 |
| 5990 | 0000 | 0001 | 1111 | 0011 | 1111 | 0011 | 1111 |
| 5995 | 0000 | 0001 | 1111 | 0011 | 1111 | 0111 | 1111 |
| 6000 | 0000 | 0001 | 1111 | 0011 | 1111 | 1111 | 1111 |
| 6070 | 0000 | 0001 | 1111 | 1011 | 0011 | 0111 | 1111 |
| 6075 | 0000 | 0001 | 1111 | 1101 | 0101 | 1111 | 1111 |
| 6095 | 0000 | 0001 | 1111 | 0111 | 0111 | 0111 | 1111 |
| 6100 | 0000 | 0001 | 1111 | 1011 | 1011 | 1111 | 1111 |
| 6120 | 0000 | 0001 | 1111 | 0111 | 1111 | 1111 | 1111 |
| 6125 | 0000 | 0001 | 1111 | 0111 | 1111 | 1111 | 1111 |
| 6175 | 0000 | 0001 | 1111 | 1111 | 0001 | 1111 | 1111 |
| 6200 | 0000 | 0001 | 1111 | 1111 | 0011 | 1111 | 1111 |
| 6225 | 0000 | 0001 | 1111 | 1111 | 0111 | 1111 | 1111 |
| 6250 | 0000 | 0001 | 1111 | 1111 | 1111 | 1111 | 1111 |
| 7813 | 0000 | 1010 | 1010 | 1010 | 1010 | 1010 | 1010 |
| 7814 | 0000 | 1010 | 1010 | 1010 | 1010 | 1010 | 1110 |
| 7815 | 0000 | 0011 | 0011 | 0011 | 0011 | 0011 | 1111 |
| 7819 | 0000 | 1010 | 1010 | 1010 | 1010 | 1011 | 1011 |
| 7820 | 0000 | 1010 | 1010 | 1010 | 1010 | 1011 | 1111 |
| 7825 | 0000 | 1010 | 1010 | 1010 | 1010 | 1111 | 1111 |
| 7839 | 0000 | 1001 | 1001 | 1001 | 1011 | 0011 | 1011 |
| 7840 | 0000 | 1001 | 1001 | 1001 | 1011 | 0011 | 1111 |
| 7844 | 0000 | 1001 | 1001 | 1001 | 1011 | 1011 | 1011 |
| 7845 | 0000 | 1001 | 1001 | 1001 | 1011 | 1011 | 1111 |
| 7849 | 0000 | 1001 | 1001 | 1001 | 1011 | 1111 | 1011 |
| 7850 | 0000 | 1001 | 1001 | 1001 | 1011 | 1111 | 1111 |
| 7865 | 0000 | 1001 | 1001 | 1001 | 1111 | 0011 | 1111 |
| 7870 | 0000 | 1001 | 1001 | 1001 | 1111 | 0111 | 1111 |
| 7875 | 0000 | 1001 | 1001 | 1001 | 1111 | 1111 | 1111 |
| 7939 | 0000 | 1010 | 1010 | 1011 | 0011 | 0011 | 1011 |
| 7940 | 0000 | 1001 | 1001 | 1011 | 0011 | 0011 | 1111 |
| 7944 | 0000 | 1010 | 1010 | 1011 | 1010 | 1110 | 1110 |
| 7945 | 0000 | 1001 | 1001 | 1011 | 0011 | 0111 | 1111 |
| 7949 | 0000 | 1010 | 1010 | 1011 | 1010 | 1111 | 1011 |
| 7950 | 0000 | 1001 | 1001 | 1011 | 1010 | 1111 | 1111 |
| 7965 | 0000 | 1001 | 1001 | 1011 | 1011 | 0011 | 1111 |
| 7969 | 0000 | 1010 | 1010 | 1011 | 1011 | 1011 | 1011 |
| 7970 | 0000 | 1001 | 1001 | 1011 | 1011 | 1011 | 1111 |
| 7974 | 0000 | 1001 | 1001 | 1011 | 1011 | 1111 | 1011 |
| 7975 | 0000 | 1001 | 1001 | 1011 | 1011 | 1111 | 1111 |
| 7990 | 0000 | 1001 | 1001 | 1011 | 1111 | 0011 | 1111 |
| 7995 | 0000 | 1001 | 1001 | 1011 | 1111 | 0111 | 1111 |
| 7999 | 0000 | 1010 | 1010 | 1011 | 1111 | 1111 | 1110 |
| 8000 | 0000 | 1001 | 1001 | 1011 | 1111 | 1111 | 1111 |
| 8065 | 0000 | 1100 | 1100 | 1111 | 0011 | 0011 | 1111 |
| 8070 | 0000 | 1100 | 1100 | 1111 | 0011 | 0111 | 1111 |
| 8075 | 0000 | 1100 | 1100 | 1111 | 0011 | 1111 | 1111 |
| 8095 | 0000 | 1100 | 1100 | 1111 | 1011 | 1011 | 1111 |
| 8100 | 0000 | 1100 | 1100 | 1111 | 0111 | 1111 | 1111 |
| 8125 | 0000 | 1100 | 1100 | 1111 | 1111 | 1111 | 1111 |
| 8464 | 0000 | 1100 | 1101 | 1001 | 1011 | 1010 | 1110 |
| 8465 | 0000 | 1100 | 1101 | 1001 | 1011 | 0011 | 1111 |
| 8469 | 0000 | 1010 | 1011 | 1010 | 1011 | 1011 | 1011 |
| 8470 | 0000 | 1010 | 1011 | 0011 | 0111 | 0111 | 1111 |
| 8474 | 0000 | 0101 | 1101 | 1001 | 1011 | 1111 | 0111 |
| 8475 | 0000 | 1100 | 1101 | 1001 | 1011 | 1111 | 1111 |
| 8490 | 0000 | 1100 | 1101 | 1001 | 1111 | 0011 | 1111 |
| 8495 | 0000 | 1100 | 1101 | 1001 | 1111 | 0111 | 1111 |
| 8500 | 0000 | 1100 | 1101 | 1001 | 1111 | 1111 | 1111 |
| 8569 | 0000 | 0110 | 1110 | 1110 | 0110 | 0111 | 0111 |
| 8570 | 0000 | 1010 | 1011 | 1011 | 0011 | 0111 | 1111 |
| 8575 | 0000 | 1010 | 1011 | 1011 | 1010 | 1111 | 1111 |
| 8590 | 0000 | 1010 | 1011 | 1011 | 1011 | 0011 | 1111 |
| 8594 | 0000 | 1010 | 1011 | 1011 | 1011 | 1011 | 1011 |
| 8595 | 0000 | 1010 | 1011 | 1011 | 1011 | 1011 | 1111 |
| 8599 | 0000 | 1010 | 1011 | 1011 | 1011 | 1111 | 1011 |
| 8600 | 0000 | 1010 | 1011 | 1011 | 1011 | 1111 | 1111 |
| 8615 | 0000 | 1010 | 1011 | 1011 | 1111 | 0011 | 1111 |
| 8619 | 0000 | 0101 | 1101 | 1101 | 1111 | 0111 | 0111 |
| 8620 | 0000 | 1010 | 1011 | 1011 | 1111 | 0111 | 1111 |
| 8624 | 0000 | 1100 | 1101 | 1101 | 1111 | 1111 | 1110 |
| 8625 | 0000 | 1010 | 1011 | 1011 | 1111 | 1111 | 1111 |
| 8695 | 0000 | 1100 | 1101 | 1111 | 0011 | 0111 | 1111 |
| 8699 | 0000 | 0110 | 1110 | 1111 | 0011 | 1111 | 1110 |
| 8700 | 0000 | 1100 | 1101 | 1111 | 0011 | 1111 | 1111 |
| 8715 | 0000 | 1100 | 1101 | 1111 | 1011 | 1010 | 1111 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 8720 | 0000 | 1100 | 1101 | 1111 | 1011 | 1011 | 1111 |
| 8724 | 0000 | 0110 | 1110 | 1111 | 0111 | 1111 | 1110 |
| 8725 | 0000 | 1100 | 1101 | 1111 | 0111 | 1111 | 1111 |
| 8740 | 0000 | 1100 | 1101 | 1111 | 1111 | 0011 | 1111 |
| 8745 | 0000 | 1100 | 1101 | 1111 | 1111 | 0111 | 1111 |
| 8749 | 0000 | 1100 | 1101 | 1111 | 1111 | 1111 | 1101 |
| 8750 | 0000 | 1100 | 1101 | 1111 | 1111 | 1111 | 1111 |
| 9115 | 0000 | 0011 | 1111 | 0011 | 1111 | 0011 | 1111 |
| 9120 | 0000 | 0011 | 1111 | 0011 | 1111 | 0111 | 1111 |
| 9125 | 0000 | 0011 | 1111 | 0011 | 1111 | 1111 | 1111 |
| 9220 | 0000 | 0011 | 1111 | 0111 | 0111 | 0111 | 1111 |
| 9225 | 0000 | 0011 | 1111 | 1011 | 1011 | 1111 | 1111 |
| 9245 | 0000 | 0011 | 1111 | 0111 | 1111 | 0111 | 1111 |
| 9250 | 0000 | 0011 | 1111 | 0111 | 1111 | 1111 | 1111 |
| 9325 | 0000 | 0011 | 1111 | 1111 | 0011 | 1111 | 1111 |
| 9350 | 0000 | 0011 | 1111 | 1111 | 0111 | 1111 | 1111 |
| 9375 | 0000 | 0011 | 1111 | 1111 | 1111 | 1111 | 1111 |
| 11719 | 0000 | 1011 | 1011 | 1011 | 1011 | 1011 | 1011 |
| 11720 | 0000 | 1011 | 1011 | 1011 | 1011 | 1011 | 1111 |
| 11725 | 0000 | 1011 | 1011 | 1011 | 1011 | 1111 | 1111 |
| 11745 | 0000 | 1011 | 1011 | 1011 | 1111 | 0111 | 1111 |
| 11750 | 0000 | 1011 | 1011 | 1011 | 1111 | 1111 | 1111 |
| 11845 | 0000 | 1110 | 1110 | 1111 | 1011 | 1011 | 1111 |
| 11850 | 0000 | 1110 | 1110 | 1111 | 0111 | 1111 | 1111 |
| 11875 | 0000 | 1110 | 1110 | 1111 | 1111 | 1111 | 1111 |
| 12370 | 0000 | 0111 | 1111 | 0111 | 1111 | 0111 | 1111 |
| 12375 | 0000 | 0111 | 1111 | 0111 | 1111 | 1111 | 1111 |
| 12475 | 0000 | 0111 | 1111 | 1111 | 0111 | 1111 | 1111 |
| 12500 | 0000 | 0111 | 1111 | 1111 | 1111 | 1111 | 1111 |
| 15625 | 0000 | 1111 | 1111 | 1111 | 1111 | 1111 | 1111 |
| 15626 | 0001 | 0000 | 0000 | 0000 | 0000 | 0000 | 0000 |
| 15627 | 0100 | 0000 | 0000 | 0000 | 0000 | 0000 | 0100 |
| 15628 | 0100 | 0000 | 0000 | 0000 | 0000 | 0000 | 1100 |
| 15629 | 0100 | 0000 | 0000 | 0000 | 0000 | 0000 | 1101 |
| 15630 | 0001 | 0000 | 0000 | 0000 | 0000 | 0000 | 1111 |
| 15632 | 1000 | 0000 | 0000 | 0000 | 0000 | 1000 | 1000 |
| 15633 | 1000 | 0000 | 0000 | 0000 | 0000 | 1000 | 1001 |
| 15634 | 1000 | 0000 | 0000 | 0000 | 0000 | 1000 | 1011 |
| 15635 | 1000 | 0000 | 0000 | 0000 | 0000 | 1000 | 1111 |
| 15638 | 1000 | 0000 | 0000 | 0000 | 0000 | 1001 | 1001 |
| 15639 | 1000 | 0000 | 0000 | 0000 | 0000 | 1001 | 1011 |
| 15640 | 1000 | 0000 | 0000 | 0000 | 0000 | 1001 | 1111 |
| 15644 | 1000 | 0000 | 0000 | 0000 | 0000 | 1011 | 1011 |
| 15645 | 1000 | 0000 | 0000 | 0000 | 0000 | 1011 | 1111 |
| 15650 | 0001 | 0000 | 0000 | 0000 | 0000 | 1111 | 1111 |
| 15652 | 0100 | 0000 | 0000 | 0000 | 0100 | 0000 | 0100 |
| 15653 | 0100 | 0000 | 0000 | 0000 | 0100 | 0000 | 0101 |
| 15654 | 0100 | 0000 | 0000 | 0000 | 0100 | 0000 | 0111 |
| 15655 | 1000 | 0000 | 0000 | 0000 | 1000 | 0000 | 1111 |
| 15657 | 0010 | 0000 | 0000 | 0000 | 0010 | 0010 | 0010 |
| 15658 | 1000 | 0000 | 0000 | 0000 | 1000 | 1000 | 1010 |
| 15659 | 1000 | 0000 | 0000 | 0000 | 1000 | 1000 | 1110 |
| 15660 | 1000 | 0000 | 0000 | 0000 | 1000 | 1000 | 1111 |
| 15662 | 0010 | 0000 | 0000 | 0000 | 0010 | 0011 | 0010 |
| 15663 | 1000 | 0000 | 0000 | 0000 | 1000 | 1010 | 1010 |
| 15664 | 1000 | 0000 | 0000 | 0000 | 1000 | 1100 | 1110 |
| 15665 | 1000 | 0000 | 0000 | 0000 | 1000 | 1001 | 1111 |
| 15667 | 1000 | 0000 | 0000 | 0000 | 1000 | 1011 | 1000 |
| 15668 | 0010 | 0000 | 0000 | 0000 | 0010 | 1110 | 1010 |
| 15669 | 1000 | 0000 | 0000 | 0000 | 1000 | 1011 | 1011 |
| 15670 | 1000 | 0000 | 0000 | 0000 | 1000 | 1011 | 1111 |
| 15672 | 1000 | 0000 | 0000 | 0000 | 1000 | 1111 | 1000 |
| 15673 | 1000 | 0000 | 0000 | 0000 | 1000 | 1111 | 1001 |
| 15674 | 1000 | 0000 | 0000 | 0000 | 1000 | 1111 | 1011 |
| 15675 | 1000 | 0000 | 0000 | 0000 | 1000 | 1111 | 1111 |
| 15678 | 0100 | 0000 | 0000 | 0000 | 1100 | 0000 | 0101 |
| 15679 | 0100 | 0000 | 0000 | 0000 | 1100 | 0000 | 0111 |
| 15680 | 1000 | 0000 | 0000 | 0000 | 1001 | 0000 | 1111 |
| 15683 | 0001 | 0000 | 0000 | 0000 | 1001 | 0001 | 0011 |
| 15684 | 0001 | 0000 | 0000 | 0000 | 1001 | 0001 | 0111 |
| 15685 | 0001 | 0000 | 0000 | 0000 | 1001 | 0001 | 1111 |
| 15688 | 1000 | 0000 | 0000 | 0000 | 1010 | 1010 | 1010 |
| 15689 | 0010 | 0000 | 0000 | 0000 | 1010 | 1010 | 1110 |
| 15690 | 1000 | 0000 | 0000 | 0000 | 1001 | 1001 | 1111 |
| 15693 | 1000 | 0000 | 0000 | 0000 | 1001 | 1011 | 1010 |
| 15694 | 0010 | 0000 | 0000 | 0000 | 1010 | 1110 | 1110 |
| 15695 | 1000 | 0000 | 0000 | 0000 | 1001 | 1011 | 1111 |
| 15698 | 0100 | 0000 | 0000 | 0000 | 1100 | 1111 | 0101 |
| 15699 | 0100 | 0000 | 0000 | 0000 | 1100 | 1111 | 0111 |
| 15700 | 0100 | 0000 | 0000 | 0000 | 1100 | 1111 | 1111 |
| 15704 | 0100 | 0000 | 0000 | 0000 | 1101 | 0000 | 0111 |
| 15705 | 1000 | 0000 | 0000 | 0000 | 1011 | 0000 | 1111 |
| 15709 | 0001 | 0000 | 0000 | 0000 | 1011 | 0001 | 0111 |
| 15710 | 0001 | 0000 | 0000 | 0000 | 1011 | 0001 | 1111 |
| 15714 | 1000 | 0000 | 0000 | 0000 | 1110 | 1100 | 1110 |
| 15715 | 1000 | 0000 | 0000 | 0000 | 1011 | 1001 | 1111 |
| 15719 | 1000 | 0000 | 0000 | 0000 | 1011 | 1011 | 1011 |
| 15720 | 1000 | 0000 | 0000 | 0000 | 1011 | 1011 | 1111 |
| 15724 | 0100 | 0000 | 0000 | 0000 | 1101 | 1111 | 0111 |
| 15725 | 0100 | 0000 | 0000 | 0000 | 1101 | 1111 | 1111 |
| 15730 | 0001 | 0000 | 0000 | 0000 | 1111 | 0000 | 1111 |
| 15735 | 1000 | 0000 | 0000 | 0000 | 1111 | 1000 | 1111 |
| 15740 | 1000 | 0000 | 0000 | 0000 | 1111 | 1001 | 1111 |
| 15745 | 1000 | 0000 | 0000 | 0000 | 1111 | 1011 | 1111 |
| 15750 | 0001 | 0000 | 0000 | 0000 | 1111 | 1111 | 1111 |
| 15752 | 0100 | 0000 | 0000 | 0100 | 0000 | 0000 | 0100 |
| 15753 | 0100 | 0000 | 0000 | 0100 | 0000 | 0000 | 0101 |
| 15754 | 0100 | 0000 | 0000 | 0100 | 0000 | 0000 | 0111 |
| 15755 | 1000 | 0000 | 0000 | 1000 | 0000 | 0000 | 1111 |
| 15757 | 0100 | 0000 | 0000 | 0100 | 0000 | 0100 | 0100 |
| 15758 | 0100 | 0000 | 0000 | 0100 | 0000 | 0100 | 0110 |
| 15759 | 0100 | 0000 | 0000 | 0100 | 0000 | 0100 | 1110 |
| 15760 | 0100 | 0000 | 0000 | 0100 | 0000 | 0100 | 1111 |
| 15762 | 0100 | 0000 | 0000 | 0100 | 0000 | 0101 | 0100 |
| 15763 | 0100 | 0000 | 0000 | 0100 | 0000 | 0110 | 0110 |
| 15764 | 0010 | 0000 | 0000 | 0010 | 0000 | 0110 | 1110 |
| 15765 | 0100 | 0000 | 0000 | 0100 | 0000 | 0101 | 1111 |
| 15767 | 0100 | 0000 | 0000 | 0100 | 0000 | 0111 | 0100 |
| 15768 | 0010 | 0000 | 0000 | 0010 | 0000 | 1110 | 1010 |
| 15769 | 0100 | 0000 | 0000 | 0100 | 0000 | 0111 | 0111 |
| 15770 | 0100 | 0000 | 0000 | 0100 | 0000 | 0111 | 1111 |
| 15772 | 0100 | 0000 | 0000 | 0100 | 0000 | 1111 | 0100 |
| 15773 | 0100 | 0000 | 0000 | 0100 | 0000 | 1111 | 0101 |
| 15774 | 0100 | 0000 | 0000 | 0100 | 0000 | 1111 | 0111 |
| 15775 | 0100 | 0000 | 0000 | 0100 | 0000 | 1111 | 1111 |
| 15778 | 1000 | 0000 | 0000 | 1000 | 1000 | 0000 | 1010 |
| 15779 | 1000 | 0000 | 0000 | 1000 | 1000 | 0000 | 1110 |
| 15780 | 1000 | 0000 | 0000 | 1000 | 1000 | 0000 | 1111 |
| 15782 | 0100 | 0000 | 0000 | 0100 | 0100 | 0100 | 0100 |
| 15783 | 0010 | 0000 | 0000 | 0010 | 0010 | 0010 | 0011 |
| 15784 | 0100 | 0000 | 0000 | 0100 | 0100 | 0100 | 0111 |
| 15785 | 0010 | 0000 | 0000 | 0010 | 0010 | 0010 | 1111 |
| 15787 | 0100 | 0000 | 0000 | 0100 | 0100 | 0110 | 0100 |
| 15788 | 0100 | 0000 | 0000 | 0100 | 0100 | 0110 | 0110 |
| 15789 | 0100 | 0000 | 0000 | 0100 | 0100 | 1100 | 1101 |
| 15790 | 1000 | 0000 | 0000 | 1000 | 1000 | 1010 | 1111 |
| 15792 | 0100 | 0000 | 0000 | 0100 | 0100 | 1110 | 0100 |
| 15793 | 0010 | 0000 | 0000 | 0010 | 0010 | 1110 | 0110 |
| 15794 | 0100 | 0000 | 0000 | 0100 | 0100 | 0111 | 0111 |
| 15795 | 1000 | 0000 | 0000 | 1000 | 1000 | 1110 | 1111 |
| 15797 | 0001 | 0000 | 0000 | 0001 | 0001 | 1111 | 0001 |
| 15798 | 0001 | 0000 | 0000 | 0001 | 0001 | 1111 | 0011 |
| 15799 | 0001 | 0000 | 0000 | 0001 | 0001 | 1111 | 0111 |
| 15800 | 1000 | 0000 | 0000 | 1000 | 1000 | 1111 | 1111 |
| 15803 | 1000 | 0000 | 0000 | 1000 | 1001 | 0000 | 1010 |
| 15804 | 1000 | 0000 | 0000 | 1000 | 1001 | 0000 | 1110 |
| 15805 | 1000 | 0000 | 0000 | 1000 | 1001 | 0000 | 1111 |
| 15808 | 0010 | 0000 | 0000 | 0010 | 0011 | 0010 | 0011 |
| 15809 | 0100 | 0000 | 0000 | 0100 | 0101 | 0100 | 0111 |
| 15810 | 0010 | 0000 | 0000 | 0010 | 0011 | 0010 | 1111 |
| 15812 | 0100 | 0000 | 0000 | 0100 | 0110 | 0110 | 0100 |
| 15813 | 0100 | 0000 | 0000 | 0100 | 0110 | 0110 | 0110 |
| 15814 | 0100 | 0000 | 0000 | 0100 | 0110 | 0110 | 0111 |
| 15815 | 1000 | 0000 | 0000 | 1000 | 1010 | 1010 | 1111 |
| 15817 | 1000 | 0000 | 0000 | 1000 | 1010 | 1110 | 1000 |
| 15818 | 0010 | 0000 | 0000 | 0010 | 1010 | 1011 | 1010 |
| 15819 | 0010 | 0000 | 0000 | 0010 | 0011 | 0111 | 0111 |
| 15820 | 1000 | 0000 | 0000 | 1000 | 1010 | 1110 | 1111 |
| 15822 | 1000 | 0000 | 0000 | 1000 | 1001 | 1111 | 1000 |
| 15823 | 1000 | 0000 | 0000 | 1000 | 1001 | 1111 | 1010 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 15824 | 1000 | 0000 | 0000 | 1000 | 1001 | 1111 | 1110 |
| 15825 | 1000 | 0000 | 0000 | 1000 | 1001 | 1111 | 1111 |
| 15828 | 1000 | 0000 | 0000 | 1000 | 1011 | 0000 | 1010 |
| 15829 | 1000 | 0000 | 0000 | 1000 | 1011 | 0000 | 1110 |
| 15830 | 1000 | 0000 | 0000 | 1000 | 1011 | 0000 | 1111 |
| 15833 | 0010 | 0000 | 0000 | 0010 | 1011 | 0010 | 0110 |
| 15834 | 0100 | 0000 | 0000 | 0100 | 0111 | 0100 | 0111 |
| 15835 | 1000 | 0000 | 0000 | 1000 | 1011 | 1000 | 1111 |
| 15838 | 0010 | 0000 | 0000 | 0010 | 1110 | 0110 | 0110 |
| 15839 | 0010 | 0000 | 0000 | 0010 | 0111 | 0110 | 1110 |
| 15840 | 1000 | 0000 | 0000 | 1000 | 1011 | 1010 | 1111 |
| 15842 | 1000 | 0000 | 0000 | 1000 | 1110 | 1110 | 1000 |
| 15843 | 0010 | 0000 | 0000 | 0010 | 1011 | 1011 | 0011 |
| 15844 | 0100 | 0000 | 0000 | 0100 | 0111 | 0111 | 0111 |
| 15845 | 1000 | 0000 | 0000 | 1000 | 1011 | 1011 | 1111 |
| 15847 | 1000 | 0000 | 0000 | 1000 | 1011 | 1111 | 1000 |
| 15848 | 1000 | 0000 | 0000 | 1000 | 1011 | 1111 | 1010 |
| 15849 | 1000 | 0000 | 0000 | 1000 | 1011 | 1111 | 1110 |
| 15850 | 1000 | 0000 | 0000 | 1000 | 1011 | 1111 | 1111 |
| 15853 | 1000 | 0000 | 0000 | 1000 | 1111 | 0000 | 1001 |
| 15854 | 1000 | 0000 | 0000 | 1000 | 1111 | 0000 | 1011 |
| 15855 | 1000 | 0000 | 0000 | 1000 | 1111 | 0000 | 1111 |
| 15858 | 0001 | 0000 | 0000 | 0001 | 1111 | 0001 | 0011 |
| 15859 | 0001 | 0000 | 0000 | 0001 | 1111 | 0001 | 0111 |
| 15860 | 0001 | 0000 | 0000 | 0001 | 1111 | 0001 | 1111 |
| 15863 | 0001 | 0000 | 0000 | 0001 | 1111 | 0011 | 0011 |
| 15864 | 0010 | 0000 | 0000 | 0010 | 1111 | 1010 | 1110 |
| 15865 | 0001 | 0000 | 0000 | 0001 | 1111 | 0011 | 1111 |
| 15868 | 0010 | 0000 | 0000 | 0010 | 1111 | 1110 | 0110 |
| 15869 | 1000 | 0000 | 0000 | 1000 | 1111 | 1011 | 1011 |
| 15870 | 0001 | 0000 | 0000 | 0001 | 1111 | 1011 | 1111 |
| 15872 | 0100 | 0000 | 0000 | 0100 | 1111 | 1111 | 0100 |
| 15873 | 0100 | 0000 | 0000 | 0100 | 1111 | 1111 | 0101 |
| 15874 | 0100 | 0000 | 0000 | 0100 | 1111 | 1111 | 0111 |
| 15875 | 0100 | 0000 | 0000 | 0100 | 1111 | 1111 | 1111 |
| 15878 | 0100 | 0000 | 0000 | 1100 | 0000 | 0000 | 0101 |
| 15879 | 0100 | 0000 | 0000 | 1100 | 0000 | 0000 | 0111 |
| 15880 | 1000 | 0000 | 0000 | 1001 | 0000 | 0000 | 1111 |
| 15883 | 0100 | 0000 | 0000 | 0110 | 0000 | 0100 | 0110 |
| 15884 | 0100 | 0000 | 0000 | 1100 | 0000 | 0100 | 1110 |
| 15885 | 0100 | 0000 | 0000 | 1100 | 0000 | 0100 | 1111 |
| 15888 | 0100 | 0000 | 0000 | 1100 | 0000 | 0110 | 0110 |
| 15889 | 0010 | 0000 | 0000 | 1010 | 0000 | 0110 | 1110 |
| 15890 | 0100 | 0000 | 0000 | 1100 | 0000 | 0101 | 1111 |
| 15893 | 0010 | 0000 | 0000 | 1010 | 0000 | 1110 | 1010 |
| 15894 | 0100 | 0000 | 0000 | 1100 | 0000 | 0111 | 0111 |
| 15895 | 0100 | 0000 | 0000 | 1100 | 0000 | 0111 | 1111 |
| 15898 | 0100 | 0000 | 0000 | 1100 | 0000 | 1111 | 0101 |
| 15899 | 0100 | 0000 | 0000 | 1100 | 0000 | 1110 | 0111 |
| 15900 | 0100 | 0000 | 0000 | 1100 | 0000 | 1111 | 1111 |
| 15904 | 1000 | 0000 | 0000 | 1001 | 1000 | 0000 | 1110 |
| 15905 | 1000 | 0000 | 0000 | 1001 | 1000 | 0000 | 1111 |
| 15908 | 0010 | 0000 | 0000 | 1010 | 0010 | 0010 | 0011 |
| 15909 | 0010 | 0000 | 0000 | 1010 | 0010 | 0010 | 0111 |
| 15910 | 0010 | 0000 | 0000 | 1010 | 0010 | 0010 | 1111 |
| 15913 | 0100 | 0000 | 0000 | 1100 | 0100 | 0110 | 0110 |
| 15914 | 1000 | 0000 | 0000 | 1010 | 1000 | 1100 | 1110 |
| 15915 | 0001 | 0000 | 0000 | 1001 | 0001 | 0011 | 1111 |
| 15918 | 0010 | 0000 | 0000 | 1010 | 0010 | 0111 | 0110 |
| 15919 | 0100 | 0000 | 0000 | 1100 | 0100 | 0111 | 0111 |
| 15920 | 1000 | 0000 | 0000 | 1001 | 1000 | 1110 | 1111 |
| 15923 | 0001 | 0000 | 0000 | 1001 | 0001 | 1111 | 0011 |
| 15924 | 0001 | 0000 | 0000 | 1001 | 0001 | 1111 | 0111 |
| 15925 | 0010 | 0000 | 0000 | 1010 | 0010 | 1111 | 1111 |
| 15929 | 1000 | 0000 | 0000 | 1001 | 1001 | 0000 | 1110 |
| 15930 | 1000 | 0000 | 0000 | 1001 | 1001 | 0000 | 1111 |
| 15934 | 0100 | 0000 | 0000 | 0101 | 0101 | 0100 | 0111 |
| 15935 | 0010 | 0000 | 0000 | 0011 | 0011 | 0010 | 1111 |
| 15938 | 0100 | 0000 | 0000 | 0110 | 0110 | 0110 | 0110 |
| 15939 | 0001 | 0000 | 0000 | 0011 | 0011 | 0011 | 1011 |
| 15940 | 1000 | 0000 | 0000 | 1010 | 1010 | 1010 | 1111 |
| 15943 | 0100 | 0000 | 0000 | 1100 | 1100 | 1110 | 0110 |
| 15944 | 0010 | 0000 | 0000 | 0110 | 0110 | 1110 | 1110 |
| 15945 | 0010 | 0000 | 0000 | 1010 | 1010 | 1110 | 1111 |
| 15948 | 1000 | 0000 | 0000 | 1001 | 1001 | 1111 | 1010 |
| 15949 | 1000 | 0000 | 0000 | 1001 | 1001 | 1111 | 1110 |
| 15950 | 1000 | 0000 | 0000 | 1001 | 1001 | 1111 | 1111 |
| 15954 | 0100 | 0000 | 0000 | 1100 | 1101 | 0000 | 1110 |
| 15955 | 1000 | 0000 | 0000 | 1001 | 1011 | 0000 | 1111 |
| 15959 | 0100 | 0000 | 0000 | 1100 | 1110 | 0100 | 0111 |
| 15960 | 1000 | 0000 | 0000 | 1100 | 1101 | 1000 | 1111 |
| 15964 | 0100 | 0000 | 0000 | 1100 | 1110 | 1100 | 1110 |
| 15965 | 1000 | 0000 | 0000 | 1001 | 1011 | 1010 | 1111 |
| 15968 | 0010 | 0000 | 0000 | 1010 | 1110 | 1110 | 1010 |
| 15969 | 0010 | 0000 | 0000 | 0110 | 1110 | 1110 | 1110 |
| 15970 | 0010 | 0000 | 0000 | 1010 | 1110 | 1110 | 1111 |
| 15973 | 0001 | 0000 | 0000 | 1001 | 1101 | 1111 | 0011 |
| 15974 | 1000 | 0000 | 0000 | 1001 | 1011 | 1111 | 1110 |
| 15975 | 1000 | 0000 | 0000 | 1001 | 1011 | 1111 | 1111 |
| 15979 | 0100 | 0000 | 0000 | 1100 | 1111 | 0000 | 0111 |
| 15980 | 0100 | 0000 | 0000 | 1100 | 1111 | 0000 | 1111 |
| 15984 | 0001 | 0000 | 0000 | 1001 | 1111 | 0001 | 0111 |
| 15985 | 0001 | 0000 | 0000 | 1001 | 1111 | 0001 | 1111 |
| 15989 | 0010 | 0000 | 0000 | 1010 | 1111 | 0110 | 0111 |
| 15990 | 0001 | 0000 | 0000 | 1001 | 1111 | 0011 | 0011 |
| 15994 | 1000 | 0000 | 0000 | 1001 | 1111 | 1011 | 1011 |
| 15995 | 0001 | 0000 | 0000 | 1001 | 1111 | 1011 | 1111 |
| 15998 | 0100 | 0000 | 0000 | 1100 | 1111 | 1111 | 0101 |
| 15999 | 0100 | 0000 | 0000 | 1100 | 1111 | 1111 | 0111 |
| 16000 | 0100 | 0000 | 0000 | 1100 | 1111 | 1111 | 1111 |
| 16004 | 0100 | 0000 | 0000 | 1101 | 0000 | 0000 | 0111 |
| 16005 | 1000 | 0000 | 0000 | 1011 | 0000 | 0000 | 1111 |
| 16009 | 0100 | 0000 | 0000 | 1101 | 0000 | 0100 | 1110 |
| 16010 | 0100 | 0000 | 0000 | 1101 | 0000 | 0100 | 1111 |
| 16014 | 0010 | 0000 | 0000 | 1011 | 0000 | 0110 | 1110 |
| 16015 | 0100 | 0000 | 0000 | 1101 | 0000 | 0101 | 1111 |
| 16019 | 0100 | 0000 | 0000 | 1101 | 0000 | 0111 | 0111 |
| 16020 | 0100 | 0000 | 0000 | 1101 | 0000 | 0111 | 1111 |
| 16024 | 0100 | 0000 | 0000 | 1101 | 0000 | 1111 | 0111 |
| 16025 | 0100 | 0000 | 0000 | 1101 | 0000 | 1111 | 1111 |
| 16030 | 0001 | 0000 | 0000 | 1011 | 0001 | 0000 | 1111 |
| 16034 | 0010 | 0000 | 0000 | 1011 | 0010 | 0010 | 0111 |
| 16035 | 0010 | 0000 | 0000 | 1011 | 0010 | 0010 | 1111 |
| 16039 | 0100 | 0000 | 0000 | 1101 | 0100 | 0110 | 0111 |
| 16040 | 0100 | 0000 | 0000 | 1101 | 0100 | 0110 | 1111 |
| 16044 | 0100 | 0000 | 0000 | 1101 | 0100 | 0111 | 1111 |
| 16045 | 1000 | 0000 | 0000 | 1101 | 1000 | 1110 | 1111 |
| 16049 | 0001 | 0000 | 0000 | 1011 | 0001 | 1111 | 0111 |
| 16050 | 0001 | 0000 | 0000 | 1011 | 0001 | 1111 | 1111 |
| 16055 | 1000 | 0000 | 0000 | 1011 | 1001 | 1000 | 1111 |
| 16060 | 1000 | 0000 | 0000 | 1101 | 1001 | 1000 | 1111 |
| 16064 | 0100 | 0000 | 0000 | 1110 | 0110 | 0110 | 1110 |
| 16065 | 0010 | 0000 | 0000 | 1011 | 0011 | 0011 | 1111 |
| 16069 | 0100 | 0000 | 0000 | 1110 | 0110 | 1110 | 1110 |
| 16070 | 0100 | 0000 | 0000 | 1110 | 0110 | 1110 | 1111 |
| 16074 | 1000 | 0000 | 0000 | 1101 | 1100 | 1111 | 1110 |
| 16075 | 0100 | 0000 | 0000 | 1101 | 0101 | 1111 | 1111 |
| 16080 | 1000 | 0000 | 0000 | 1011 | 1011 | 0000 | 1111 |
| 16085 | 0010 | 0000 | 0000 | 1011 | 1011 | 0010 | 1111 |
| 16090 | 1000 | 0000 | 0000 | 1110 | 1110 | 1010 | 1111 |
| 16094 | 0010 | 0000 | 0000 | 1011 | 1011 | 1011 | 1011 |
| 16095 | 1000 | 0000 | 0000 | 1011 | 1011 | 1011 | 1111 |
| 16099 | 1000 | 0000 | 0000 | 1011 | 1011 | 1111 | 1110 |
| 16100 | 1000 | 0000 | 0000 | 1011 | 1011 | 1111 | 1111 |
| 16105 | 0100 | 0000 | 0000 | 1101 | 1111 | 0000 | 1111 |
| 16110 | 0001 | 0000 | 0000 | 1011 | 1111 | 0001 | 1111 |
| 16115 | 0001 | 0000 | 0000 | 1011 | 1111 | 0011 | 1111 |
| 16120 | 0001 | 0000 | 0000 | 1011 | 1111 | 1011 | 1111 |
| 16124 | 0100 | 0000 | 0000 | 1101 | 1111 | 1111 | 0111 |
| 16125 | 0100 | 0000 | 0000 | 1101 | 1111 | 1111 | 1111 |
| 16130 | 0001 | 0000 | 0000 | 1111 | 0000 | 0000 | 1111 |
| 16135 | 1000 | 0000 | 0000 | 1111 | 0000 | 1000 | 1111 |
| 16140 | 0100 | 0000 | 0000 | 1111 | 0000 | 1100 | 1111 |
| 16145 | 0100 | 0000 | 0000 | 1111 | 0000 | 1101 | 1111 |
| 16150 | 0001 | 0000 | 0000 | 1111 | 0000 | 1111 | 1111 |
| 16160 | 1000 | 0000 | 0000 | 1111 | 1000 | 1000 | 1111 |
| 16165 | 1000 | 0000 | 0000 | 1111 | 1000 | 1001 | 1111 |
| 16170 | 1000 | 0000 | 0000 | 1111 | 1000 | 1011 | 1111 |
| 16175 | 1000 | 0000 | 0000 | 1111 | 1000 | 1111 | 1111 |
| 16190 | 1000 | 0000 | 0000 | 1111 | 1001 | 1001 | 1111 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 16195 | 1000 | 0000 | 0000 | 1111 | 1001 | 1011 | 1111 |
| 16200 | 0100 | 0000 | 0000 | 1111 | 1100 | 1111 | 1111 |
| 16220 | 1000 | 0000 | 0000 | 1111 | 1011 | 1011 | 1111 |
| 16225 | 0100 | 0000 | 0000 | 1111 | 1101 | 1111 | 1111 |
| 16250 | 0001 | 0000 | 0000 | 1111 | 1111 | 1111 | 1111 |
| 16277 | 0100 | 0000 | 0100 | 0000 | 0100 | 0000 | 0100 |
| 16278 | 0100 | 0000 | 0100 | 0000 | 0100 | 0000 | 0110 |
| 16279 | 0100 | 0000 | 0100 | 0000 | 0100 | 0000 | 1110 |
| 16280 | 0100 | 0000 | 0100 | 0000 | 0100 | 0000 | 1111 |
| 16282 | 0001 | 0000 | 0001 | 0000 | 0001 | 0001 | 0001 |
| 16283 | 0001 | 0000 | 0001 | 0000 | 0001 | 0001 | 0011 |
| 16284 | 0001 | 0000 | 0001 | 0000 | 0001 | 0001 | 0111 |
| 16285 | 0010 | 0000 | 0010 | 0000 | 0010 | 0010 | 1111 |
| 16287 | 0001 | 0000 | 0001 | 0000 | 0001 | 0101 | 0001 |
| 16288 | 0001 | 0000 | 0001 | 0000 | 0001 | 0101 | 0101 |
| 16289 | 0100 | 0000 | 0100 | 0000 | 0100 | 1100 | 1101 |
| 16290 | 1000 | 0000 | 1000 | 0000 | 1000 | 1010 | 1111 |
| 16292 | 0001 | 0000 | 0001 | 0000 | 0001 | 1101 | 0001 |
| 16293 | 1000 | 0000 | 1000 | 0000 | 1000 | 1011 | 1010 |
| 16294 | 1000 | 0000 | 1000 | 0000 | 1000 | 1101 | 1101 |
| 16295 | 1000 | 0000 | 1000 | 0000 | 1000 | 1110 | 1111 |
| 16297 | 0010 | 0000 | 0010 | 0000 | 0010 | 1111 | 0010 |
| 16298 | 1000 | 0000 | 1000 | 0000 | 1000 | 1111 | 1010 |
| 16299 | 1000 | 0000 | 1000 | 0000 | 1000 | 1111 | 1110 |
| 16300 | 0100 | 0000 | 0100 | 0000 | 0100 | 1111 | 1111 |
| 16303 | 0100 | 0000 | 0100 | 0000 | 0101 | 0000 | 0110 |
| 16304 | 0100 | 0000 | 0100 | 0000 | 0101 | 0000 | 1110 |
| 16305 | 0100 | 0000 | 0100 | 0000 | 0101 | 0000 | 1111 |
| 16308 | 0001 | 0000 | 0001 | 0000 | 0011 | 0001 | 0011 |
| 16309 | 0100 | 0000 | 0100 | 0000 | 0101 | 0100 | 0111 |
| 16310 | 0010 | 0000 | 0010 | 0000 | 0011 | 0010 | 1111 |
| 16313 | 0100 | 0000 | 0100 | 0000 | 0101 | 0101 | 0101 |
| 16314 | 0001 | 0000 | 0001 | 0000 | 1001 | 1001 | 1011 |
| 16315 | 1000 | 0000 | 1000 | 0000 | 1010 | 1010 | 1111 |
| 16318 | 1000 | 0000 | 1000 | 0000 | 1010 | 1011 | 1010 |
| 16319 | 0001 | 0000 | 0001 | 0000 | 1001 | 1011 | 1011 |
| 16320 | 0010 | 0000 | 0010 | 0000 | 0110 | 1110 | 1111 |
| 16323 | 1000 | 0000 | 1000 | 0000 | 1001 | 1111 | 1010 |
| 16324 | 1000 | 0000 | 1000 | 0000 | 1001 | 1111 | 1110 |
| 16325 | 0100 | 0000 | 0100 | 0000 | 0101 | 1111 | 1111 |
| 16329 | 0100 | 0000 | 0100 | 0000 | 0111 | 0000 | 1110 |
| 16330 | 0100 | 0000 | 0100 | 0000 | 0111 | 0000 | 1111 |
| 16334 | 0100 | 0000 | 0100 | 0000 | 0111 | 0100 | 0111 |
| 16335 | 0010 | 0000 | 0010 | 0000 | 1011 | 0010 | 1111 |
| 16339 | 0001 | 0000 | 0001 | 0000 | 1011 | 1001 | 1011 |
| 16340 | 1000 | 0000 | 1000 | 0000 | 1110 | 1100 | 1111 |
| 16344 | 0100 | 0000 | 0100 | 0000 | 1101 | 1101 | 1101 |
| 16345 | 1000 | 0000 | 1000 | 0000 | 1011 | 1011 | 1111 |
| 16349 | 1000 | 0000 | 1000 | 0000 | 1011 | 1111 | 1110 |
| 16350 | 0100 | 0000 | 0100 | 0000 | 0111 | 1111 | 1111 |
| 16355 | 0100 | 0000 | 0100 | 0000 | 1111 | 0000 | 1111 |
| 16360 | 0001 | 0000 | 0001 | 0000 | 1111 | 0001 | 1111 |
| 16365 | 0001 | 0000 | 0001 | 0000 | 1111 | 0011 | 1111 |
| 16370 | 0001 | 0000 | 0001 | 0000 | 1111 | 1011 | 1111 |
| 16375 | 0100 | 0000 | 0100 | 0000 | 1111 | 1111 | 1111 |
| 16382 | 0100 | 0000 | 0100 | 0100 | 0000 | 0100 | 0100 |
| 16383 | 0100 | 0000 | 0100 | 0100 | 0000 | 0100 | 0101 |
| 16384 | 0100 | 0000 | 0100 | 0100 | 0000 | 0100 | 0111 |
| 16385 | 1000 | 0000 | 1000 | 1000 | 0000 | 1000 | 1111 |
| 16388 | 0100 | 0000 | 0100 | 0100 | 0000 | 0110 | 0110 |
| 16389 | 0010 | 0000 | 0010 | 0010 | 0000 | 1010 | 1110 |
| 16390 | 1000 | 0000 | 1000 | 1000 | 0000 | 1010 | 1111 |
| 16394 | 0100 | 0000 | 0100 | 0100 | 0000 | 0111 | 0111 |
| 16395 | 1000 | 0000 | 1000 | 1000 | 0000 | 1110 | 1111 |
| 16400 | 1000 | 0000 | 1000 | 1000 | 0000 | 1111 | 1111 |
| 16403 | 1000 | 0000 | 1000 | 1000 | 1000 | 0000 | 1001 |
| 16404 | 1000 | 0000 | 1000 | 1000 | 1000 | 0000 | 1011 |
| 16405 | 1000 | 0000 | 1000 | 1000 | 1000 | 0000 | 1111 |
| 16407 | 0001 | 0000 | 0001 | 0001 | 0001 | 0001 | 0001 |
| 16408 | 0001 | 0000 | 0001 | 0001 | 0001 | 0001 | 0011 |
| 16409 | 0001 | 0000 | 0001 | 0001 | 0001 | 0001 | 0111 |
| 16410 | 0100 | 0000 | 0100 | 0100 | 0100 | 0100 | 1111 |
| 16412 | 0001 | 0000 | 0001 | 0001 | 0001 | 0011 | 0001 |
| 16413 | 0001 | 0000 | 0001 | 0001 | 0001 | 0011 | 0011 |
| 16414 | 0100 | 0000 | 0100 | 0100 | 0100 | 1100 | 1110 |
| 16415 | 0100 | 0000 | 0100 | 0100 | 0100 | 0101 | 1111 |
| 16417 | 0001 | 0000 | 0001 | 0001 | 0001 | 0111 | 0001 |
| 16418 | 0100 | 0000 | 0100 | 0100 | 0100 | 1101 | 1100 |
| 16419 | 0001 | 0000 | 0001 | 0001 | 0001 | 0111 | 0111 |
| 16420 | 0100 | 0000 | 0100 | 0100 | 0100 | 0111 | 1111 |
| 16422 | 1000 | 0000 | 1000 | 1000 | 1000 | 1111 | 1000 |
| 16423 | 1000 | 0000 | 1000 | 1000 | 1000 | 1111 | 1001 |
| 16424 | 1000 | 0000 | 1000 | 1000 | 1000 | 1111 | 1011 |
| 16425 | 0100 | 0000 | 0100 | 0100 | 0100 | 1111 | 1111 |
| 16428 | 1000 | 0000 | 1000 | 1000 | 1010 | 0000 | 1001 |
| 16429 | 1000 | 0000 | 1000 | 1000 | 1010 | 0000 | 1011 |
| 16430 | 1000 | 0000 | 1000 | 1000 | 1010 | 0000 | 1111 |
| 16432 | 0001 | 0000 | 0001 | 0001 | 0011 | 0001 | 0001 |
| 16433 | 0001 | 0000 | 0001 | 0001 | 0011 | 0001 | 0011 |
| 16434 | 0001 | 0000 | 0001 | 0001 | 0011 | 0001 | 0111 |
| 16435 | 0100 | 0000 | 0100 | 0100 | 0110 | 0100 | 1111 |
| 16437 | 0001 | 0000 | 0001 | 0001 | 0011 | 0011 | 0001 |
| 16438 | 0001 | 0000 | 0001 | 0001 | 0011 | 0011 | 0011 |
| 16439 | 0100 | 0000 | 0100 | 0100 | 1100 | 1100 | 1110 |
| 16440 | 0100 | 0000 | 0100 | 0100 | 0110 | 0110 | 1111 |
| 16442 | 0001 | 0000 | 0001 | 0001 | 0011 | 1011 | 0001 |
| 16443 | 0100 | 0000 | 0100 | 0100 | 1100 | 1101 | 1100 |
| 16444 | 0001 | 0000 | 0001 | 0001 | 1001 | 1101 | 1101 |
| 16445 | 0010 | 0000 | 0010 | 0010 | 0110 | 1110 | 1111 |
| 16447 | 1000 | 0000 | 1000 | 1000 | 1010 | 1111 | 1000 |
| 16448 | 1000 | 0000 | 1000 | 1000 | 1010 | 1111 | 1001 |
| 16449 | 1000 | 0000 | 1000 | 1000 | 1010 | 1111 | 1011 |
| 16450 | 0100 | 0000 | 0100 | 0100 | 0110 | 1111 | 1111 |
| 16453 | 1000 | 0000 | 1000 | 1000 | 1110 | 0000 | 1001 |
| 16454 | 1000 | 0000 | 1000 | 1000 | 1110 | 0000 | 1011 |
| 16455 | 1000 | 0000 | 1000 | 1000 | 1110 | 0000 | 1111 |
| 16457 | 0001 | 0000 | 0001 | 0001 | 0111 | 0001 | 0001 |
| 16458 | 0001 | 0000 | 0001 | 0001 | 0111 | 0001 | 0011 |
| 16459 | 0001 | 0000 | 0001 | 0001 | 0111 | 0001 | 0111 |
| 16460 | 0100 | 0000 | 0100 | 0100 | 1110 | 0100 | 1111 |
| 16462 | 0100 | 0000 | 0100 | 0100 | 1110 | 1100 | 0100 |
| 16463 | 0100 | 0000 | 0100 | 0100 | 1101 | 1100 | 1100 |
| 16464 | 0001 | 0000 | 0001 | 0001 | 1011 | 1001 | 1101 |
| 16465 | 0001 | 0000 | 0001 | 0001 | 1011 | 1001 | 1111 |
| 16467 | 0001 | 0000 | 0001 | 0001 | 0111 | 0111 | 0001 |
| 16468 | 0100 | 0000 | 0100 | 0100 | 1101 | 1101 | 1100 |
| 16469 | 0001 | 0000 | 0001 | 0001 | 0111 | 0111 | 0111 |
| 16470 | 0100 | 0000 | 0100 | 0100 | 0111 | 0111 | 1111 |
| 16472 | 1000 | 0000 | 1000 | 1000 | 1110 | 1111 | 1000 |
| 16473 | 1000 | 0000 | 1000 | 1000 | 1110 | 1111 | 1001 |
| 16474 | 1000 | 0000 | 1000 | 1000 | 1110 | 1111 | 1011 |
| 16475 | 1000 | 0000 | 1000 | 1000 | 1110 | 1111 | 1111 |
| 16478 | 0001 | 0000 | 0001 | 0001 | 1111 | 0000 | 0011 |
| 16479 | 0001 | 0000 | 0001 | 0001 | 1111 | 0000 | 0111 |
| 16480 | 1000 | 0000 | 1000 | 1000 | 1111 | 0000 | 1111 |
| 16482 | 0100 | 0000 | 0100 | 0100 | 1111 | 0100 | 0100 |
| 16483 | 0100 | 0000 | 0100 | 0100 | 1111 | 0100 | 0101 |
| 16484 | 0100 | 0000 | 0100 | 0100 | 1111 | 0100 | 0111 |
| 16485 | 0010 | 0000 | 0010 | 0010 | 1111 | 0010 | 1111 |
| 16487 | 0100 | 0000 | 0100 | 0100 | 1111 | 0110 | 0100 |
| 16488 | 0100 | 0000 | 0100 | 0100 | 1111 | 0110 | 0110 |
| 16489 | 0010 | 0000 | 0010 | 0010 | 1111 | 1010 | 1110 |
| 16490 | 1000 | 0000 | 1000 | 1000 | 1111 | 1010 | 1111 |
| 16492 | 0100 | 0000 | 0100 | 0100 | 1111 | 1110 | 0100 |
| 16493 | 0010 | 0000 | 0010 | 0010 | 1111 | 1110 | 1010 |
| 16494 | 0100 | 0000 | 0100 | 0100 | 1111 | 0111 | 0111 |
| 16495 | 1000 | 0000 | 1000 | 1000 | 1111 | 1110 | 1111 |
| 16497 | 0001 | 0000 | 0001 | 0001 | 1111 | 1111 | 0001 |
| 16498 | 0001 | 0000 | 0001 | 0001 | 1111 | 1111 | 0011 |
| 16499 | 0001 | 0000 | 0001 | 0001 | 1111 | 1111 | 0111 |
| 16500 | 1000 | 0000 | 1000 | 1000 | 1111 | 1111 | 1111 |
| 16508 | 0100 | 0000 | 0100 | 0101 | 0000 | 0100 | 0101 |
| 16509 | 0100 | 0000 | 0100 | 0101 | 0000 | 0100 | 0111 |
| 16510 | 1000 | 0000 | 1000 | 1001 | 0000 | 1000 | 1111 |
| 16512 | 0100 | 0000 | 0100 | 0101 | 0000 | 0110 | 0100 |
| 16513 | 0100 | 0000 | 0100 | 0101 | 0000 | 0110 | 0110 |
| 16514 | 0100 | 0000 | 0100 | 0101 | 0000 | 0110 | 0111 |
| 16515 | 1000 | 0000 | 1000 | 1001 | 0000 | 1010 | 1111 |
| 16517 | 0100 | 0000 | 0100 | 0101 | 0000 | 1110 | 0100 |
| 16518 | 0100 | 0000 | 0100 | 0101 | 0000 | 1101 | 1100 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 16519 | 0100 | 0000 | 0100 | 0101 | 0000 | 0111 | 0111 |
| 16520 | 1000 | 0000 | 1000 | 1001 | 0000 | 1110 | 1111 |
| 16522 | 1000 | 0000 | 1000 | 1001 | 0000 | 1111 | 1000 |
| 16523 | 1000 | 0000 | 1000 | 1001 | 0000 | 1111 | 1010 |
| 16524 | 1000 | 0000 | 1000 | 1001 | 0000 | 1111 | 1110 |
| 16525 | 1000 | 0000 | 1000 | 1001 | 0000 | 1111 | 1111 |
| 16528 | 0100 | 0000 | 0100 | 1100 | 0100 | 0000 | 0101 |
| 16529 | 0100 | 0000 | 0100 | 1100 | 0000 | 0111 | 0111 |
| 16530 | 1000 | 0000 | 1000 | 1001 | 1000 | 0000 | 1111 |
| 16533 | 0001 | 0000 | 0001 | 0011 | 0001 | 0001 | 0011 |
| 16534 | 0001 | 0000 | 0001 | 0011 | 0001 | 0001 | 0111 |
| 16535 | 0100 | 0000 | 0100 | 0101 | 0100 | 0100 | 1111 |
| 16537 | 0001 | 0000 | 0001 | 0011 | 0001 | 0011 | 0001 |
| 16538 | 0001 | 0000 | 0001 | 0011 | 0001 | 0011 | 0011 |
| 16539 | 0100 | 0000 | 0100 | 0110 | 0100 | 1100 | 1110 |
| 16540 | 0100 | 0000 | 0100 | 0101 | 0100 | 0101 | 1111 |
| 16542 | 0001 | 0000 | 0001 | 0011 | 0001 | 0111 | 0001 |
| 16543 | 0100 | 0000 | 0100 | 0101 | 0100 | 1101 | 1100 |
| 16544 | 0001 | 0000 | 0001 | 0011 | 0001 | 0111 | 0111 |
| 16545 | 0100 | 0000 | 0100 | 0101 | 0100 | 0111 | 1111 |
| 16547 | 0100 | 0000 | 0100 | 1100 | 0100 | 1111 | 0100 |
| 16548 | 0100 | 0000 | 0100 | 0110 | 0100 | 1111 | 1100 |
| 16549 | 0100 | 0000 | 0100 | 1100 | 0100 | 1111 | 0111 |
| 16550 | 0100 | 0000 | 0100 | 0101 | 0100 | 1111 | 1111 |
| 16553 | 1000 | 0000 | 1000 | 1100 | 1100 | 0000 | 1001 |
| 16554 | 1000 | 0000 | 1000 | 1100 | 1100 | 0000 | 1011 |
| 16555 | 1000 | 0000 | 1000 | 1010 | 1010 | 0000 | 1111 |
| 16558 | 0001 | 0000 | 0001 | 0011 | 0011 | 0001 | 0011 |
| 16559 | 0001 | 0000 | 0001 | 0011 | 0011 | 0001 | 0111 |
| 16560 | 0100 | 0000 | 0100 | 0110 | 0110 | 0100 | 1111 |
| 16562 | 0001 | 0000 | 0001 | 0011 | 0011 | 0011 | 0001 |
| 16563 | 0001 | 0000 | 0001 | 0011 | 0011 | 0011 | 0011 |
| 16564 | 0100 | 0000 | 0100 | 1100 | 1100 | 1100 | 1101 |
| 16565 | 0100 | 0000 | 0100 | 0110 | 0110 | 0110 | 1111 |
| 16567 | 0010 | 0000 | 0010 | 0110 | 0110 | 0111 | 0010 |
| 16568 | 0010 | 0000 | 0010 | 1010 | 1010 | 1011 | 1010 |
| 16569 | 0001 | 0000 | 0001 | 0101 | 0101 | 0111 | 0111 |
| 16570 | 0001 | 0000 | 0001 | 0101 | 0101 | 1101 | 1111 |
| 16572 | 1000 | 0000 | 1000 | 1100 | 1100 | 1111 | 1000 |
| 16573 | 1000 | 0000 | 1000 | 1100 | 1100 | 1111 | 1001 |
| 16574 | 1000 | 0000 | 1000 | 1100 | 1100 | 1111 | 1011 |
| 16575 | 0100 | 0000 | 0100 | 0110 | 0110 | 1111 | 1111 |
| 16578 | 1000 | 0000 | 1000 | 1100 | 1101 | 0000 | 1001 |
| 16579 | 1000 | 0000 | 1000 | 1100 | 1101 | 0000 | 1011 |
| 16580 | 1000 | 0000 | 1000 | 1100 | 1110 | 0000 | 1111 |
| 16583 | 0001 | 0000 | 0001 | 1001 | 1101 | 0001 | 0011 |
| 16584 | 0001 | 0000 | 0001 | 0011 | 0111 | 0001 | 0111 |
| 16585 | 0001 | 0000 | 0001 | 1001 | 1101 | 0001 | 1111 |
| 16587 | 0001 | 0000 | 0001 | 1001 | 1011 | 0011 | 0001 |
| 16588 | 0100 | 0000 | 0100 | 1100 | 1101 | 1100 | 1100 |
| 16589 | 0001 | 0000 | 0001 | 1001 | 1101 | 1001 | 1011 |
| 16590 | 0010 | 0000 | 0010 | 1010 | 1110 | 1010 | 1111 |
| 16592 | 0100 | 0000 | 0100 | 1100 | 1110 | 1110 | 0100 |
| 16593 | 0100 | 0000 | 0100 | 1100 | 1101 | 1101 | 1100 |
| 16594 | 0100 | 0000 | 0100 | 1100 | 1110 | 1110 | 1110 |
| 16595 | 0010 | 0000 | 0010 | 1010 | 1110 | 1110 | 1111 |
| 16597 | 1000 | 0000 | 1000 | 1100 | 1101 | 1111 | 1000 |
| 16598 | 1000 | 0000 | 1000 | 1100 | 1101 | 1111 | 1001 |
| 16599 | 1000 | 0000 | 1000 | 1100 | 1101 | 1111 | 1011 |
| 16600 | 1000 | 0000 | 1000 | 1010 | 1011 | 1111 | 1111 |
| 16603 | 1000 | 0000 | 1000 | 1001 | 1111 | 0000 | 1010 |
| 16604 | 1000 | 0000 | 1000 | 1001 | 1111 | 0000 | 1110 |
| 16605 | 1000 | 0000 | 1000 | 1001 | 1111 | 0000 | 1111 |
| 16608 | 0100 | 0000 | 0100 | 0101 | 1111 | 0100 | 0101 |
| 16609 | 0100 | 0000 | 0100 | 0101 | 1111 | 0100 | 0111 |
| 16610 | 0010 | 0000 | 0010 | 0011 | 1111 | 0010 | 1111 |
| 16612 | 0100 | 0000 | 0100 | 0101 | 1111 | 0110 | 0100 |
| 16613 | 0100 | 0000 | 0100 | 0101 | 1111 | 0110 | 0110 |
| 16614 | 0010 | 0000 | 0010 | 0011 | 1111 | 1010 | 1110 |
| 16615 | 1000 | 0000 | 1000 | 1001 | 1111 | 1010 | 1111 |
| 16617 | 0100 | 0000 | 0100 | 0101 | 1111 | 1110 | 0100 |
| 16618 | 0100 | 0000 | 0100 | 0101 | 1111 | 1101 | 1100 |
| 16619 | 0100 | 0000 | 0100 | 0101 | 1111 | 0111 | 0111 |
| 16620 | 1000 | 0000 | 1000 | 1001 | 1111 | 1110 | 1111 |
| 16622 | 1000 | 0000 | 1000 | 1001 | 1111 | 1111 | 1000 |
| 16623 | 1000 | 0000 | 1000 | 1001 | 1111 | 1111 | 1010 |
| 16624 | 1000 | 0000 | 1000 | 1001 | 1111 | 1111 | 1110 |
| 16625 | 1000 | 0000 | 1000 | 1001 | 1111 | 1111 | 1111 |
| 16634 | 0100 | 0000 | 0100 | 0111 | 0000 | 0100 | 0111 |
| 16635 | 1000 | 0000 | 1000 | 1011 | 0000 | 1000 | 1111 |
| 16638 | 0100 | 0000 | 0100 | 0111 | 0000 | 0110 | 0110 |
| 16639 | 0100 | 0000 | 0100 | 0111 | 0000 | 0110 | 0111 |
| 16640 | 1000 | 0000 | 1000 | 1011 | 0000 | 1010 | 1111 |
| 16642 | 0100 | 0000 | 0100 | 0111 | 0000 | 1110 | 0100 |
| 16643 | 0100 | 0000 | 0100 | 0111 | 0000 | 1101 | 1100 |
| 16644 | 0100 | 0000 | 0100 | 0111 | 0000 | 0111 | 0111 |
| 16645 | 1000 | 0000 | 1000 | 1011 | 0000 | 1110 | 1111 |
| 16647 | 1000 | 0000 | 1000 | 1011 | 0000 | 1111 | 1000 |
| 16648 | 1000 | 0000 | 1000 | 1011 | 0000 | 1111 | 1010 |
| 16649 | 1000 | 0000 | 1000 | 1011 | 0000 | 1111 | 1110 |
| 16650 | 1000 | 0000 | 1000 | 1011 | 0000 | 1111 | 1111 |
| 16653 | 1000 | 0000 | 1000 | 1101 | 1000 | 0000 | 1001 |
| 16654 | 1000 | 0000 | 1000 | 1101 | 1000 | 0000 | 1011 |
| 16655 | 1000 | 0000 | 1000 | 1011 | 1000 | 0000 | 1111 |
| 16658 | 0001 | 0000 | 0001 | 1011 | 0001 | 0001 | 0011 |
| 16659 | 0001 | 0000 | 0001 | 1011 | 0001 | 0001 | 0111 |
| 16660 | 0100 | 0000 | 0100 | 0111 | 0100 | 0100 | 1111 |
| 16663 | 0001 | 0000 | 0001 | 1011 | 0001 | 0011 | 0011 |
| 16664 | 0010 | 0000 | 0010 | 1011 | 0010 | 0011 | 1011 |
| 16665 | 0100 | 0000 | 0100 | 0111 | 0100 | 0101 | 1111 |
| 16667 | 0001 | 0000 | 0001 | 1011 | 0001 | 0111 | 0001 |
| 16668 | 0100 | 0000 | 0100 | 0111 | 0100 | 1101 | 1100 |
| 16669 | 0001 | 0000 | 0001 | 1011 | 0001 | 0111 | 0111 |
| 16670 | 0100 | 0000 | 0100 | 0111 | 0100 | 0111 | 1111 |
| 16672 | 1000 | 0000 | 1000 | 1101 | 1000 | 1111 | 1000 |
| 16673 | 0100 | 0000 | 0100 | 1101 | 0100 | 1111 | 0101 |
| 16674 | 0001 | 0000 | 0001 | 1101 | 0001 | 1111 | 1011 |
| 16675 | 1000 | 0000 | 1000 | 1011 | 1000 | 1111 | 1111 |
| 16678 | 0001 | 0000 | 0001 | 1101 | 0101 | 0000 | 0011 |
| 16679 | 0001 | 0000 | 0001 | 1101 | 0101 | 0000 | 0111 |
| 16680 | 0010 | 0000 | 0010 | 1110 | 1010 | 0000 | 1111 |
| 16683 | 0001 | 0000 | 0001 | 0111 | 0011 | 0001 | 0011 |
| 16684 | 0001 | 0000 | 0001 | 1011 | 0011 | 0001 | 0111 |
| 16685 | 0100 | 0000 | 0100 | 1110 | 0110 | 0100 | 1111 |
| 16688 | 0010 | 0000 | 0010 | 1011 | 1010 | 1010 | 1010 |
| 16689 | 0010 | 0000 | 0010 | 1011 | 0011 | 0011 | 1011 |
| 16690 | 0010 | 0000 | 0010 | 1110 | 0110 | 0110 | 1111 |
| 16692 | 0001 | 0000 | 0001 | 1011 | 0011 | 0111 | 0001 |
| 16693 | 0100 | 0000 | 0100 | 0111 | 0110 | 0111 | 0101 |
| 16694 | 0001 | 0000 | 0001 | 1101 | 0101 | 0111 | 0111 |
| 16695 | 0010 | 0000 | 0010 | 1110 | 0110 | 0111 | 1111 |
| 16697 | 1000 | 0000 | 1000 | 1110 | 1100 | 1111 | 1000 |
| 16698 | 1000 | 0000 | 1000 | 1110 | 1100 | 1111 | 1001 |
| 16699 | 1000 | 0000 | 1000 | 1110 | 1100 | 1111 | 1011 |
| 16700 | 1000 | 0000 | 1000 | 1011 | 1010 | 1111 | 1111 |
| 16703 | 1000 | 0000 | 1000 | 1101 | 1101 | 0000 | 1001 |
| 16704 | 1000 | 0000 | 1000 | 1101 | 1101 | 0000 | 1011 |
| 16705 | 0010 | 0000 | 0010 | 0111 | 0111 | 0000 | 1111 |
| 16708 | 0001 | 0000 | 0001 | 1011 | 1011 | 0001 | 0011 |
| 16709 | 0001 | 0000 | 0001 | 1011 | 1011 | 0001 | 0111 |
| 16710 | 0100 | 0000 | 0100 | 0111 | 0111 | 0100 | 1111 |
| 16713 | 0001 | 0000 | 0001 | 1101 | 1101 | 0101 | 0101 |
| 16714 | 0010 | 0000 | 0010 | 1011 | 1011 | 0011 | 1011 |
| 16715 | 0010 | 0000 | 0010 | 1110 | 1110 | 1010 | 1111 |
| 16717 | 0001 | 0000 | 0001 | 0111 | 0111 | 0111 | 0001 |
| 16718 | 0100 | 0000 | 0100 | 1101 | 1101 | 1101 | 0101 |
| 16719 | 0001 | 0000 | 0001 | 0111 | 0111 | 0111 | 0111 |
| 16720 | 0100 | 0000 | 0100 | 0111 | 0111 | 0111 | 1111 |
| 16722 | 1000 | 0000 | 1000 | 1110 | 1110 | 1111 | 1000 |
| 16723 | 1000 | 0000 | 1000 | 1110 | 1110 | 1111 | 1001 |
| 16724 | 1000 | 0000 | 1000 | 1110 | 1110 | 1111 | 1011 |
| 16725 | 1000 | 0000 | 1000 | 1011 | 1011 | 1111 | 1111 |
| 16728 | 1000 | 0000 | 1000 | 1011 | 1111 | 0000 | 1010 |
| 16729 | 1000 | 0000 | 1000 | 1011 | 1111 | 0000 | 1110 |
| 16730 | 1000 | 0000 | 1000 | 1011 | 1111 | 0000 | 1111 |
| 16733 | 0100 | 0000 | 0100 | 0111 | 1111 | 0100 | 0101 |
| 16734 | 0100 | 0000 | 0100 | 0111 | 1111 | 0100 | 0111 |
| 16735 | 0010 | 0000 | 0010 | 1011 | 1111 | 0010 | 1111 |
| 16738 | 0100 | 0000 | 0100 | 0111 | 1111 | 0110 | 0110 |
| 16739 | 0100 | 0000 | 0100 | 0111 | 1111 | 0110 | 0111 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 16740 | 1000 | 0000 | 1000 | 1011 | 1111 | 1010 | 1111 |
| 16742 | 0100 | 0000 | 0100 | 0111 | 1111 | 1110 | 0100 |
| 16743 | 0100 | 0000 | 0100 | 0111 | 1111 | 1101 | 1100 |
| 16744 | 0100 | 0000 | 0100 | 0111 | 1111 | 0111 | 0111 |
| 16745 | 1000 | 0000 | 1000 | 1011 | 1111 | 1110 | 1111 |
| 16747 | 1000 | 0000 | 1000 | 1011 | 1111 | 1111 | 1000 |
| 16748 | 1000 | 0000 | 1000 | 1011 | 1111 | 1111 | 1010 |
| 16749 | 1000 | 0000 | 1000 | 1011 | 1111 | 1111 | 1110 |
| 16750 | 1000 | 0000 | 1000 | 1011 | 1111 | 1111 | 1111 |
| 16760 | 0100 | 0000 | 0100 | 1111 | 0000 | 0100 | 1111 |
| 16763 | 1000 | 0000 | 1000 | 1111 | 0000 | 1010 | 1010 |
| 16764 | 0010 | 0000 | 0010 | 1111 | 0000 | 1010 | 1110 |
| 16765 | 0100 | 0000 | 0100 | 1111 | 0000 | 0101 | 1111 |
| 16768 | 0010 | 0000 | 0010 | 1111 | 0000 | 1110 | 1010 |
| 16769 | 1000 | 0000 | 1000 | 1111 | 0000 | 1011 | 1011 |
| 16770 | 0100 | 0000 | 0100 | 1111 | 0000 | 0111 | 1111 |
| 16772 | 0100 | 0000 | 0100 | 1111 | 0000 | 1111 | 0100 |
| 16773 | 0100 | 0000 | 0100 | 1111 | 0000 | 1111 | 0101 |
| 16774 | 0100 | 0000 | 0100 | 1111 | 0000 | 1111 | 0111 |
| 16775 | 0100 | 0000 | 0100 | 1111 | 0000 | 1111 | 1111 |
| 16778 | 1000 | 0000 | 1000 | 1111 | 1000 | 0000 | 1010 |
| 16779 | 1000 | 0000 | 1000 | 1111 | 1000 | 0000 | 1110 |
| 16780 | 0100 | 0000 | 0100 | 1111 | 0100 | 0000 | 1111 |
| 16783 | 0001 | 0000 | 0001 | 1111 | 0001 | 0001 | 0011 |
| 16784 | 0001 | 0000 | 0001 | 1111 | 0001 | 0001 | 0111 |
| 16785 | 0010 | 0000 | 0010 | 1111 | 0010 | 0010 | 1111 |
| 16788 | 0001 | 0000 | 0001 | 1111 | 0001 | 0101 | 0101 |
| 16789 | 0100 | 0000 | 0100 | 1111 | 0100 | 0101 | 1101 |
| 16790 | 0001 | 0000 | 0001 | 1111 | 0001 | 0011 | 1111 |
| 16793 | 1000 | 0000 | 1000 | 1111 | 1000 | 1011 | 1010 |
| 16794 | 0001 | 0000 | 0001 | 1111 | 0001 | 1101 | 1101 |
| 16795 | 0001 | 0000 | 0001 | 1111 | 0001 | 0111 | 1111 |
| 16797 | 1000 | 0000 | 1000 | 1111 | 1000 | 1111 | 1000 |
| 16798 | 1000 | 0000 | 1000 | 1111 | 1000 | 1111 | 1010 |
| 16799 | 1000 | 0000 | 1000 | 1111 | 1000 | 1111 | 1110 |
| 16800 | 0001 | 0000 | 0001 | 1111 | 0001 | 1111 | 1111 |
| 16803 | 1000 | 0000 | 1000 | 1111 | 1001 | 0000 | 1010 |
| 16804 | 1000 | 0000 | 1000 | 1111 | 1001 | 0000 | 1110 |
| 16805 | 0100 | 0000 | 0100 | 1111 | 0101 | 0000 | 1111 |
| 16808 | 0001 | 0000 | 0001 | 1111 | 0011 | 0001 | 0011 |
| 16809 | 1000 | 0000 | 1000 | 1111 | 1001 | 1000 | 1011 |
| 16810 | 0010 | 0000 | 0010 | 1111 | 0011 | 0010 | 1111 |
| 16813 | 1000 | 0000 | 1000 | 1111 | 1001 | 1001 | 1001 |
| 16814 | 0001 | 0000 | 0001 | 1111 | 0101 | 0101 | 1101 |
| 16815 | 0001 | 0000 | 0001 | 1111 | 0011 | 0011 | 1111 |
| 16818 | 1000 | 0000 | 1000 | 1111 | 1001 | 1101 | 1001 |
| 16819 | 0001 | 0000 | 0001 | 1111 | 1001 | 1011 | 1011 |
| 16820 | 0010 | 0000 | 0010 | 1111 | 1010 | 1110 | 1111 |
| 16822 | 1000 | 0000 | 1000 | 1111 | 1001 | 1111 | 1000 |
| 16823 | 1000 | 0000 | 1000 | 1111 | 1001 | 1111 | 1010 |
| 16824 | 1000 | 0000 | 1000 | 1111 | 1001 | 1111 | 1110 |
| 16825 | 1000 | 0000 | 1000 | 1111 | 1001 | 1111 | 1111 |
| 16828 | 1000 | 0000 | 1000 | 1111 | 1011 | 0000 | 1010 |
| 16829 | 1000 | 0000 | 1000 | 1111 | 1011 | 0000 | 1110 |
| 16830 | 0100 | 0000 | 0100 | 1111 | 0111 | 0000 | 1111 |
| 16833 | 1000 | 0000 | 1000 | 1111 | 1011 | 1000 | 1001 |
| 16834 | 1000 | 0000 | 1000 | 1111 | 1011 | 1000 | 1011 |
| 16835 | 0010 | 0000 | 0010 | 1111 | 1011 | 0010 | 1111 |
| 16838 | 0001 | 0000 | 0001 | 1111 | 1011 | 1001 | 1001 |
| 16839 | 0001 | 0000 | 0001 | 1111 | 1011 | 1001 | 1011 |
| 16840 | 0010 | 0000 | 0010 | 1111 | 1110 | 1010 | 1111 |
| 16843 | 0001 | 0000 | 0001 | 1111 | 1011 | 1011 | 1011 |
| 16844 | 0100 | 0000 | 0100 | 1111 | 1101 | 1101 | 1101 |
| 16845 | 1000 | 0000 | 1000 | 1111 | 1011 | 1011 | 1111 |
| 16847 | 1000 | 0000 | 1000 | 1111 | 1011 | 1111 | 1000 |
| 16848 | 1000 | 0000 | 1000 | 1111 | 1011 | 1111 | 1010 |
| 16849 | 1000 | 0000 | 1000 | 1111 | 1011 | 1111 | 1110 |
| 16850 | 1000 | 0000 | 1000 | 1111 | 1011 | 1111 | 1111 |
| 16853 | 0100 | 0000 | 0100 | 1111 | 1111 | 0000 | 0101 |
| 16854 | 0100 | 0000 | 0100 | 1111 | 1111 | 0000 | 0111 |
| 16855 | 0100 | 0000 | 0100 | 1111 | 1111 | 0000 | 1111 |
| 16858 | 0001 | 0000 | 0001 | 1111 | 1111 | 0001 | 0011 |
| 16859 | 0001 | 0000 | 0001 | 1111 | 1111 | 0001 | 0111 |
| 16860 | 0001 | 0000 | 0001 | 1111 | 1111 | 0001 | 1111 |
| 16863 | 0001 | 0000 | 0001 | 1111 | 1111 | 0011 | 0011 |
| 16864 | 0010 | 0000 | 0010 | 1111 | 1111 | 1010 | 1110 |
| 16865 | 1000 | 0000 | 1000 | 1111 | 1111 | 1001 | 1111 |
| 16868 | 0010 | 0000 | 0010 | 1111 | 1111 | 1110 | 1010 |
| 16869 | 1000 | 0000 | 1000 | 1111 | 1111 | 1011 | 1011 |
| 16870 | 1000 | 0000 | 1000 | 1111 | 1111 | 1011 | 1111 |
| 16872 | 1000 | 0000 | 1000 | 1111 | 1111 | 1111 | 1000 |
| 16873 | 1000 | 0000 | 1000 | 1111 | 1111 | 1111 | 1001 |
| 16874 | 1000 | 0000 | 1000 | 1111 | 1111 | 1111 | 1011 |
| 16875 | 1000 | 0000 | 1000 | 1111 | 1111 | 1111 | 1111 |
| 16928 | 0100 | 0000 | 1100 | 0000 | 0101 | 0000 | 0110 |
| 16929 | 0100 | 0000 | 1100 | 0000 | 0101 | 0000 | 1110 |
| 16930 | 0100 | 0000 | 1100 | 0000 | 0101 | 0000 | 1111 |
| 16933 | 0001 | 0000 | 1001 | 0000 | 0011 | 0001 | 0011 |
| 16934 | 0100 | 0000 | 1100 | 0000 | 0101 | 0100 | 0111 |
| 16935 | 0010 | 0000 | 1010 | 0000 | 0011 | 0010 | 1111 |
| 16938 | 0100 | 0000 | 1100 | 0000 | 0101 | 0101 | 0101 |
| 16939 | 0001 | 0000 | 1001 | 0000 | 1001 | 1001 | 1011 |
| 16940 | 0010 | 0000 | 1010 | 0000 | 0011 | 0011 | 1111 |
| 16943 | 0100 | 0000 | 1100 | 0000 | 0110 | 0111 | 0101 |
| 16944 | 0100 | 0000 | 1100 | 0000 | 0101 | 0111 | 1111 |
| 16945 | 0010 | 0000 | 1010 | 0000 | 0110 | 0111 | 1111 |
| 16948 | 1000 | 0000 | 1001 | 0000 | 1001 | 1111 | 1010 |
| 16949 | 1000 | 0000 | 1001 | 0000 | 1001 | 1111 | 1110 |
| 16950 | 0100 | 0000 | 1100 | 0000 | 0101 | 1111 | 1111 |
| 16954 | 0100 | 0000 | 1100 | 0000 | 0111 | 0000 | 1110 |
| 16955 | 0100 | 0000 | 1100 | 0000 | 0111 | 0000 | 1111 |
| 16959 | 0100 | 0000 | 1100 | 0000 | 0111 | 0100 | 0111 |
| 16960 | 0010 | 0000 | 1010 | 0000 | 1011 | 0010 | 1111 |
| 16964 | 0001 | 0000 | 1001 | 0000 | 0111 | 0101 | 0111 |
| 16965 | 0001 | 0000 | 1001 | 0000 | 0111 | 0101 | 1111 |
| 16969 | 0100 | 0000 | 1100 | 0000 | 1101 | 1101 | 1101 |
| 16970 | 1000 | 0000 | 1001 | 0000 | 1011 | 1011 | 1111 |
| 16974 | 1000 | 0000 | 1001 | 0000 | 1011 | 1111 | 1110 |
| 16975 | 0100 | 0000 | 1100 | 0000 | 0111 | 1111 | 1111 |
| 16980 | 0100 | 0000 | 1100 | 0000 | 1111 | 0000 | 1111 |
| 16985 | 0001 | 0000 | 1001 | 0000 | 1111 | 0001 | 1111 |
| 16990 | 0001 | 0000 | 1001 | 0000 | 1111 | 0011 | 1111 |
| 16995 | 0001 | 0000 | 1001 | 0000 | 1111 | 1011 | 1111 |
| 17000 | 0100 | 0000 | 1100 | 0000 | 1111 | 1111 | 1111 |
| 17033 | 0001 | 0000 | 1001 | 0001 | 0001 | 0001 | 0011 |
| 17034 | 0001 | 0000 | 1001 | 0001 | 0001 | 0001 | 0111 |
| 17035 | 0100 | 0000 | 1100 | 0100 | 0100 | 0100 | 1111 |
| 17038 | 0001 | 0000 | 1001 | 0001 | 0001 | 0011 | 0011 |
| 17039 | 0100 | 0000 | 0110 | 0100 | 0100 | 1100 | 1110 |
| 17040 | 0100 | 0000 | 1100 | 0100 | 0100 | 0101 | 1111 |
| 17043 | 0100 | 0000 | 1100 | 0100 | 0100 | 1101 | 1100 |
| 17044 | 0001 | 0000 | 1001 | 0001 | 0001 | 0111 | 0111 |
| 17045 | 0100 | 0000 | 1100 | 0100 | 0100 | 1101 | 1111 |
| 17048 | 0100 | 0000 | 1100 | 0100 | 0100 | 1111 | 0101 |
| 17049 | 0100 | 0000 | 1100 | 0100 | 0100 | 1111 | 0111 |
| 17050 | 0100 | 0000 | 1100 | 0100 | 0100 | 1111 | 1111 |
| 17054 | 1000 | 0000 | 1001 | 1000 | 1010 | 0000 | 1011 |
| 17055 | 0001 | 0000 | 1001 | 0001 | 0011 | 0000 | 1111 |
| 17058 | 0001 | 0000 | 1001 | 0001 | 0011 | 0001 | 0011 |
| 17059 | 0001 | 0000 | 1001 | 0001 | 0011 | 0001 | 0111 |
| 17060 | 0100 | 0000 | 1100 | 0100 | 0110 | 0100 | 1111 |
| 17063 | 0001 | 0000 | 1001 | 0001 | 0011 | 0011 | 0011 |
| 17064 | 0001 | 0000 | 0011 | 0001 | 0101 | 0101 | 1101 |
| 17065 | 0100 | 0000 | 1100 | 0100 | 0110 | 0110 | 1111 |
| 17068 | 0100 | 0000 | 1100 | 0100 | 1100 | 1101 | 1100 |
| 17069 | 0001 | 0000 | 0011 | 0001 | 0011 | 1011 | 1011 |
| 17070 | 0010 | 0000 | 0011 | 0010 | 0110 | 1110 | 1111 |
| 17073 | 0100 | 0000 | 1100 | 0100 | 0110 | 1111 | 0101 |
| 17074 | 0100 | 0000 | 1100 | 0100 | 0110 | 1111 | 0111 |
| 17075 | 0100 | 0000 | 1100 | 0100 | 0110 | 1111 | 1111 |
| 17079 | 0100 | 0000 | 1100 | 0100 | 0111 | 0000 | 0111 |
| 17080 | 1000 | 0000 | 1001 | 1000 | 1110 | 0000 | 1111 |
| 17083 | 0001 | 0000 | 1001 | 0001 | 0111 | 0001 | 0011 |
| 17084 | 0001 | 0000 | 1001 | 0001 | 0111 | 0001 | 0111 |
| 17085 | 0100 | 0000 | 1100 | 0100 | 1110 | 0100 | 1111 |
| 17088 | 0100 | 0000 | 1100 | 0100 | 1101 | 1100 | 1100 |
| 17089 | 0100 | 0000 | 1100 | 0100 | 1110 | 1100 | 1101 |
| 17090 | 0010 | 0000 | 1010 | 0010 | 1110 | 0110 | 1111 |
| 17093 | 0100 | 0000 | 1100 | 0100 | 1101 | 1101 | 1100 |
| 17094 | 0001 | 0000 | 1001 | 0001 | 0111 | 0111 | 0111 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 17095 | 0100 | 0000 | 1100 | 0100 | 0111 | 0111 | 1111 |
| 17098 | 0100 | 0000 | 1100 | 0100 | 1110 | 1111 | 0101 |
| 17099 | 0100 | 0000 | 1100 | 0100 | 1110 | 1111 | 0111 |
| 17100 | 0100 | 0000 | 1100 | 0100 | 1110 | 1111 | 1111 |
| 17104 | 0001 | 0000 | 1001 | 0001 | 1111 | 0000 | 0111 |
| 17105 | 0010 | 0000 | 1010 | 0010 | 1111 | 0000 | 1111 |
| 17108 | 0100 | 0000 | 1100 | 0100 | 1111 | 0100 | 0101 |
| 17109 | 0100 | 0000 | 1100 | 0100 | 1111 | 0100 | 0111 |
| 17110 | 0010 | 0000 | 1010 | 0010 | 1111 | 0010 | 1111 |
| 17113 | 0100 | 0000 | 1100 | 0100 | 1111 | 0110 | 0110 |
| 17114 | 0100 | 0000 | 1100 | 0100 | 1111 | 1100 | 1101 |
| 17115 | 0001 | 0000 | 1001 | 0001 | 1111 | 0011 | 1111 |
| 17118 | 0100 | 0000 | 1100 | 0100 | 1111 | 1101 | 1100 |
| 17119 | 0100 | 0000 | 1100 | 0100 | 1111 | 0111 | 0111 |
| 17120 | 0001 | 0000 | 1001 | 0001 | 1111 | 0111 | 1111 |
| 17123 | 0001 | 0000 | 1001 | 0001 | 1111 | 1111 | 0011 |
| 17124 | 0001 | 0000 | 1001 | 0001 | 1111 | 1111 | 0111 |
| 17125 | 0010 | 0000 | 1010 | 0010 | 1111 | 1111 | 1111 |
| 17138 | 0100 | 0000 | 1100 | 1100 | 0000 | 0110 | 0110 |
| 17139 | 0010 | 0000 | 0011 | 0011 | 0000 | 1010 | 1111 |
| 17140 | 1000 | 0000 | 1001 | 1001 | 0000 | 1010 | 1111 |
| 17144 | 0100 | 0000 | 1100 | 1100 | 0000 | 0111 | 0111 |
| 17145 | 1000 | 0000 | 1001 | 1001 | 0000 | 1110 | 1111 |
| 17150 | 1000 | 0000 | 1001 | 1001 | 0000 | 1111 | 1111 |
| 17159 | 0001 | 0000 | 1001 | 1001 | 0001 | 0001 | 0111 |
| 17160 | 0100 | 0000 | 0101 | 0101 | 0100 | 0100 | 1111 |
| 17163 | 0001 | 0000 | 1001 | 1001 | 0001 | 0011 | 0011 |
| 17164 | 0001 | 0000 | 0011 | 0011 | 0001 | 0011 | 1011 |
| 17165 | 0100 | 0000 | 0101 | 0101 | 0100 | 0101 | 1111 |
| 17168 | 0010 | 0000 | 0011 | 0011 | 0010 | 1011 | 1010 |
| 17169 | 0001 | 0000 | 1001 | 1001 | 0001 | 0111 | 0111 |
| 17170 | 0100 | 0000 | 0101 | 0101 | 0100 | 1101 | 1111 |
| 17173 | 0100 | 0000 | 1100 | 1100 | 0100 | 1111 | 0101 |
| 17174 | 0100 | 0000 | 1100 | 1100 | 0100 | 1111 | 0111 |
| 17175 | 0010 | 0000 | 1010 | 1010 | 0010 | 1111 | 1111 |
| 17179 | 0100 | 0000 | 1100 | 1100 | 1100 | 0000 | 0111 |
| 17180 | 1000 | 0000 | 1010 | 1010 | 1010 | 0000 | 1111 |
| 17184 | 0001 | 0000 | 0011 | 0011 | 0011 | 0001 | 0111 |
| 17185 | 0100 | 0000 | 1100 | 1100 | 1100 | 0100 | 1111 |
| 17188 | 0001 | 0000 | 0011 | 0011 | 0011 | 0011 | 0011 |
| 17189 | 0010 | 0000 | 1010 | 1010 | 1010 | 1010 | 1011 |
| 17190 | 0100 | 0000 | 0101 | 0101 | 0101 | 0101 | 1111 |
| 17193 | 0100 | 0000 | 0101 | 0101 | 0101 | 1101 | 1100 |
| 17194 | 0010 | 0000 | 0110 | 0110 | 0110 | 0111 | 0111 |
| 17195 | 0001 | 0000 | 1001 | 1001 | 1001 | 1101 | 1111 |
| 17198 | 0100 | 0000 | 1100 | 1100 | 1100 | 1111 | 0101 |
| 17199 | 0100 | 0000 | 1100 | 1100 | 1100 | 1111 | 0111 |
| 17200 | 1000 | 0000 | 1010 | 1010 | 1010 | 1111 | 1111 |
| 17204 | 1000 | 0000 | 1100 | 1100 | 1101 | 0000 | 1011 |
| 17205 | 0010 | 0000 | 1010 | 1010 | 1110 | 0000 | 1111 |
| 17209 | 1000 | 0000 | 1010 | 1010 | 1011 | 1000 | 1110 |
| 17210 | 0100 | 0000 | 0110 | 0110 | 1110 | 0100 | 1111 |
| 17213 | 1000 | 0000 | 1100 | 1100 | 1101 | 1100 | 1100 |
| 17214 | 1000 | 0000 | 1010 | 1010 | 1011 | 1001 | 1101 |
| 17215 | 0100 | 0000 | 1100 | 1100 | 1101 | 1100 | 1111 |
| 17218 | 0001 | 0000 | 1001 | 1001 | 1011 | 1011 | 0011 |
| 17219 | 1000 | 0000 | 1010 | 1010 | 1110 | 1110 | 1110 |
| 17220 | 0010 | 0000 | 0110 | 0110 | 1110 | 1110 | 1111 |
| 17223 | 1000 | 0000 | 1100 | 1100 | 1101 | 1111 | 1001 |
| 17224 | 1000 | 0000 | 1100 | 1100 | 1101 | 1111 | 1011 |
| 17225 | 1000 | 0000 | 1010 | 1010 | 1110 | 1111 | 1111 |
| 17229 | 1000 | 0000 | 1001 | 1001 | 1111 | 0000 | 1110 |
| 17230 | 1000 | 0000 | 1001 | 1001 | 1111 | 0000 | 1111 |
| 17234 | 0100 | 0000 | 0101 | 0101 | 1111 | 0100 | 0111 |
| 17235 | 0010 | 0000 | 0011 | 0011 | 1111 | 0010 | 1111 |
| 17238 | 0100 | 0000 | 0101 | 0101 | 1111 | 0110 | 0110 |
| 17239 | 0010 | 0000 | 0011 | 0011 | 1111 | 1010 | 1110 |
| 17240 | 1000 | 0000 | 1001 | 1001 | 1111 | 1010 | 1111 |
| 17243 | 0010 | 0000 | 0011 | 0011 | 1111 | 1110 | 0110 |
| 17244 | 0100 | 0000 | 0101 | 0101 | 1111 | 0111 | 0111 |
| 17245 | 1000 | 0000 | 1001 | 1001 | 1111 | 1110 | 1111 |
| 17248 | 1000 | 0000 | 1001 | 1001 | 1111 | 1111 | 1010 |
| 17249 | 1000 | 0000 | 1001 | 1001 | 1111 | 1111 | 1110 |
| 17250 | 1000 | 0000 | 1001 | 1001 | 1111 | 1111 | 1111 |
| 17264 | 0001 | 0000 | 0011 | 0111 | 0000 | 1001 | 1101 |
| 17265 | 1000 | 0000 | 1001 | 1011 | 0000 | 1010 | 1111 |
| 17268 | 0001 | 0000 | 0011 | 0111 | 0000 | 1101 | 1001 |
| 17269 | 1000 | 0000 | 1100 | 1110 | 0000 | 1110 | 1110 |
| 17270 | 0001 | 0000 | 0101 | 1101 | 0000 | 0111 | 1111 |
| 17273 | 1000 | 0000 | 1001 | 1011 | 0000 | 1111 | 1010 |
| 17274 | 0001 | 0000 | 0101 | 1101 | 0000 | 1111 | 0111 |
| 17275 | 0100 | 0000 | 1100 | 1101 | 0000 | 1111 | 1111 |
| 17284 | 1000 | 0000 | 1100 | 1101 | 1000 | 1000 | 1110 |
| 17285 | 0010 | 0000 | 0110 | 1110 | 0010 | 0010 | 1111 |
| 17289 | 1000 | 0000 | 1100 | 1101 | 1000 | 1010 | 1011 |
| 17290 | 0010 | 0000 | 1010 | 1110 | 0010 | 0011 | 1111 |
| 17293 | 0010 | 0000 | 0110 | 0111 | 0010 | 1011 | 1010 |
| 17294 | 1000 | 0000 | 1100 | 1101 | 1000 | 1110 | 1110 |
| 17295 | 0100 | 0000 | 1100 | 1110 | 0100 | 0111 | 1111 |
| 17298 | 1000 | 0000 | 1100 | 1110 | 1000 | 1111 | 1001 |
| 17299 | 1000 | 0000 | 1100 | 1110 | 1000 | 1111 | 1011 |
| 17300 | 0100 | 0000 | 1100 | 1110 | 0100 | 1111 | 1111 |
| 17304 | 1000 | 0000 | 1100 | 1110 | 1100 | 0000 | 1011 |
| 17305 | 1000 | 0000 | 1001 | 1011 | 1010 | 0000 | 1111 |
| 17309 | 1000 | 0000 | 1100 | 1101 | 1100 | 1000 | 1110 |
| 17310 | 0100 | 0000 | 1100 | 1110 | 1100 | 0100 | 1111 |
| 17314 | 0001 | 0000 | 1001 | 1011 | 0011 | 0011 | 0111 |
| 17315 | 0010 | 0000 | 1010 | 1110 | 0110 | 0110 | 1111 |
| 17318 | 0001 | 0000 | 0011 | 0111 | 0011 | 1011 | 0011 |
| 17319 | 0001 | 0000 | 1001 | 1101 | 0101 | 0111 | 0111 |
| 17320 | 0100 | 0000 | 1100 | 1110 | 1100 | 1110 | 1111 |
| 17323 | 1000 | 0000 | 1100 | 1110 | 1100 | 1111 | 1001 |
| 17324 | 1000 | 0000 | 1100 | 1110 | 1100 | 1111 | 1011 |
| 17325 | 1000 | 0000 | 1001 | 1011 | 1010 | 1111 | 1111 |
| 17329 | 1000 | 0000 | 1100 | 1101 | 1101 | 0000 | 1011 |
| 17330 | 0010 | 0000 | 1010 | 1110 | 1110 | 0000 | 1111 |
| 17334 | 1000 | 0000 | 1100 | 1101 | 1101 | 1000 | 1110 |
| 17335 | 0001 | 0000 | 0101 | 0111 | 0111 | 0001 | 1111 |
| 17339 | 1000 | 0000 | 1001 | 1011 | 1011 | 1001 | 1011 |
| 17340 | 0010 | 0000 | 1010 | 1110 | 1110 | 1010 | 1111 |
| 17343 | 0001 | 0000 | 1001 | 1011 | 1011 | 1011 | 0011 |
| 17344 | 0010 | 0000 | 0110 | 0111 | 0111 | 0111 | 0111 |
| 17345 | 0010 | 0000 | 1010 | 1110 | 1110 | 1110 | 1111 |
| 17348 | 1000 | 0000 | 1010 | 1110 | 1110 | 1111 | 1001 |
| 17349 | 1000 | 0000 | 1010 | 1110 | 1110 | 1111 | 1011 |
| 17350 | 1000 | 0000 | 1001 | 1011 | 1011 | 1111 | 1111 |
| 17354 | 1000 | 0000 | 1001 | 1011 | 1111 | 0000 | 1110 |
| 17355 | 1000 | 0000 | 1001 | 1011 | 1111 | 0000 | 1111 |
| 17359 | 0100 | 0000 | 1100 | 1110 | 1111 | 0100 | 0111 |
| 17360 | 1000 | 0000 | 1010 | 1110 | 1111 | 1000 | 1111 |
| 17364 | 0010 | 0000 | 1010 | 1110 | 1111 | 0110 | 1110 |
| 17365 | 0001 | 0000 | 0101 | 1101 | 1111 | 0011 | 1111 |
| 17368 | 0010 | 0000 | 1010 | 1110 | 1111 | 1110 | 0110 |
| 17369 | 0100 | 0000 | 1100 | 1101 | 1111 | 0111 | 0111 |
| 17370 | 1000 | 0000 | 1001 | 1011 | 1111 | 1110 | 1111 |
| 17373 | 1000 | 0000 | 1001 | 1011 | 1111 | 1111 | 1010 |
| 17374 | 1000 | 0000 | 1001 | 1011 | 1111 | 1111 | 1110 |
| 17375 | 0100 | 0000 | 1100 | 1101 | 1111 | 1111 | 1111 |
| 17390 | 0100 | 0000 | 1100 | 1111 | 0000 | 0101 | 1111 |
| 17394 | 1000 | 0000 | 1001 | 1111 | 0000 | 1011 | 1011 |
| 17395 | 0100 | 0000 | 1100 | 1111 | 0000 | 0111 | 1111 |
| 17398 | 0100 | 0000 | 1100 | 1111 | 0000 | 1111 | 0101 |
| 17399 | 0100 | 0000 | 1100 | 1111 | 0000 | 1111 | 0111 |
| 17400 | 0100 | 0000 | 1100 | 1111 | 0000 | 1111 | 1111 |
| 17409 | 0001 | 0000 | 1001 | 1111 | 0001 | 0001 | 0111 |
| 17410 | 0010 | 0000 | 1010 | 1111 | 0010 | 0010 | 1111 |
| 17414 | 0100 | 0000 | 1100 | 1111 | 0100 | 0101 | 1101 |
| 17415 | 0001 | 0000 | 1001 | 1111 | 0001 | 0011 | 1111 |
| 17419 | 0001 | 0000 | 1001 | 1111 | 0001 | 1101 | 1101 |
| 17420 | 0001 | 0000 | 1001 | 1111 | 0001 | 0111 | 1111 |
| 17423 | 0001 | 0000 | 1001 | 1111 | 0001 | 1111 | 0011 |
| 17424 | 0001 | 0000 | 1001 | 1111 | 0001 | 1111 | 0111 |
| 17425 | 0001 | 0000 | 1001 | 1111 | 0001 | 1111 | 1111 |
| 17429 | 1000 | 0000 | 1001 | 1111 | 1001 | 0000 | 1110 |
| 17430 | 0100 | 0000 | 1100 | 1111 | 0101 | 0000 | 1111 |
| 17434 | 0001 | 0000 | 1001 | 1111 | 0011 | 0001 | 0111 |
| 17435 | 0010 | 0000 | 1010 | 1111 | 0011 | 0010 | 1111 |
| 17439 | 0001 | 0000 | 1001 | 1111 | 1001 | 1001 | 1011 |
| 17440 | 0001 | 0000 | 1001 | 1111 | 0011 | 0011 | 1111 |
| 17444 | 1000 | 0000 | 1001 | 1111 | 1001 | 1101 | 1101 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 17445 | 0010 | 0000 | 1010 | 1111 | 0110 | 0111 | 1111 |
| 17448 | 1000 | 0000 | 1001 | 1111 | 1001 | 1111 | 1010 |
| 17449 | 1000 | 0000 | 1001 | 1111 | 1001 | 1111 | 1110 |
| 17450 | 0001 | 0000 | 1001 | 1111 | 0011 | 1111 | 1111 |
| 17454 | 1000 | 0000 | 1001 | 1111 | 1011 | 0000 | 1110 |
| 17455 | 0100 | 0000 | 1100 | 1111 | 0111 | 0000 | 1111 |
| 17459 | 1000 | 0000 | 1001 | 1111 | 1011 | 1000 | 1011 |
| 17460 | 0010 | 0000 | 1010 | 1111 | 1011 | 0010 | 1111 |
| 17464 | 0001 | 0000 | 1001 | 1111 | 1011 | 1001 | 1011 |
| 17465 | 0001 | 0000 | 1001 | 1111 | 0111 | 0011 | 1111 |
| 17469 | 0100 | 0000 | 1100 | 1111 | 1101 | 1101 | 1101 |
| 17470 | 0001 | 0000 | 1001 | 1111 | 1011 | 1011 | 1111 |
| 17473 | 1000 | 0000 | 1001 | 1111 | 1011 | 1111 | 1010 |
| 17474 | 1000 | 0000 | 1001 | 1111 | 1011 | 1111 | 1110 |
| 17475 | 1000 | 0000 | 1001 | 1111 | 1011 | 1111 | 1111 |
| 17479 | 0100 | 0000 | 1100 | 1111 | 1111 | 0000 | 0111 |
| 17480 | 0100 | 0000 | 1100 | 1111 | 1111 | 0000 | 1111 |
| 17484 | 0001 | 0000 | 1001 | 1111 | 1111 | 0001 | 0111 |
| 17485 | 0001 | 0000 | 1001 | 1111 | 1111 | 0001 | 1111 |
| 17489 | 0010 | 0000 | 1010 | 1111 | 1111 | 0110 | 0111 |
| 17490 | 0001 | 0000 | 1001 | 1111 | 1111 | 0011 | 1111 |
| 17494 | 1000 | 0000 | 1001 | 1111 | 1111 | 1011 | 1011 |
| 17495 | 1000 | 0000 | 1001 | 1111 | 1111 | 1011 | 1111 |
| 17498 | 1000 | 0000 | 1001 | 1111 | 1111 | 1111 | 1001 |
| 17499 | 1000 | 0000 | 1001 | 1111 | 1111 | 1111 | 1011 |
| 17500 | 1000 | 0000 | 1001 | 1111 | 1111 | 1111 | 1111 |
| 17579 | 0100 | 0000 | 1101 | 0000 | 0111 | 0000 | 1110 |
| 17580 | 0100 | 0000 | 1101 | 0000 | 0111 | 0000 | 1111 |
| 17584 | 0100 | 0000 | 1101 | 0000 | 0111 | 0100 | 0111 |
| 17585 | 0010 | 0000 | 1011 | 0000 | 1011 | 0010 | 1111 |
| 17589 | 0001 | 0000 | 1011 | 0000 | 0111 | 0101 | 0111 |
| 17590 | 1000 | 0000 | 1011 | 0000 | 1011 | 1010 | 1111 |
| 17594 | 0100 | 0000 | 1101 | 0000 | 1101 | 1101 | 1101 |
| 17595 | 1000 | 0000 | 1011 | 0000 | 1011 | 1011 | 1111 |
| 17599 | 1000 | 0000 | 1011 | 0000 | 1011 | 1111 | 1110 |
| 17600 | 0100 | 0000 | 1101 | 0000 | 0111 | 1111 | 1111 |
| 17605 | 0100 | 0000 | 1101 | 0000 | 1111 | 0000 | 1111 |
| 17610 | 0001 | 0000 | 1011 | 0000 | 1111 | 0001 | 1111 |
| 17615 | 0001 | 0000 | 1011 | 0000 | 1111 | 0011 | 1111 |
| 17620 | 0001 | 0000 | 1011 | 0000 | 1111 | 1011 | 1111 |
| 17625 | 0100 | 0000 | 1101 | 0000 | 1111 | 1111 | 1111 |
| 17659 | 0001 | 0000 | 1011 | 0001 | 0001 | 0001 | 0111 |
| 17660 | 0100 | 0000 | 1101 | 0100 | 0100 | 0100 | 1111 |
| 17664 | 0100 | 0000 | 1110 | 0100 | 0100 | 1100 | 1110 |
| 17665 | 0100 | 0000 | 1101 | 0100 | 0100 | 0101 | 1111 |
| 17669 | 0001 | 0000 | 1011 | 0001 | 0001 | 0111 | 0111 |
| 17670 | 0100 | 0000 | 1101 | 0100 | 0100 | 0111 | 1111 |
| 17674 | 0100 | 0000 | 1101 | 0100 | 0100 | 1111 | 0111 |
| 17675 | 0010 | 0000 | 1011 | 0010 | 0010 | 1111 | 1111 |
| 17684 | 0001 | 0000 | 1011 | 0001 | 0011 | 0001 | 0111 |
| 17685 | 1000 | 0000 | 1011 | 1000 | 1010 | 1000 | 1111 |
| 17689 | 0001 | 0000 | 1011 | 0001 | 0101 | 0101 | 1101 |
| 17690 | 0100 | 0000 | 1101 | 0100 | 0110 | 0110 | 1111 |
| 17694 | 0010 | 0000 | 1011 | 0010 | 1010 | 1011 | 1011 |
| 17695 | 0100 | 0000 | 1110 | 0100 | 1100 | 1110 | 1111 |
| 17699 | 0100 | 0000 | 1101 | 0100 | 0110 | 1111 | 0111 |
| 17700 | 0100 | 0000 | 1101 | 0100 | 0110 | 1111 | 1111 |
| 17705 | 1000 | 0000 | 1011 | 1000 | 1110 | 0000 | 1111 |
| 17709 | 0001 | 0000 | 1011 | 0001 | 0111 | 0001 | 0111 |
| 17710 | 0100 | 0000 | 0111 | 0100 | 0111 | 0100 | 1111 |
| 17714 | 0001 | 0000 | 1101 | 0001 | 1011 | 1001 | 1101 |
| 17715 | 0100 | 0000 | 1101 | 0100 | 1101 | 0101 | 1111 |
| 17719 | 0001 | 0000 | 1011 | 0001 | 0111 | 0111 | 0111 |
| 17720 | 0100 | 0000 | 1101 | 0100 | 0111 | 0111 | 1111 |
| 17724 | 0100 | 0000 | 1101 | 0100 | 1110 | 1111 | 0111 |
| 17725 | 0100 | 0000 | 1101 | 0100 | 1110 | 1111 | 1111 |
| 17730 | 0001 | 0000 | 1011 | 0001 | 1111 | 0000 | 1111 |
| 17734 | 0100 | 0000 | 1101 | 0100 | 1111 | 0100 | 0111 |
| 17735 | 0010 | 0000 | 1011 | 0010 | 1111 | 0010 | 1111 |
| 17739 | 0100 | 0000 | 1101 | 0100 | 1111 | 1100 | 1110 |
| 17740 | 0001 | 0000 | 1011 | 0001 | 1111 | 0011 | 1111 |
| 17744 | 0100 | 0000 | 1101 | 0100 | 1111 | 0111 | 0111 |
| 17745 | 0001 | 0000 | 1011 | 0001 | 1111 | 1011 | 1111 |
| 17749 | 0001 | 0000 | 1011 | 0001 | 1111 | 1111 | 1011 |
| 17750 | 0100 | 0000 | 1101 | 0100 | 1111 | 1111 | 1111 |
| 17785 | 0001 | 0000 | 0111 | 0101 | 0001 | 0001 | 1111 |
| 17789 | 0100 | 0000 | 0111 | 0110 | 0100 | 1100 | 1110 |
| 17790 | 1000 | 0000 | 1110 | 1100 | 1000 | 1001 | 1111 |
| 17794 | 1000 | 0000 | 1110 | 1100 | 1000 | 1110 | 1110 |
| 17795 | 0001 | 0000 | 1101 | 0101 | 0001 | 1011 | 1111 |
| 17799 | 1000 | 0000 | 1110 | 1100 | 1000 | 1111 | 1101 |
| 17800 | 1000 | 0000 | 1101 | 1001 | 1000 | 1111 | 1111 |
| 17810 | 0001 | 0000 | 1101 | 0101 | 0101 | 0001 | 1111 |
| 17814 | 0010 | 0000 | 1110 | 1010 | 1010 | 1010 | 1011 |
| 17815 | 1000 | 0000 | 1011 | 1010 | 1010 | 1010 | 1111 |
| 17819 | 0010 | 0000 | 0111 | 0011 | 0011 | 1011 | 1011 |
| 17820 | 0001 | 0000 | 0111 | 0101 | 0101 | 1101 | 1111 |
| 17824 | 1000 | 0000 | 1110 | 1100 | 1100 | 1111 | 1011 |
| 17825 | 0100 | 0000 | 1110 | 0110 | 0110 | 1111 | 1111 |
| 17830 | 0100 | 0000 | 1110 | 1100 | 1110 | 0000 | 1111 |
| 17835 | 0100 | 0000 | 1110 | 1100 | 1110 | 0100 | 1111 |
| 17839 | 0100 | 0000 | 1110 | 1100 | 1110 | 1100 | 1110 |
| 17840 | 0100 | 0000 | 1110 | 1100 | 1110 | 1100 | 1111 |
| 17844 | 0001 | 0000 | 0111 | 0011 | 0111 | 0111 | 0111 |
| 17845 | 0100 | 0000 | 1110 | 1100 | 1110 | 1110 | 1111 |
| 17849 | 1000 | 0000 | 1110 | 1100 | 1110 | 1111 | 1011 |
| 17850 | 0100 | 0000 | 1110 | 0110 | 1110 | 1111 | 1111 |
| 17855 | 0100 | 0000 | 1101 | 0101 | 1111 | 0000 | 1111 |
| 17860 | 1000 | 0000 | 1110 | 1100 | 1111 | 1000 | 1111 |
| 17864 | 0100 | 0000 | 1101 | 0101 | 1111 | 0110 | 0111 |
| 17865 | 1000 | 0000 | 1101 | 1100 | 1111 | 1010 | 1111 |
| 17869 | 1000 | 0000 | 1110 | 1100 | 1111 | 1110 | 1110 |
| 17870 | 1000 | 0000 | 1101 | 1100 | 1111 | 1111 | 1111 |
| 17874 | 1000 | 0000 | 1101 | 1100 | 1111 | 1111 | 1110 |
| 17875 | 1000 | 0000 | 1110 | 1100 | 1111 | 1111 | 1111 |
| 17894 | 0100 | 0000 | 1101 | 1101 | 0000 | 0111 | 0111 |
| 17895 | 1000 | 0000 | 1011 | 1011 | 0000 | 1110 | 1111 |
| 17900 | 0100 | 0000 | 1101 | 1101 | 0000 | 1111 | 1111 |
| 17910 | 0100 | 0000 | 0111 | 0111 | 0100 | 0100 | 1111 |
| 17915 | 0100 | 0000 | 0111 | 0111 | 0100 | 0101 | 1111 |
| 17919 | 0001 | 0000 | 1011 | 1011 | 0001 | 0111 | 0111 |
| 17920 | 0100 | 0000 | 1110 | 1110 | 0100 | 0111 | 1111 |
| 17924 | 0100 | 0000 | 1101 | 1101 | 0100 | 1111 | 0111 |
| 17925 | 0100 | 0000 | 1110 | 1110 | 0100 | 1111 | 1111 |
| 17935 | 0010 | 0000 | 0111 | 0111 | 0011 | 0010 | 1111 |
| 17940 | 0001 | 0000 | 1011 | 1011 | 0011 | 1011 | 1111 |
| 17944 | 0001 | 0000 | 1101 | 1101 | 1001 | 1101 | 1101 |
| 17945 | 0010 | 0000 | 1110 | 1110 | 0110 | 0111 | 1111 |
| 17949 | 1000 | 0000 | 1110 | 1110 | 1100 | 1111 | 1011 |
| 17950 | 0010 | 0000 | 1110 | 1110 | 0110 | 1111 | 1111 |
| 17955 | 1000 | 0000 | 1011 | 1011 | 1011 | 0000 | 1111 |
| 17960 | 0001 | 0000 | 0111 | 0111 | 0111 | 0001 | 1111 |
| 17965 | 0010 | 0000 | 1110 | 1110 | 1110 | 1010 | 1111 |
| 17969 | 0001 | 0000 | 0111 | 0111 | 0111 | 0111 | 0111 |
| 17970 | 0010 | 0000 | 1011 | 1011 | 1011 | 1011 | 1111 |
| 17974 | 0100 | 0000 | 1110 | 1110 | 1110 | 1111 | 0111 |
| 17975 | 0100 | 0000 | 0111 | 0111 | 0111 | 1111 | 1111 |
| 17980 | 1000 | 0000 | 1011 | 1011 | 1111 | 0000 | 1111 |
| 17985 | 0010 | 0000 | 1011 | 1011 | 1111 | 0010 | 1111 |
| 17990 | 1000 | 0000 | 1011 | 1011 | 1111 | 1010 | 1111 |
| 17994 | 0100 | 0000 | 1101 | 1101 | 1111 | 0111 | 0111 |
| 17995 | 1000 | 0000 | 1011 | 1011 | 1111 | 1110 | 1111 |
| 17999 | 1000 | 0000 | 1011 | 1011 | 1111 | 1111 | 1110 |
| 18000 | 0100 | 0000 | 1101 | 1101 | 1111 | 1111 | 1111 |
| 18020 | 0100 | 0000 | 1101 | 1111 | 0000 | 0111 | 1111 |
| 18024 | 0100 | 0000 | 1101 | 1111 | 0000 | 1111 | 0111 |
| 18025 | 0100 | 0000 | 1101 | 1111 | 0000 | 1111 | 1111 |
| 18035 | 0010 | 0000 | 1011 | 1111 | 0010 | 0010 | 1111 |
| 18040 | 0001 | 0000 | 1011 | 1111 | 0001 | 0011 | 1111 |
| 18045 | 0001 | 0000 | 1011 | 1111 | 0001 | 0111 | 1111 |
| 18049 | 0001 | 0000 | 1011 | 1111 | 0001 | 1111 | 0111 |
| 18050 | 0001 | 0000 | 1011 | 1111 | 0001 | 1111 | 1111 |
| 18060 | 0010 | 0000 | 1011 | 1111 | 0011 | 0010 | 1111 |
| 18065 | 0010 | 0000 | 1011 | 1111 | 0011 | 0011 | 1111 |
| 18070 | 0010 | 0000 | 1011 | 1111 | 0110 | 0111 | 1111 |
| 18074 | 1000 | 0000 | 1011 | 1111 | 1001 | 1111 | 1110 |
| 18075 | 0010 | 0000 | 1011 | 1111 | 0011 | 1111 | 1111 |
| 18080 | 0100 | 0000 | 1101 | 1111 | 0111 | 0000 | 1111 |
| 18085 | 0010 | 0000 | 1011 | 1111 | 1011 | 0010 | 1111 |
| 18090 | 1000 | 0000 | 1011 | 1111 | 1011 | 1010 | 1111 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 18095 | 1000 | 0000 | 1011 | 1111 | 1011 | 1011 | 1111 |
| 18099 | 1000 | 0000 | 1011 | 1111 | 1011 | 1111 | 1110 |
| 18100 | 1000 | 0000 | 1011 | 1111 | 1011 | 1111 | 1111 |
| 18105 | 0100 | 0000 | 1101 | 1111 | 1111 | 0000 | 1111 |
| 18110 | 0001 | 0000 | 1011 | 1111 | 1111 | 0001 | 1111 |
| 18115 | 0010 | 0000 | 1011 | 1111 | 1111 | 0011 | 1111 |
| 18120 | 1000 | 0000 | 1011 | 1111 | 1111 | 1011 | 1111 |
| 18124 | 1000 | 0000 | 1011 | 1111 | 1111 | 1111 | 1011 |
| 18125 | 1000 | 0000 | 1011 | 1111 | 1111 | 1111 | 1111 |
| 18230 | 0001 | 0000 | 1111 | 0000 | 1111 | 0000 | 1111 |
| 18235 | 1000 | 0000 | 1111 | 0000 | 1111 | 1000 | 1111 |
| 18240 | 1000 | 0000 | 1111 | 0000 | 1111 | 1100 | 1111 |
| 18245 | 0100 | 0000 | 1111 | 0000 | 1111 | 1101 | 1111 |
| 18250 | 0001 | 0000 | 1111 | 0000 | 1111 | 1111 | 1111 |
| 18285 | 1000 | 0000 | 1111 | 1000 | 1000 | 1000 | 1111 |
| 18290 | 1000 | 0000 | 1111 | 1000 | 1000 | 1010 | 1111 |
| 18295 | 1000 | 0000 | 1111 | 1000 | 1000 | 1110 | 1111 |
| 18300 | 1000 | 0000 | 1111 | 1000 | 1000 | 1111 | 1111 |
| 18310 | 1000 | 0000 | 1111 | 1000 | 1001 | 1000 | 1111 |
| 18315 | 1000 | 0000 | 1111 | 1000 | 1010 | 1010 | 1111 |
| 18320 | 0100 | 0000 | 1111 | 0100 | 0101 | 0111 | 1111 |
| 18325 | 1000 | 0000 | 1111 | 1000 | 1001 | 1111 | 1111 |
| 18335 | 1000 | 0000 | 1111 | 1000 | 1011 | 1000 | 1111 |
| 18340 | 1000 | 0000 | 1111 | 1000 | 1011 | 1010 | 1111 |
| 18345 | 1000 | 0000 | 1111 | 1000 | 1011 | 1011 | 1111 |
| 18350 | 1000 | 0000 | 1111 | 1000 | 1011 | 1111 | 1111 |
| 18360 | 1000 | 0000 | 1111 | 1000 | 1111 | 1000 | 1111 |
| 18365 | 1000 | 0000 | 1111 | 1000 | 1111 | 1001 | 1111 |
| 18370 | 1000 | 0000 | 1111 | 1000 | 1111 | 1011 | 1111 |
| 18375 | 1000 | 0000 | 1111 | 1000 | 1111 | 1111 | 1111 |
| 18415 | 1000 | 0000 | 1111 | 1001 | 1000 | 1010 | 1111 |
| 18420 | 1000 | 0000 | 1111 | 1001 | 1000 | 1110 | 1111 |
| 18425 | 1000 | 0000 | 1111 | 1001 | 1000 | 1111 | 1111 |
| 18440 | 1000 | 0000 | 1111 | 1010 | 1010 | 1010 | 1111 |
| 18445 | 0010 | 0000 | 1111 | 1010 | 1010 | 1110 | 1111 |
| 18450 | 1000 | 0000 | 1111 | 1001 | 1001 | 1111 | 1111 |
| 18465 | 1000 | 0000 | 1111 | 1001 | 1011 | 1010 | 1111 |
| 18470 | 0010 | 0000 | 1111 | 1010 | 1110 | 1110 | 1111 |
| 18475 | 1000 | 0000 | 1111 | 1001 | 1011 | 1111 | 1111 |
| 18490 | 0001 | 0000 | 1111 | 1001 | 1111 | 0011 | 1111 |
| 18495 | 1000 | 0000 | 1111 | 1001 | 1111 | 1011 | 1111 |
| 18500 | 1000 | 0000 | 1111 | 1001 | 1111 | 1111 | 1111 |
| 18545 | 1000 | 0000 | 1111 | 1011 | 1000 | 1110 | 1111 |
| 18550 | 0100 | 0000 | 1111 | 1101 | 0100 | 1111 | 1111 |
| 18570 | 1000 | 0000 | 1111 | 1110 | 0110 | 1110 | 1111 |
| 18575 | 0100 | 0000 | 1111 | 1101 | 0101 | 1111 | 1111 |
| 18595 | 1000 | 0000 | 1111 | 1011 | 1011 | 1011 | 1111 |
| 18600 | 1000 | 0000 | 1111 | 1011 | 1011 | 1111 | 1111 |
| 18620 | 1000 | 0000 | 1111 | 1011 | 1111 | 1011 | 1111 |
| 18625 | 1000 | 0000 | 1111 | 1011 | 1111 | 1111 | 1111 |
| 18650 | 0001 | 0000 | 1111 | 1111 | 0000 | 1111 | 1111 |
| 18675 | 1000 | 0000 | 1111 | 1111 | 1000 | 1111 | 1111 |
| 18700 | 1000 | 0000 | 1111 | 1111 | 1001 | 1111 | 1111 |
| 18725 | 1000 | 0000 | 1111 | 1111 | 1011 | 1111 | 1111 |
| 18750 | 0001 | 0000 | 1111 | 1111 | 1111 | 1111 | 1111 |
| 19532 | 0100 | 0100 | 0100 | 0100 | 0100 | 0100 | 0100 |
| 19533 | 0100 | 0100 | 0100 | 0100 | 0100 | 0100 | 0110 |
| 19534 | 0100 | 0100 | 0100 | 0100 | 0100 | 0100 | 0111 |
| 19535 | 0010 | 0010 | 0010 | 0010 | 0010 | 0010 | 1111 |
| 19538 | 0100 | 0100 | 0100 | 0100 | 0100 | 0110 | 0110 |
| 19539 | 0100 | 0100 | 0100 | 0100 | 0100 | 0110 | 1110 |
| 19540 | 0010 | 0010 | 0010 | 0010 | 0010 | 0110 | 1111 |
| 19544 | 0010 | 0010 | 0010 | 0010 | 0010 | 1110 | 1110 |
| 19545 | 0010 | 0010 | 0010 | 0010 | 0010 | 1110 | 1111 |
| 19550 | 0100 | 0100 | 0100 | 0100 | 0100 | 1111 | 1111 |
| 19558 | 0100 | 0100 | 0100 | 0100 | 0101 | 0100 | 0110 |
| 19559 | 0010 | 0010 | 0010 | 0010 | 0011 | 0010 | 0111 |
| 19560 | 0010 | 0010 | 0010 | 0010 | 0011 | 0010 | 1111 |
| 19563 | 0100 | 0100 | 0100 | 0100 | 0110 | 0110 | 0110 |
| 19564 | 0010 | 0010 | 0010 | 0010 | 0011 | 0011 | 0111 |
| 19565 | 0010 | 0010 | 0010 | 0010 | 0110 | 0110 | 1111 |
| 19568 | 0100 | 0100 | 0100 | 0100 | 0101 | 0111 | 0110 |
| 19569 | 1000 | 1000 | 1000 | 1000 | 1100 | 1110 | 1110 |
| 19570 | 1000 | 1000 | 1000 | 1000 | 1100 | 1110 | 1111 |
| 19573 | 0010 | 0010 | 0010 | 0010 | 0011 | 1111 | 1010 |
| 19574 | 0010 | 0010 | 0010 | 0010 | 0011 | 1111 | 1110 |
| 19575 | 0100 | 0100 | 0100 | 0100 | 0101 | 1111 | 1111 |
| 19584 | 1000 | 1000 | 1000 | 1000 | 1110 | 1000 | 1110 |
| 19585 | 0010 | 0010 | 0010 | 0010 | 0111 | 0010 | 1111 |
| 19589 | 1000 | 1000 | 1000 | 1000 | 1011 | 1010 | 1110 |
| 19590 | 0001 | 0001 | 0001 | 0001 | 1011 | 1001 | 1111 |
| 19594 | 0100 | 0100 | 0100 | 0100 | 0111 | 0111 | 0111 |
| 19595 | 1000 | 1000 | 1000 | 1000 | 1110 | 1110 | 1111 |
| 19599 | 0010 | 0010 | 0010 | 0010 | 0111 | 1111 | 1110 |
| 19600 | 0100 | 0100 | 0100 | 0100 | 0111 | 1111 | 1111 |
| 19610 | 0010 | 0010 | 0010 | 0010 | 1111 | 0010 | 1111 |
| 19615 | 0010 | 0010 | 0010 | 0010 | 1111 | 0011 | 1111 |
| 19620 | 1000 | 1000 | 1000 | 1000 | 1111 | 1011 | 1111 |
| 19625 | 1000 | 1000 | 1000 | 1000 | 1111 | 1111 | 1111 |
| 19658 | 0100 | 0100 | 0100 | 0110 | 0100 | 0100 | 0110 |
| 19659 | 0100 | 0100 | 0100 | 0110 | 0100 | 0100 | 0111 |
| 19660 | 0010 | 0010 | 0010 | 0110 | 0010 | 0010 | 1111 |
| 19663 | 0100 | 0100 | 0100 | 0110 | 0100 | 0110 | 0110 |
| 19664 | 0100 | 0100 | 0100 | 0110 | 0100 | 0110 | 0111 |
| 19665 | 0001 | 0001 | 0001 | 0101 | 0001 | 0101 | 1111 |
| 19668 | 0100 | 0100 | 0100 | 0110 | 0110 | 1110 | 0110 |
| 19669 | 1000 | 1000 | 1000 | 1010 | 1000 | 1110 | 1110 |
| 19670 | 1000 | 1000 | 1000 | 1010 | 1000 | 1110 | 1111 |
| 19673 | 0100 | 0100 | 0100 | 0110 | 0100 | 1111 | 0110 |
| 19674 | 0010 | 0010 | 0010 | 0110 | 0010 | 1111 | 1110 |
| 19675 | 0100 | 0100 | 0100 | 0110 | 0100 | 1111 | 1111 |
| 19684 | 0100 | 0100 | 0100 | 0110 | 0110 | 0100 | 0111 |
| 19685 | 0010 | 0010 | 0010 | 0011 | 0011 | 0010 | 1111 |
| 19688 | 0100 | 0100 | 0100 | 0110 | 0110 | 0110 | 0110 |
| 19689 | 0010 | 0010 | 0010 | 0011 | 0011 | 0011 | 1011 |
| 19690 | 1000 | 1000 | 1000 | 1010 | 1010 | 1010 | 1111 |
| 19693 | 0010 | 0010 | 0010 | 0110 | 0110 | 0111 | 0011 |
| 19694 | 1000 | 1000 | 1000 | 1100 | 1100 | 1110 | 1110 |
| 19695 | 0010 | 0010 | 0010 | 0110 | 0110 | 0111 | 1111 |
| 19698 | 0010 | 0010 | 0010 | 0011 | 0011 | 1111 | 1010 |
| 19699 | 0010 | 0010 | 0010 | 0011 | 0011 | 1111 | 1110 |
| 19700 | 0100 | 0100 | 0100 | 0110 | 0110 | 1111 | 1111 |
| 19709 | 0100 | 0100 | 0100 | 0110 | 0111 | 0100 | 0111 |
| 19710 | 0001 | 0001 | 0001 | 0011 | 1011 | 0001 | 1111 |
| 19714 | 0010 | 0010 | 0010 | 1010 | 1110 | 1010 | 1110 |
| 19715 | 1000 | 1000 | 1000 | 1100 | 1110 | 1010 | 1111 |
| 19718 | 0100 | 0100 | 0100 | 0110 | 0111 | 0111 | 0110 |
| 19719 | 0100 | 0100 | 0100 | 0110 | 0111 | 0111 | 0111 |
| 19720 | 1000 | 1000 | 1000 | 1010 | 1110 | 1110 | 1111 |
| 19723 | 0010 | 0010 | 0010 | 0011 | 1011 | 1111 | 0110 |
| 19724 | 0010 | 0010 | 0010 | 0011 | 0111 | 1111 | 1110 |
| 19725 | 0010 | 0010 | 0010 | 0110 | 1110 | 1111 | 1111 |
| 19734 | 0010 | 0010 | 0010 | 0110 | 1111 | 0010 | 1110 |
| 19735 | 1000 | 1000 | 1000 | 1010 | 1111 | 1000 | 1111 |
| 19739 | 0010 | 0010 | 0010 | 0110 | 1111 | 0011 | 0111 |
| 19740 | 1000 | 1000 | 1000 | 1010 | 1111 | 1001 | 1111 |
| 19744 | 0001 | 0001 | 0001 | 0011 | 1111 | 0111 | 0111 |
| 19745 | 1000 | 1000 | 1000 | 1010 | 1111 | 1011 | 1111 |
| 19748 | 0100 | 0100 | 0100 | 0110 | 1111 | 1111 | 0101 |
| 19749 | 0100 | 0100 | 0100 | 0110 | 1111 | 1111 | 0111 |
| 19750 | 1000 | 1000 | 1000 | 1010 | 1111 | 1111 | 1111 |
| 19784 | 1000 | 1000 | 1000 | 1110 | 1000 | 1000 | 1011 |
| 19785 | 1000 | 1000 | 1000 | 1110 | 1000 | 1000 | 1111 |
| 19789 | 0100 | 0100 | 0100 | 0110 | 0100 | 0110 | 1110 |
| 19790 | 1000 | 1000 | 1000 | 1110 | 1000 | 1010 | 1111 |
| 19794 | 0100 | 0100 | 0100 | 0110 | 0100 | 1110 | 1110 |
| 19795 | 1000 | 1000 | 1000 | 1110 | 1000 | 1110 | 1111 |
| 19799 | 0010 | 0010 | 0010 | 0110 | 0010 | 1111 | 1110 |
| 19800 | 0100 | 0100 | 0100 | 0110 | 0100 | 1111 | 1111 |
| 19810 | 0010 | 0010 | 0010 | 0111 | 0110 | 0010 | 1111 |
| 19814 | 0010 | 0010 | 0010 | 0110 | 0110 | 0110 | 1110 |
| 19815 | 0010 | 0010 | 0010 | 0111 | 0110 | 0110 | 1111 |
| 19819 | 0100 | 0100 | 0100 | 0110 | 1100 | 1110 | 1110 |
| 19820 | 1000 | 1000 | 1000 | 1011 | 1010 | 1110 | 1111 |
| 19824 | 0010 | 0010 | 0010 | 0110 | 0110 | 1111 | 1110 |
| 19825 | 0010 | 0010 | 0010 | 0110 | 1010 | 1111 | 1110 |
| 19835 | 0010 | 0010 | 0010 | 0111 | 0111 | 0010 | 1111 |
| 19840 | 1000 | 1000 | 1000 | 1110 | 1110 | 1010 | 1111 |
| 19844 | 0100 | 0100 | 0100 | 0111 | 0111 | 0111 | 0111 |
| 19845 | 1000 | 1000 | 1000 | 1110 | 1110 | 1110 | 1111 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 19849 | 1000 | 1000 | 1000 | 1110 | 1110 | 1111 | 1110 |
| 19850 | 0010 | 0010 | 0010 | 0111 | 0111 | 1111 | 1111 |
| 19860 | 1000 | 1000 | 1000 | 1110 | 1111 | 1000 | 1111 |
| 19865 | 1000 | 1000 | 1000 | 1110 | 1111 | 1001 | 1111 |
| 19870 | 1000 | 1000 | 1000 | 1110 | 1111 | 1011 | 1111 |
| 19874 | 0100 | 0100 | 0100 | 1110 | 1111 | 1111 | 0111 |
| 19875 | 1000 | 1000 | 1000 | 1110 | 1111 | 1111 | 1111 |
| 19910 | 0100 | 0100 | 0100 | 1111 | 0100 | 0100 | 1111 |
| 19915 | 0100 | 0100 | 0100 | 1111 | 0100 | 0101 | 1111 |
| 19920 | 0100 | 0100 | 0100 | 1111 | 0100 | 0111 | 1111 |
| 19925 | 1000 | 1000 | 1000 | 1111 | 1000 | 1111 | 1111 |
| 19940 | 0100 | 0100 | 0100 | 1111 | 0110 | 0110 | 1111 |
| 19945 | 0010 | 0010 | 0010 | 1111 | 1010 | 1110 | 1111 |
| 19950 | 1000 | 1000 | 1000 | 1111 | 1010 | 1111 | 1111 |
| 19970 | 0100 | 0100 | 0100 | 1111 | 0111 | 0111 | 1111 |
| 19975 | 1000 | 1000 | 1000 | 1111 | 1110 | 1111 | 1111 |
| 20000 | 1000 | 1000 | 1000 | 1111 | 1111 | 1111 | 1111 |
| 20183 | 0010 | 0010 | 0011 | 0010 | 0011 | 0010 | 0011 |
| 20184 | 1000 | 1000 | 1001 | 1000 | 1010 | 1000 | 1101 |
| 20185 | 0010 | 0010 | 0011 | 0010 | 0011 | 0010 | 1111 |
| 20188 | 0100 | 0100 | 0101 | 0100 | 0110 | 0110 | 0110 |
| 20189 | 0010 | 0010 | 0011 | 0010 | 0110 | 0110 | 0111 |
| 20190 | 0010 | 0010 | 0011 | 0010 | 0110 | 0110 | 1111 |
| 20193 | 0100 | 0100 | 0101 | 0100 | 0101 | 0111 | 0110 |
| 20194 | 0010 | 0010 | 0011 | 0010 | 0011 | 0111 | 0111 |
| 20195 | 1000 | 1000 | 1010 | 1000 | 1010 | 1011 | 1111 |
| 20198 | 0010 | 0010 | 0011 | 0010 | 0011 | 1111 | 0110 |
| 20199 | 0010 | 0010 | 0011 | 0010 | 0011 | 1111 | 1110 |
| 20200 | 0100 | 0100 | 0101 | 0100 | 0101 | 1111 | 1111 |
| 20209 | 0001 | 0001 | 0011 | 0001 | 0111 | 0001 | 0111 |
| 20210 | 0010 | 0010 | 0011 | 0010 | 0111 | 0010 | 1111 |
| 20214 | 0100 | 0100 | 0110 | 0100 | 1101 | 0101 | 1101 |
| 20215 | 1000 | 1000 | 1001 | 1000 | 1110 | 1010 | 1111 |
| 20219 | 0100 | 0100 | 0101 | 0100 | 1101 | 1101 | 1101 |
| 20220 | 1000 | 1000 | 1001 | 1000 | 1011 | 1011 | 1111 |
| 20224 | 0010 | 0010 | 0011 | 0010 | 0111 | 1111 | 1110 |
| 20225 | 0100 | 0100 | 0101 | 0100 | 0111 | 1111 | 1111 |
| 20235 | 0010 | 0010 | 1010 | 0010 | 1111 | 0010 | 1111 |
| 20240 | 0010 | 0010 | 1010 | 0010 | 1111 | 0011 | 1111 |
| 20245 | 0010 | 0010 | 1010 | 0010 | 1111 | 1011 | 1111 |
| 20250 | 1000 | 1000 | 1001 | 1000 | 1111 | 1111 | 1111 |
| 20288 | 0100 | 0100 | 0110 | 0110 | 0100 | 0110 | 0110 |
| 20289 | 0100 | 0100 | 0110 | 0110 | 0100 | 0101 | 0111 |
| 20290 | 0001 | 0001 | 0011 | 0011 | 0001 | 0011 | 1111 |
| 20294 | 0100 | 0100 | 0110 | 0110 | 0100 | 0111 | 0111 |
| 20295 | 1000 | 1000 | 1010 | 1010 | 1000 | 1110 | 1111 |
| 20300 | 0100 | 0100 | 0110 | 0110 | 0100 | 1111 | 1111 |
| 20309 | 0100 | 0100 | 0101 | 0101 | 0101 | 0100 | 0111 |
| 20310 | 0010 | 0010 | 0011 | 0011 | 0011 | 0010 | 1111 |
| 20313 | 0100 | 0100 | 0110 | 0110 | 0110 | 0110 | 0110 |
| 20314 | 1000 | 1000 | 1001 | 1001 | 1001 | 1001 | 1101 |
| 20315 | 1000 | 1000 | 1010 | 1010 | 1010 | 1010 | 1111 |
| 20318 | 0010 | 0010 | 1010 | 1010 | 1010 | 1110 | 0110 |
| 20319 | 0010 | 0010 | 0110 | 0110 | 0110 | 0111 | 0111 |
| 20320 | 1000 | 1000 | 1010 | 1010 | 1010 | 1011 | 1111 |
| 20323 | 0010 | 0010 | 0011 | 0011 | 0011 | 1111 | 0110 |
| 20324 | 0010 | 0010 | 0011 | 0011 | 0011 | 1111 | 0111 |
| 20325 | 0100 | 0100 | 0110 | 0110 | 0110 | 1111 | 1111 |
| 20334 | 0100 | 0100 | 1100 | 1100 | 1110 | 0100 | 0111 |
| 20335 | 0001 | 0001 | 0101 | 0101 | 1101 | 0001 | 1111 |
| 20338 | 0010 | 0010 | 1010 | 1010 | 1110 | 0110 | 0110 |
| 20339 | 0010 | 0010 | 1010 | 1010 | 1110 | 1010 | 1011 |
| 20340 | 0001 | 0001 | 0011 | 0011 | 1011 | 0011 | 1111 |
| 20343 | 0100 | 0100 | 1100 | 1100 | 1110 | 1110 | 1100 |
| 20344 | 0010 | 0010 | 0110 | 0110 | 1110 | 1110 | 1110 |
| 20345 | 0010 | 0010 | 1010 | 1010 | 1110 | 1110 | 1111 |
| 20348 | 0001 | 0001 | 0011 | 0011 | 0111 | 1111 | 0011 |
| 20349 | 0010 | 0010 | 1010 | 1010 | 1110 | 1111 | 1110 |
| 20350 | 0100 | 0100 | 0101 | 0101 | 0111 | 1111 | 1111 |
| 20359 | 0010 | 0010 | 0011 | 0011 | 1111 | 0010 | 1111 |
| 20360 | 1000 | 1000 | 1010 | 1010 | 1111 | 1000 | 1111 |
| 20363 | 0010 | 0010 | 0011 | 0011 | 1111 | 0110 | 0110 |
| 20364 | 0001 | 0001 | 0011 | 0011 | 1111 | 0101 | 0111 |
| 20365 | 1000 | 1000 | 1010 | 1010 | 1111 | 1001 | 1111 |
| 20368 | 0100 | 0100 | 0110 | 0110 | 1111 | 1110 | 0110 |
| 20369 | 1000 | 1000 | 1010 | 1010 | 1111 | 1011 | 1011 |
| 20370 | 1000 | 1000 | 1010 | 1010 | 1111 | 1011 | 1111 |
| 20373 | 0100 | 0100 | 0110 | 0110 | 1111 | 1111 | 0101 |
| 20374 | 0100 | 0100 | 0110 | 0110 | 1111 | 1111 | 0111 |
| 20375 | 1000 | 1000 | 1010 | 1010 | 1111 | 1111 | 1111 |
| 20414 | 1000 | 1000 | 1010 | 1011 | 1000 | 1010 | 1011 |
| 20415 | 1000 | 1000 | 1001 | 1011 | 1000 | 1100 | 1111 |
| 20418 | 1000 | 1000 | 1001 | 1011 | 1000 | 1101 | 1100 |
| 20419 | 0100 | 0100 | 0110 | 0111 | 0100 | 1110 | 1110 |
| 20420 | 1000 | 1000 | 1010 | 1011 | 1000 | 1110 | 1111 |
| 20423 | 0010 | 0010 | 0011 | 1011 | 0010 | 1111 | 1010 |
| 20424 | 0010 | 0010 | 0011 | 1011 | 0010 | 1111 | 1110 |
| 20425 | 1000 | 1000 | 1010 | 1110 | 1000 | 1111 | 1111 |
| 20434 | 0100 | 0100 | 0110 | 0111 | 0110 | 0100 | 0111 |
| 20435 | 1000 | 1000 | 1100 | 1110 | 1100 | 1000 | 1111 |
| 20439 | 0010 | 0010 | 0110 | 0111 | 0110 | 0110 | 0111 |
| 20440 | 1000 | 1000 | 1001 | 1011 | 1010 | 1010 | 1111 |
| 20443 | 0100 | 0100 | 1100 | 1110 | 1100 | 1110 | 1100 |
| 20444 | 0010 | 0010 | 1010 | 1110 | 0110 | 0111 | 0111 |
| 20445 | 1000 | 1000 | 1100 | 1110 | 1100 | 1110 | 1111 |
| 20448 | 0001 | 0001 | 0011 | 1011 | 1001 | 1111 | 0011 |
| 20449 | 0010 | 0010 | 1010 | 1110 | 0110 | 1111 | 1110 |
| 20450 | 0010 | 0010 | 1010 | 1110 | 1010 | 1111 | 1111 |
| 20459 | 0100 | 0100 | 0110 | 0111 | 0111 | 0100 | 0111 |
| 20460 | 0010 | 0010 | 0011 | 0111 | 0111 | 0010 | 1111 |
| 20464 | 0010 | 0010 | 1010 | 1110 | 1110 | 1010 | 1110 |
| 20465 | 0010 | 0010 | 1010 | 1110 | 1110 | 0110 | 1111 |
| 20468 | 0100 | 0100 | 0110 | 0111 | 0111 | 0111 | 0110 |
| 20469 | 0100 | 0100 | 0110 | 0111 | 0111 | 0111 | 0111 |
| 20470 | 0100 | 0100 | 0110 | 0111 | 0111 | 0111 | 1111 |
| 20473 | 0001 | 0001 | 0011 | 1011 | 1011 | 1111 | 0011 |
| 20474 | 1000 | 1000 | 1010 | 1110 | 1110 | 1111 | 1110 |
| 20475 | 0100 | 0100 | 0110 | 1110 | 1110 | 1111 | 1111 |
| 20484 | 0001 | 0001 | 0011 | 1011 | 1111 | 0001 | 1011 |
| 20485 | 0010 | 0010 | 0110 | 1110 | 1111 | 0010 | 1111 |
| 20489 | 0010 | 0010 | 0110 | 0111 | 1111 | 0110 | 0111 |
| 20490 | 0010 | 0010 | 1010 | 1110 | 1111 | 0011 | 1111 |
| 20493 | 1000 | 1000 | 1100 | 1110 | 1111 | 1110 | 1100 |
| 20494 | 1000 | 1000 | 1010 | 1110 | 1111 | 1110 | 1110 |
| 20495 | 0010 | 0010 | 1010 | 1110 | 1111 | 0111 | 1111 |
| 20498 | 0100 | 0100 | 0110 | 0111 | 1111 | 1111 | 0101 |
| 20499 | 0100 | 0100 | 0101 | 0111 | 1111 | 1111 | 0111 |
| 20500 | 1000 | 1000 | 1100 | 1110 | 1111 | 1111 | 1111 |
| 20540 | 0100 | 0100 | 0101 | 1111 | 0100 | 0101 | 1111 |
| 20544 | 1000 | 1000 | 1001 | 1111 | 1000 | 1011 | 1011 |
| 20545 | 0100 | 0100 | 0101 | 1111 | 0100 | 0111 | 1111 |
| 20548 | 0010 | 0010 | 0011 | 1111 | 0010 | 1111 | 0011 |
| 20549 | 0010 | 0010 | 0011 | 1111 | 0010 | 1111 | 0111 |
| 20550 | 1000 | 1000 | 1001 | 1111 | 1000 | 1111 | 1111 |
| 20559 | 0010 | 0010 | 0011 | 1111 | 0110 | 0010 | 1110 |
| 20560 | 0100 | 0100 | 0101 | 1111 | 0110 | 0100 | 1111 |
| 20564 | 0010 | 0010 | 0011 | 1111 | 0110 | 0110 | 0111 |
| 20565 | 0100 | 0100 | 0101 | 1111 | 0110 | 0110 | 1111 |
| 20569 | 0001 | 0001 | 0101 | 1111 | 1001 | 1011 | 1011 |
| 20570 | 0010 | 0010 | 0011 | 1111 | 1010 | 1110 | 1111 |
| 20573 | 0010 | 0010 | 0011 | 1111 | 0110 | 1111 | 0011 |
| 20574 | 0010 | 0010 | 0011 | 1111 | 0110 | 1111 | 0111 |
| 20575 | 1000 | 1000 | 1001 | 1111 | 1010 | 1111 | 1111 |
| 20584 | 1000 | 1000 | 1010 | 1111 | 1110 | 1000 | 1110 |
| 20585 | 0100 | 0100 | 0101 | 1111 | 1110 | 0100 | 1111 |
| 20589 | 0010 | 0010 | 0011 | 1111 | 1110 | 0110 | 1110 |
| 20590 | 0100 | 0100 | 0101 | 1111 | 1101 | 1100 | 1111 |
| 20594 | 1000 | 1000 | 1001 | 1111 | 1110 | 1110 | 1110 |
| 20595 | 0100 | 0100 | 0101 | 1111 | 0111 | 0111 | 1111 |
| 20598 | 0010 | 0010 | 0011 | 1111 | 1110 | 1111 | 0011 |
| 20599 | 0010 | 0010 | 0011 | 1111 | 1110 | 1111 | 0111 |
| 20600 | 1000 | 1000 | 1001 | 1111 | 1110 | 1111 | 1111 |
| 20609 | 0100 | 0100 | 0101 | 1111 | 1111 | 0100 | 0111 |
| 20610 | 1000 | 1000 | 1001 | 1111 | 1111 | 1000 | 1111 |
| 20614 | 0010 | 0010 | 0011 | 1111 | 1111 | 0110 | 1110 |
| 20615 | 1000 | 1000 | 1001 | 1111 | 1111 | 1010 | 1111 |
| 20619 | 0100 | 0100 | 0101 | 1111 | 1111 | 0111 | 1111 |
| 20620 | 1000 | 1000 | 1001 | 1111 | 1111 | 1110 | 1111 |
| 20623 | 1000 | 1000 | 1001 | 1111 | 1111 | 1111 | 1010 |
| 20624 | 1000 | 1000 | 1001 | 1111 | 1111 | 1111 | 1110 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 20625 | 1000 | 1000 | 1001 | 1111 | 1111 | 1111 | 1111 |
| 20834 | 0100 | 0100 | 0111 | 0100 | 0111 | 0100 | 0111 |
| 20835 | 0010 | 0010 | 1011 | 0010 | 1011 | 0010 | 1011 |
| 20839 | 1000 | 1000 | 1011 | 1000 | 1101 | 1001 | 1101 |
| 20840 | 0001 | 0001 | 0111 | 0001 | 1011 | 0011 | 1111 |
| 20844 | 0100 | 0100 | 0111 | 0100 | 0111 | 0111 | 0111 |
| 20845 | 0010 | 0010 | 1011 | 0010 | 0111 | 0111 | 1111 |
| 20849 | 0010 | 0010 | 1011 | 0010 | 0111 | 1111 | 1110 |
| 20850 | 0100 | 0100 | 0111 | 0100 | 0111 | 1111 | 1111 |
| 20860 | 0010 | 0010 | 1110 | 0010 | 1111 | 0010 | 1111 |
| 20865 | 0010 | 0010 | 1110 | 0010 | 1111 | 0011 | 1111 |
| 20870 | 0010 | 0010 | 1110 | 0010 | 1111 | 0111 | 1111 |
| 20875 | 1000 | 1000 | 1011 | 1000 | 1111 | 1111 | 1111 |
| 20939 | 1000 | 1000 | 1101 | 1001 | 1001 | 1001 | 1101 |
| 20940 | 1000 | 1000 | 1011 | 1010 | 1010 | 1010 | 1111 |
| 20944 | 0010 | 0010 | 1110 | 0110 | 0110 | 0111 | 0111 |
| 20945 | 0001 | 0001 | 1011 | 1001 | 1001 | 1011 | 1111 |
| 20949 | 0001 | 0001 | 1011 | 0011 | 0011 | 1111 | 0111 |
| 20950 | 0010 | 0010 | 1110 | 0110 | 0110 | 1111 | 1111 |
| 20960 | 1000 | 1000 | 1011 | 1010 | 1110 | 1000 | 1111 |
| 20964 | 0100 | 0100 | 0111 | 0110 | 0111 | 0101 | 0111 |
| 20965 | 1000 | 1000 | 1011 | 1010 | 1110 | 1100 | 1111 |
| 20969 | 0100 | 0100 | 1110 | 1100 | 1110 | 1110 | 1110 |
| 20970 | 0010 | 0010 | 1011 | 1010 | 1110 | 1110 | 1111 |
| 20974 | 0010 | 0010 | 1110 | 0110 | 0111 | 1111 | 1110 |
| 20975 | 1000 | 1000 | 1101 | 1100 | 1110 | 1111 | 1111 |
| 20985 | 1000 | 1000 | 1011 | 1010 | 1111 | 1000 | 1111 |
| 20989 | 0001 | 0001 | 1011 | 0011 | 1111 | 0011 | 1011 |
| 20990 | 1000 | 1000 | 1110 | 1010 | 1111 | 1001 | 1111 |
| 20994 | 0001 | 0001 | 0111 | 0101 | 1111 | 0111 | 0111 |
| 20995 | 0010 | 0010 | 0111 | 0110 | 1111 | 0111 | 1111 |
| 20999 | 0100 | 0100 | 0111 | 0110 | 1111 | 1111 | 0111 |
| 21000 | 1000 | 1000 | 1011 | 1010 | 1111 | 1111 | 1111 |
| 21044 | 0100 | 0100 | 1110 | 1110 | 0100 | 1110 | 1110 |
| 21045 | 1000 | 1000 | 1011 | 1011 | 1000 | 1110 | 1111 |
| 21050 | 1000 | 1000 | 1110 | 1110 | 1000 | 1111 | 1111 |
| 21065 | 0010 | 0010 | 1110 | 1110 | 1010 | 1110 | 1111 |
| 21069 | 0100 | 0100 | 0111 | 0111 | 0101 | 0111 | 0111 |
| 21070 | 0010 | 0010 | 0111 | 0111 | 0110 | 1110 | 1111 |
| 21074 | 0010 | 0010 | 1011 | 1011 | 0011 | 1111 | 1110 |
| 21075 | 0100 | 0100 | 1101 | 1101 | 1100 | 1111 | 1111 |
| 21085 | 1000 | 1000 | 1110 | 1110 | 1110 | 1000 | 1111 |
| 21090 | 1000 | 1000 | 1110 | 1110 | 1110 | 1010 | 1111 |
| 21094 | 0100 | 0100 | 0111 | 0111 | 0111 | 0111 | 0111 |
| 21095 | 1000 | 1000 | 1110 | 1110 | 1110 | 1110 | 1111 |
| 21099 | 1000 | 1000 | 1011 | 1011 | 1011 | 1111 | 1110 |
| 21100 | 0100 | 0100 | 0111 | 0111 | 0111 | 1111 | 1111 |
| 21110 | 1000 | 1000 | 1110 | 1110 | 1111 | 1000 | 1111 |
| 21115 | 1000 | 1000 | 1110 | 1110 | 1111 | 1001 | 1111 |
| 21119 | 1000 | 1000 | 1011 | 1011 | 1111 | 1110 | 1110 |
| 21120 | 1000 | 1000 | 1110 | 1110 | 1111 | 1011 | 1111 |
| 21124 | 0100 | 0100 | 0111 | 0111 | 1111 | 1111 | 0111 |
| 21125 | 1000 | 1000 | 1011 | 1011 | 1111 | 1111 | 1111 |
| 21170 | 0100 | 0100 | 0111 | 1111 | 0100 | 0111 | 1111 |
| 21174 | 0010 | 0010 | 1011 | 1111 | 0010 | 1111 | 0111 |
| 21175 | 1000 | 1000 | 1011 | 1111 | 1000 | 1111 | 1111 |
| 21190 | 0100 | 0100 | 0111 | 1111 | 0110 | 0110 | 1111 |
| 21195 | 0010 | 0010 | 1011 | 1111 | 1010 | 1110 | 1111 |
| 21199 | 0100 | 0100 | 0111 | 1111 | 0110 | 0111 | 0111 |
| 21200 | 1000 | 1000 | 1011 | 1111 | 1010 | 1111 | 1111 |
| 21210 | 0100 | 0100 | 0111 | 1111 | 1110 | 0100 | 1111 |
| 21215 | 0100 | 0100 | 0111 | 1111 | 1101 | 1100 | 1111 |
| 21220 | 0100 | 0100 | 0111 | 1111 | 0111 | 0111 | 1111 |
| 21224 | 0100 | 0100 | 0111 | 1111 | 1110 | 1111 | 0111 |
| 21225 | 1000 | 1000 | 1011 | 1111 | 1110 | 1111 | 1111 |
| 21235 | 1000 | 1000 | 1011 | 1111 | 1111 | 1000 | 1111 |
| 21240 | 1000 | 1000 | 1011 | 1111 | 1111 | 1010 | 1111 |
| 21245 | 1000 | 1000 | 1011 | 1111 | 1111 | 1110 | 1111 |
| 21249 | 1000 | 1000 | 1011 | 1111 | 1111 | 1111 | 1110 |
| 21250 | 1000 | 1000 | 1011 | 1111 | 1111 | 1111 | 1111 |
| 21485 | 1000 | 1000 | 1111 | 1000 | 1111 | 1000 | 1111 |
| 21490 | 1000 | 1000 | 1111 | 1000 | 1111 | 1010 | 1111 |
| 21495 | 1000 | 1000 | 1111 | 1000 | 1110 | 1111 | 1111 |
| 21500 | 1000 | 1000 | 1111 | 1000 | 1111 | 1111 | 1111 |
| 21565 | 1000 | 1000 | 1111 | 1001 | 1001 | 1001 | 1111 |
| 21570 | 0001 | 0001 | 1111 | 1001 | 1001 | 1011 | 1111 |
| 21575 | 1000 | 1000 | 1111 | 1010 | 1010 | 1111 | 1111 |
| 21590 | 0001 | 0001 | 1111 | 0011 | 1011 | 1001 | 1111 |
| 21595 | 0001 | 0001 | 1111 | 1001 | 1011 | 1011 | 1111 |
| 21600 | 0010 | 0010 | 1111 | 1010 | 1110 | 1111 | 1111 |
| 21615 | 1000 | 1000 | 1111 | 1001 | 1111 | 1010 | 1111 |
| 21620 | 1000 | 1000 | 1111 | 1001 | 1111 | 1110 | 1111 |
| 21625 | 1000 | 1000 | 1111 | 1001 | 1111 | 1111 | 1111 |
| 21695 | 0001 | 0001 | 1111 | 1011 | 1001 | 1011 | 1111 |
| 21700 | 0010 | 0010 | 1111 | 1110 | 1010 | 1111 | 1111 |
| 21720 | 1000 | 1000 | 1111 | 1101 | 1101 | 1101 | 1111 |
| 21725 | 1000 | 1000 | 1111 | 1011 | 1011 | 1111 | 1111 |
| 21745 | 1000 | 1000 | 1111 | 1011 | 1111 | 1110 | 1111 |
| 21750 | 1000 | 1000 | 1111 | 1011 | 1111 | 1111 | 1111 |
| 21800 | 1000 | 1000 | 1111 | 1111 | 1000 | 1111 | 1111 |
| 21825 | 1000 | 1000 | 1111 | 1111 | 1001 | 1111 | 1111 |
| 21850 | 1000 | 1000 | 1111 | 1111 | 1011 | 1111 | 1111 |
| 21875 | 1000 | 1000 | 1111 | 1111 | 1111 | 1111 | 1111 |
| 23438 | 0100 | 0110 | 0110 | 0110 | 0110 | 0110 | 0110 |
| 23439 | 0001 | 1001 | 1001 | 1001 | 1001 | 1001 | 1101 |
| 23440 | 0010 | 1010 | 1010 | 1010 | 1010 | 1010 | 1111 |
| 23444 | 0010 | 1010 | 1010 | 1010 | 1010 | 1110 | 1110 |
| 23445 | 1000 | 1010 | 1010 | 1010 | 1010 | 1011 | 1111 |
| 23450 | 0100 | 0101 | 0101 | 0101 | 0101 | 1111 | 1111 |
| 23464 | 0001 | 0101 | 0101 | 0101 | 1101 | 0101 | 0111 |
| 23465 | 1000 | 1010 | 1010 | 1010 | 1011 | 1010 | 1111 |
| 23469 | 0010 | 1010 | 1010 | 1010 | 1110 | 1110 | 1110 |
| 23470 | 0001 | 1001 | 1001 | 1001 | 1011 | 1011 | 1111 |
| 23474 | 0100 | 1100 | 1100 | 1100 | 1110 | 1111 | 1110 |
| 23475 | 0001 | 1001 | 1001 | 1001 | 1101 | 1111 | 1111 |
| 23490 | 0010 | 1010 | 1010 | 1010 | 1111 | 0011 | 1111 |
| 23495 | 0010 | 1010 | 1010 | 1010 | 1111 | 0111 | 1111 |
| 23500 | 1000 | 1010 | 1010 | 1010 | 1111 | 1111 | 1111 |
| 23564 | 0010 | 1010 | 1010 | 1110 | 1010 | 1010 | 1110 |
| 23565 | 0100 | 0110 | 0110 | 1110 | 0110 | 0110 | 1111 |
| 23569 | 1000 | 1010 | 1010 | 1011 | 1001 | 1011 | 1011 |
| 23570 | 0001 | 0101 | 0101 | 1101 | 0101 | 0111 | 1111 |
| 23574 | 1000 | 1010 | 1010 | 1011 | 1010 | 1111 | 1011 |
| 23575 | 1000 | 1100 | 1100 | 1101 | 1001 | 1111 | 1111 |
| 23590 | 0100 | 0110 | 0110 | 0111 | 0111 | 0110 | 1111 |
| 23594 | 0010 | 1010 | 1010 | 1110 | 1110 | 1110 | 1110 |
| 23595 | 1000 | 1001 | 1001 | 1011 | 1011 | 1011 | 1111 |
| 23599 | 1000 | 1100 | 1100 | 1110 | 1110 | 1111 | 1110 |
| 23600 | 0100 | 0101 | 0101 | 1101 | 1101 | 1111 | 1111 |
| 23615 | 0010 | 0110 | 0110 | 0111 | 1111 | 0011 | 1111 |
| 23620 | 1000 | 1010 | 1010 | 1011 | 1111 | 1011 | 1111 |
| 23624 | 0001 | 0101 | 0101 | 0111 | 1111 | 1111 | 0111 |
| 23625 | 1000 | 1001 | 1001 | 1011 | 1111 | 1111 | 1111 |
| 23690 | 0100 | 1100 | 1100 | 1111 | 0110 | 0110 | 1111 |
| 23695 | 0010 | 1010 | 1010 | 1111 | 1010 | 1110 | 1111 |
| 23700 | 1000 | 1001 | 1001 | 1111 | 1010 | 1111 | 1111 |
| 23720 | 0100 | 1100 | 1100 | 1111 | 0111 | 0111 | 1111 |
| 23725 | 1000 | 1001 | 1001 | 1111 | 1110 | 1111 | 1111 |
| 23750 | 1000 | 1001 | 1001 | 1111 | 1111 | 1111 | 1111 |
| 24089 | 0010 | 1010 | 1011 | 0011 | 0111 | 0110 | 1110 |
| 24090 | 1000 | 1001 | 1011 | 1010 | 1011 | 1010 | 1111 |
| 24094 | 0100 | 1100 | 1110 | 1100 | 1110 | 1110 | 1110 |
| 24095 | 0010 | 1010 | 1011 | 1010 | 1110 | 1111 | 1110 |
| 24099 | 1000 | 1010 | 1011 | 1010 | 1110 | 1111 | 1110 |
| 24100 | 0100 | 1100 | 1110 | 1100 | 1110 | 1111 | 1111 |
| 24115 | 0010 | 1010 | 1110 | 0110 | 1111 | 0011 | 1111 |
| 24120 | 0010 | 0110 | 0111 | 0110 | 1111 | 0111 | 1111 |
| 24125 | 1000 | 1001 | 1011 | 1010 | 1111 | 1111 | 1111 |
| 24194 | 0010 | 0011 | 0111 | 0111 | 0110 | 0111 | 0111 |
| 24195 | 0010 | 0011 | 1011 | 1011 | 1010 | 1110 | 1111 |
| 24200 | 0100 | 1100 | 1110 | 1110 | 0110 | 0111 | 1111 |
| 24215 | 1000 | 1010 | 1110 | 1110 | 1110 | 1100 | 1111 |
| 24219 | 0100 | 1100 | 1110 | 1110 | 1110 | 1110 | 1110 |
| 24220 | 0010 | 0110 | 1110 | 1110 | 1110 | 1111 | 1110 |
| 24224 | 1000 | 1100 | 1110 | 1110 | 1110 | 1111 | 1110 |
| 24225 | 1000 | 1100 | 1110 | 1110 | 1110 | 1111 | 1111 |
| 24240 | 0010 | 0110 | 0111 | 0111 | 1111 | 0011 | 1111 |
| 24244 | 1000 | 1010 | 1011 | 1011 | 1111 | 1011 | 1011 |
| 24245 | 0010 | 0110 | 0111 | 0111 | 1111 | 0111 | 1111 |
| 24249 | 0010 | 1010 | 1110 | 1110 | 1111 | 1111 | 1011 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 24250 | 0010 | 1010 | 1110 | 1110 | 1111 | 1111 | 1111 |
| 24320 | 0001 | 0011 | 0111 | 1111 | 1001 | 1101 | 1111 |
| 24324 | 0001 | 0101 | 1101 | 1111 | 0011 | 1111 | 0111 |
| 24325 | 1000 | 1001 | 1011 | 1111 | 1010 | 1111 | 1111 |
| 24340 | 0100 | 1100 | 1101 | 1111 | 0111 | 0101 | 1111 |
| 24345 | 1000 | 1100 | 1110 | 1111 | 1110 | 1110 | 1111 |
| 24349 | 0001 | 0101 | 1101 | 1111 | 0111 | 1111 | 0111 |
| 24350 | 1000 | 1001 | 1011 | 1111 | 1110 | 1111 | 1111 |
| 24365 | 1000 | 1001 | 1011 | 1111 | 1111 | 1010 | 1111 |
| 24370 | 1000 | 1001 | 1011 | 1111 | 1111 | 1110 | 1111 |
| 24374 | 0100 | 1100 | 1101 | 1111 | 1111 | 1111 | 1110 |
| 24375 | 1000 | 1100 | 1101 | 1111 | 1111 | 1111 | 1111 |
| 24740 | 1000 | 1001 | 1111 | 1001 | 1111 | 1010 | 1111 |
| 24745 | 1000 | 1001 | 1111 | 1001 | 1111 | 1110 | 1111 |
| 24750 | 0001 | 1001 | 1111 | 0011 | 1111 | 1111 | 1111 |
| 24845 | 0100 | 1100 | 1111 | 1101 | 1101 | 1101 | 1111 |
| 24850 | 1000 | 1001 | 1111 | 1011 | 1011 | 1111 | 1111 |
| 24870 | 1000 | 1001 | 1111 | 1011 | 1111 | 1110 | 1111 |
| 24875 | 1000 | 1001 | 1111 | 1011 | 1111 | 1111 | 1111 |
| 24950 | 0001 | 1001 | 1111 | 1111 | 0011 | 1111 | 1111 |
| 24975 | 1000 | 1001 | 1111 | 1111 | 1011 | 1111 | 1111 |
| 25000 | 1000 | 1001 | 1111 | 1111 | 1111 | 1111 | 1111 |
| 27344 | 0100 | 0111 | 0111 | 0111 | 0111 | 0111 | 0111 |
| 27345 | 1000 | 1110 | 1110 | 1110 | 1110 | 1110 | 1111 |
| 27350 | 0010 | 1011 | 1011 | 1011 | 1011 | 1111 | 1111 |
| 27370 | 0100 | 1110 | 1110 | 1110 | 1111 | 0111 | 1111 |
| 27375 | 0010 | 1011 | 1011 | 1011 | 1111 | 1111 | 1111 |
| 27470 | 0100 | 1101 | 1101 | 1111 | 0111 | 0111 | 1111 |
| 27475 | 1000 | 1011 | 1011 | 1111 | 1110 | 1111 | 1111 |
| 27500 | 0100 | 1101 | 1101 | 1111 | 1111 | 1111 | 1111 |
| 27995 | 1000 | 1011 | 1111 | 1011 | 1111 | 1110 | 1111 |
| 28000 | 1000 | 1011 | 1111 | 1011 | 1111 | 1111 | 1111 |
| 28100 | 1000 | 1011 | 1111 | 1111 | 1011 | 1111 | 1111 |
| 28125 | 1000 | 1011 | 1111 | 1111 | 1111 | 1111 | 1111 |
| 31250 | 0001 | 1111 | 1111 | 1111 | 1111 | 1111 | 1111 |
| 31251 | 0011 | 0000 | 0000 | 0000 | 0000 | 0000 | 0000 |
| 31252 | 1100 | 0000 | 0000 | 0000 | 0000 | 0000 | 1000 |
| 31253 | 1100 | 0000 | 0000 | 0000 | 0000 | 0000 | 1100 |
| 31254 | 1100 | 0000 | 0000 | 0000 | 0000 | 0000 | 1101 |
| 31255 | 0011 | 0000 | 0000 | 0000 | 0000 | 0000 | 1111 |
| 31257 | 1100 | 0000 | 0000 | 0000 | 0000 | 1000 | 1000 |
| 31258 | 1100 | 0000 | 0000 | 0000 | 0000 | 1000 | 1100 |
| 31259 | 1100 | 0000 | 0000 | 0000 | 0000 | 1000 | 1101 |
| 31260 | 1100 | 0000 | 0000 | 0000 | 0000 | 1000 | 1111 |
| 31263 | 1001 | 0000 | 0000 | 0000 | 0000 | 1001 | 1001 |
| 31264 | 1100 | 0000 | 0000 | 0000 | 0000 | 1100 | 1101 |
| 31265 | 1001 | 0000 | 0000 | 0000 | 0000 | 1001 | 1111 |
| 31269 | 1100 | 0000 | 0000 | 0000 | 0000 | 1101 | 1101 |
| 31270 | 1010 | 0000 | 0000 | 0000 | 0000 | 1011 | 1111 |
| 31275 | 0011 | 0000 | 0000 | 0000 | 0000 | 1111 | 1111 |
| 31277 | 1100 | 0000 | 0000 | 0000 | 1000 | 0000 | 1000 |
| 31278 | 1100 | 0000 | 0000 | 0000 | 1000 | 0000 | 1100 |
| 31279 | 1100 | 0000 | 0000 | 0000 | 0100 | 0000 | 1110 |
| 31280 | 1100 | 0000 | 0000 | 0000 | 1000 | 0000 | 1111 |
| 31282 | 0110 | 0000 | 0000 | 0000 | 0010 | 0010 | 0010 |
| 31283 | 1010 | 0000 | 0000 | 0000 | 1000 | 1000 | 1010 |
| 31284 | 0110 | 0000 | 0000 | 0000 | 0010 | 0010 | 0111 |
| 31285 | 0101 | 0000 | 0000 | 0000 | 0001 | 0001 | 1111 |
| 31287 | 1010 | 0000 | 0000 | 0000 | 1000 | 1010 | 0010 |
| 31288 | 1010 | 0000 | 0000 | 0000 | 1000 | 1010 | 1010 |
| 31289 | 1001 | 0000 | 0000 | 0000 | 1000 | 1001 | 1101 |
| 31290 | 1001 | 0000 | 0000 | 0000 | 1000 | 1001 | 1111 |
| 31292 | 1010 | 0000 | 0000 | 0000 | 1000 | 1110 | 0010 |
| 31293 | 1010 | 0000 | 0000 | 0000 | 0010 | 1110 | 1010 |
| 31294 | 1010 | 0000 | 0000 | 0000 | 1000 | 1011 | 1011 |
| 31295 | 1010 | 0000 | 0000 | 0000 | 1000 | 1011 | 1111 |
| 31297 | 1100 | 0000 | 0000 | 0000 | 1000 | 1111 | 1000 |
| 31298 | 1100 | 0000 | 0000 | 0000 | 1000 | 1111 | 1100 |
| 31299 | 1100 | 0000 | 0000 | 0000 | 0100 | 1111 | 1110 |
| 31300 | 1100 | 0000 | 0000 | 0000 | 1000 | 1111 | 1111 |
| 31303 | 1100 | 0000 | 0000 | 0000 | 1100 | 0000 | 1100 |
| 31304 | 1100 | 0000 | 0000 | 0000 | 1100 | 0000 | 1101 |
| 31305 | 1100 | 0000 | 0000 | 0000 | 1100 | 0000 | 1111 |
| 31308 | 1010 | 0000 | 0000 | 0000 | 1010 | 0010 | 1010 |
| 31309 | 1010 | 0000 | 0000 | 0000 | 1010 | 0010 | 1011 |
| 31310 | 1001 | 0000 | 0000 | 0000 | 1001 | 0001 | 1111 |
| 31313 | 1010 | 0000 | 0000 | 0000 | 1010 | 1010 | 1010 |
| 31314 | 1001 | 0000 | 0000 | 0000 | 1001 | 1001 | 1011 |
| 31315 | 1001 | 0000 | 0000 | 0000 | 1001 | 1001 | 1111 |
| 31318 | 1010 | 0000 | 0000 | 0000 | 1010 | 1011 | 1010 |
| 31319 | 1010 | 0000 | 0000 | 0000 | 1010 | 1011 | 1011 |
| 31320 | 1010 | 0000 | 0000 | 0000 | 1010 | 1011 | 1111 |
| 31323 | 1100 | 0000 | 0000 | 0000 | 1100 | 1111 | 1100 |
| 31324 | 1100 | 0000 | 0000 | 0000 | 1100 | 1111 | 1101 |
| 31325 | 1100 | 0000 | 0000 | 0000 | 1100 | 1111 | 1111 |
| 31329 | 1100 | 0000 | 0000 | 0000 | 1101 | 0000 | 1101 |
| 31330 | 1100 | 0000 | 0000 | 0000 | 1101 | 0000 | 1111 |
| 31334 | 1001 | 0000 | 0000 | 0000 | 1101 | 0001 | 1011 |
| 31335 | 1010 | 0000 | 0000 | 0000 | 1011 | 1000 | 1111 |
| 31339 | 0011 | 0000 | 0000 | 0000 | 1011 | 0011 | 0111 |
| 31340 | 1001 | 0000 | 0000 | 0000 | 1011 | 1001 | 1111 |
| 31344 | 1010 | 0000 | 0000 | 0000 | 1011 | 1011 | 1011 |
| 31345 | 1010 | 0000 | 0000 | 0000 | 1011 | 1011 | 1111 |
| 31349 | 1100 | 0000 | 0000 | 0000 | 1101 | 1111 | 1101 |
| 31350 | 1100 | 0000 | 0000 | 0000 | 1101 | 1111 | 1111 |
| 31355 | 0011 | 0000 | 0000 | 0000 | 1111 | 0000 | 1111 |
| 31360 | 1100 | 0000 | 0000 | 0000 | 1111 | 1000 | 1111 |
| 31365 | 1100 | 0000 | 0000 | 0000 | 1111 | 1100 | 1111 |
| 31370 | 1100 | 0000 | 0000 | 0000 | 1111 | 1101 | 1111 |
| 31375 | 0011 | 0000 | 0000 | 0000 | 1111 | 1111 | 1111 |
| 31377 | 1100 | 0000 | 0000 | 1000 | 0000 | 0000 | 1000 |
| 31378 | 1100 | 0000 | 0000 | 1000 | 0000 | 0000 | 1100 |
| 31379 | 1100 | 0000 | 0000 | 0100 | 0000 | 0000 | 1110 |
| 31380 | 1100 | 0000 | 0000 | 1000 | 0000 | 0000 | 1111 |
| 31382 | 1100 | 0000 | 0000 | 1000 | 0000 | 1000 | 1000 |
| 31383 | 1100 | 0000 | 0000 | 1000 | 0000 | 1000 | 1100 |
| 31384 | 1100 | 0000 | 0000 | 0100 | 0000 | 0100 | 1110 |
| 31385 | 1100 | 0000 | 0000 | 1000 | 0000 | 1000 | 1111 |
| 31387 | 1100 | 0000 | 0000 | 1000 | 0000 | 1100 | 0100 |
| 31388 | 1100 | 0000 | 0000 | 1000 | 0000 | 1100 | 1100 |
| 31389 | 1100 | 0000 | 0000 | 0100 | 0000 | 1100 | 1101 |
| 31390 | 1100 | 0000 | 0000 | 1000 | 0000 | 1100 | 1111 |
| 31392 | 1010 | 0000 | 0000 | 1000 | 0000 | 1011 | 1000 |
| 31393 | 1100 | 0000 | 0000 | 1000 | 0000 | 1101 | 1100 |
| 31394 | 1100 | 0000 | 0000 | 0100 | 0000 | 1110 | 1110 |
| 31395 | 1100 | 0000 | 0000 | 0100 | 0000 | 1110 | 1111 |
| 31397 | 1100 | 0000 | 0000 | 1000 | 0000 | 1111 | 1000 |
| 31398 | 1100 | 0000 | 0000 | 1000 | 0000 | 1111 | 1100 |
| 31399 | 1100 | 0000 | 0000 | 0100 | 0000 | 1111 | 1110 |
| 31400 | 1100 | 0000 | 0000 | 1000 | 0000 | 1111 | 1111 |
| 31403 | 1100 | 0000 | 0000 | 1000 | 1000 | 0000 | 1100 |
| 31404 | 1100 | 0000 | 0000 | 1000 | 1000 | 0000 | 1101 |
| 31405 | 1100 | 0000 | 0000 | 1000 | 1000 | 0000 | 1111 |
| 31407 | 0110 | 0000 | 0000 | 0010 | 0010 | 0010 | 0010 |
| 31408 | 0110 | 0000 | 0000 | 0010 | 0010 | 0010 | 0110 |
| 31409 | 0110 | 0000 | 0000 | 0010 | 0010 | 0010 | 0111 |
| 31410 | 0110 | 0000 | 0000 | 0010 | 0010 | 0010 | 1111 |
| 31412 | 0101 | 0000 | 0000 | 0001 | 0001 | 0101 | 0001 |
| 31413 | 0110 | 0000 | 0000 | 0010 | 0010 | 0110 | 0110 |
| 31414 | 1001 | 0000 | 0000 | 0001 | 0001 | 1001 | 1101 |
| 31415 | 0110 | 0000 | 0000 | 0010 | 0010 | 0110 | 1111 |
| 31417 | 1100 | 0000 | 0000 | 1000 | 1000 | 1110 | 0100 |
| 31418 | 0110 | 0000 | 0000 | 0010 | 0010 | 1110 | 0110 |
| 31419 | 1010 | 0000 | 0000 | 0010 | 0010 | 1011 | 1011 |
| 31420 | 1010 | 0000 | 0000 | 0010 | 0010 | 1110 | 1111 |
| 31422 | 0011 | 0000 | 0000 | 0001 | 0001 | 1111 | 0010 |
| 31423 | 0011 | 0000 | 0000 | 0001 | 0001 | 1111 | 0011 |
| 31424 | 1001 | 0000 | 0000 | 1000 | 1000 | 1111 | 1011 |
| 31425 | 1100 | 0000 | 0000 | 1000 | 1000 | 1111 | 1111 |
| 31428 | 1100 | 0000 | 0000 | 1000 | 1100 | 0000 | 1100 |
| 31429 | 1100 | 0000 | 0000 | 0100 | 1100 | 0000 | 1101 |
| 31430 | 1100 | 0000 | 0000 | 1000 | 1100 | 0000 | 1111 |
| 31433 | 0110 | 0000 | 0000 | 0010 | 0110 | 0010 | 0110 |
| 31434 | 0110 | 0000 | 0000 | 0100 | 0110 | 0100 | 0111 |
| 31435 | 1010 | 0000 | 0000 | 1000 | 1010 | 1000 | 1111 |
| 31437 | 0110 | 0000 | 0000 | 0010 | 0110 | 0110 | 0010 |
| 31438 | 0110 | 0000 | 0000 | 0010 | 0110 | 0110 | 0110 |
| 31439 | 1100 | 0000 | 0000 | 0100 | 1100 | 1100 | 1110 |
| 31440 | 1010 | 0000 | 0000 | 1000 | 1010 | 1010 | 1111 |
| 31442 | 1100 | 0000 | 0000 | 0100 | 1100 | 1101 | 0100 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 31443 | 0011 | 0000 | 0000 | 0010 | 0011 | 1011 | 0011 |
| 31444 | 1010 | 0000 | 0000 | 0010 | 1010 | 1011 | 1011 |
| 31445 | 1100 | 0000 | 0000 | 0100 | 1100 | 1101 | 1111 |
| 31447 | 0011 | 0000 | 0000 | 0001 | 0011 | 1111 | 0010 |
| 31448 | 0011 | 0000 | 0000 | 0001 | 0011 | 1111 | 0011 |
| 31449 | 1001 | 0000 | 0000 | 1000 | 1001 | 1111 | 1011 |
| 31450 | 1100 | 0000 | 0000 | 1000 | 1100 | 1111 | 1111 |
| 31453 | 1100 | 0000 | 0000 | 1000 | 1101 | 0000 | 1100 |
| 31454 | 1100 | 0000 | 0000 | 0100 | 1101 | 0000 | 1101 |
| 31455 | 1100 | 0000 | 0000 | 1000 | 1101 | 0000 | 1111 |
| 31458 | 1100 | 0000 | 0000 | 1000 | 1110 | 0100 | 1100 |
| 31459 | 1010 | 0000 | 0000 | 1000 | 1011 | 1000 | 1011 |
| 31460 | 0101 | 0000 | 0000 | 0001 | 1101 | 0001 | 1111 |
| 31463 | 0110 | 0000 | 0000 | 0010 | 1110 | 0110 | 0110 |
| 31464 | 0110 | 0000 | 0000 | 0010 | 0111 | 0110 | 0111 |
| 31465 | 0110 | 0000 | 0000 | 0010 | 1110 | 0110 | 1111 |
| 31467 | 1100 | 0000 | 0000 | 0100 | 1110 | 1110 | 0100 |
| 31468 | 0101 | 0000 | 0000 | 0100 | 0111 | 0111 | 0101 |
| 31469 | 0101 | 0000 | 0000 | 0100 | 0111 | 0111 | 0111 |
| 31470 | 1010 | 0000 | 0000 | 1000 | 1011 | 1011 | 1111 |
| 31472 | 0101 | 0000 | 0000 | 0001 | 1101 | 1111 | 0100 |
| 31473 | 1010 | 0000 | 0000 | 1000 | 1011 | 1111 | 1010 |
| 31474 | 1010 | 0000 | 0000 | 0010 | 1011 | 1111 | 1110 |
| 31475 | 1100 | 0000 | 0000 | 1000 | 1101 | 1111 | 1111 |
| 31478 | 1100 | 0000 | 0000 | 1000 | 1111 | 0000 | 1100 |
| 31479 | 1100 | 0000 | 0000 | 0100 | 1111 | 0000 | 1110 |
| 31480 | 1100 | 0000 | 0000 | 1000 | 1111 | 0000 | 1111 |
| 31483 | 1010 | 0000 | 0000 | 1000 | 1111 | 0010 | 1010 |
| 31484 | 1001 | 0000 | 0000 | 1000 | 1111 | 1000 | 1101 |
| 31485 | 0101 | 0000 | 0000 | 0001 | 1111 | 0001 | 1111 |
| 31488 | 0011 | 0000 | 0000 | 0001 | 1111 | 0011 | 0011 |
| 31489 | 1010 | 0000 | 0000 | 0010 | 1111 | 1010 | 1110 |
| 31490 | 0101 | 0000 | 0000 | 0001 | 1111 | 0101 | 1111 |
| 31493 | 0011 | 0000 | 0000 | 0010 | 1111 | 0111 | 0011 |
| 31494 | 1010 | 0000 | 0000 | 0010 | 1111 | 1011 | 1011 |
| 31495 | 1010 | 0000 | 0000 | 1000 | 1111 | 1011 | 1111 |
| 31497 | 1100 | 0000 | 0000 | 1000 | 1111 | 1111 | 1000 |
| 31498 | 1100 | 0000 | 0000 | 1000 | 1111 | 1111 | 1100 |
| 31499 | 1100 | 0000 | 0000 | 0100 | 1111 | 1111 | 1110 |
| 31503 | 1100 | 0000 | 0000 | 1100 | 0000 | 0000 | 1100 |
| 31504 | 1100 | 0000 | 0000 | 1100 | 0000 | 0000 | 1101 |
| 31505 | 1100 | 0000 | 0000 | 1100 | 0000 | 0000 | 1111 |
| 31508 | 1100 | 0000 | 0000 | 1100 | 0000 | 1000 | 1100 |
| 31509 | 1100 | 0000 | 0000 | 1100 | 0000 | 1000 | 1110 |
| 31510 | 1100 | 0000 | 0000 | 1100 | 0000 | 1000 | 1111 |
| 31513 | 1100 | 0000 | 0000 | 1100 | 0000 | 1100 | 1100 |
| 31514 | 1100 | 0000 | 0000 | 1100 | 0000 | 1100 | 1110 |
| 31515 | 1100 | 0000 | 0000 | 1100 | 0000 | 1100 | 1111 |
| 31518 | 1100 | 0000 | 0000 | 1100 | 0000 | 1101 | 1100 |
| 31519 | 1100 | 0000 | 0000 | 1100 | 0000 | 1110 | 1110 |
| 31520 | 1100 | 0000 | 0000 | 1100 | 0000 | 1101 | 1111 |
| 31523 | 1100 | 0000 | 0000 | 1100 | 0000 | 1111 | 1100 |
| 31524 | 1100 | 0000 | 0000 | 1100 | 0000 | 1111 | 1101 |
| 31525 | 1100 | 0000 | 0000 | 1100 | 0000 | 1111 | 1111 |
| 31529 | 1100 | 0000 | 0000 | 1100 | 1000 | 0000 | 1101 |
| 31530 | 1100 | 0000 | 0000 | 1100 | 1000 | 0000 | 1111 |
| 31533 | 0110 | 0000 | 0000 | 0110 | 0100 | 0100 | 0110 |
| 31534 | 0110 | 0000 | 0000 | 0110 | 0100 | 0100 | 0111 |
| 31535 | 1010 | 0000 | 0000 | 1010 | 0010 | 0010 | 1111 |
| 31538 | 0110 | 0000 | 0000 | 0110 | 0010 | 0110 | 0110 |
| 31539 | 1010 | 0000 | 0000 | 1010 | 1000 | 1010 | 1011 |
| 31540 | 1010 | 0000 | 0000 | 1010 | 0010 | 1010 | 1111 |
| 31543 | 1010 | 0000 | 0000 | 1010 | 0010 | 1011 | 1010 |
| 31544 | 1010 | 0000 | 0000 | 1010 | 1000 | 1110 | 1110 |
| 31545 | 1100 | 0000 | 0000 | 1100 | 0100 | 1101 | 1111 |
| 31548 | 1001 | 0000 | 0000 | 1001 | 0001 | 1111 | 1001 |
| 31549 | 1010 | 0000 | 0000 | 1010 | 1000 | 1111 | 1011 |
| 31550 | 1100 | 0000 | 0000 | 1100 | 1000 | 1111 | 1111 |
| 31554 | 1100 | 0000 | 0000 | 1100 | 1100 | 0000 | 1110 |
| 31555 | 1001 | 0000 | 0000 | 1001 | 1001 | 0000 | 1111 |
| 31559 | 1010 | 0000 | 0000 | 1010 | 1010 | 0010 | 1110 |
| 31560 | 1010 | 0000 | 0000 | 1010 | 1010 | 0010 | 1111 |
| 31563 | 0110 | 0000 | 0000 | 0110 | 0110 | 0110 | 0110 |
| 31564 | 0110 | 0000 | 0000 | 0110 | 0110 | 0110 | 0111 |
| 31565 | 1010 | 0000 | 0000 | 1010 | 1010 | 1010 | 1111 |
| 31568 | 1100 | 0000 | 0000 | 1100 | 1100 | 1110 | 1100 |
| 31569 | 1100 | 0000 | 0000 | 1100 | 1100 | 1110 | 1110 |
| 31570 | 1100 | 0000 | 0000 | 1100 | 1100 | 1110 | 1111 |
| 31573 | 0011 | 0000 | 0000 | 0011 | 0011 | 1111 | 0011 |
| 31574 | 1001 | 0000 | 0000 | 1001 | 1001 | 1111 | 1011 |
| 31575 | 1001 | 0000 | 0000 | 1001 | 1001 | 1111 | 1111 |
| 31579 | 1100 | 0000 | 0000 | 1100 | 1101 | 0000 | 1110 |
| 31580 | 1100 | 0000 | 0000 | 1100 | 1101 | 0000 | 1111 |
| 31584 | 1010 | 0000 | 0000 | 1010 | 1110 | 1000 | 1011 |
| 31585 | 1100 | 0000 | 0000 | 1100 | 1110 | 1000 | 1111 |
| 31589 | 0110 | 0000 | 0000 | 0110 | 0111 | 0110 | 0111 |
| 31590 | 1010 | 0000 | 0000 | 1010 | 1011 | 1010 | 1111 |
| 31593 | 1100 | 0000 | 0000 | 1100 | 1110 | 1110 | 1100 |
| 31594 | 1100 | 0000 | 0000 | 1100 | 1110 | 1110 | 1110 |
| 31595 | 1100 | 0000 | 0000 | 1100 | 1110 | 1110 | 1111 |
| 31598 | 1010 | 0000 | 0000 | 1010 | 1011 | 1111 | 1010 |
| 31599 | 1010 | 0000 | 0000 | 1010 | 1011 | 1111 | 1110 |
| 31604 | 1100 | 0000 | 0000 | 1100 | 1111 | 0000 | 1101 |
| 31605 | 1100 | 0000 | 0000 | 1100 | 1111 | 0000 | 1111 |
| 31609 | 1001 | 0000 | 0000 | 1001 | 1111 | 0001 | 1011 |
| 31610 | 0101 | 0000 | 0000 | 0101 | 1111 | 0001 | 1111 |
| 31614 | 1001 | 0000 | 0000 | 1001 | 1111 | 1001 | 1011 |
| 31615 | 0101 | 0000 | 0000 | 0101 | 1111 | 0101 | 1111 |
| 31619 | 1001 | 0000 | 0000 | 1001 | 1111 | 1011 | 1011 |
| 31620 | 0101 | 0000 | 0000 | 0101 | 1111 | 0111 | 1111 |
| 31623 | 1100 | 0000 | 0000 | 1100 | 1111 | 1111 | 1100 |
| 31629 | 1100 | 0000 | 0000 | 1101 | 0000 | 0000 | 1101 |
| 31630 | 1100 | 0000 | 0000 | 1101 | 0000 | 0000 | 1111 |
| 31634 | 1100 | 0000 | 0000 | 1101 | 0000 | 1000 | 1110 |
| 31635 | 1010 | 0000 | 0000 | 1011 | 0000 | 1000 | 1111 |
| 31639 | 1100 | 0000 | 0000 | 1101 | 0000 | 1100 | 1110 |
| 31640 | 1100 | 0000 | 0000 | 1101 | 0000 | 1100 | 1111 |
| 31644 | 1100 | 0000 | 0000 | 1101 | 0000 | 1110 | 1110 |
| 31645 | 1100 | 0000 | 0000 | 1101 | 0000 | 1101 | 1111 |
| 31649 | 1100 | 0000 | 0000 | 1101 | 0000 | 1111 | 1101 |
| 31650 | 1100 | 0000 | 0000 | 1101 | 0000 | 1111 | 1111 |
| 31655 | 1010 | 0000 | 0000 | 1011 | 1000 | 0000 | 1111 |
| 31659 | 1010 | 0000 | 0000 | 1110 | 0010 | 0010 | 1011 |
| 31660 | 1010 | 0000 | 0000 | 1011 | 1000 | 1000 | 1111 |
| 31664 | 1010 | 0000 | 0000 | 1011 | 0010 | 1010 | 1011 |
| 31665 | 1010 | 0000 | 0000 | 1011 | 1000 | 1010 | 1111 |
| 31669 | 0110 | 0000 | 0000 | 1110 | 0100 | 0111 | 0111 |
| 31670 | 1100 | 0000 | 0000 | 1101 | 1000 | 1110 | 1111 |
| 31674 | 0011 | 0000 | 0000 | 1011 | 0010 | 1111 | 0111 |
| 31675 | 1010 | 0000 | 0000 | 1011 | 1000 | 1111 | 1111 |
| 31680 | 1001 | 0000 | 0000 | 1011 | 1001 | 0000 | 1111 |
| 31685 | 1100 | 0000 | 0000 | 1110 | 1100 | 1000 | 1111 |
| 31689 | 0110 | 0000 | 0000 | 1110 | 0110 | 0110 | 0111 |
| 31690 | 1010 | 0000 | 0000 | 1011 | 1010 | 1010 | 1111 |
| 31694 | 1100 | 0000 | 0000 | 1110 | 1100 | 1110 | 1110 |
| 31695 | 1001 | 0000 | 0000 | 1011 | 1001 | 1011 | 1111 |
| 31699 | 0011 | 0000 | 0000 | 1011 | 0011 | 1111 | 0111 |
| 31705 | 1100 | 0000 | 0000 | 1101 | 1101 | 0000 | 1111 |
| 31710 | 1100 | 0000 | 0000 | 1110 | 1110 | 1000 | 1111 |
| 31715 | 1010 | 0000 | 0000 | 1011 | 1011 | 1010 | 1111 |
| 31719 | 1001 | 0000 | 0000 | 1011 | 1011 | 1011 | 1011 |
| 31720 | 1100 | 0000 | 0000 | 1110 | 1110 | 1110 | 1111 |
| 31724 | 1010 | 0000 | 0000 | 1011 | 1011 | 1011 | 1110 |
| 31730 | 1100 | 0000 | 0000 | 1101 | 1111 | 0000 | 1111 |
| 31735 | 0101 | 0000 | 0000 | 1101 | 1111 | 0001 | 1111 |
| 31740 | 0101 | 0000 | 0000 | 1101 | 1111 | 0101 | 1111 |
| 31745 | 0101 | 0000 | 0000 | 1101 | 1111 | 0111 | 1111 |
| 31755 | 0011 | 0000 | 0000 | 1111 | 0000 | 0000 | 1111 |
| 31760 | 1100 | 0000 | 0000 | 1111 | 0000 | 1000 | 1111 |
| 31765 | 1100 | 0000 | 0000 | 1111 | 0000 | 1100 | 1111 |
| 31770 | 1100 | 0000 | 0000 | 1111 | 0000 | 1101 | 1111 |
| 31775 | 0011 | 0000 | 0000 | 1111 | 0000 | 1111 | 1111 |
| 31785 | 1100 | 0000 | 0000 | 1111 | 1000 | 1000 | 1111 |
| 31790 | 1100 | 0000 | 0000 | 1111 | 1000 | 1100 | 1111 |
| 31795 | 1100 | 0000 | 0000 | 1111 | 1000 | 1101 | 1111 |
| 31815 | 1001 | 0000 | 0000 | 1111 | 1001 | 1001 | 1111 |
| 31820 | 1100 | 0000 | 0000 | 1111 | 1100 | 1101 | 1111 |
| 31845 | 1100 | 0000 | 0000 | 1111 | 1101 | 1101 | 1111 |
| 31902 | 1100 | 0000 | 1000 | 0000 | 1000 | 0000 | 0100 |
| 31903 | 1100 | 0000 | 1000 | 0000 | 1000 | 0000 | 1100 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 31904 | 1100 | 0000 | 0100 | 0000 | 1000 | 0000 | 1101 |
| 31905 | 1100 | 0000 | 1000 | 0000 | 1000 | 0000 | 1111 |
| 31907 | 0101 | 0000 | 0001 | 0000 | 0001 | 0001 | 0001 |
| 31908 | 0101 | 0000 | 0001 | 0000 | 0001 | 0001 | 0101 |
| 31909 | 1100 | 0000 | 1000 | 0000 | 0100 | 0100 | 1101 |
| 31910 | 1010 | 0000 | 1000 | 0000 | 0010 | 0010 | 1111 |
| 31912 | 0101 | 0000 | 0001 | 0000 | 0001 | 0101 | 0001 |
| 31913 | 0101 | 0000 | 0001 | 0000 | 0001 | 0101 | 0101 |
| 31914 | 1001 | 0000 | 1000 | 0000 | 1000 | 1001 | 1011 |
| 31915 | 1010 | 0000 | 1000 | 0000 | 0010 | 1010 | 1111 |
| 31917 | 1100 | 0000 | 0100 | 0000 | 1000 | 1101 | 0100 |
| 31918 | 1100 | 0000 | 0100 | 0000 | 1000 | 1101 | 1100 |
| 31919 | 1100 | 0000 | 0100 | 0000 | 1000 | 1110 | 1110 |
| 31920 | 1001 | 0000 | 0001 | 0000 | 1000 | 1011 | 1111 |
| 31922 | 0110 | 0000 | 0010 | 0000 | 0010 | 1111 | 0010 |
| 31923 | 0110 | 0000 | 0010 | 0000 | 0010 | 1111 | 0110 |
| 31924 | 1010 | 0000 | 1000 | 0000 | 0010 | 1111 | 1011 |
| 31928 | 1100 | 0000 | 1000 | 0000 | 1100 | 0000 | 1100 |
| 31929 | 1100 | 0000 | 1000 | 0000 | 1100 | 0000 | 1110 |
| 31930 | 1100 | 0000 | 1000 | 0000 | 1100 | 0000 | 1111 |
| 31933 | 0011 | 0000 | 0010 | 0000 | 0011 | 0001 | 0011 |
| 31934 | 1001 | 0000 | 0001 | 0000 | 1001 | 1000 | 1011 |
| 31935 | 0011 | 0000 | 0001 | 0000 | 0011 | 0010 | 1111 |
| 31938 | 0101 | 0000 | 0001 | 0000 | 0101 | 0101 | 0101 |
| 31939 | 1100 | 0000 | 0100 | 0000 | 1100 | 1100 | 1101 |
| 31940 | 1010 | 0000 | 1000 | 0000 | 1010 | 1010 | 1111 |
| 31943 | 1001 | 0000 | 0001 | 0000 | 1001 | 1101 | 1001 |
| 31944 | 1001 | 0000 | 0001 | 0000 | 1001 | 1101 | 1101 |
| 31945 | 1010 | 0000 | 0010 | 0000 | 1010 | 1110 | 1111 |
| 31948 | 1010 | 0000 | 1000 | 0000 | 1010 | 1111 | 1010 |
| 31949 | 1001 | 0000 | 1000 | 0000 | 1001 | 1111 | 1011 |
| 31954 | 1100 | 0000 | 1000 | 0000 | 1101 | 0000 | 1110 |
| 31955 | 1100 | 0000 | 0100 | 0000 | 1110 | 0000 | 1111 |
| 31959 | 0011 | 0000 | 0001 | 0000 | 1011 | 0001 | 1011 |
| 31960 | 0011 | 0000 | 0001 | 0000 | 1011 | 0010 | 1111 |
| 31964 | 1001 | 0000 | 0001 | 0000 | 1011 | 1001 | 1011 |
| 31965 | 1010 | 0000 | 0010 | 0000 | 1110 | 1010 | 1111 |
| 31969 | 0110 | 0000 | 0100 | 0000 | 1110 | 1110 | 1110 |
| 31970 | 1010 | 0000 | 0010 | 0000 | 1011 | 1011 | 1111 |
| 31974 | 1001 | 0000 | 1000 | 0000 | 1011 | 1111 | 1011 |
| 31980 | 1100 | 0000 | 1000 | 0000 | 1111 | 0000 | 1111 |
| 31985 | 0101 | 0000 | 0001 | 0000 | 1111 | 0001 | 1111 |
| 31990 | 0101 | 0000 | 0001 | 0000 | 1111 | 0101 | 1111 |
| 31995 | 0110 | 0000 | 0100 | 0000 | 1111 | 0111 | 1111 |
| 32007 | 1100 | 0000 | 1000 | 1000 | 0000 | 0100 | 0100 |
| 32008 | 1100 | 0000 | 1000 | 1000 | 0000 | 0100 | 1100 |
| 32009 | 1100 | 0000 | 1000 | 1000 | 0000 | 0100 | 1110 |
| 32010 | 1010 | 0000 | 1000 | 1000 | 0000 | 0010 | 1111 |
| 32013 | 1100 | 0000 | 1000 | 1000 | 0000 | 1100 | 1100 |
| 32014 | 1100 | 0000 | 1000 | 1000 | 0000 | 1100 | 1101 |
| 32015 | 1010 | 0000 | 1000 | 1000 | 0000 | 1010 | 1111 |
| 32019 | 1100 | 0000 | 0100 | 0100 | 0000 | 1101 | 1101 |
| 32020 | 0011 | 0000 | 0001 | 0001 | 0000 | 0111 | 1111 |
| 32028 | 1100 | 0000 | 1000 | 1000 | 1000 | 0000 | 1100 |
| 32029 | 0110 | 0000 | 0100 | 0100 | 0100 | 0000 | 1110 |
| 32030 | 1100 | 0000 | 1000 | 1000 | 1000 | 0000 | 1111 |
| 32032 | 0101 | 0000 | 0001 | 0001 | 0001 | 0001 | 0001 |
| 32033 | 0101 | 0000 | 0001 | 0001 | 0001 | 0001 | 0101 |
| 32034 | 0011 | 0000 | 0010 | 0010 | 0010 | 0010 | 1011 |
| 32035 | 0110 | 0000 | 0010 | 0010 | 0010 | 0010 | 1111 |
| 32037 | 0101 | 0000 | 0001 | 0001 | 0001 | 0101 | 0100 |
| 32038 | 0101 | 0000 | 0001 | 0001 | 0001 | 0101 | 0101 |
| 32039 | 1100 | 0000 | 0100 | 0100 | 0100 | 1100 | 1110 |
| 32040 | 1010 | 0000 | 0010 | 0010 | 0010 | 1010 | 1111 |
| 32042 | 0101 | 0000 | 0001 | 0001 | 0001 | 1101 | 0100 |
| 32043 | 1100 | 0000 | 1000 | 1000 | 1000 | 1110 | 1111 |
| 32044 | 0011 | 0000 | 0010 | 0010 | 0010 | 0111 | 0111 |
| 32045 | 0110 | 0000 | 0100 | 0100 | 0100 | 0111 | 1111 |
| 32047 | 1100 | 0000 | 1000 | 1000 | 1000 | 1111 | 0100 |
| 32048 | 1100 | 0000 | 1000 | 1000 | 1000 | 1111 | 1100 |
| 32049 | 1100 | 0000 | 1000 | 1000 | 1000 | 1111 | 1101 |
| 32053 | 1010 | 0000 | 1000 | 1000 | 1010 | 0000 | 1010 |
| 32054 | 1100 | 0000 | 1000 | 1000 | 1100 | 0000 | 1110 |
| 32055 | 1100 | 0000 | 1000 | 1000 | 1100 | 0000 | 1111 |
| 32057 | 0101 | 0000 | 0001 | 0001 | 0101 | 0001 | 0001 |
| 32058 | 0101 | 0000 | 0001 | 0001 | 0101 | 0001 | 0101 |
| 32059 | 0011 | 0000 | 0010 | 0010 | 0011 | 0010 | 0111 |
| 32060 | 1100 | 0000 | 1000 | 1000 | 1100 | 0100 | 1111 |
| 32062 | 0101 | 0000 | 0001 | 0001 | 0101 | 0101 | 0100 |
| 32063 | 0101 | 0000 | 0001 | 0001 | 0101 | 0101 | 0101 |
| 32064 | 1001 | 0000 | 0001 | 0001 | 1001 | 1001 | 1101 |
| 32065 | 0110 | 0000 | 0010 | 0010 | 0110 | 0110 | 1111 |
| 32067 | 1100 | 0000 | 0100 | 0100 | 1100 | 1110 | 0100 |
| 32068 | 0101 | 0000 | 0100 | 0100 | 0101 | 1101 | 0101 |
| 32069 | 0011 | 0000 | 0010 | 0010 | 0011 | 1011 | 1011 |
| 32070 | 0101 | 0000 | 0001 | 0001 | 0101 | 0111 | 1111 |
| 32072 | 1010 | 0000 | 1000 | 1000 | 1010 | 1111 | 0010 |
| 32073 | 1010 | 0000 | 1000 | 1000 | 1010 | 1111 | 1010 |
| 32074 | 1100 | 0000 | 1000 | 1000 | 1100 | 1111 | 1101 |
| 32078 | 1100 | 0000 | 1000 | 1000 | 1101 | 0000 | 1100 |
| 32079 | 1100 | 0000 | 1000 | 1000 | 1110 | 0000 | 1100 |
| 32080 | 0011 | 0000 | 0010 | 0010 | 1011 | 0000 | 1111 |
| 32082 | 1001 | 0000 | 0001 | 0001 | 1101 | 0001 | 0001 |
| 32083 | 0101 | 0000 | 0100 | 0100 | 1101 | 0100 | 0101 |
| 32084 | 1010 | 0000 | 0010 | 0010 | 1011 | 0010 | 1011 |
| 32085 | 1100 | 0000 | 1000 | 1000 | 1110 | 0100 | 1111 |
| 32087 | 1001 | 0000 | 0001 | 0001 | 1101 | 1001 | 0001 |
| 32088 | 1100 | 0000 | 0100 | 0100 | 1101 | 1100 | 1100 |
| 32089 | 0101 | 0000 | 0100 | 0100 | 1101 | 0101 | 1101 |
| 32090 | 0110 | 0000 | 0010 | 0010 | 1110 | 0110 | 1111 |
| 32092 | 1100 | 0000 | 0100 | 0100 | 1101 | 1101 | 1000 |
| 32093 | 1010 | 0000 | 0010 | 0010 | 1011 | 1011 | 1010 |
| 32094 | 1100 | 0000 | 0100 | 0100 | 1110 | 1110 | 1110 |
| 32095 | 0101 | 0000 | 0001 | 0001 | 0111 | 0111 | 1111 |
| 32097 | 1100 | 0000 | 1000 | 1000 | 1101 | 1111 | 0100 |
| 32098 | 0110 | 0000 | 0100 | 0100 | 0111 | 1111 | 0110 |
| 32099 | 1100 | 0000 | 1000 | 1000 | 1110 | 1111 | 1101 |
| 32103 | 0011 | 0000 | 0001 | 0001 | 1111 | 0000 | 0011 |
| 32104 | 1010 | 0000 | 1000 | 1000 | 1111 | 0000 | 1011 |
| 32105 | 1100 | 0000 | 1000 | 1000 | 1111 | 0000 | 1111 |
| 32107 | 1100 | 0000 | 1000 | 1000 | 1111 | 0100 | 0100 |
| 32108 | 0110 | 0000 | 0010 | 0010 | 1111 | 0110 | 0110 |
| 32109 | 1100 | 0000 | 1000 | 1000 | 1111 | 1000 | 1110 |
| 32110 | 0011 | 0000 | 0001 | 0001 | 1111 | 0010 | 1111 |
| 32112 | 0110 | 0000 | 0010 | 0010 | 1111 | 0110 | 0010 |
| 32113 | 1100 | 0000 | 1000 | 1000 | 1111 | 1100 | 1100 |
| 32114 | 1100 | 0000 | 1000 | 1000 | 1111 | 1100 | 1101 |
| 32115 | 0110 | 0000 | 0010 | 0010 | 1111 | 0110 | 1111 |
| 32117 | 1100 | 0000 | 1000 | 1000 | 1111 | 1110 | 0100 |
| 32118 | 1100 | 0000 | 0100 | 0100 | 1111 | 1110 | 1100 |
| 32119 | 1100 | 0000 | 0100 | 0100 | 1111 | 1101 | 1101 |
| 32133 | 1100 | 0000 | 1000 | 1100 | 0000 | 0100 | 1100 |
| 32134 | 1100 | 0000 | 1000 | 1100 | 0000 | 0100 | 1110 |
| 32135 | 1010 | 0000 | 1000 | 1010 | 0000 | 0010 | 1111 |
| 32137 | 1100 | 0000 | 1000 | 1100 | 0000 | 1100 | 0100 |
| 32138 | 1100 | 0000 | 1000 | 1100 | 0000 | 1100 | 1100 |
| 32139 | 1100 | 0000 | 0100 | 1100 | 0000 | 1100 | 1101 |
| 32140 | 1010 | 0000 | 1000 | 1010 | 0000 | 1010 | 1111 |
| 32142 | 1010 | 0000 | 1000 | 1010 | 0000 | 1110 | 0010 |
| 32143 | 0101 | 0000 | 0100 | 0101 | 0000 | 1101 | 0101 |
| 32144 | 0101 | 0000 | 0100 | 0101 | 0000 | 1101 | 1101 |
| 32145 | 0011 | 0000 | 0001 | 0011 | 0000 | 0111 | 1111 |
| 32147 | 1010 | 0000 | 1000 | 1010 | 0000 | 1111 | 0010 |
| 32148 | 1010 | 0000 | 1000 | 1010 | 0000 | 1111 | 1010 |
| 32149 | 0011 | 0000 | 0001 | 0011 | 0000 | 1111 | 0111 |
| 32153 | 1100 | 0000 | 1000 | 1100 | 0100 | 0000 | 1100 |
| 32154 | 1100 | 0000 | 1000 | 1100 | 1000 | 0000 | 1110 |
| 32155 | 1010 | 0000 | 1000 | 1010 | 0010 | 0000 | 1111 |
| 32158 | 0101 | 0000 | 0001 | 0101 | 0001 | 0001 | 0101 |
| 32159 | 0011 | 0000 | 0001 | 0011 | 0010 | 0010 | 0111 |
| 32160 | 0110 | 0000 | 0010 | 0110 | 0010 | 0010 | 1111 |
| 32162 | 0101 | 0000 | 0001 | 0101 | 0100 | 0101 | 0100 |
| 32163 | 0101 | 0000 | 0001 | 0101 | 0100 | 0101 | 0101 |
| 32164 | 0101 | 0000 | 0001 | 0101 | 0001 | 0101 | 1101 |
| 32165 | 1100 | 0000 | 1000 | 1100 | 1000 | 1100 | 1111 |
| 32167 | 0101 | 0000 | 0001 | 0101 | 0001 | 1101 | 0100 |
| 32168 | 0101 | 0000 | 0001 | 0101 | 0001 | 1101 | 0101 |
| 32169 | 1100 | 0000 | 0100 | 1100 | 0100 | 1101 | 1101 |
| 32170 | 0101 | 0000 | 0001 | 0101 | 0100 | 0111 | 1111 |
| 32172 | 1100 | 0000 | 1000 | 1100 | 0100 | 1111 | 0100 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 32173 | 1100 | 0000 | 1000 | 1100 | 0100 | 1111 | 1100 |
| 32174 | 1100 | 0000 | 1000 | 1100 | 1000 | 1111 | 1110 |
| 32178 | 1100 | 0000 | 1000 | 1100 | 1100 | 0000 | 1100 |
| 32179 | 1100 | 0000 | 0100 | 1100 | 1100 | 0000 | 1110 |
| 32180 | 1100 | 0000 | 1000 | 1100 | 1100 | 0000 | 1111 |
| 32183 | 0101 | 0000 | 0001 | 0101 | 0101 | 0001 | 0101 |
| 32184 | 0101 | 0000 | 0100 | 0101 | 0101 | 0100 | 0111 |
| 32185 | 0110 | 0000 | 0010 | 0110 | 0110 | 0010 | 1111 |
| 32187 | 0101 | 0000 | 0001 | 0101 | 0101 | 0101 | 0100 |
| 32188 | 0101 | 0000 | 0001 | 0101 | 0101 | 0101 | 0101 |
| 32189 | 1001 | 0000 | 0001 | 1001 | 1001 | 1001 | 1101 |
| 32190 | 0110 | 0000 | 0010 | 0110 | 0110 | 0110 | 1111 |
| 32192 | 0101 | 0000 | 0001 | 0101 | 0101 | 1101 | 0001 |
| 32193 | 0011 | 0000 | 0001 | 0011 | 0011 | 1011 | 0011 |
| 32194 | 1001 | 0000 | 0001 | 1001 | 1001 | 1011 | 1011 |
| 32195 | 0110 | 0000 | 0010 | 0110 | 0110 | 1110 | 1111 |
| 32197 | 1100 | 0000 | 1000 | 1100 | 1100 | 1111 | 0100 |
| 32198 | 1100 | 0000 | 1000 | 1100 | 1100 | 1111 | 1100 |
| 32199 | 1100 | 0000 | 0100 | 1100 | 1100 | 1111 | 1101 |
| 32203 | 0011 | 0000 | 0010 | 0011 | 1011 | 0000 | 0011 |
| 32204 | 1100 | 0000 | 1000 | 1100 | 1110 | 0000 | 1110 |
| 32205 | 1100 | 0000 | 0100 | 1100 | 1101 | 0000 | 1111 |
| 32208 | 0101 | 0000 | 0100 | 0101 | 1101 | 0001 | 0101 |
| 32209 | 0101 | 0000 | 0001 | 0101 | 1101 | 0001 | 0111 |
| 32210 | 1100 | 0000 | 0100 | 1100 | 1101 | 0100 | 1111 |
| 32212 | 0101 | 0000 | 0001 | 0101 | 0111 | 0101 | 0100 |
| 32213 | 1100 | 0000 | 0100 | 1100 | 1101 | 1100 | 1100 |
| 32214 | 0101 | 0000 | 0100 | 0101 | 1101 | 0101 | 0111 |
| 32215 | 1010 | 0000 | 1000 | 1010 | 1110 | 1010 | 1111 |
| 32217 | 1100 | 0000 | 0100 | 1100 | 1101 | 1101 | 0100 |
| 32218 | 1001 | 0000 | 0001 | 1001 | 1101 | 1101 | 1001 |
| 32219 | 1100 | 0000 | 0100 | 1100 | 1101 | 1101 | 1101 |
| 32222 | 1100 | 0000 | 0100 | 1100 | 1101 | 1111 | 0100 |
| 32223 | 1100 | 0000 | 1000 | 1100 | 1110 | 1111 | 1100 |
| 32228 | 0011 | 0000 | 0001 | 0011 | 1111 | 0000 | 0011 |
| 32229 | 0110 | 0000 | 0010 | 0110 | 1111 | 0000 | 1110 |
| 32230 | 1100 | 0000 | 1000 | 1100 | 1111 | 0000 | 1111 |
| 32233 | 0110 | 0000 | 0010 | 0110 | 1111 | 0010 | 0110 |
| 32234 | 0011 | 0000 | 0010 | 0011 | 1111 | 0001 | 1011 |
| 32235 | 0011 | 0000 | 0001 | 0011 | 1111 | 0010 | 1111 |
| 32237 | 0011 | 0000 | 0010 | 0011 | 1111 | 0011 | 0010 |
| 32238 | 0110 | 0000 | 0010 | 0110 | 1111 | 0110 | 0110 |
| 32239 | 1001 | 0000 | 1000 | 1001 | 1111 | 1001 | 1011 |
| 32240 | 1010 | 0000 | 1000 | 1010 | 1111 | 1010 | 1111 |
| 32242 | 0110 | 0000 | 0100 | 0110 | 1111 | 1110 | 0010 |
| 32243 | 1010 | 0000 | 0010 | 1010 | 1111 | 1011 | 1010 |
| 32259 | 1100 | 0000 | 0100 | 1110 | 0000 | 0100 | 1110 |
| 32260 | 1001 | 0000 | 0001 | 1101 | 0000 | 1000 | 1111 |
| 32263 | 1100 | 0000 | 1000 | 1101 | 0000 | 1100 | 1100 |
| 32264 | 1001 | 0000 | 1000 | 1011 | 0000 | 1001 | 1101 |
| 32265 | 1010 | 0000 | 1000 | 1011 | 0000 | 1010 | 1111 |
| 32267 | 1100 | 0000 | 0100 | 1110 | 0000 | 1110 | 1000 |
| 32268 | 1100 | 0000 | 0100 | 1101 | 0000 | 1110 | 1100 |
| 32269 | 0101 | 0000 | 0100 | 1101 | 0000 | 0111 | 0111 |
| 32270 | 1010 | 0000 | 0010 | 1011 | 0000 | 1110 | 1111 |
| 32272 | 1001 | 0000 | 0001 | 1101 | 0000 | 1111 | 1000 |
| 32273 | 1010 | 0000 | 1000 | 1011 | 0000 | 1111 | 1010 |
| 32274 | 1010 | 0000 | 0010 | 1011 | 0000 | 1111 | 1110 |
| 32278 | 1100 | 0000 | 1000 | 1110 | 1000 | 0000 | 1100 |
| 32279 | 1100 | 0000 | 0100 | 1110 | 0100 | 0000 | 1110 |
| 32280 | 0101 | 0000 | 0001 | 0111 | 0001 | 0000 | 1111 |
| 32283 | 1001 | 0000 | 1000 | 1101 | 0001 | 0001 | 1001 |
| 32284 | 0101 | 0000 | 0001 | 1101 | 0001 | 0001 | 0111 |
| 32285 | 0110 | 0000 | 0010 | 1110 | 0100 | 0100 | 1111 |
| 32288 | 0101 | 0000 | 0001 | 0111 | 0001 | 0101 | 0101 |
| 32289 | 0101 | 0000 | 0001 | 0111 | 0100 | 0101 | 0111 |
| 32290 | 1100 | 0000 | 1000 | 1110 | 0100 | 1100 | 1111 |
| 32292 | 0011 | 0000 | 0001 | 0111 | 0010 | 1011 | 0001 |
| 32293 | 0101 | 0000 | 0001 | 1101 | 0001 | 1101 | 0101 |
| 32294 | 0101 | 0000 | 0001 | 0111 | 0100 | 0111 | 0111 |
| 32295 | 1100 | 0000 | 0100 | 1110 | 0100 | 1110 | 1111 |
| 32297 | 1100 | 0000 | 1000 | 1110 | 1000 | 1111 | 1000 |
| 32298 | 1010 | 0000 | 0010 | 1110 | 1000 | 1111 | 1010 |
| 32299 | 1100 | 0000 | 0100 | 1110 | 0100 | 1111 | 1101 |
| 32303 | 1100 | 0000 | 0100 | 1110 | 1100 | 0000 | 1100 |
| 32304 | 1100 | 0000 | 0100 | 1101 | 1100 | 0000 | 1110 |
| 32305 | 1100 | 0000 | 0100 | 1101 | 1100 | 0000 | 1111 |
| 32308 | 0110 | 0000 | 0100 | 0111 | 0110 | 0100 | 0110 |
| 32309 | 1001 | 0000 | 0001 | 1011 | 1001 | 0001 | 1011 |
| 32310 | 0110 | 0000 | 0010 | 0111 | 0110 | 0010 | 1111 |
| 32313 | 0110 | 0000 | 0100 | 0111 | 0110 | 0110 | 0110 |
| 32314 | 0011 | 0000 | 0001 | 1011 | 0011 | 0011 | 1011 |
| 32315 | 0110 | 0000 | 0010 | 1110 | 0110 | 0110 | 1111 |
| 32317 | 0101 | 0000 | 0001 | 1111 | 0101 | 0111 | 0100 |
| 32318 | 0011 | 0000 | 0001 | 1011 | 0011 | 0111 | 0011 |
| 32319 | 0101 | 0000 | 0100 | 0111 | 0101 | 0111 | 0111 |
| 32322 | 1100 | 0000 | 1000 | 1110 | 1100 | 1111 | 0100 |
| 32323 | 0110 | 0000 | 0100 | 1110 | 0110 | 1111 | 0110 |
| 32324 | 1100 | 0000 | 0100 | 1101 | 1100 | 1111 | 1101 |
| 32328 | 1010 | 0000 | 0010 | 1110 | 1110 | 0000 | 1010 |
| 32329 | 1001 | 0000 | 0001 | 1101 | 1101 | 0000 | 1011 |
| 32330 | 1010 | 0000 | 1000 | 1011 | 1011 | 0000 | 1111 |
| 32333 | 0110 | 0000 | 0100 | 0111 | 0111 | 0100 | 0110 |
| 32334 | 0110 | 0000 | 0100 | 1110 | 1110 | 0100 | 0111 |
| 32335 | 1100 | 0000 | 0100 | 1110 | 1110 | 0100 | 1111 |
| 32338 | 0101 | 0000 | 0100 | 0111 | 0111 | 0101 | 0101 |
| 32339 | 0101 | 0000 | 0100 | 0111 | 0111 | 0101 | 0111 |
| 32340 | 0101 | 0000 | 0100 | 0111 | 0111 | 0101 | 1111 |
| 32342 | 0101 | 0000 | 0001 | 0111 | 0111 | 0111 | 0100 |
| 32343 | 1001 | 0000 | 0001 | 1011 | 1011 | 1011 | 1001 |
| 32344 | 1100 | 0000 | 0100 | 1110 | 1110 | 1110 | 1110 |
| 32353 | 1010 | 0000 | 1000 | 1011 | 1111 | 0000 | 1010 |
| 32354 | 1010 | 0000 | 0010 | 1011 | 1111 | 0000 | 1110 |
| 32355 | 1100 | 0000 | 1000 | 1101 | 1111 | 0000 | 1111 |
| 32358 | 1100 | 0000 | 1000 | 1110 | 1111 | 0100 | 1100 |
| 32359 | 0110 | 0000 | 0010 | 0111 | 1111 | 0010 | 0111 |
| 32363 | 0110 | 0000 | 0010 | 0111 | 1111 | 0110 | 0110 |
| 32367 | 1100 | 0000 | 1000 | 1101 | 1111 | 1110 | 0100 |
| 32385 | 1100 | 0000 | 1000 | 1111 | 0000 | 1000 | 1111 |
| 32388 | 1010 | 0000 | 1000 | 1111 | 0000 | 1010 | 1010 |
| 32389 | 1001 | 0000 | 1000 | 1111 | 0000 | 1001 | 1011 |
| 32390 | 1100 | 0000 | 1000 | 1111 | 0000 | 1100 | 1111 |
| 32393 | 1100 | 0000 | 0100 | 1111 | 0000 | 1110 | 1100 |
| 32394 | 1010 | 0000 | 0010 | 1111 | 0000 | 1011 | 1011 |
| 32395 | 1100 | 0000 | 0100 | 1111 | 0000 | 1110 | 1111 |
| 32397 | 1100 | 0000 | 1000 | 1111 | 0000 | 1111 | 1000 |
| 32398 | 1100 | 0000 | 1000 | 1111 | 0000 | 1111 | 1100 |
| 32399 | 1100 | 0000 | 0100 | 1111 | 0000 | 1111 | 1110 |
| 32403 | 1100 | 0000 | 1000 | 1111 | 1000 | 0000 | 1100 |
| 32404 | 0011 | 0000 | 0001 | 1111 | 0010 | 0000 | 0111 |
| 32405 | 1100 | 0000 | 1000 | 1111 | 1000 | 0000 | 1111 |
| 32408 | 0101 | 0000 | 0001 | 1111 | 0001 | 0001 | 0101 |
| 32409 | 0011 | 0000 | 0010 | 1111 | 0001 | 0001 | 1011 |
| 32410 | 0110 | 0000 | 0010 | 1111 | 0010 | 0010 | 1111 |
| 32413 | 0101 | 0000 | 0001 | 1111 | 0001 | 0101 | 0101 |
| 32414 | 0110 | 0000 | 0010 | 1111 | 0100 | 0110 | 0111 |
| 32415 | 0110 | 0000 | 0010 | 1111 | 0010 | 0110 | 1111 |
| 32418 | 1100 | 0000 | 0100 | 1111 | 1000 | 1101 | 1100 |
| 32419 | 1001 | 0000 | 0001 | 1111 | 1000 | 1011 | 1011 |
| 32422 | 1100 | 0000 | 1000 | 1111 | 1000 | 1111 | 0100 |
| 32423 | 1100 | 0000 | 1000 | 1111 | 1000 | 1111 | 1100 |
| 32424 | 0011 | 0000 | 0010 | 1111 | 0010 | 1111 | 1011 |
| 32428 | 1010 | 0000 | 1000 | 1111 | 1010 | 0000 | 1010 |
| 32429 | 1001 | 0000 | 1000 | 1111 | 1001 | 0000 | 1011 |
| 32430 | 1100 | 0000 | 1000 | 1111 | 1100 | 0000 | 1111 |
| 32433 | 1001 | 0000 | 1000 | 1111 | 1001 | 0001 | 1001 |
| 32434 | 1001 | 0000 | 0001 | 1111 | 1001 | 1000 | 1011 |
| 32435 | 0011 | 0000 | 0001 | 1111 | 0011 | 0010 | 1111 |
| 32438 | 0101 | 0000 | 0001 | 1111 | 0101 | 0101 | 0101 |
| 32439 | 1001 | 0000 | 1000 | 1111 | 1001 | 1001 | 1011 |
| 32440 | 0011 | 0000 | 0001 | 1111 | 0011 | 0011 | 1111 |
| 32443 | 1001 | 0000 | 0001 | 1111 | 1001 | 1101 | 1001 |
| 32444 | 1001 | 0000 | 0001 | 1111 | 1001 | 1101 | 1101 |
| 32447 | 1010 | 0000 | 1000 | 1111 | 1010 | 1111 | 0010 |
| 32448 | 1010 | 0000 | 1000 | 1111 | 1010 | 1111 | 1010 |
| 32449 | 1001 | 0000 | 1000 | 1111 | 1001 | 1111 | 1011 |
| 32553 | 1100 | 0000 | 1100 | 0000 | 1100 | 0000 | 1100 |
| 32554 | 1100 | 0000 | 1100 | 0000 | 1100 | 0000 | 1110 |
| 32555 | 1100 | 0000 | 1100 | 0000 | 1100 | 0000 | 1111 |
| 32558 | 0011 | 0000 | 0011 | 0000 | 0011 | 0001 | 0011 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 32559 | 1001 | 0000 | 1001 | 0000 | 1001 | 1000 | 1011 |
| 32560 | 0011 | 0000 | 0011 | 0000 | 0011 | 0010 | 1111 |
| 32563 | 0101 | 0000 | 0101 | 0000 | 0101 | 0101 | 0111 |
| 32564 | 0101 | 0000 | 0101 | 0000 | 0101 | 0101 | 0111 |
| 32565 | 1010 | 0000 | 1010 | 0000 | 1010 | 1010 | 1111 |
| 32568 | 1100 | 0000 | 1100 | 0000 | 1100 | 1101 | 1100 |
| 32569 | 1001 | 0000 | 1001 | 0000 | 1001 | 1101 | 1101 |
| 32573 | 1010 | 0000 | 1010 | 0000 | 1010 | 1111 | 1010 |
| 32579 | 1100 | 0000 | 1100 | 0000 | 1101 | 0000 | 1110 |
| 32580 | 1100 | 0000 | 1100 | 0000 | 1101 | 0000 | 1111 |
| 32584 | 0101 | 0000 | 0101 | 0000 | 1101 | 0001 | 0111 |
| 32585 | 1010 | 0000 | 1010 | 0000 | 1011 | 0010 | 1111 |
| 32589 | 0101 | 0000 | 0101 | 0000 | 0111 | 0101 | 0111 |
| 32590 | 1010 | 0000 | 1010 | 0000 | 1011 | 1010 | 1111 |
| 32594 | 1100 | 0000 | 1100 | 0000 | 1101 | 1101 | 1101 |
| 32605 | 1100 | 0000 | 1100 | 0000 | 1111 | 0000 | 1111 |
| 32610 | 0101 | 0000 | 0101 | 0000 | 1111 | 0001 | 1111 |
| 32615 | 0101 | 0000 | 0101 | 0000 | 1111 | 0101 | 1111 |
| 32658 | 0101 | 0000 | 0101 | 0001 | 0001 | 0001 | 0101 |
| 32659 | 1001 | 0000 | 1001 | 0001 | 0001 | 0001 | 1011 |
| 32660 | 0110 | 0000 | 0110 | 0010 | 0010 | 0010 | 1111 |
| 32663 | 0101 | 0000 | 0101 | 0001 | 0001 | 0101 | 0101 |
| 32664 | 0101 | 0000 | 0101 | 0100 | 0100 | 0101 | 0111 |
| 32665 | 1100 | 0000 | 1100 | 0100 | 0100 | 1100 | 1111 |
| 32668 | 1001 | 0000 | 1001 | 0001 | 0001 | 1101 | 1001 |
| 32669 | 0101 | 0000 | 0101 | 0001 | 0001 | 0111 | 0111 |
| 32673 | 1100 | 0000 | 1100 | 1000 | 1000 | 1111 | 1100 |
| 32679 | 1010 | 0000 | 1010 | 0010 | 1010 | 0000 | 1110 |
| 32680 | 1100 | 0000 | 1100 | 1000 | 1100 | 0000 | 1111 |
| 32683 | 0101 | 0000 | 0101 | 0001 | 0101 | 0001 | 0101 |
| 32684 | 0101 | 0000 | 0101 | 0001 | 0101 | 0001 | 0111 |
| 32685 | 1100 | 0000 | 1100 | 0100 | 1100 | 0100 | 1111 |
| 32688 | 0101 | 0000 | 0101 | 0001 | 0101 | 0101 | 0101 |
| 32689 | 0101 | 0000 | 0101 | 0100 | 0101 | 0101 | 0111 |
| 32690 | 1010 | 0000 | 1010 | 0010 | 1010 | 1010 | 1111 |
| 32693 | 0101 | 0000 | 0101 | 0100 | 0101 | 1101 | 0101 |
| 32694 | 0101 | 0000 | 0101 | 0100 | 1101 | 1101 | 1101 |
| 32698 | 1010 | 0000 | 1010 | 1000 | 1010 | 1111 | 1010 |
| 32704 | 1100 | 0000 | 1100 | 1000 | 1110 | 0000 | 1101 |
| 32705 | 1100 | 0000 | 1100 | 0100 | 1110 | 0000 | 1111 |
| 32708 | 1001 | 0000 | 1001 | 0001 | 1101 | 0001 | 1001 |
| 32709 | 0101 | 0000 | 0101 | 0001 | 0111 | 0001 | 0111 |
| 32710 | 1010 | 0000 | 1010 | 0010 | 1110 | 0010 | 1111 |
| 32713 | 0101 | 0000 | 0101 | 0100 | 1101 | 0101 | 0101 |
| 32714 | 1100 | 0000 | 1100 | 0100 | 1101 | 1100 | 1111 |
| 32715 | 0101 | 0000 | 0101 | 0001 | 0111 | 0101 | 1111 |
| 32718 | 1001 | 0000 | 1001 | 0001 | 1011 | 1011 | 1001 |
| 32719 | 0101 | 0000 | 0101 | 0100 | 1101 | 1101 | 1101 |
| 32729 | 1001 | 0000 | 1001 | 0001 | 1111 | 0000 | 1011 |
| 32730 | 1100 | 0000 | 1100 | 1000 | 1111 | 0000 | 1111 |
| 32733 | 0110 | 0000 | 0110 | 0010 | 1111 | 0010 | 0110 |
| 32734 | 1100 | 0000 | 1100 | 0100 | 1111 | 0100 | 1110 |
| 32735 | 1010 | 0000 | 1010 | 0010 | 1111 | 0010 | 1111 |
| 32738 | 0110 | 0000 | 0110 | 0010 | 1111 | 0110 | 0110 |
| 32739 | 1100 | 0000 | 1100 | 0100 | 1111 | 1100 | 1101 |
| 32763 | 1100 | 0000 | 1100 | 1100 | 0000 | 1100 | 1100 |
| 32764 | 1100 | 0000 | 1100 | 1100 | 0000 | 1100 | 1101 |
| 32765 | 1010 | 0000 | 1010 | 1010 | 0000 | 1010 | 1111 |
| 32769 | 1100 | 0000 | 1100 | 1100 | 0000 | 1110 | 1110 |
| 32784 | 0011 | 0000 | 0011 | 0011 | 0001 | 0001 | 0111 |
| 32785 | 1100 | 0000 | 1100 | 1100 | 0100 | 0100 | 1111 |
| 32788 | 0101 | 0000 | 0101 | 0101 | 0100 | 0101 | 0101 |
| 32789 | 0110 | 0000 | 0110 | 0110 | 0100 | 0110 | 0111 |
| 32790 | 0110 | 0000 | 0110 | 0110 | 0010 | 0110 | 1111 |
| 32793 | 1100 | 0000 | 1100 | 1100 | 0100 | 1101 | 1100 |
| 32794 | 0011 | 0000 | 0011 | 0011 | 0001 | 0111 | 1111 |
| 32798 | 1100 | 0000 | 1100 | 1100 | 0100 | 1111 | 1100 |
| 32804 | 1100 | 0000 | 1100 | 1100 | 1100 | 0000 | 1101 |
| 32805 | 1010 | 0000 | 1010 | 1010 | 1010 | 0000 | 1111 |
| 32809 | 0110 | 0000 | 0110 | 0110 | 0110 | 0100 | 0111 |
| 32810 | 1100 | 0000 | 1100 | 1100 | 1100 | 0100 | 1111 |
| 32813 | 0101 | 0000 | 0101 | 0101 | 0101 | 0101 | 0101 |
| 32814 | 0101 | 0000 | 0101 | 0101 | 0101 | 0101 | 0111 |
| 32815 | 0110 | 0000 | 0110 | 0110 | 0110 | 0110 | 1111 |
| 32818 | 0101 | 0000 | 0101 | 0101 | 0101 | 0111 | 0101 |
| 32819 | 0101 | 0000 | 0101 | 0101 | 0101 | 0111 | 0111 |
| 32823 | 1100 | 0000 | 1100 | 1100 | 1100 | 1111 | 1100 |
| 32829 | 1100 | 0000 | 1100 | 1100 | 1110 | 0000 | 1101 |
| 32830 | 1100 | 0000 | 1100 | 1100 | 1110 | 0000 | 1111 |
| 32834 | 0011 | 0000 | 0011 | 0011 | 0111 | 0001 | 0111 |
| 32835 | 0110 | 0000 | 0110 | 0110 | 0111 | 0100 | 1111 |
| 32838 | 0101 | 0000 | 0101 | 0101 | 0111 | 0101 | 0101 |
| 32839 | 0101 | 0000 | 0101 | 0101 | 0111 | 0101 | 0111 |
| 32843 | 0101 | 0000 | 0101 | 0101 | 0111 | 0111 | 0101 |
| 32844 | 0101 | 0000 | 0101 | 0101 | 0111 | 0111 | 0111 |
| 32854 | 1001 | 0000 | 1001 | 1001 | 1111 | 0000 | 1011 |
| 32855 | 1001 | 0000 | 1001 | 1001 | 1111 | 0000 | 1111 |
| 32859 | 0011 | 0000 | 0011 | 0011 | 1111 | 0001 | 1011 |
| 32863 | 1100 | 0000 | 1100 | 1100 | 1111 | 1100 | 1100 |
| 32889 | 1010 | 0000 | 1010 | 1011 | 0000 | 1010 | 1011 |
| 32890 | 1010 | 0000 | 1010 | 1011 | 0000 | 1010 | 1111 |
| 32893 | 1010 | 0000 | 1010 | 1011 | 0000 | 1110 | 1010 |
| 32894 | 1100 | 0000 | 1100 | 1101 | 0000 | 1110 | 1110 |
| 32898 | 1010 | 0000 | 1010 | 1011 | 0000 | 1111 | 1010 |
| 32909 | 0101 | 0000 | 0101 | 0111 | 0001 | 0001 | 0111 |
| 32910 | 1100 | 0000 | 1100 | 1110 | 0100 | 0100 | 1111 |
| 32914 | 0101 | 0000 | 0101 | 0111 | 0001 | 0101 | 0111 |
| 32915 | 0110 | 0000 | 0110 | 0111 | 0100 | 0110 | 1111 |
| 32918 | 0011 | 0000 | 0011 | 1011 | 0001 | 0111 | 0011 |
| 32919 | 0011 | 0000 | 0011 | 1011 | 0001 | 0111 | 0111 |
| 32923 | 1100 | 0000 | 1100 | 1110 | 1000 | 1111 | 1100 |
| 32929 | 1100 | 0000 | 1100 | 1101 | 1100 | 0000 | 1101 |
| 32930 | 1010 | 0000 | 1010 | 1011 | 1010 | 0000 | 1111 |
| 32934 | 0011 | 0000 | 0011 | 0111 | 0011 | 0001 | 0111 |
| 32935 | 0011 | 0000 | 0011 | 0111 | 0011 | 0010 | 1111 |
| 32939 | 0101 | 0000 | 0101 | 0111 | 0101 | 0101 | 0111 |
| 32943 | 0101 | 0000 | 0101 | 0111 | 0101 | 0111 | 0101 |
| 32944 | 0101 | 0000 | 0101 | 0111 | 0101 | 0111 | 0111 |
| 32954 | 1001 | 0000 | 1001 | 1101 | 1101 | 0000 | 1011 |
| 32955 | 1010 | 0000 | 1010 | 1011 | 1011 | 0000 | 1111 |
| 32959 | 0011 | 0000 | 0011 | 0111 | 0111 | 0001 | 0111 |
| 32960 | 0011 | 0000 | 0011 | 1011 | 1011 | 0010 | 1111 |
| 32964 | 0101 | 0000 | 0101 | 0111 | 0111 | 0101 | 0111 |
| 32968 | 0101 | 0000 | 0101 | 0111 | 0111 | 0111 | 0101 |
| 32969 | 0101 | 0000 | 0101 | 0111 | 0111 | 0111 | 0111 |
| 33015 | 1100 | 0000 | 1100 | 1111 | 0000 | 1100 | 1111 |
| 33019 | 1001 | 0000 | 1001 | 1111 | 0000 | 1011 | 1011 |
| 33023 | 1100 | 0000 | 1100 | 1111 | 0000 | 1111 | 1100 |
| 33034 | 0101 | 0000 | 0101 | 1111 | 0001 | 0001 | 1101 |
| 33039 | 1100 | 0000 | 1100 | 1111 | 0100 | 1100 | 1101 |
| 33048 | 1010 | 0000 | 1010 | 1111 | 0010 | 1111 | 1010 |
| 33204 | 1100 | 0000 | 1101 | 0000 | 1101 | 0000 | 1110 |
| 33205 | 1100 | 0000 | 1101 | 0000 | 1101 | 0000 | 1111 |
| 33209 | 1100 | 0000 | 1101 | 0000 | 1110 | 1000 | 1110 |
| 33210 | 1010 | 0000 | 1110 | 0000 | 1011 | 1000 | 1111 |
| 33214 | 0101 | 0000 | 1101 | 0000 | 0111 | 0101 | 0111 |
| 33219 | 1100 | 0000 | 1101 | 0000 | 1101 | 1101 | 1101 |
| 33230 | 1100 | 0000 | 1101 | 0000 | 1111 | 0000 | 1111 |
| 33235 | 0110 | 0000 | 0111 | 0000 | 1111 | 0100 | 1111 |
| 33284 | 0110 | 0000 | 0111 | 0100 | 0100 | 0100 | 0111 |
| 33285 | 0110 | 0000 | 1110 | 0010 | 0010 | 0010 | 1111 |
| 33289 | 0011 | 0000 | 0111 | 0010 | 0010 | 0011 | 0111 |
| 33294 | 0101 | 0000 | 1101 | 0001 | 0001 | 0111 | 1101 |
| 33309 | 0110 | 0000 | 0111 | 0100 | 0110 | 0100 | 0111 |
| 33310 | 1100 | 0000 | 1110 | 1000 | 1100 | 0100 | 1111 |
| 33314 | 0110 | 0000 | 0111 | 0100 | 0110 | 0110 | 0111 |
| 33319 | 0101 | 0000 | 1101 | 0001 | 0101 | 0111 | 1101 |
| 33330 | 1100 | 0000 | 1101 | 1000 | 1110 | 0000 | 1111 |
| 33334 | 0101 | 0000 | 1101 | 0001 | 0111 | 0001 | 1111 |
| 33335 | 1100 | 0000 | 1101 | 1000 | 1110 | 0100 | 1111 |
| 33339 | 0101 | 0000 | 0111 | 0100 | 0111 | 0101 | 1111 |
| 33344 | 0110 | 0000 | 1110 | 0100 | 0111 | 0111 | 0111 |
| 33355 | 1010 | 0000 | 1011 | 1000 | 1111 | 0000 | 1111 |
| 33359 | 0110 | 0000 | 1110 | 0010 | 1111 | 0010 | 0111 |
| 33410 | 0110 | 0000 | 1110 | 0110 | 0010 | 0010 | 0111 |
| 33414 | 0011 | 0000 | 1011 | 0011 | 0010 | 0011 | 1011 |
| 33419 | 0110 | 0000 | 0111 | 0110 | 0100 | 0111 | 0111 |
| 33435 | 0110 | 0000 | 0111 | 0110 | 0110 | 0010 | 1111 |
| 33439 | 0110 | 0000 | 1101 | 0101 | 0101 | 0101 | 0111 |
| 33444 | 0101 | 0000 | 1101 | 0101 | 0101 | 0111 | 0111 |

TABLE 1-continued (reduced size look-up-table)

| #Config | Cell 1 | Cell 2 | Cell 3 | Cell 4 | Cell 5 | Cell 6 | Cell 7 |
|---|---|---|---|---|---|---|---|
| 33455 | 1001 | 0000 | 1011 | 1001 | 1011 | 0000 | 1111 |
| 33464 | 0101 | 0000 | 1101 | 0101 | 0111 | 0101 | 0111 |
| 33469 | 0101 | 0000 | 1101 | 0101 | 0111 | 0111 | 0111 |
| 33519 | 1100 | 0000 | 1101 | 1101 | 0000 | 1110 | 1110 |
| 33535 | 1100 | 0000 | 1101 | 1101 | 0100 | 0100 | 1111 |
| 33544 | 0101 | 0000 | 0111 | 0111 | 0100 | 0111 | 0111 |
| 33569 | 0101 | 0000 | 1101 | 1101 | 0101 | 0111 | 0111 |
| 33580 | 1010 | 0000 | 1011 | 1011 | 1011 | 0000 | 1111 |
| 33594 | 0101 | 0000 | 0111 | 0111 | 0111 | 0111 | 0111 |
| 33855 | 0011 | 0000 | 1111 | 0000 | 1111 | 0000 | 1111 |
| 35157 | 0110 | 0010 | 0010 | 0010 | 0010 | 0010 | 0010 |
| 35158 | 0110 | 0010 | 0010 | 0010 | 0010 | 0010 | 0110 |
| 35159 | 0110 | 0010 | 0010 | 0010 | 0010 | 0010 | 0111 |
| 35163 | 0110 | 0010 | 0010 | 0010 | 0010 | 0110 | 0110 |
| 35164 | 1100 | 0100 | 0100 | 0100 | 0100 | 1100 | 1101 |
| 35169 | 0101 | 0100 | 0100 | 0100 | 0100 | 0111 | 0111 |
| 35183 | 0110 | 0010 | 0010 | 0010 | 0110 | 0010 | 0110 |
| 35184 | 0110 | 0010 | 0010 | 0010 | 0110 | 0010 | 0111 |
| 35188 | 0110 | 0010 | 0010 | 0010 | 0110 | 0110 | 0110 |
| 35189 | 0110 | 0010 | 0010 | 0010 | 0110 | 0110 | 1110 |
| 35193 | 1100 | 0100 | 0100 | 0100 | 1100 | 1110 | 1100 |
| 35194 | 1100 | 0100 | 0100 | 0100 | 1100 | 1110 | 1110 |
| 35209 | 1010 | 0010 | 0010 | 0010 | 1011 | 0010 | 1110 |
| 35214 | 0110 | 0100 | 0100 | 0100 | 0111 | 0110 | 0111 |
| 35219 | 0110 | 0010 | 0010 | 0010 | 0111 | 0111 | 0111 |
| 35283 | 0110 | 0010 | 0010 | 0110 | 0010 | 0010 | 0110 |
| 35284 | 0110 | 0010 | 0010 | 0110 | 0010 | 0010 | 0111 |
| 35288 | 0110 | 0010 | 0010 | 0110 | 0010 | 0110 | 0110 |
| 35289 | 0110 | 0010 | 0010 | 0110 | 0100 | 0110 | 1110 |
| 35293 | 1001 | 0001 | 0001 | 1001 | 0001 | 1011 | 1001 |
| 35294 | 0110 | 0100 | 0100 | 0110 | 0010 | 1110 | 1110 |
| 35309 | 1100 | 1000 | 1000 | 1100 | 1100 | 0100 | 1110 |
| 35313 | 0110 | 0010 | 0010 | 0110 | 0110 | 0110 | 0110 |
| 35314 | 1100 | 1000 | 1000 | 1100 | 1100 | 1100 | 1110 |
| 35318 | 1100 | 0100 | 0100 | 1100 | 1100 | 1110 | 1100 |
| 35319 | 1100 | 0100 | 0100 | 1100 | 1100 | 1101 | 1101 |
| 35334 | 0110 | 0100 | 0100 | 0110 | 0111 | 0010 | 1110 |
| 35339 | 1100 | 1000 | 1000 | 1100 | 1101 | 1100 | 1110 |
| 35343 | 1100 | 0100 | 0100 | 1100 | 1101 | 1101 | 1100 |
| 35409 | 0110 | 0010 | 0010 | 1110 | 0100 | 0100 | 0111 |
| 35414 | 0110 | 0100 | 0100 | 1110 | 0100 | 0110 | 0111 |
| 35419 | 0110 | 0100 | 0100 | 1110 | 0010 | 1110 | 1110 |
| 35439 | 1010 | 0010 | 0010 | 1011 | 1010 | 1010 | 1011 |
| 35808 | 0110 | 0010 | 0110 | 0010 | 0110 | 0010 | 0110 |
| 35809 | 1100 | 1000 | 1100 | 0100 | 1100 | 0100 | 1110 |
| 35813 | 0110 | 0010 | 0110 | 0010 | 0110 | 0110 | 0110 |
| 35814 | 0110 | 0010 | 0110 | 0100 | 0110 | 0110 | 0111 |
| 35818 | 0110 | 0010 | 0110 | 0010 | 0110 | 1110 | 0110 |
| 35834 | 0110 | 0100 | 0110 | 0100 | 0111 | 0100 | 0111 |
| 35839 | 1001 | 1000 | 1001 | 1000 | 1011 | 1001 | 1011 |
| 35913 | 0110 | 0010 | 0110 | 0110 | 0010 | 0110 | 0110 |
| 35914 | 0110 | 0010 | 0110 | 0110 | 0100 | 0110 | 0111 |
| 35934 | 1100 | 1000 | 1100 | 1100 | 1100 | 0100 | 1110 |
| 35938 | 0110 | 0010 | 0110 | 0110 | 0110 | 0110 | 0110 |
| 35939 | 0011 | 0001 | 0011 | 0011 | 0011 | 0011 | 1011 |
| 35943 | 0011 | 0010 | 0011 | 0011 | 0011 | 0111 | 0011 |
| 35959 | 1010 | 1000 | 1010 | 1010 | 1110 | 0010 | 1110 |
| 35963 | 0110 | 0100 | 0110 | 0110 | 1110 | 0110 | 0110 |
| 36039 | 1010 | 0010 | 1010 | 1011 | 0010 | 1010 | 1011 |
| 36043 | 0101 | 0100 | 0101 | 1101 | 0100 | 1101 | 0101 |
| 36459 | 0110 | 0100 | 0111 | 0100 | 0111 | 0100 | 0111 |
| 39063 | 0110 | 0110 | 0110 | 0110 | 0110 | 0110 | 0110 |

Figure 3:
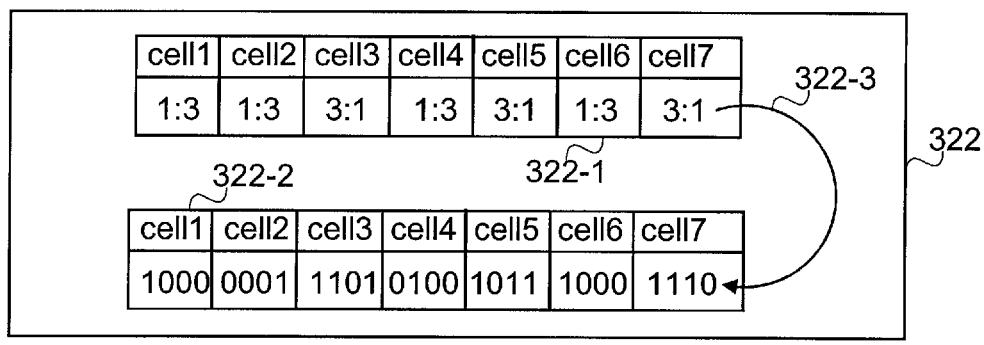
FIG. 3 shows one example of a look-up-table.

FIG. 3 illustrates another alternative for the look-up-table 322. In the illustrated alternative the look-up-table 322 comprises two tables: a ratio table 332-1 and an optimal link direction assignment table 332-2. In the ratio table 332-1 each row represents one uplink/downlink ratio set of flexible subframes in the seven cells. In the optimal link direction assignment table 332-2 one row comprises for each cell, a link direction assignment at least for the flexible subframes, and wherein the mapping relation 322-3 is a pointer from a ratio table row to an optimal link direction. If the same principles are used for the optimal link direction assignment table 322-2 than were used for the above table 1, the mapping relation 322-2 may contain further information with which the pointed link direction assignment can be transferred to an actually optimal link direction assignment, using the same principles that will be described below with FIG. 5.

Figure 4:
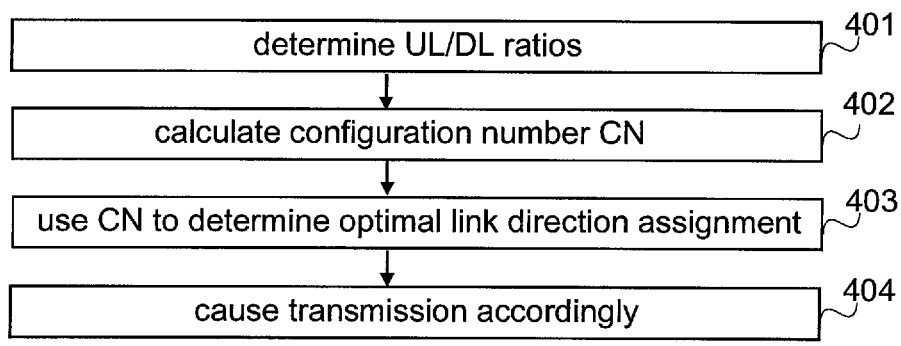
FIGS. 4 to 7 illustrate exemplified processes.

FIGS. 4 to 7 illustrate different functionality of an access node relating to optimal link direction alignment, or more precisely different functionality of the link direction alignment unit, or a combination of the link direction alignment unit and digital combinational circuit(s) for the look-up-table. The process is preferably performed independently in each cell. In the example of FIG. 4, the look-up-table comprising values for all possible mapping relations is used, whereas in the examples of FIGS. 5 and 6, the reduced table is used, and in the example of FIG. 7 the alternative look-up-table of FIG. 3 is used. The functionality described with FIGS. 3 to 7 may be triggered in response to detecting a change in traffic conditions that causes a change in the uplink/downlink ratios. Further, the process may be performed for every frame or for multiple frames.

Referring to FIG. 4, uplink/downlink ratios of flexible slots in the seven cells, i.e. the cell and in its six neighboring cells, are determined in block 401. The cells may determine the uplink/downlink ratios according to traffic demands in independent/coordinated way. The neighboring cells share the uplink/downlink ratios over Xn interface, for example, or over another connection/backhaul between the access nodes. Then a configuration number CN, i.e. #Congfig, is calculated in block 402, as described above. The calculated configuration number is then used in block 403 to determine assignments of the flexible slots for the optimal link direction alignment. When the look-up-table stored in the memory is used, the configuration number is used to retrieve the assignments for the optimal link direction alignment. When the combinational circuit(s) is (are) used, the configuration number is given as an input, and the assignments for optimal link direction alignment are received as an output. Then transmission according to the optimal link direction alignment is caused in block 404.

For example, if the seven cells attempt to make transmissions with the uplink downlink ratios {1:3, 1:3, 3:1, 2:2, 3:1, 4:0, 4:0}, the configuration number will be 20975, and the optimal link direction assignment will be (as can be seen from the table 1, which is a subset of the table that is actually used with the example):

cell 1: 1000 (subframe 3 uplink, subframes 4, 8, 9 downlink)
cell 2: 1000 (subframe 3 uplink, subframes 4, 8, 9 downlink)
cell 3: 1101 (subframes 3, 4, 9 uplink, subframe 4 downlink)
cell 4: 1100 (subframes 3, 4 uplink, subframes 8, 9 downlink)
cell 5: 1110 (subframes 3, 4, 8 uplink, subframe 9 downlink)
cell 6: 1111 (subframes 3, 4, 8, 9 uplink)
cell 7: 1111 (subframes 3, 4, 8, 9, uplink)

Figure 5:
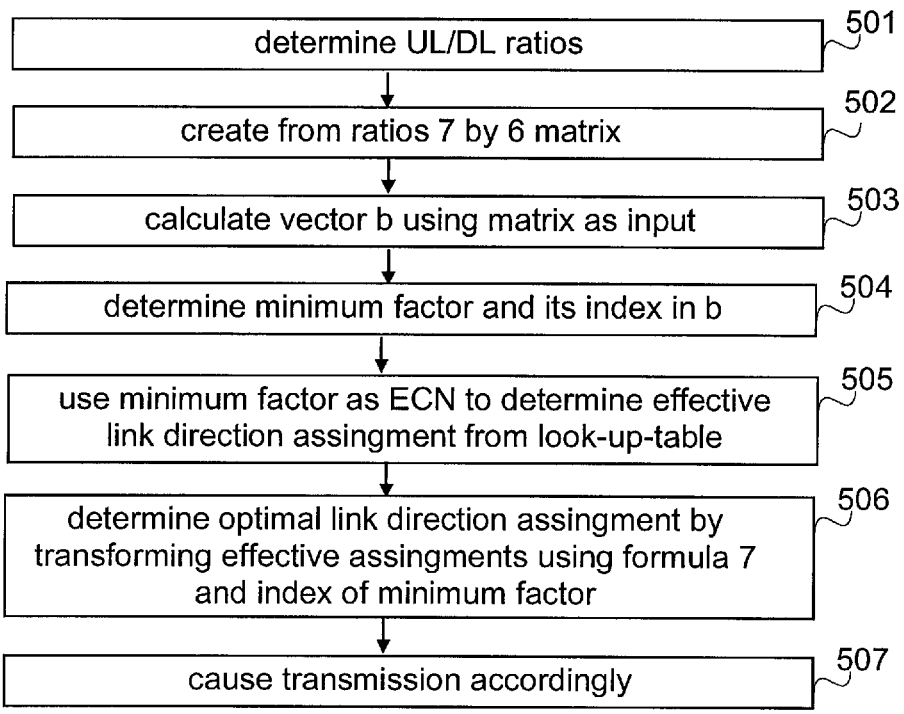

Referring to FIG. 5, the process is described in a little bit more detail, with an example, compared to the process of FIG. 4. The process in FIG. 5 starts when the uplink/downlink ratios of flexible slots in the cell and in its neighboring cells are determined in block 501, as described above with block 401. Let us assume that the ratios are {3:1, 1:3, 2:2, 1:3, 0:4, 3:1}. Then a matrix A, which is a 7 by 6 matrix for the hexagonal cell structure of 7 cells, is created in block 502. The matrix is created using following principles (formula 5):

$$A\left(\left\{N_{slot,n}^{UL}:(4-N_{slot,n}^{UL})\right\}_{n=1,2,\cdots,7}\right) = \begin{bmatrix} N_{slot,1}^{UL} & N_{slot,1}^{UL} & N_{slot,1}^{UL} & N_{slot,1}^{UL} & N_{slot,1}^{UL} & N_{slot,1}^{UL} \\ N_{slot,2}^{UL} & N_{slot,7}^{UL} & N_{slot,6}^{UL} & N_{slot,5}^{UL} & N_{slot,4}^{UL} & N_{slot,3}^{UL} \\ N_{slot,3}^{UL} & N_{slot,2}^{UL} & N_{slot,7}^{UL} & N_{slot,6}^{UL} & N_{slot,5}^{UL} & N_{slot,4}^{UL} \\ N_{slot,4}^{UL} & N_{slot,3}^{UL} & N_{slot,2}^{UL} & N_{slot,7}^{UL} & N_{slot,6}^{UL} & N_{slot,5}^{UL} \\ N_{slot,5}^{UL} & N_{slot,4}^{UL} & N_{slot,3}^{UL} & N_{slot,2}^{UL} & N_{slot,7}^{UL} & N_{slot,6}^{UL} \\ N_{slot,6}^{UL} & N_{slot,5}^{UL} & N_{slot,4}^{UL} & N_{slot,3}^{UL} & N_{slot,2}^{UL} & N_{slot,7}^{UL} \\ N_{slot,7}^{UL} & N_{slot,6}^{UL} & N_{slot,5}^{UL} & N_{slot,4}^{UL} & N_{slot,3}^{UL} & N_{slot,2}^{UL} \end{bmatrix}$$

wherein $\{N_{slot,n}^{UL}:(4-N_{slot,n}^{UL})\}_{n=1, 2, \ldots, 7}$ denotes the ratios.

For the assumed ratios {3:1, 1:3, 2:2, 1:3, 0:4, 3:1}, the matrix A will be:

$$\begin{bmatrix} 3 & 3 & 3 & 3 & 3 & 3 \\ 1 & 3 & 0 & 0 & 1 & 2 \\ 2 & 1 & 3 & 0 & 0 & 1 \\ 1 & 2 & 1 & 3 & 0 & 0 \\ 0 & 1 & 2 & 1 & 3 & 0 \\ 0 & 0 & 1 & 2 & 1 & 3 \\ 3 & 0 & 0 & 1 & 2 & 1 \end{bmatrix}$$

Then vector b is calculated (computed) in block 503, using following formula 6, that uses matrix A as input:

$$b=1+c^T[A\ 4-A]$$

wherein $$c=[5^6\ 5^5\ 5^4\ 5^3\ 5^2\ 5\ 1]^T, \text{ and}$$

The configuration number is the first value of b.

For the above example b=[51379, 57151, 48931, 47287, 500083, 53767, 26747, 20975, 29195, 30839, 28043, 24359].

The first value of b, i.e. 51379 in the example, is the configuration number. However, in the illustrated example, the configuration number is not used but instead of the configuration number, an effective configuration number is determined and used, irrespective whether the configuration number could be used. Therefore in block 504 a minimum factor (minimum value) $b_{min}$ amongst the factors of the vector b, and the index $i^*_{min}$ of the minimum factor are determined. The minimum factor is the effective configuration number.

In the example, the minimum factor is 20975, and its index is 8.

Then the minimum factor, i.e. the effective configuration number ECN, is used in block 505 to determine effective link direction assignment from the look-up-table. When the look-up-table stored in the memory is used, the effective configuration number is used to retrieve the assignments for the effective link direction assignment. When the combinational circuit(s) is (are) used, the effective configuration number is given as an input, and the effective link direction assignment is received as an output. In other words, [Link direction($b_{min}$, n)/n=1, 2, 3, 4, 5, 6, 7] is determined.

In the illustrated example, using the table 1 above, following values are determined:

{1000, 1000, 1101, 1100, 1110, 1111, 1111}.

Then the effective link direction assignment is converted in block 506 to the optimal link direction assignment by using cyclic shift and/or link direction reverse. In other words, the optimal link direction assignment is determined. The conversion, or transformation, may be performed using following formulas (formula 7), and the index of the minimum factor.

$$LinkDirection(b_1, n) = \begin{cases} \dfrac{LinkDirection(b_{min}, n)}{LinkDirection(b_{min}, n)} & \begin{aligned} n &= 1, i^*_{min} = 1, 2, 3, 4, 5, 6 \\ n &= 1, i^*_{min} = 7, 8, 9, 10, 11, 12 \end{aligned} \\ \dfrac{LinkDirection(b_{min}, 2+\mathrm{mod}(n+i^*_{min}-3, 6))}{LinkDirection(b_{min}, 2+\mathrm{mod}(n+i^*_{min}-3, 6))} & \begin{aligned} n &> 1, i^*_{min} = 1, 2, 3, 4, 5, 6 \\ n &> 1, i^*_{min} = 7, 8, 9, 10, 11, 12 \end{aligned} \end{cases}$$

For the example, the result of the conversion/transformation, i.e. the optimal link direction assignment will be:

{0111, 0010, 0011, 0001, 0000, 0000, 0111} meaning:
cell 1: subframe 3 downlink, subframes 4, 8, 9 uplink
cell 2: subframes 3, 4, 9 downlink, subframe 8 uplink
cell 3: subframes 3, 4 downlink, subframes 8, 9 uplink
cell 4: subframes 3, 4, 8, downlink, subframe 9 uplink
cell 5: subframes 3, 4, 8, 9 downlink
cell 6: subframes 3, 4, 8, 9, downlink
cell 7: subframe 3 downlink, subframes 4, 8, 9 uplink Then transmission according to the optimal link direction alignment is caused in block 507.

Figure 6:
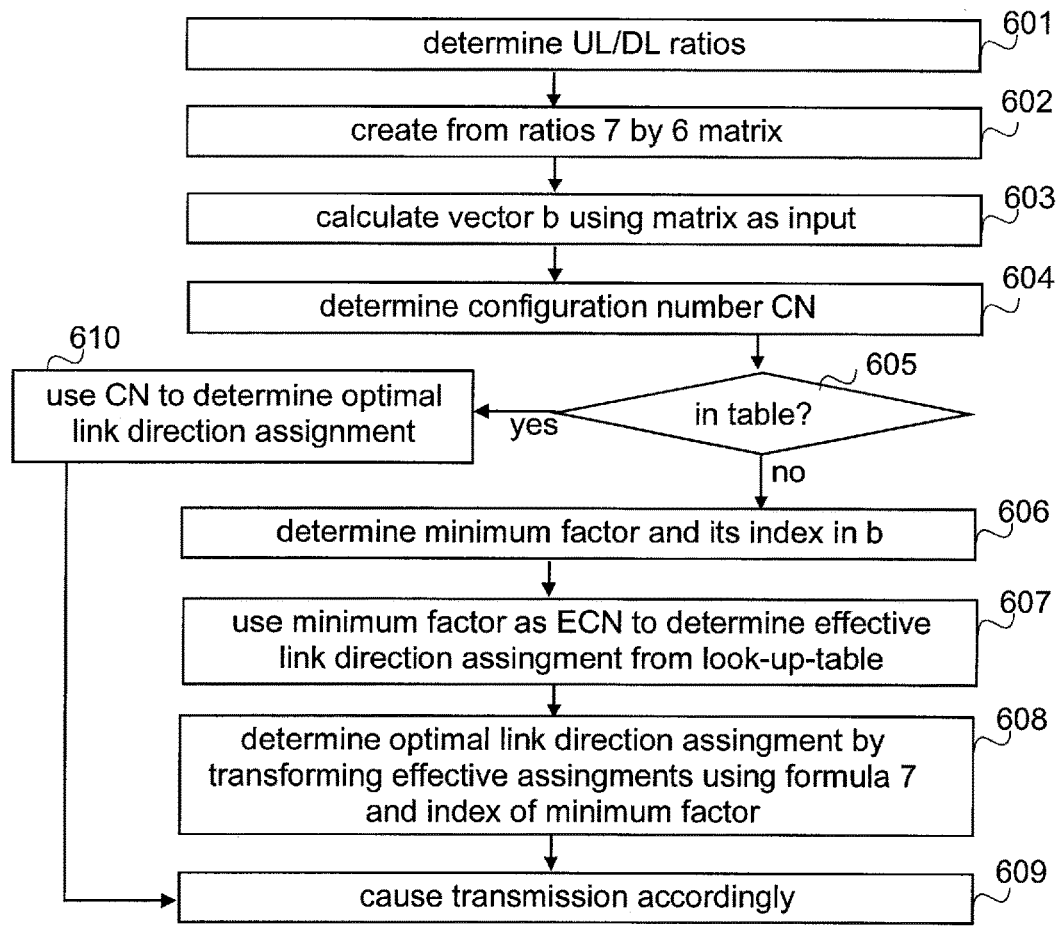

The process of FIG. 6 differs from the process described with FIG. in that respect, that if the configuration number happens to be in the table 1, no minimum factor is determined.

Referring to FIG. 6, blocks 601 to 603 correspond to blocks 501 to 503, and they are not repeated in vain herein. When the vector b has been calculated using formula 6, the configuration number CN is determined in block 604 from the vector b. Then it is checked in block 605, whether the configuration number is one of the configuration numbers in the reduced size look-up-table (table 1). If it is not (block 605: no), a minimum factor (minimum value) $b_{min}$ amongst the factors of the vector b, and the index $i^*_{min}$ of the minimum factor are determined in block 606, which corresponds to block 504. Then the process continues in blocks 607 to 609, which correspond blocks 505 to 507. They are not repeated in vain herein.

Otherwise, if the configuration number is in the reduced size look-up-table (block 605: yes), the configuration number CN is used in block 610 to determine the optimal link direction assignment from the look-up-table. No other processing is required, so the process may proceed directly to block 609 causing transmission(s) according to the optimal link direction assignment.

Using the examples described with FIG. 5, for the CN=20975, the values {1000, 1000, 1101, 1100, 1110, 1111, 1111} obtained from the table 1 are used as such, without spending time and resources in processes of blocks 606 to 608, whereas for the CN=51379 the process described above with FIG. 7 is used. However, some resources are used in blocks 604 and 605 for those configuration numbers that are not in the look-up-table.

Figure 7:
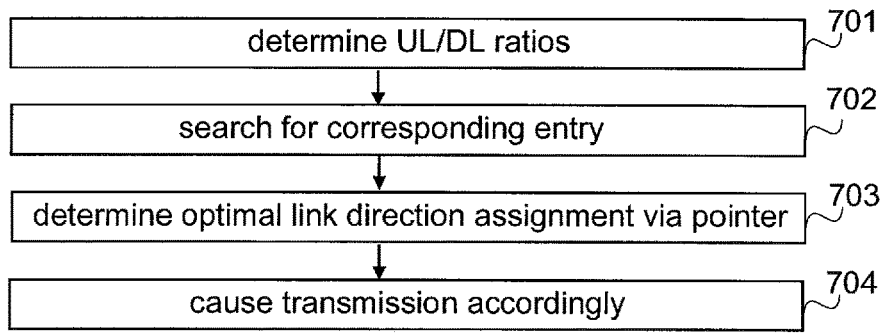

FIG. 7 illustrates an example how to use the look-up-table described with FIG. 3. The process in FIG. 7 starts when the uplink/downlink ratios of flexible slots in the cell and in its neighboring cells are determined in block 701, as described above with block 401.

Then the ratio table is search for in block 702 to detect a corresponding entry, i.e. a row with the same set of uplink/downlink ratios of the flexible slots. Once the entry is found, the optimal link direction assignment is determined in block 703 via the mapping relations pointer of the entry, the pointer pointing to the optimal link direction assignment in the optimal link direction assignment table. Then transmission(s) according to the optimal link direction assignment are caused in block 704.

Although in the above, the examples are described using a typical cellular deployment of the seven cell hexagonal grid, the principles can be extended with an appropriate clustering method to be implement for general cases. For example, a set of cells may be divided into several isolated or overlapped clusters, each cluster consisting of seven cells. Then any of the above described examples may be applied to each cluster. If a cell belongs to two or more overlapped clusters, it may have multiple options of link direction assignment and an appropriate one of the options for the overlapped cell may be chosen (selected). The selection may use diverse criteria.

The blocks, related functions, and information exchanges described above by means of FIGS. 1 to 7 are in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

The techniques and methods described herein may be implemented by various means so that an access node (network node/apparatus/device) configured to support postponement of user device capability resolving based on at least partly on what is disclosed above with any of FIGS. 1 to 7, comprises not only prior art means, but also means for implementing the one or more functions/operations of a corresponding functionality described with an embodiment, for example by means of any of FIGS. 2 to 7, and it may comprise separate means for each separate function/operation, or means may be configured to perform two or more functions/operations. For example, one or more of the means and/or the link direction assignment unit, described above, or its sub-units, and/or the look-up-table, described above, may be implemented in hardware (one or more devices), firmware (one or more devices), software (one or more modules), or combinations thereof. For a hardware implementation, the access node (nodes) may be implemented within one or more application-specific integrated circuits (ASICs), digital signal processors (DSPs), digital signal processing devices (DSPDs), programmable logic devices (PLDs), field programmable gate arrays (FPGAs), radio-frequency circuits (RFICs), processors, controllers, microcontrollers, microprocessors, logic gates, decoder circuitries, encoder circuitries, other electronic units designed to perform the functions described herein by means of FIGS. 1 to 7, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components described herein may be rearranged and/or complemented by additional components in order to facilitate the achievements of the various aspects, etc., described with regard thereto, and they are not limited to the precise configurations set forth in the given figures, as will be appreciated by one skilled in the art.

Figure 8:
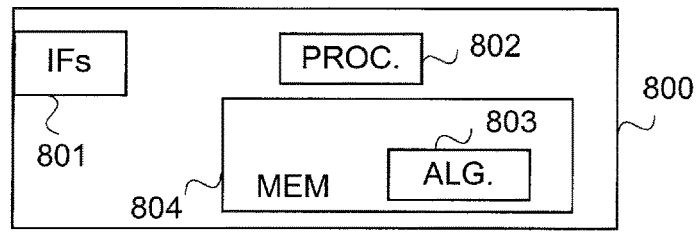
FIG. 8 is a schematic block diagram.

FIG. 8 provides an access node (network node, device, apparatus) according to some embodiments. FIG. 8 illustrates an access node 800 configured to carry out at least some of the functions described above in connection with the enhanced access unit. Each such access node may comprise one or more communication control circuitry, such as at least one processor 802, and at least one memory 804, including one or more algorithms 803, such as a computer program code (software) wherein the at least one memory and the computer program code (software) are configured, with the at least one processor, to cause the access node (network node, device, apparatus) to carry out any one of the exemplified functionalities of the link direction assignment unit, described above, or its sub-units, and/or the look-up-table, described above.

Referring to FIG. 8, at least one of the communication control circuitries in the corresponding access node (network node device, apparatus) 800 is configured to provide the enhanced access unit or its sub-units and to carry out functionalities described above by means of any of FIGS. 2 to 7 by one or more circuitries.

Referring to FIG. 8, the memory 804 may be implemented using any suitable data storage technology, such as semiconductor based memory devices, flash memory, magnetic memory devices and systems, optical memory devices and systems, fixed memory and removable memory.

Referring to FIG. 8, the access node may further comprise different interfaces 801 such as one or more communication interfaces (TX/RX) comprising hardware and/or software for realizing communication connectivity over any medium according to one or more communication protocols. The communication interface may provide the access node with communication capabilities to communicate in the cellular communication system and enable communication between terminal devices (user devices) and different network nodes and/or a communication interface to enable communication between different access nodes, for example. The communication interface may comprise standard well-known components such as an amplifier, filter, frequency-converter, (de)modulator, and encoder/decoder circuitries, controlled by the corresponding controlling units, and one or more antennas. The communication interfaces may comprise radio interface components providing the device with radio communication capability.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a base station, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node, or other computing device or network node.

In embodiments, the at least one processor, the memory, and the computer program code form processing means or comprises one or more computer program code portions for carrying out one or more operations according to any one of the embodiments/examples of FIGS. 2 to 7 or operations thereof.

Embodiments as described may also be carried out in the form of a computer process defined by a computer program or portions thereof. Embodiments of the methods described in connection with FIGS. 2 to 7 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. A network node configured to provide wireless access via a cell, the network node comprising:

at least one processor; and at least one memory including computer program code;

the at least one memory and computer program code configured to, with the at least one processor, cause the network node at least to perform:

determining in the cell and in its neighboring cells uplink/downlink ratios of at least flexible subframes within a transmission frame, a flexible subframe being a subframe that is flexibly assignable for uplink or for downlink;

determining, based on the uplink/downlink ratios, using a look-up-table comprising mappings between at least some uplink/downlink ratios and their optimal link direction assignments, optimal link direction assignments at least for the flexible subframes in the cell and its neighboring cells; and causing using the optimal link direction assignments in one or more transmissions.

2. A network node as claimed in claim 1, wherein the at least one memory and computer program code configured to, with the at least one processor, further cause the network node at least to perform, when the look-up-table comprises, for each link direction assignment in the look-up-table, as a mapping relation between the link direction assignment for the cells and a set of uplink/downlink ratios, a configuration number:

creating, using the uplink/downlink ratios determined, following matrix A $$\begin{bmatrix} N^{UL}_{slot,1} & N^{UL}_{slot,1} & N^{UL}_{slot,1} & N^{UL}_{slot,1} & N^{UL}_{slot,1} & N^{UL}_{slot,1} \\ N^{UL}_{slot,2} & N^{UL}_{slot,7} & N^{UL}_{slot,6} & N^{UL}_{slot,5} & N^{UL}_{slot,4} & N^{UL}_{slot,3} \\ N^{UL}_{slot,3} & N^{UL}_{slot,2} & N^{UL}_{slot,7} & N^{UL}_{slot,6} & N^{UL}_{slot,5} & N^{UL}_{slot,4} \\ N^{UL}_{slot,4} & N^{UL}_{slot,3} & N^{UL}_{slot,2} & N^{UL}_{slot,7} & N^{UL}_{slot,6} & N^{UL}_{slot,5} \\ N^{UL}_{slot,5} & N^{UL}_{slot,4} & N^{UL}_{slot,3} & N^{UL}_{slot,2} & N^{UL}_{slot,7} & N^{UL}_{slot,6} \\ N^{UL}_{slot,6} & N^{UL}_{slot,5} & N^{UL}_{slot,4} & N^{UL}_{slot,3} & N^{UL}_{slot,2} & N^{UL}_{slot,7} \\ N^{UL}_{slot,7} & N^{UL}_{slot,6} & N^{UL}_{slot,5} & N^{UL}_{slot,4} & N^{UL}_{slot,3} & N^{UL}_{slot,2} \end{bmatrix}$$

wherein $N_{slot,n}^{UL}$ is the number of flexible subframes that are assigned as uplink subframes to cell n;

calculating a vector b using the following formula $$b = 1 + c^T[A\ 4 - A]$$

wherein $$c = [5^6\ 5^5\ 5^4\ 5^3\ 5^2\ 5\ 1]^T, \text{ and}$$

A is the matrix A;

determining a minimum factor burin and its index $i^*_{min}$ in the vector b;

using the minimum factor as a configuration number to determine from the look-up-table link direction assignments; and determining optimal link direction assignments from the link direction assignments by using the following formula:

$$LinkDirection(b_1, n) =$$

$$\begin{cases} \dfrac{LinkDirection(b_{min}, n)}{LinkDirection(b_{min}, n)} & n = 1, i^*_{min} = 1, 2, 3, 4, 5, 6 \\ & n = 1, i^*_{min} = 7, 8, 9, 10, 11, 12 \\ \dfrac{LinkDirection(b_{min}, 2 + \mod(n + i^*_{min} - 3, 6))}{LinkDirection(b_{min}, 2 + \mod(n + i^*_{min} - 3, 6))} & n > 1, i^*_{min} = 1, 2, 3, 4, 5, 6 \\ & n > 1, i^*_{min} = 7, 8, 9, 10, 11, 12 \end{cases}$$

3. A network node as claimed in claim 2, wherein the at least one memory and computer program code configured to, with the at least one processor, further cause the network node at least to perform:
  determining, before determining the minimum factor, the first factor in the vector b to be a configuration number;
  checking, whether the look-up-table comprises the configuration number;
  in response to the look-up-table comprising the configuration number, using the link direction assignments as the optimal link direction assignments;
  in response to the look-up-table not comprising the configuration number, performing the determining the minimum factor and its index, the using the minimum factor as a configuration number to determine from the look-up-table link direction assignments and the determining optimal link direction assignments.

4. A network node as claimed in claim 1, wherein the look-up-table comprises at least a subset of optimal solutions to following zero-one problem:

$$N^*_{CLI}(\{N^{UL}_{slot,n}\}) = \min_{x^{cell}_{n,t}} \sum_{t=1}^{N_{slot}} \sum_{m \in S_{cell}} \sum_{n \in S_{cell}} a_{m,n}(x^{cell}_{m,t} - x^{cell}_{n,t})^2$$

$$\text{s.t.} \sum_{t=1}^{N_{slot}} x^{cell}_{n,t} = N^{UL}_{slot,n}, n \in S_{cell}, x^{cell}_{n,t} \in \{0, 1\},$$

$$n \in S_{cell}, t = 1, 2, \cdots, N_{slot}.$$

wherein
Nu*$_{CLI}$ is the minimum total number of link direction conflicts over the neighbouring cells for a given combination of uplink/downlink ratio,
$N_{slot,n}^{UL}$ is the number of flexible subframes that are assigned as uplink subframes to cell n,
$x_{n,t}^{cell}$ is a zero-one indication variable for link direction, 1 means that the subframe t is assigned as an uplink subframe for cell n, 0 means that subframe t is assigned as an downlink subframe for cell n,
$N_{slot}$ is the number of flexible subframes,
$S_{cell}$ is the cluster of neighbouring cells (i.e. the set of the indices of the neighbouring cells),
$a_{m,n}$ is a constant representing neighboring relation between cells m and n as follows $$a_{n,m} = \begin{cases} 1 & \text{if } n \neq m \text{ and cells } m \text{ and } n \text{ are } neighbouring \\ 0 & \text{if } n = m \text{ or cells } m \text{ and } n \text{ are not } neighbouring \end{cases}.$$

5. A network node as claimed in claim 1, wherein the at least one memory and computer program code configured to, with the at least one processor, further cause the network node to use hexagonal cell structure to determine the ratios and the optimal link direction assignments.

6. A network node as claimed claim 5, wherein the look-up-table comprises a subset of 3787 optimal link direction assignments from 78125 optimal link direction assignments, the subset covering 78125 optimal link direction assignments.

7. A method for a network node configured to provide wireless access via a cell, the method comprising:
  determining in the cell and in its neighboring cells uplink/downlink ratios of at least flexible subframes within a transmission frame, a flexible subframe being a subframe that is flexibly assignable for uplink or for downlink;
  determining, based on the uplink/downlink ratios, using a look-up-table comprising mappings between at least some uplink/downlink ratios and their optimal link direction assignments, optimal link direction assignments at least for the flexible subframes in the cell and its neighboring cells; and
  causing using the optimal link direction assignments in one or more transmissions.

8. A method as claimed in claim 7, the method further comprising:
  creating, using the uplink/downlink ratios determined, following matrix A $$\begin{bmatrix} N^{UL}_{slot,1} & N^{UL}_{slot,1} & N^{UL}_{slot,1} & N^{UL}_{slot,1} & N^{UL}_{slot,1} & N^{UL}_{slot,1} \\ N^{UL}_{slot,2} & N^{UL}_{slot,7} & N^{UL}_{slot,6} & N^{UL}_{slot,5} & N^{UL}_{slot,4} & N^{UL}_{slot,3} \\ N^{UL}_{slot,3} & N^{UL}_{slot,2} & N^{UL}_{slot,7} & N^{UL}_{slot,6} & N^{UL}_{slot,5} & N^{UL}_{slot,4} \\ N^{UL}_{slot,4} & N^{UL}_{slot,3} & N^{UL}_{slot,2} & N^{UL}_{slot,7} & N^{UL}_{slot,6} & N^{UL}_{slot,5} \\ N^{UL}_{slot,5} & N^{UL}_{slot,4} & N^{UL}_{slot,3} & N^{UL}_{slot,2} & N^{UL}_{slot,7} & N^{UL}_{slot,6} \\ N^{UL}_{slot,6} & N^{UL}_{slot,5} & N^{UL}_{slot,4} & N^{UL}_{slot,3} & N^{UL}_{slot,2} & N^{UL}_{slot,7} \\ N^{UL}_{slot,7} & N^{UL}_{slot,6} & N^{UL}_{slot,5} & N^{UL}_{slot,4} & N^{UL}_{slot,3} & N^{UL}_{slot,2} \end{bmatrix}$$

wherein $N_{slot,n}^{UL}$ is the number of flexible subframes that are assigned as uplink subframes to cell n;

calculating a vector b using the following formula $$b = 1 + c^T[A \ 4-A]$$

wherein $$c = [5^6 \ 5^5 \ 5^4 \ 5^3 \ 5^2 \ 5 \ 1]^T, \text{ and}$$

A is the matrix A;

determining a minimum factor burin and its index i*$_{min}$ in the vector b;

using the minimum factor as a configuration number to determine from the look-up-table link direction assignments; and determining optimal link direction assignments from the link direction assignments by using the following formula:

$$LinkDirection(b_1, n) = \begin{cases} \dfrac{LinkDirection(b_{min}, n)}{LinkDirection(b_{min}, n)} & n = 1, i^*_{min} = 1, 2, 3, 4, 5, 6 \\ & n = 1, i^*_{min} = 7, 8, 9, 10, 11, 12 \\ \dfrac{LinkDirection(b_{min}, 2 + \mod(n + i^*_{min} - 3, 6))}{LinkDirection(b_{min}, 2 + \mod(n + i^*_{min} - 3, 6))} & n > 1, i^*_{min} = 1, 2, 3, 4, 5, 6 \\ & n > 1, i^*_{min} = 7, 8, 9, 10, 11, 12 \end{cases}$$

9. A method as claimed in claim 8, the method further comprising:
determining, before determining the minimum factor, the first factor in the vector b to be a configuration number;
checking, whether the look-up-table comprises the configuration number;
in response to the look-up-table comprising the configuration number, using the link direction assignments as the optimal link direction assignments;
in response to the look-up-table not comprising the configuration number, performing the determining the minimum factor and its index, the using the minimum factor as a configuration number to determine from the look-up-table link direction assignments and the determining optimal link direction assignments.

10. A non-transitory computer readable medium comprising program instructions for causing a network node configured to provide wireless access via a cell to perform at least the following:
determining in the cell and in its neighboring cells uplink/downlink ratios of at least flexible subframes within a transmission frame, a flexible subframe being a subframe that is flexibly assignable for uplink or for downlink;
determining, based on the uplink/downlink ratios, using a look-up-table comprising mappings between at least some uplink/downlink ratios and their optimal link direction assignments, optimal link direction assignments at least for the flexible subframes in the cell and its neighboring cells; and
causing using the optimal link direction assignments in one or more transmissions.

11. A non-transitory computer readable medium as claimed in claim 10, the program instructions further causing the network to perform:
creating, using the uplink/downlink ratios determined, following matrix A $$\begin{bmatrix} N^{UL}_{slot,1} & N^{UL}_{slot,1} & N^{UL}_{slot,1} & N^{UL}_{slot,1} & N^{UL}_{slot,1} & N^{UL}_{slot,1} \\ N^{UL}_{slot,2} & N^{UL}_{slot,7} & N^{UL}_{slot,6} & N^{UL}_{slot,5} & N^{UL}_{slot,4} & N^{UL}_{slot,3} \\ N^{UL}_{slot,3} & N^{UL}_{slot,2} & N^{UL}_{slot,7} & N^{UL}_{slot,6} & N^{UL}_{slot,5} & N^{UL}_{slot,4} \\ N^{UL}_{slot,4} & N^{UL}_{slot,3} & N^{UL}_{slot,2} & N^{UL}_{slot,7} & N^{UL}_{slot,6} & N^{UL}_{slot,5} \\ N^{UL}_{slot,5} & N^{UL}_{slot,4} & N^{UL}_{slot,3} & N^{UL}_{slot,2} & N^{UL}_{slot,7} & N^{UL}_{slot,6} \\ N^{UL}_{slot,6} & N^{UL}_{slot,5} & N^{UL}_{slot,4} & N^{UL}_{slot,3} & N^{UL}_{slot,2} & N^{UL}_{slot,7} \\ N^{UL}_{slot,7} & N^{UL}_{slot,6} & N^{UL}_{slot,5} & N^{UL}_{slot,4} & N^{UL}_{slot,3} & N^{UL}_{slot,2} \end{bmatrix}$$

wherein $N_{slot,n}^{UL}$ is the number of flexible subframes that are assigned as uplink subframes to cell n;
calculating a vector b using the following formula $$b = 1 + c^T[A\ 4-A]$$

wherein $$c = [5^6\ 5^5\ 5^4\ 5^3\ 5^2\ 5\ 1]^T, \text{ and}$$

A is the matrix A;
determining a minimum factor burin and its index $i^*_{min}$ in the vector b;
using the minimum factor as a configuration number to determine from the look-up-table link direction assignments; and
determining optimal link direction assignments from the link direction assignments by using the following formula:

$$LinkDirection(b_1, n) = \begin{cases} \dfrac{LinkDirection(b_{min}, n)}{LinkDirection(b_{min}, n)} & n = 1, i^*_{min} = 1, 2, 3, 4, 5, 6 \\ & n = 1, i^*_{min} = 7, 8, 9, 10, 11, 12 \\ \dfrac{LinkDirection(b_{min}, 2 + \mod(n + i^*_{min} - 3, 6))}{LinkDirection(b_{min}, 2 + \mod(n + i^*_{min} - 3, 6))} & n > 1, i^*_{min} = 1, 2, 3, 4, 5, 6 \\ & n > 1, i^*_{min} = 7, 8, 9, 10, 11, 12 \end{cases}$$

12. A non-transitory computer readable medium as claimed in claim 11, the program instructions further causing the network to perform:
- determining, before determining the minimum factor, the first factor in the vector b to be a configuration number;
- checking, whether the look-up-table comprises the configuration number;
- in response to the look-up-table comprising the configuration number, using the link direction assignments as the optimal link direction assignments;
- in response to the look-up-table not comprising the configuration number, performing the determining the minimum factor and its index, the using the minimum factor as a configuration number to determine from the look-up-table link direction assignments and the determining optimal link direction assignments.

\* \* \* \* \*